(12) United States Patent
Kang et al.

(10) Patent No.: US 11,674,082 B2
(45) Date of Patent: Jun. 13, 2023

(54) POLYMERIZABLE LIQUID CRYSTAL COMPOUND, LIQUID CRYSTAL COMPOSITION FOR OPTICAL ELEMENT, POLYMER, OPTICALLY ANISOTROPIC BODY, AND OPTICAL ELEMENT FOR DISPLAY DEVICE

(71) Applicant: LG Chem, Ltd., Seoul (KR)

(72) Inventors: Minyoung Kang, Daejeon (KR); Hyok Joon Kwon, Daejeon (KR); Sung In Lee, Daejeon (KR)

(73) Assignee: LG Chem, Ltd.

( * ) Notice: Subject to any disclaimer, the term of this patent is extended or adjusted under 35 U.S.C. 154(b) by 108 days.

(21) Appl. No.: 17/043,856

(22) PCT Filed: Apr. 23, 2019

(86) PCT No.: PCT/KR2019/004888
§ 371 (c)(1),
(2) Date: Sep. 30, 2020

(87) PCT Pub. No.: WO2019/212183
PCT Pub. Date: Nov. 7, 2019

(65) Prior Publication Data
US 2021/0062092 A1 Mar. 4, 2021

(30) Foreign Application Priority Data
May 3, 2018 (KR) .................... 10-2018-0051165

(51) Int. Cl.
C09K 19/34 (2006.01)
G02F 1/13 (2006.01)
C08F 220/30 (2006.01)
C08F 222/10 (2006.01)
C09K 19/04 (2006.01)

(52) U.S. Cl.
CPC ...... *C09K 19/3452* (2013.01); *C08F 220/303* (2020.02); *C08F 222/1035* (2020.02); *G02F 1/13* (2013.01); *C09K 2019/0448* (2013.01)

(58) Field of Classification Search
CPC .......................... C07D 241/42; C07D 241/44
See application file for complete search history.

(56) References Cited

U.S. PATENT DOCUMENTS

| | | | |
|---|---|---|---|
| 2007/0205714 A1 | 9/2007 | Busing et al. | |
| 2008/0079354 A1 | 4/2008 | Egawa et al. | |
| 2009/0105447 A1 | 4/2009 | Schafer et al. | |
| 2010/0249349 A1* | 9/2010 | Chebotareva | C08G 61/126 526/259 |
| 2014/0311566 A1 | 10/2014 | Zhang et al. | |
| 2015/0277010 A1 | 10/2015 | Aimatsu et al. | |
| 2017/0145312 A1 | 5/2017 | Hida et al. | |
| 2017/0174992 A1 | 6/2017 | Ootsuki | |
| 2017/0183286 A1 | 6/2017 | Androsov et al. | |
| 2018/0037817 A1 | 2/2018 | Kuwana et al. | |
| 2021/0017315 A1* | 1/2021 | Shiraiwa | C08F 220/302 |

FOREIGN PATENT DOCUMENTS

| | | |
|---|---|---|
| CN | 101142275 A | 3/2008 |
| CN | 104737044 A | 6/2015 |
| CN | 106946709 A | 7/2017 |
| CN | 107954940 A | 4/2018 |
| JP | 2008106062 A | 5/2008 |
| KR | 101248047 B1 | 3/2013 |

(Continued)

OTHER PUBLICATIONS

Carlè et al., "Comparative studies of photochemical cross-linking methods for stabilizing the bulk hetero junction morphology in polymer solar cells", Journal of Materials Chemistry, Accepted Aug. 14, 2012, vol. 22, No. 46, pp. 24417-24423.

(Continued)

*Primary Examiner* — Chanceity N Robinson
*Assistant Examiner* — Anna Malloy
(74) *Attorney, Agent, or Firm* — Lerner David LLP

(57) ABSTRACT

A polymerizable liquid crystal compound represented by Chemical Formula 1, a liquid crystal composition for an optical element comprising the same, a polymer polymerized from the same, an optically anisotropic body comprising a cured material or polymerized reactant of the liquid crystal composition or the polymer, and an optical element for a display device comprising the optical anisotropic body are disclosed herein:

[Chemical Formula 1]

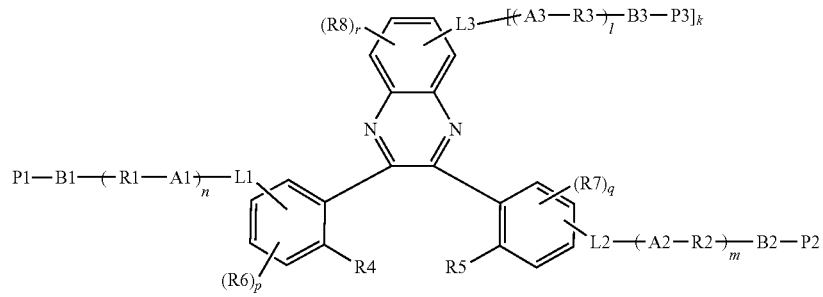

wherein, in Chemical Formula 1, A1 to A3, B1 to B3, R1 to R3, P1 to P3, R4 to R8, l, m, n, p, q r, k, and L1 to L3 are disclosed herein.

16 Claims, No Drawings

(56) References Cited

FOREIGN PATENT DOCUMENTS

| | | | |
|---|---|---|---|
| KR | 20130038548 | A | 4/2013 |
| KR | 101368183 | B1 | 2/2014 |
| KR | 20170061078 | A | 6/2017 |
| KR | 20170074178 | A | 6/2017 |
| KR | 20170105000 | A | 9/2017 |
| TW | 200640985 | A | 12/2006 |
| TW | 200736295 | A | 10/2007 |
| WO | 2005104264 | A1 | 11/2005 |
| WO | 2006097419 | A1 | 9/2006 |
| WO | 2007090773 | A1 | 8/2007 |
| WO | WO-2019176972 | A1 * | 9/2019 .......... C08F 220/301 |

OTHER PUBLICATIONS

Extended European Search Report for Application No. EP19796972 dated Dec. 18, 2020.
International Search Report for Application No. PCT/KR2019/004888 dated Jul. 31, 2019.
Lee et al., "Insertion of Poly (acrylamide) Disc-Columnar Liquid Crystals as a Functional Template in Organic Photovoltaics", Journal of Applied Polymer Science, Published online Feb. 20, 2012, vol. 126, p. E70-E77.
Taiwanese Search Report for Application No. TW108114924 dated Jul. 7, 2019.
Baek Jong-Beom et al: "Synthesis and photoluminescence of linear and hyperbranched polyethers containing phenylquinoxaline units and flexible aliphatic spacers", Journal of Polymer Science Part A: Polymer Chemistry, vol. 42, No. 14, Jul. 15, 2004 (Jul. 15, 2004), pp. 3587-3603, XP055966700.

* cited by examiner

POLYMERIZABLE LIQUID CRYSTAL COMPOUND, LIQUID CRYSTAL COMPOSITION FOR OPTICAL ELEMENT, POLYMER, OPTICALLY ANISOTROPIC BODY, AND OPTICAL ELEMENT FOR DISPLAY DEVICE

CROSS-REFERENCE TO RELATED APPLICATION(S)

The present application is a national phase entry under 35 U.S.C. § 371 of International Application No. PCT/KR2019/004888, filed on Apr. 23, 2019, which claims priority from Korean Patent Application No. 10-2018-0051165, filed May 3, 2018, the entire contents of which are incorporated herein by reference herein.

TECHNICAL FIELD

The present specification relates to a polymerizable liquid crystal compound, a liquid crystal composition for an optical element, a polymer, an optically anisotropic body, and an optical element for a display device.

BACKGROUND ART

A phase retarder is one type of optical element changing a polarization state of light passing through the phase retarder, and is also referred to as a wave plate. When an electromagnetic wave passes through the phase retarder, a polarization direction (electric field vector direction) becomes a sum of two components parallel or perpendicular to the optical axis (normal rays and extraordinary rays), and a vector sum of the two components varies depending on double refraction and thickness of the phase retarder, and therefore, the polarization direction changes after the passing through.

Herein, changing the polarization direction of light by 90 degrees is referred to as a quarter-wave plate ($\lambda/4$), and changing by 180 degrees is referred to as a half-wave plate ($\lambda/2$).

Herein, a retardation value of the phase retarder depends on the wavelength, and wavelength dispersion of the retardation value is classified into normal wavelength dispersion, flat wavelength dispersion, reverse wavelength dispersion and the like.

An optically anisotropic body such as a retardation film or a polarizing plate used in liquid crystal displays may be prepared by coating a solution including a polymerizable liquid crystal compound on a substrate, drying the result, and polymerizing the result by ultraviolet rays or heat. Since optical properties required for an optically anisotropic body differs depending on the purpose, compounds having properties suitable for the purpose are required.

PRIOR ART DOCUMENTS

Patent Documents

Korean Patent Application Laid-Open Publication No. 10-1999-0068186

DISCLOSURE

Technical Problem

The present disclosure is directed to providing a polymerizable liquid crystal compound, a liquid crystal composition for an optical element, a polymer, an optically anisotropic body, and an optical element for a display device.

Technical Solution

One embodiment of the present specification provides a polymerizable liquid crystal compound represented by the following Chemical Formula 1.

[Chemical Formula 1]

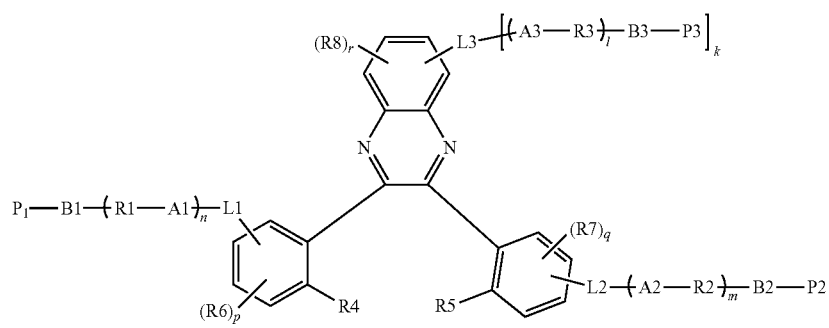

In Chemical Formula 1,

A1 to A3 are each O or S,

B1 to B3 are each a direct bond; or a substituted or unsubstituted alkylene group, R1 to R3 are each a substituted or unsubstituted alkylene group; or a substituted or unsubstituted arylene group, P1 and P2 are each a polymerizable functional group, P3 is hydrogen; a substituted or unsubstituted alkyl group; a substituted or unsubstituted alkoxy group; or a polymerizable functional group, the polymerizable functional group of P1, P2, and P3 is an epoxy group, an oxetane group, an aziridinyl group, a maleimide group, a (meth)acryloyl group or a (meth)acryloyloxy group, R4 to R8 are each hydrogen; or a substituted or unsubstituted alkyl group, and R4 and R5 may bond to each other to form a ring, l, m, n, p, q and r are each an integer of 0 to 3, and when l, m, n, p, q or r is 2 or greater, structures in the parentheses are the same as or different from each other, k is 1 or 2, and when k is 2, structures in the parentheses are the same as or different from each other, and L1 to L3 are each a direct bond or represented by the following Chemical Formula 2,

[Chemical Formula 2]

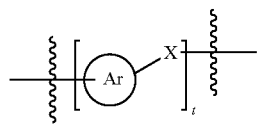

in Chemical Formula 2,

Ar is a substituted or unsubstituted arylene group; or a substituted or unsubstituted cycloalkylene group, X is a direct bond, —O—, —(CH$_2$)$_a$COO—, —OOC (CH$_2$)$_b$—, —(CH$_2$)$_c$—, —O(CH$_2$)$_d$O—, —(CH$_2$)$_e$O—, —O(CH$_2$)$_f$—, —CH═CH—, —NHNH—, —CH═N—, —N═CH— or —C≡C—, a and b are each an integer of 0 to 10, c to f are each an integer of 1 to 10, and t is an integer of 1 to 3, and when t is 2 or greater, structures in the parentheses are the same as or different from each other.

Another embodiment of the present specification provides a liquid crystal composition for an optical element including the polymerizable liquid crystal compound.

Another embodiment of the present specification provides a polymer obtained by polymerizing the polymerizable liquid crystal compound represented by Chemical Formula 1.

Another embodiment of the present specification provides an optically anisotropic body including a cured material or a polymerized reactant of the liquid crystal composition for an optical element.

Another embodiment of the present specification provides an optically anisotropic body including the polymer.

Another embodiment of the present specification provides an optical element for a display device including the optically anisotropic body.

Advantageous Effects

A polymerizable liquid crystal compound according to one embodiment of the present specification has excellent high temperature durability while having proper solubility, and therefore, excellent stability can be obtained when used in an optical element for a display.

MODE FOR DISCLOSURE

Hereinafter, the present specification will be described in more detail.

One embodiment of the present specification provides a polymerizable liquid crystal compound represented by the following Chemical Formula 1.

[Chemical Formula 1]

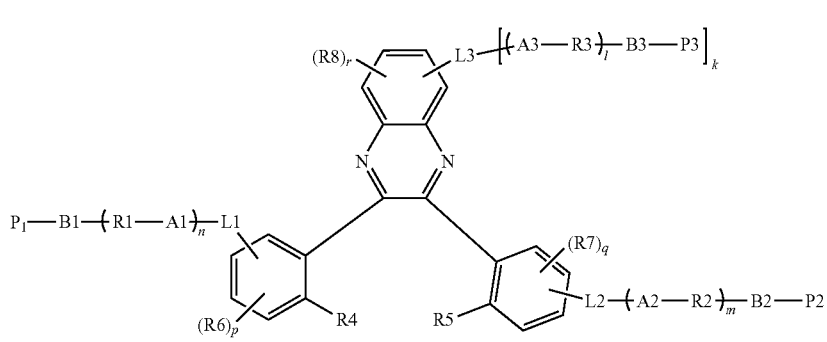

In Chemical Formula 1,

A1 to A3 are each O or S,

B1 to B3 are each a direct bond; or a substituted or unsubstituted alkylene group, R1 to R3 are each a substituted or unsubstituted alkylene group; or a substituted or unsubstituted arylene group, P1 and P2 are each a polymerizable functional group, P3 is hydrogen; a substituted or unsubstituted alkyl group; a substituted or unsubstituted alkoxy group; or a polymerizable functional group, the polymerizable functional group of P1, P2, and P3 is an epoxy group, an oxetane group, an aziridinyl group, a maleimide group, a (meth)acryloyl group or a (meth)acryloyloxy group, R4 to R8 are each hydrogen; or a substituted or unsubstituted alkyl group, and R4 and R5 may bond to each other to form a ring, l, m, n, p, q and r are each an integer of 0 to 3, and when l, m, n, p, q or r is 2 or greater, structures in the parentheses are the same as or different from each other, k is 1 or 2, and when k is 2, structures in the parentheses are the same as or different from each other, and L1 to L3 are each a direct bond or represented by the following Chemical Formula 2,

[Chemical Formula 2]

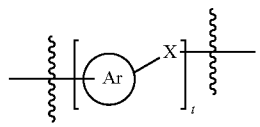

in Chemical Formula 2,

Ar is a substituted or unsubstituted arylene group; or a substituted or unsubstituted cycloalkylene group, X is a direct bond, —O—, —(CH$_2$)$_a$COO—, —OOC(CH$_2$)$_b$—, —(CH$_2$)$_c$—, —O(CH$_2$)$_d$O—, —(CH$_2$)$_e$O—, —O(CH$_2$)$_f$—, —CH=CH—, —NHNH—, —CH=N—, —N=CH— or —C≡C—, a and b are each an integer of 0 to 10, c to f are each an integer of 1 to 10, and t is an integer of 1 to 3, and when t is 2 or greater, structures in the parentheses are the same as or different from each other.

Existing reverse dispersion liquid crystal materials for a quarter-wave plate (λ/4) include a compound having a T-shape or H-shape molecular structure in order to have reverse dispersibility. In the case of the T-type, structures of benzothiazole or benzodithiol, specifically (benzylidenehydrazinyl)benzothiazole, are often used as a core to form a molecular skeleton, and molecules having such a skeleton structure have properties of being weak against heat with a high temperature due to low stiffness and stability at the core portion, and have a problem of being not suitable to be used in apparatuses exposed to a high temperature such as displays for a car.

In addition, in the case of the H-type, two linear mesogen groups are linked by a spacer to form a skeleton, and, despite excellent reverse dispersibility properties, this has a problem of low solubility making it difficult to prepare a film.

On the other hand, the polymerizable liquid crystal compound according to one embodiment of the present specification has high core stiffness and structural stability by including diphenylquinoxaline or dibenzophenazine as a core, and thereby has excellent solubility while having excellent high temperature durability. Accordingly, a reverse dispersion liquid crystal material for a quarter-wave plate having excellent performance and readily prepared to a film may be obtained.

In the present specification, a description of a certain part 'including' certain constituents means capable of further including other constituents, and does not exclude other constituents unless particularly stated on the contrary.

In the present specification, a description of one member being placed 'on' another member includes not only a case of the one member adjoining the another member but a case of still another member being present between the two members.

In the present specification,

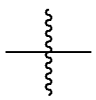

is a site linked to other units or substituents.

In the present specification, the term 'substitution' means a hydrogen atom bonding to a carbon atom of a compound is changed to another substituent, and the position of substitution is not limited as long as it is a position at which a hydrogen atom is substituted, that is, a position at which a substituent may substitute, and when two or more substituents substitute, the two or more substituents may be the same as or different from each other.

In the present specification, the term 'substituted or unsubstituted' means being substituted with one or more substituents selected from the group consisting of deuterium; a halogen group; a hydroxyl group; an alkyl group; a cycloalkyl group; an alkoxy group; an aryloxy group; an alkenyl group; an aryl group; and a heterocyclic group, or being substituted with a substituent linking two or more substituents among the substituents illustrated above, or having no substituents.

In the present specification, the alkyl group may be linear or branched, and although not particularly limited thereto, the number of carbon atoms is preferably from 1 to 50. Specific examples thereof may include methyl, ethyl, propyl, n-propyl, isopropyl, butyl, n-butyl, isobutyl, tert-butyl, sec-butyl, 1-methylbutyl, 1-ethylbutyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylhexyl, 4-methylhexyl and 5-methylhexyl and the like, but are not limited thereto.

In the present specification, the alkoxy group may be linear, branched or cyclic. The number of carbon atoms of the alkoxy group is not particularly limited, but is preferably from 1 to 20. Specific examples thereof may include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy and the like, but are not limited thereto.

In the present specification, the cycloalkyl group is not particularly limited, but preferably has 3 to 60 carbon atoms, and according to one embodiment, the number of carbon atoms of the cycloalkyl group is from 3 to 40. According to another embodiment, the number of carbon atoms of the cycloalkyl group is from 3 to 20. According to another embodiment, the number of carbon atoms of the cycloalkyl group is from 3 to 6.

Specific examples thereof may include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl and the like, but are not limited thereto.

The alkyl group may be substituted with an aryl group or a heteroaryl group to function as an arylalkyl group or a heteroarylalkyl group. The aryl group and the heteroaryl group may be each selected from among examples of the aryl group and the heteroaryl group to describe later.

In the present specification, the aryl group is not particularly limited, but preferably has 6 to 60 carbon atoms, and may be monocyclic or polycyclic.

Examples of the monocyclic aryl group may include a phenyl group, a biphenyl group, a terphenyl group and the like, but are not limited thereto. Examples of the polycyclic aryl group may include a naphthyl group, an anthracenyl group, a phenanthryl group, a pyrenyl group, a perylenyl group, a chrysenyl group, a fluorenyl group and the like, but are not limited thereto. The fluorenyl group may be substituted, and adjacent substituents may bond to each other to form a ring.

In the present specification, the heterocyclic group includes one or more atoms that are not carbon, that is, heteroatoms, and specifically, the heteroatom may include one or more atoms selected from the group consisting of O, N, Se, S and the like. The number of carbon atoms of the heterocyclic group is not particularly limited, but is preferably from 2 to 60. Examples of the heterocyclic group may include a thiophene group, a furan group, a pyrrole group, an imidazole group, a triazole group, an oxazole group, an oxadiazole group, a triazole group, a pyridyl group, a bipyridyl group, a pyrimidyl group, a triazine group, a triazole group, an acridyl group, a pyridazine group, a pyrazinyl group, a quinolinyl group, a quinazoline group, a quinoxalinyl group, an isoquinoline group, an indole group, a carbazole group, a benzoxazole group, a benzimidazole group, a benzothiazole group, a benzocarbazole group, a benzothiophene group, a dibenzothiophene group, a benzofuranyl group, a phenanthroline group, a thiazolyl group, an isoxazolyl group, an oxadiazolyl group, a thiadiazolyl group, a phenothiazinyl group, a dibenzofuranyl group and the like, but are not limited thereto.

The heterocyclic group may be monocyclic or polycyclic, and may be aromatic, aliphatic or a fused ring of aromatic and aliphatic.

In the present specification, descriptions on the heterocyclic group provided above may be applied to the heteroaryl group except for being aromatic.

In the present specification, the alkylene group may be selected from among the examples of the alkyl group described above except for being divalent.

In the present specification, descriptions on the cycloalkyl group provided above may be applied to the cycloalkylene group except for being divalent.

In the present specification, the arylene group means an aryl group having two bonding sites, that is, a divalent group. Descriptions on the aryl group provided above may be applied thereto except for each being a divalent group.

In the present specification, the heteroarylene group means a heteroaryl group having two bonding sites, that is, a divalent group. Descriptions on the heteroaryl group provided above may be applied thereto except for each being a divalent group.

In the present specification, the polymerizable functional group means a functional group capable of producing a polymerization reaction when initiating a reaction by light or heat. Specifically, substituents including an epoxy group, an oxetane group

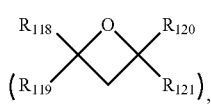

an aziridinyl group

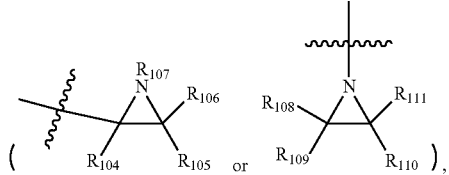

a maleimide group

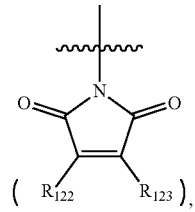

a (meth)acryloyl group

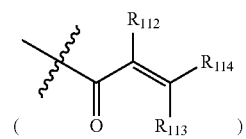

or a (meth)acryloyloxy group

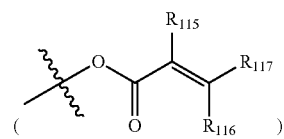

may be included.

is a site linked to Chemical Formula 1, and $R_{104}$ to $R_{123}$ are each hydrogen; a halogen group; or a substituted or unsubstituted alkyl group, and adjacent substituents may bond to each other to form a ring.

In one embodiment of the present specification, R4 to R8 are each hydrogen.

In one embodiment of the present specification, R4 and R5 are each a methyl group and bond to each other to form a ring, and R6 to R8 are each hydrogen.

In one embodiment of the present specification, Chemical Formula 1 may be represented by the following Chemical Formula 1-1 or 1-2.

[Chemical Formula 1-1]

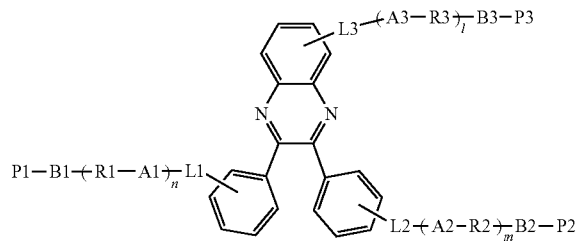

-continued

[Chemical Formula 1-2]

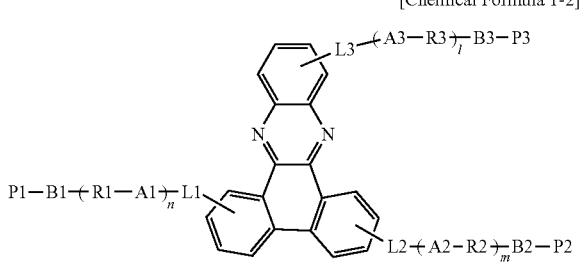

In Chemical Formulae 1-1 and 1-2,

A1 to A3, B1 to B3, R1 to R3, P1 to P3, L1 to L3, l, m and n have the same definitions as in Chemical Formula 1.

In one embodiment of the present specification, L1 and L2 are each represented by Chemical Formula 2, and L3 is a direct bond.

In one embodiment of the present specification, A1 to A3 are each O.

In one embodiment of the present specification, R1 to R3 are each a linear alkylene group having 1 to 10 carbon atoms.

In one embodiment of the present specification, R1 to R3 are each a linear alkylene group having 1 to 5 carbon atoms.

In one embodiment of the present specification, R1 to R3 are each an ethylene group.

In one embodiment of the present specification, l, m and n are each 1 or 2.

In one embodiment of the present specification, l is 2, and m and n are each 1.

In one embodiment of the present specification, B1 and B2 are each a substituted or unsubstituted alkylene group, and B3 is a direct bond.

In one embodiment of the present specification, B1 and B2 are each a linear alkylene group having 1 to 10 carbon atoms.

In one embodiment of the present specification, B1 and B2 are each a linear alkylene group having 2 to 8 carbon atoms.

In one embodiment of the present specification, B1 and B2 are each a butylene group.

In one embodiment of the present specification, P1 to P3 are each a (meth)acryloyl group or a (meth)acryloyloxy group.

In one embodiment of the present specification, P1 to P3 are each a (meth)acryloyloxy group.

In one embodiment of the present specification, P1 to P3 are each a methacryloyloxy group.

In one embodiment of the present specification, P1 and P2 are each a polymerizable functional group, and P3 is a methyl group, a methoxy group or hydrogen.

In one embodiment of the present specification, Ar is an arylene group having 6 to 30 carbon atoms; or a cycloalkylene group having 3 to 30 carbon atoms.

In one embodiment of the present specification, Ar is a benzene ring group or a cyclohexane group.

In one embodiment of the present specification, X is —O—, —COO—, —OCH$_2$O—, —CH$_2$CH$_2$—, —CH$_2$O— or —OCH$_2$—.

In one embodiment of the present specification, X is COO.

In one embodiment of the present specification, a and b are an integer of 0 to 2.

In one embodiment of the present specification, c to f are each 1 or 2.

In one embodiment of the present specification, Chemical Formula 2 is represented by the following Chemical Formula 2-1 or 2-2.

[Chemical Formula 2-1]

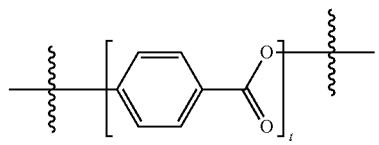

[Chemical Formula 2-2]

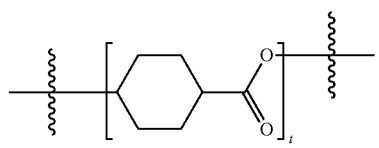

In Chemical Formulae 2-1 and 2-2, t is an integer of 1 to 3, and when t is 2 or greater, structures in the parentheses are the same as or different from each other.

In one embodiment of the present specification, t is 1.

In one embodiment of the present specification, L1 and L2 are each represented by Chemical Formula 2-1 or 2-2, and L3 is a direct bond.

In one embodiment of the present specification, the polymerizable liquid crystal compound is represented by any one selected from among the following Chemical Formulae 1-3 to 1-113.

[Chemical Formula 1-3]
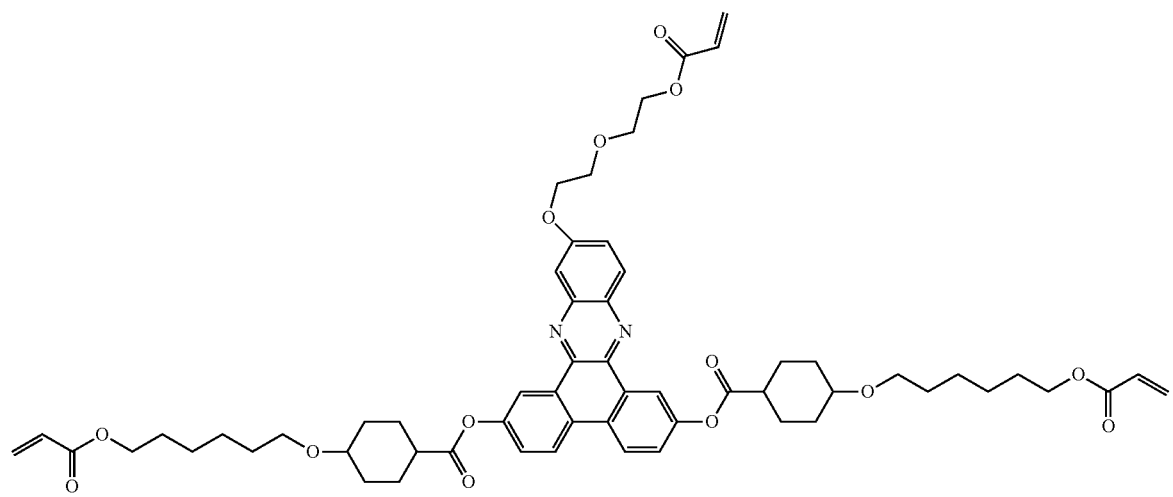
[Chemical Formula 1-4]
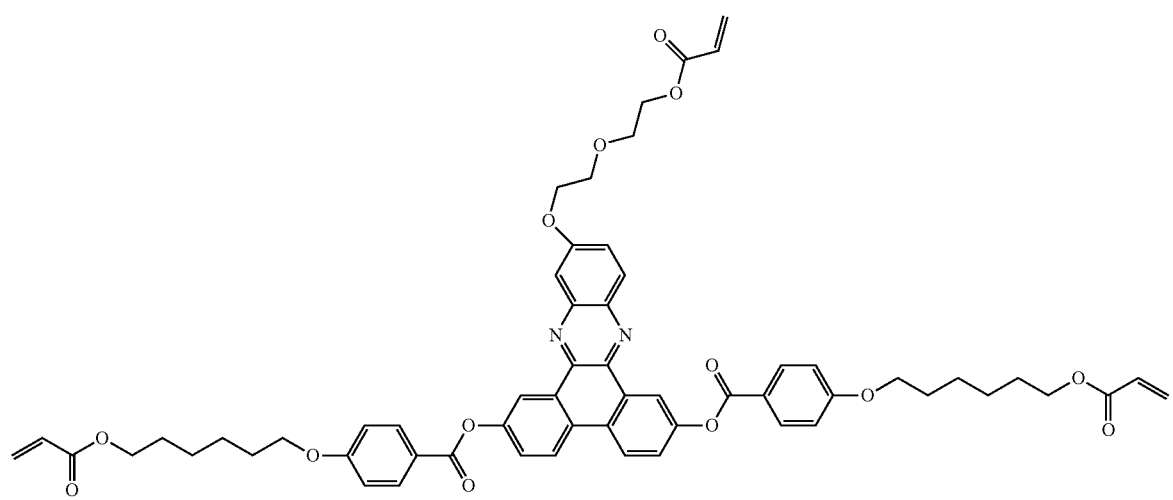
[Chemical Formula 1-5]
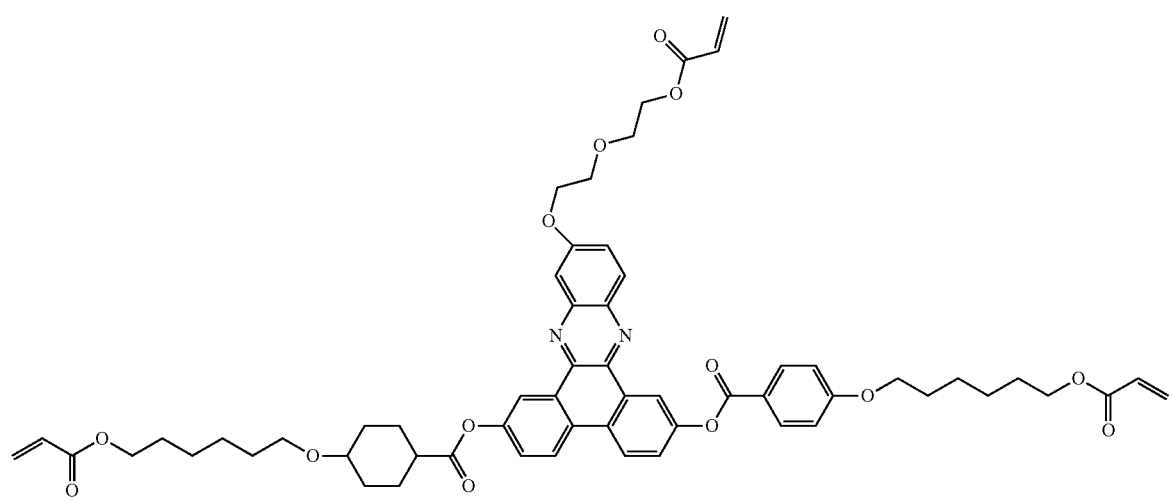

[Chemical Formula 1-6]
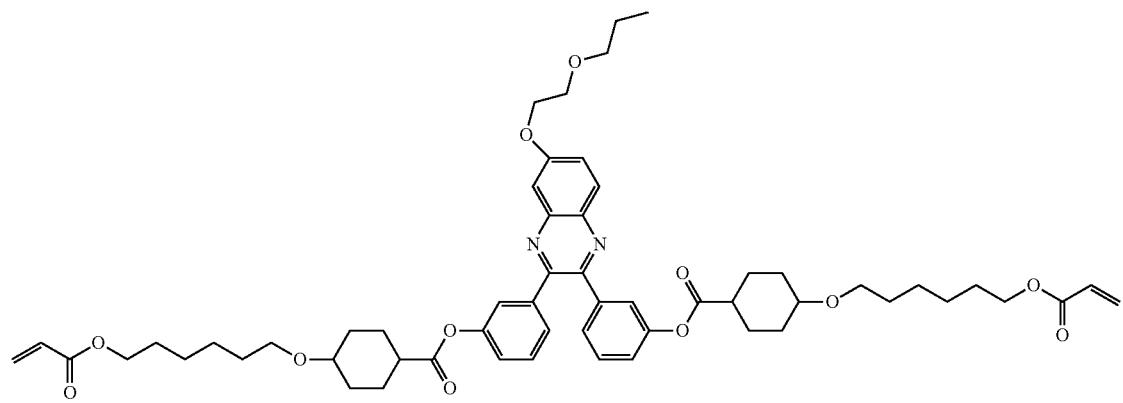
[Chemical Formula 1-7]
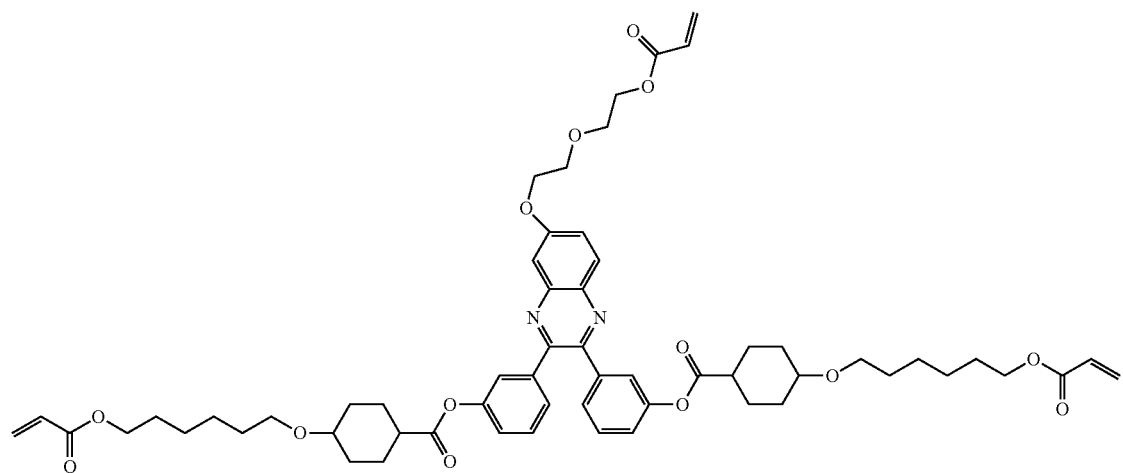
[Chemical Formula 1-8]
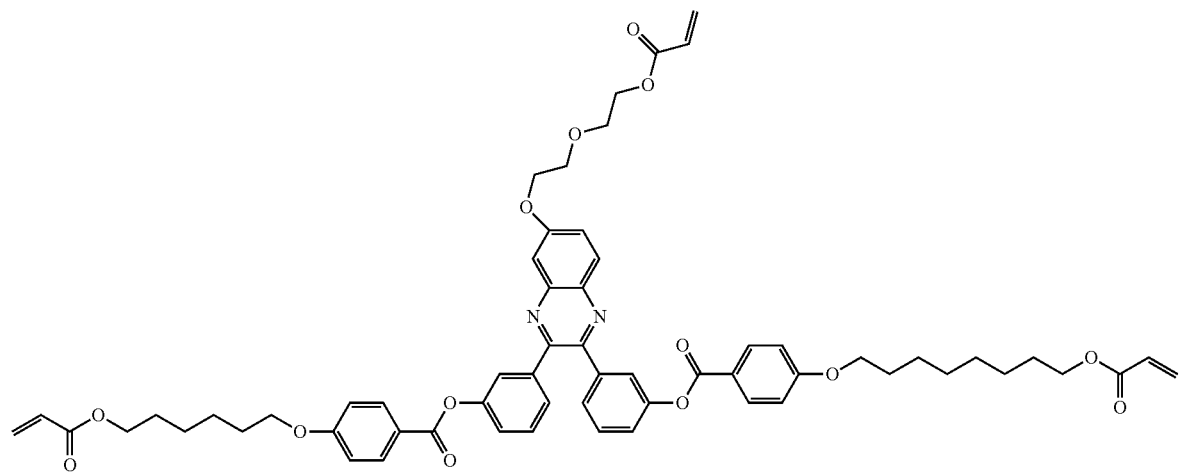

[Chemical Formula 1-9]
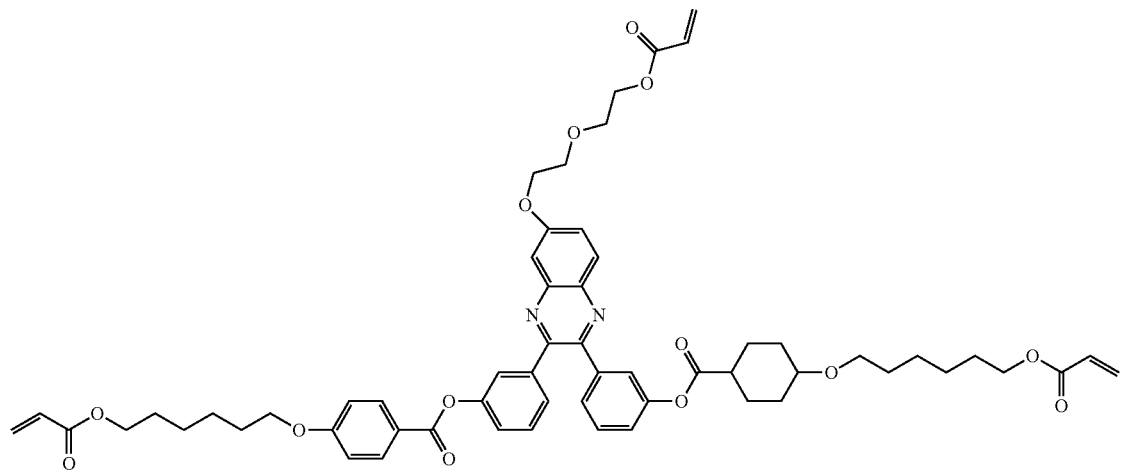
[Chemical Formula 1-10]
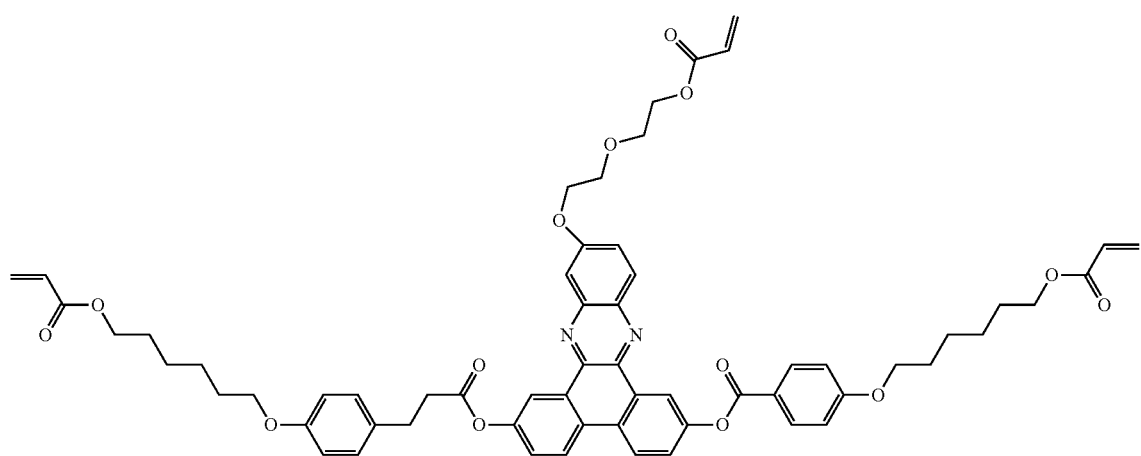
[Chemical Formula 1-11]
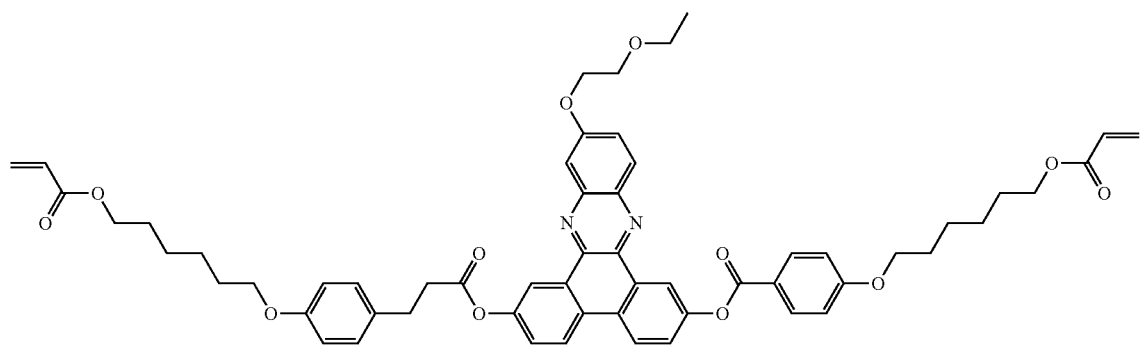

[Chemical Formula 1-12]
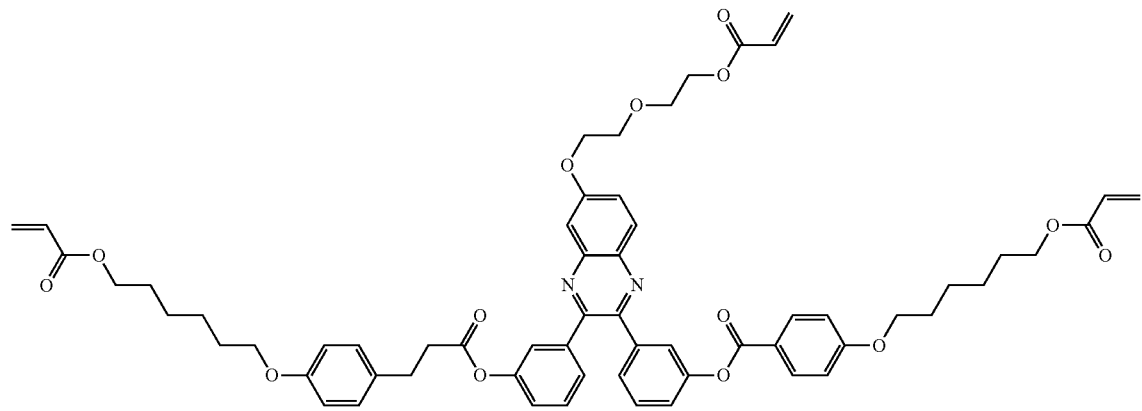
[Chemical Formula 1-13]
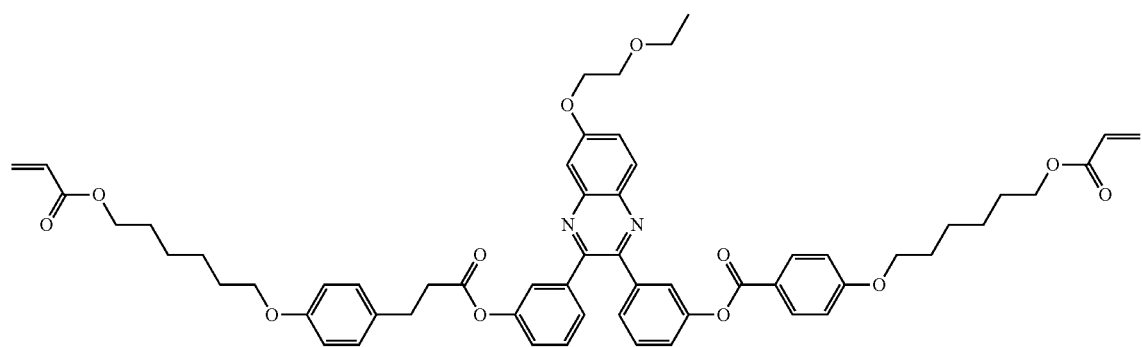
[Chemical Formula 1-14]
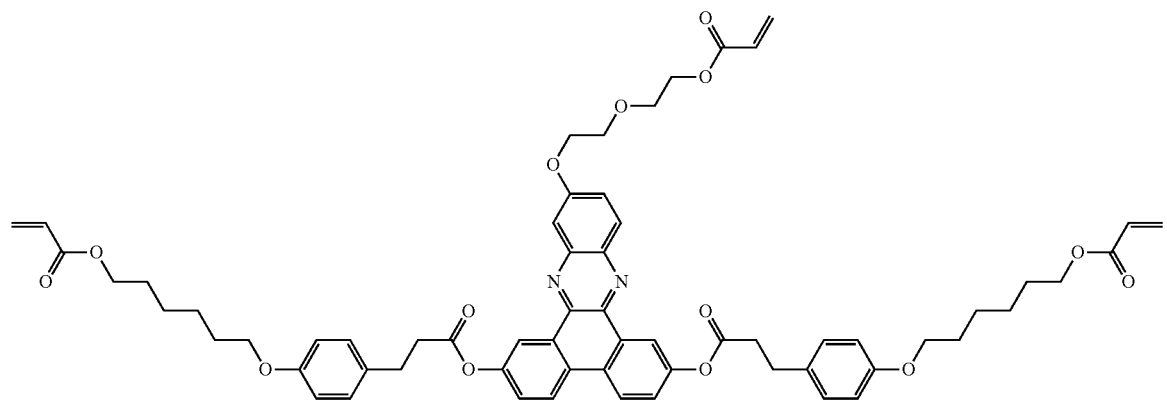
[Chemical Formula 1-15]
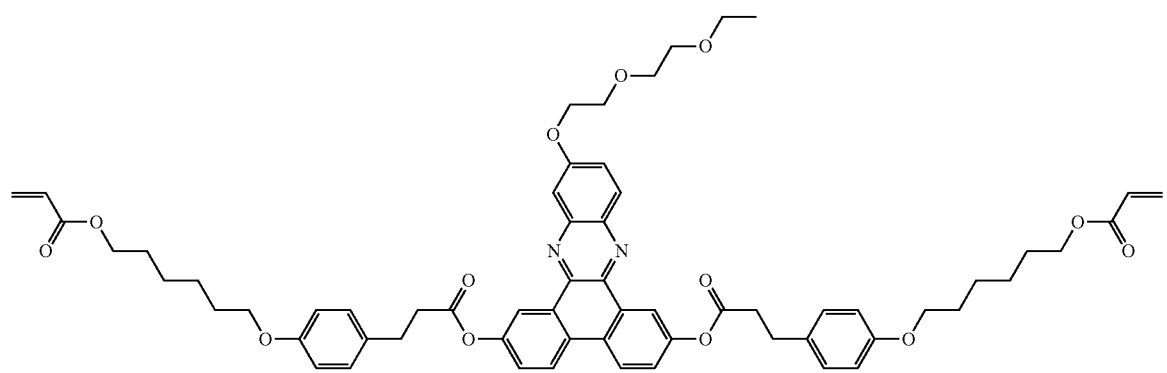

-continued
[Chemical Formula 1-16]
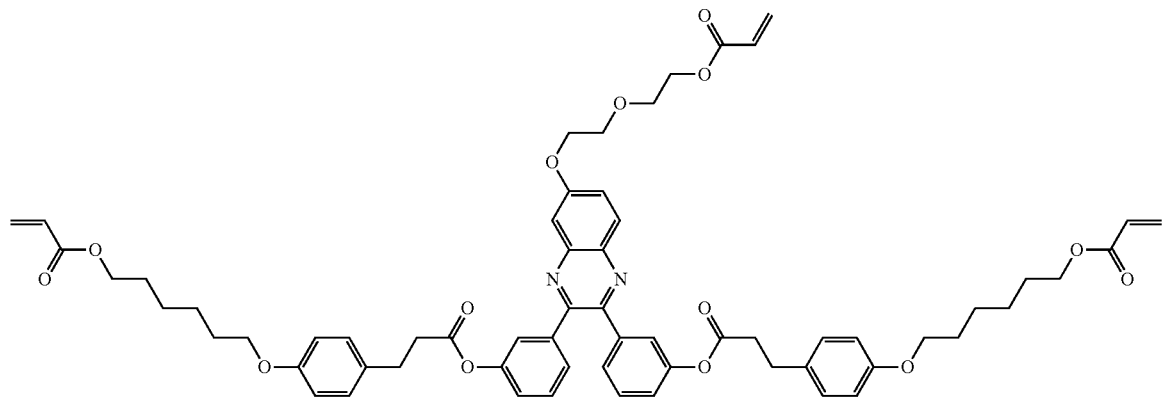
[Chemical Formula 1-17]
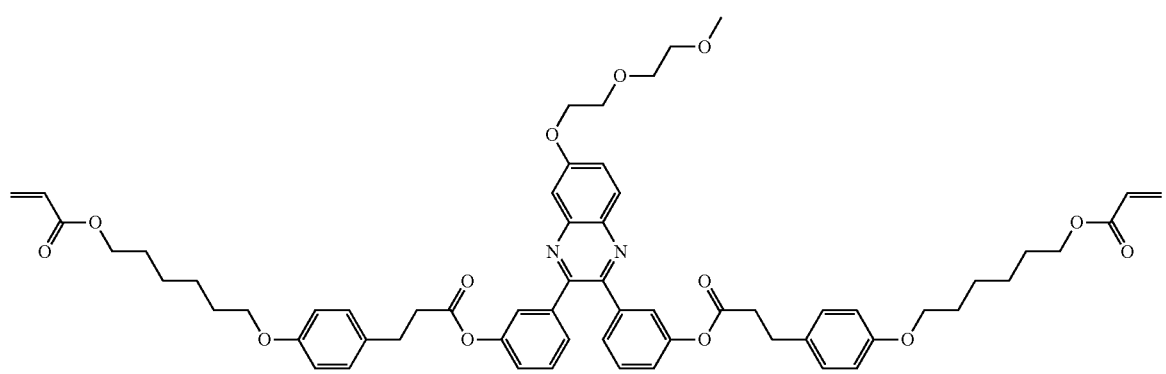
[Chemical Formula 1-18]
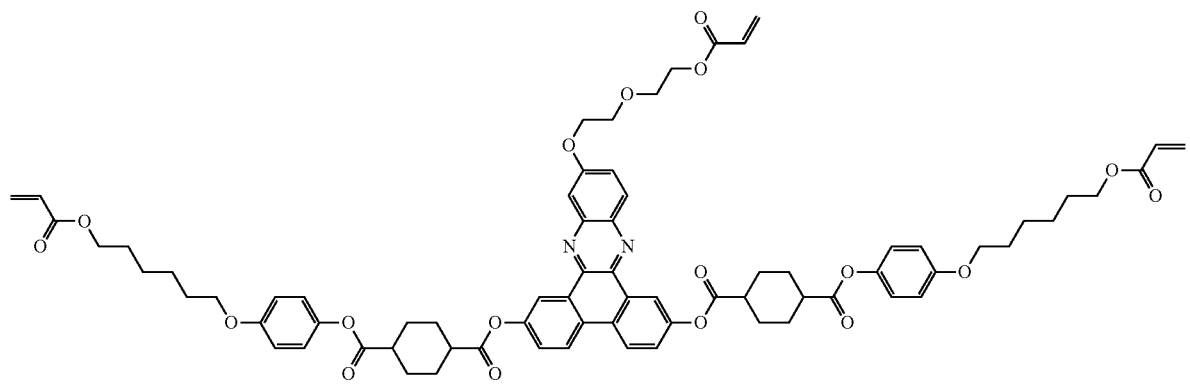
[Chemical Formula 1-19]
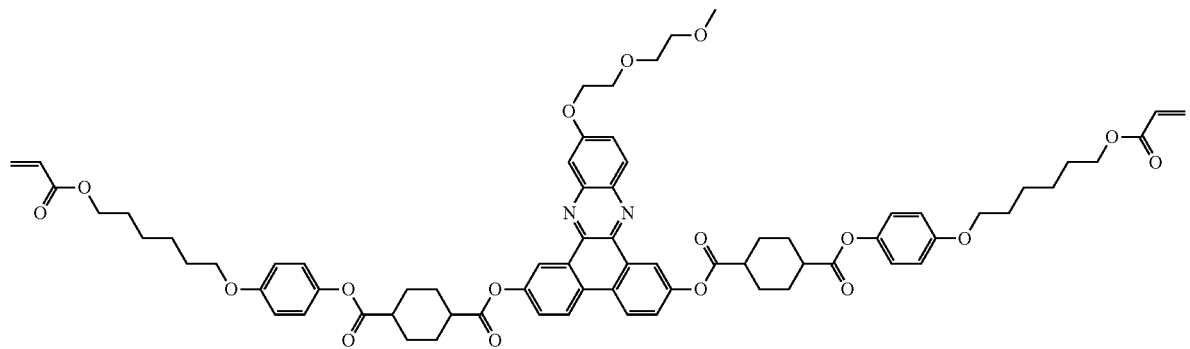

[Chemical Formula 1-20]
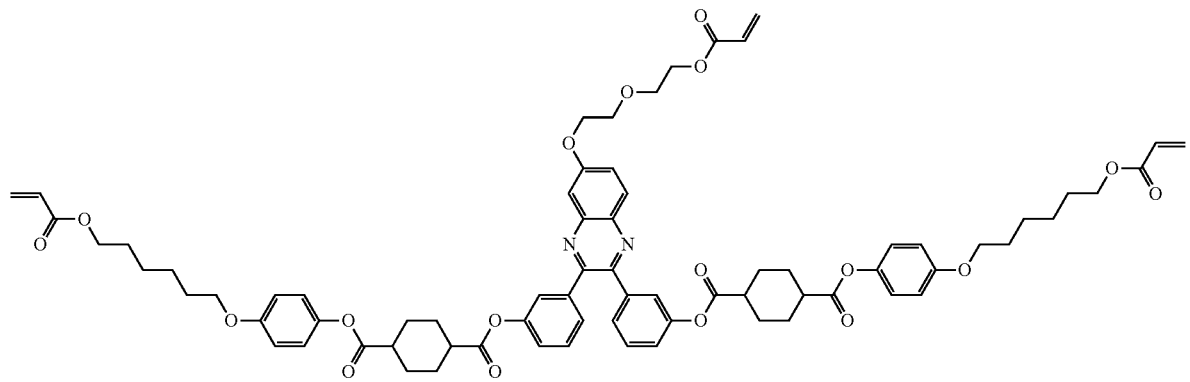
[Chemical Formula 1-21]
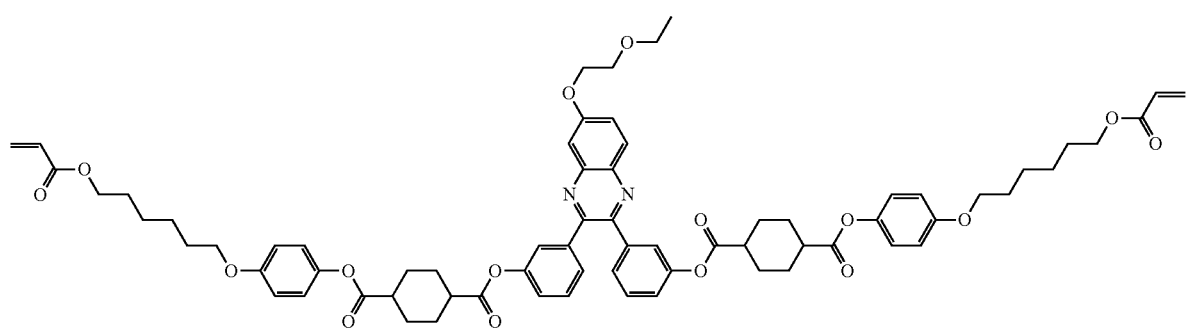
[Chemical Formula 1-22]
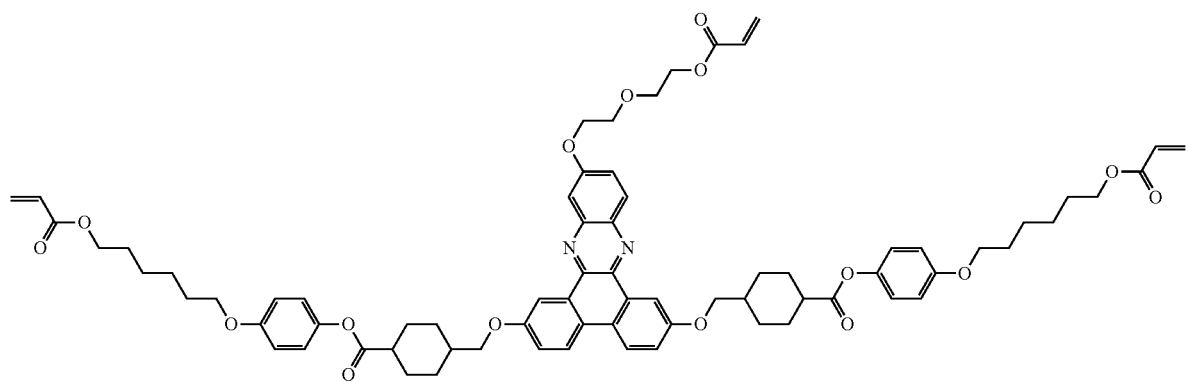
[Chemical Formula 1-23]
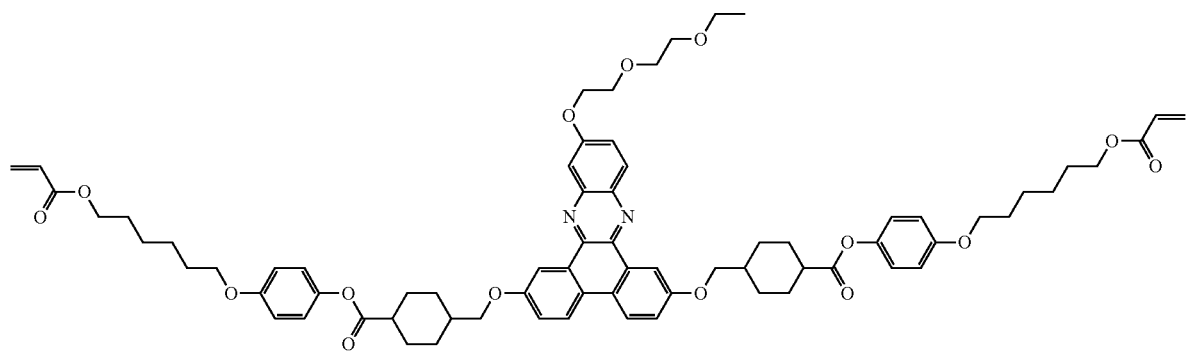

-continued
[Chemical Formula 1-24]
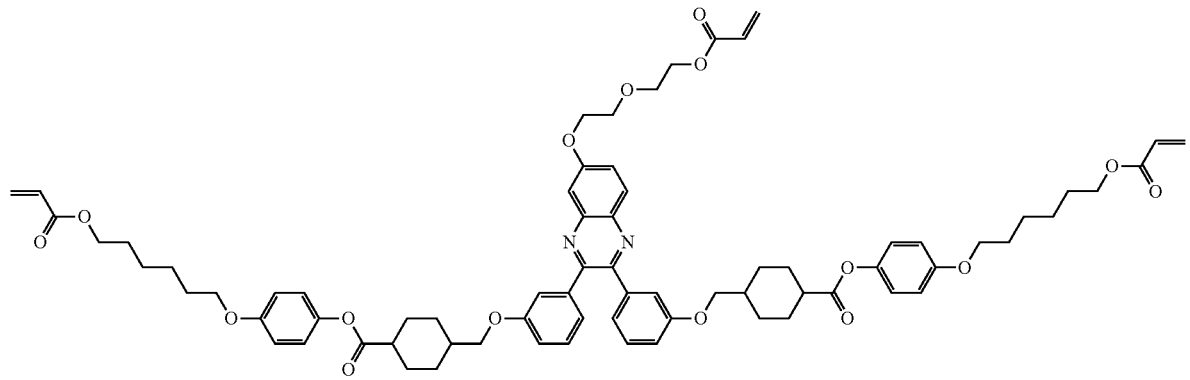
[Chemical Formula 1-25]
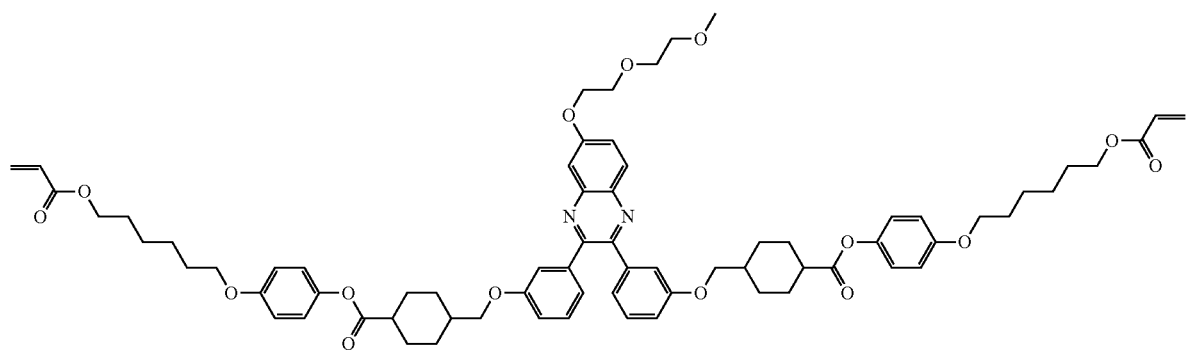
[Chemical Formula 1-26]
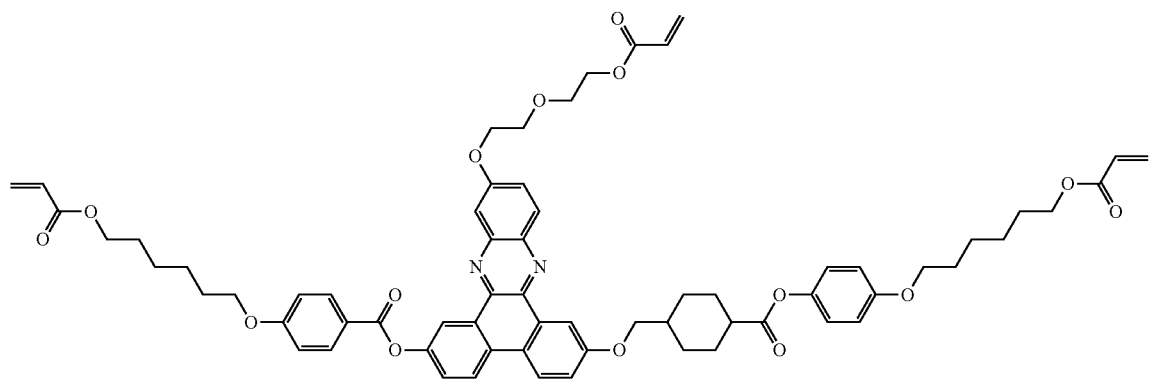
[Chemical Formula 1-27]
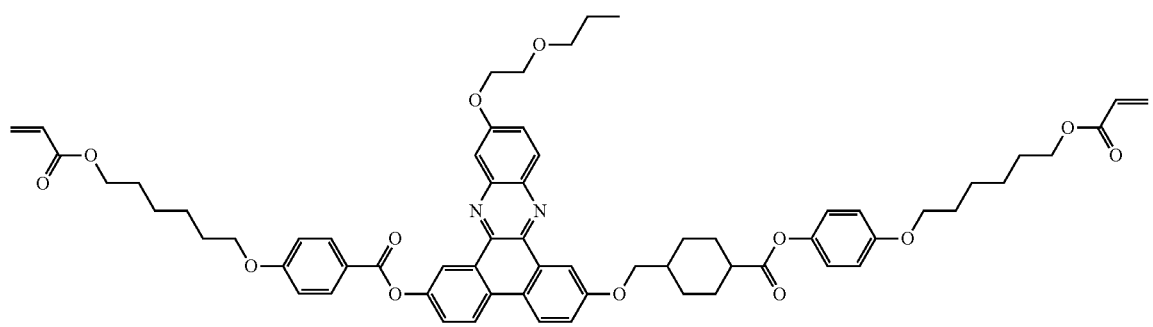

-continued
[Chemical Formula 1-28]
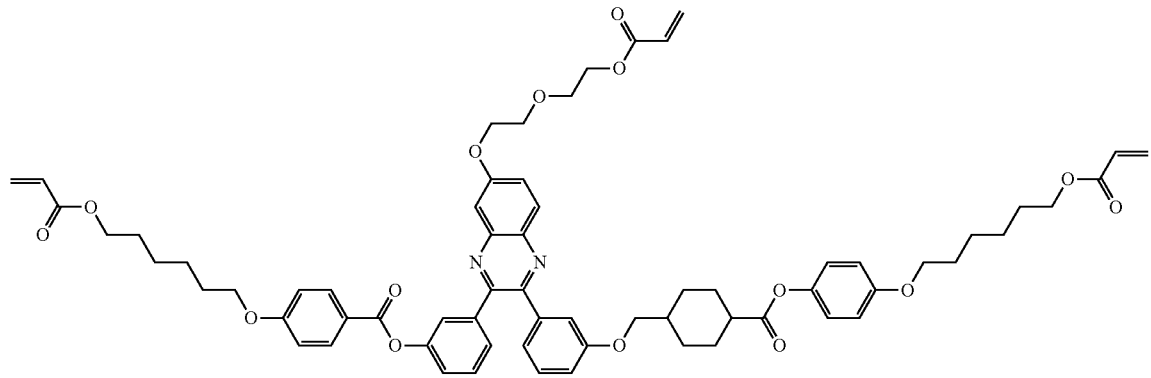
[Chemical Formula 1-29]
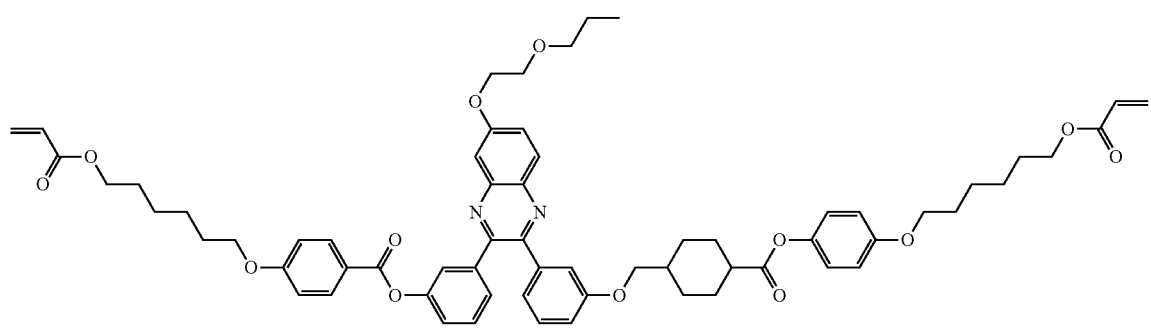
[Chemical Formula 1-30]
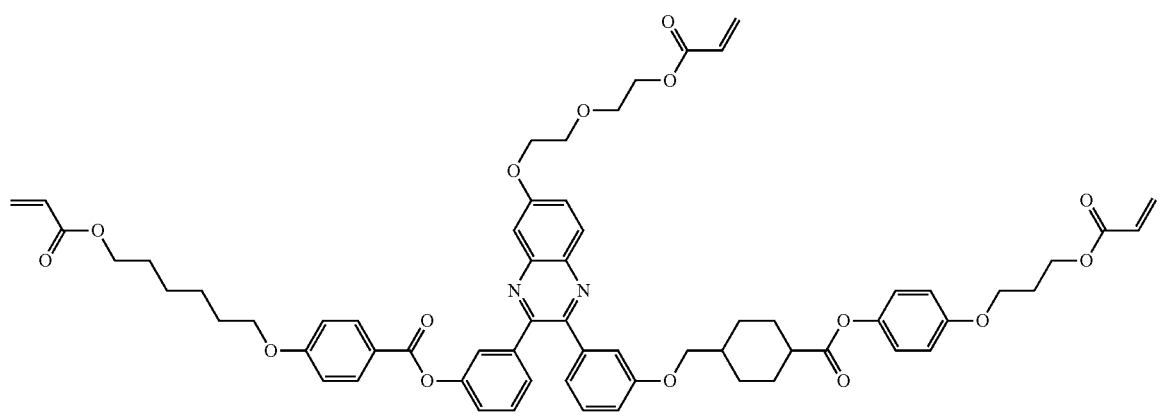
[Chemical Formula 1-31]
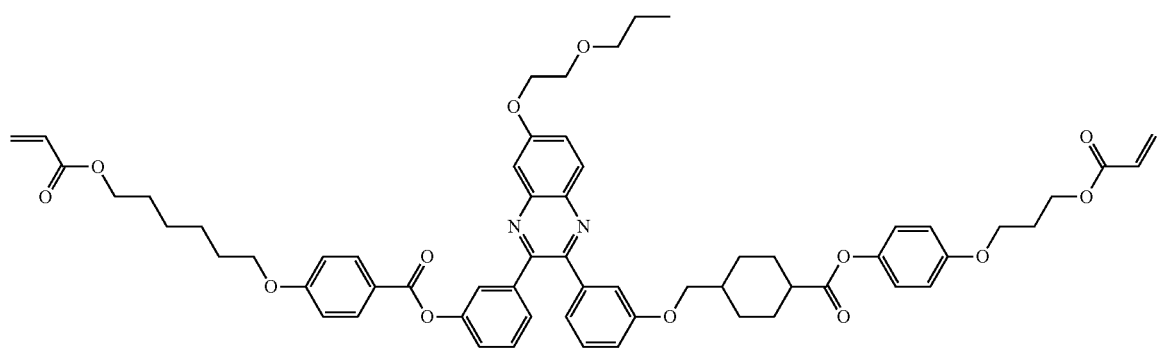

-continued
[Chemical Formula 1-32]
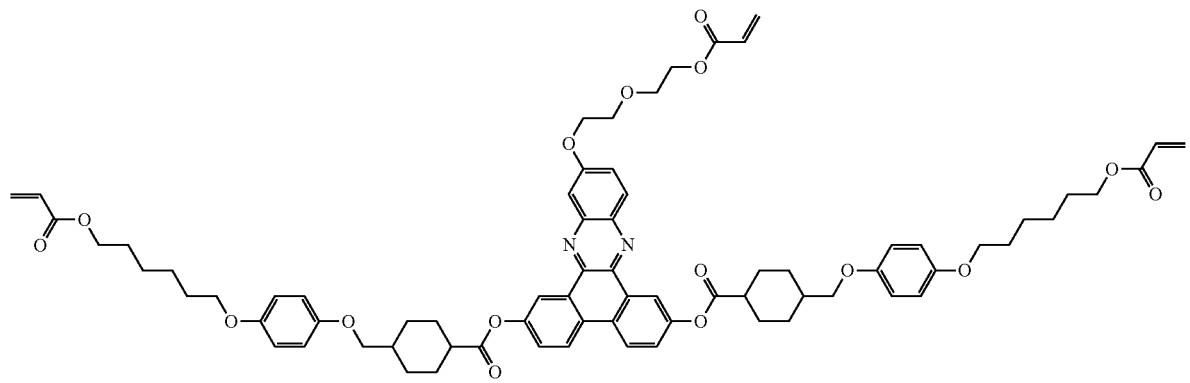
[Chemical Formula 1-33]
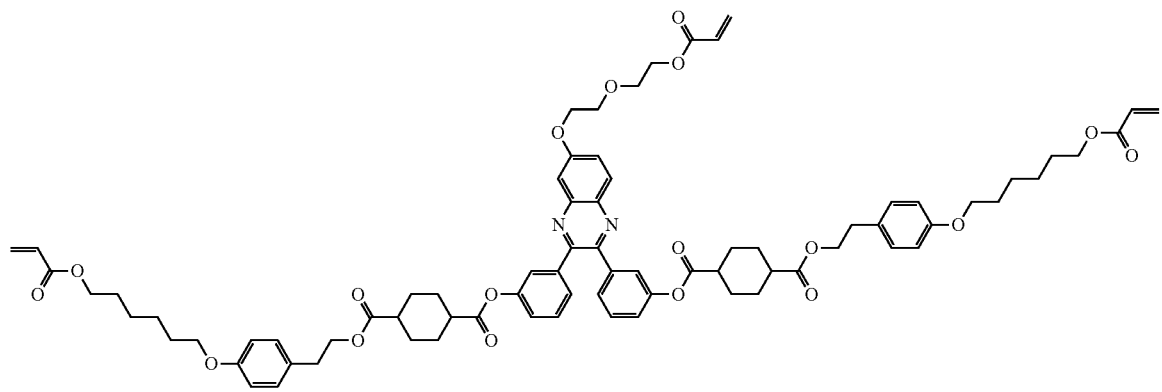
[Chemical Formula 1-34]
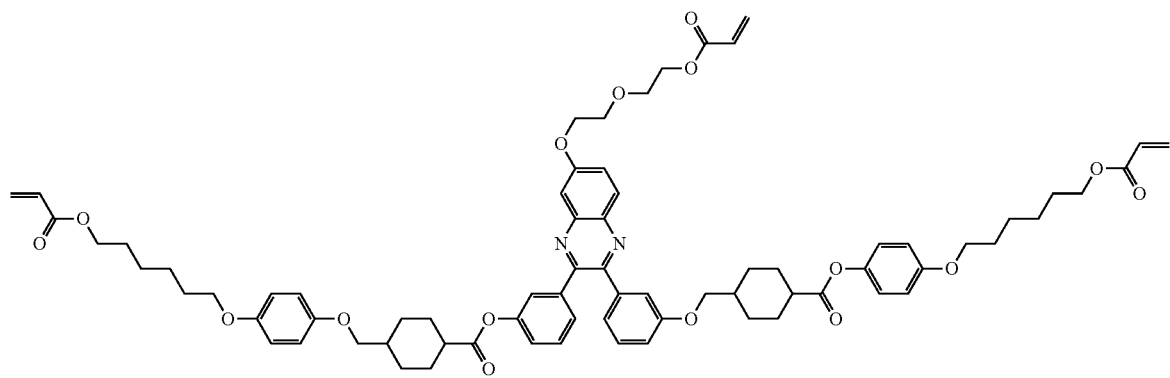
[Chemical Formula 1-35]
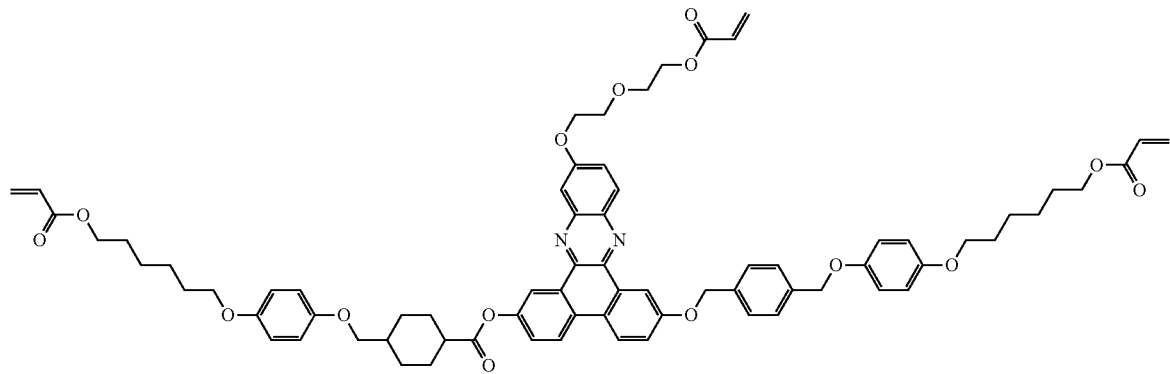

-continued
[Chemical Formula 1-36]
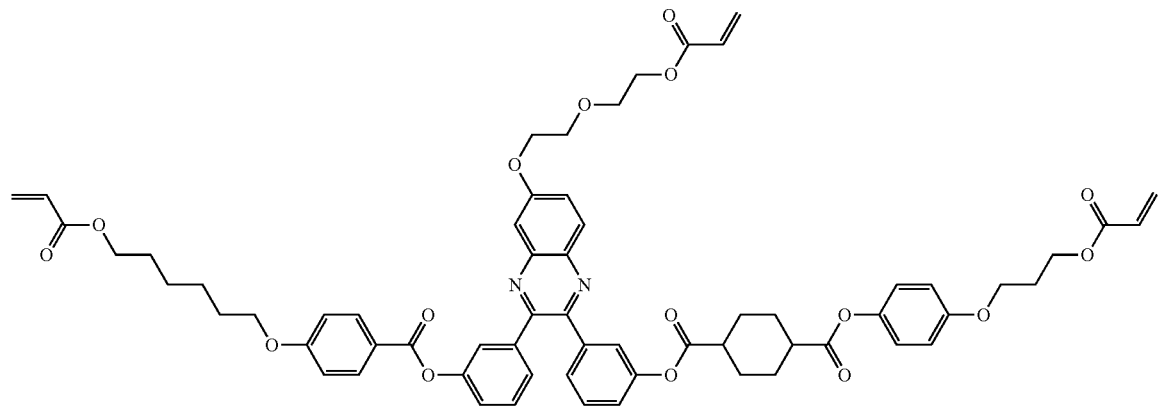
[Chemical Formula 1-37]
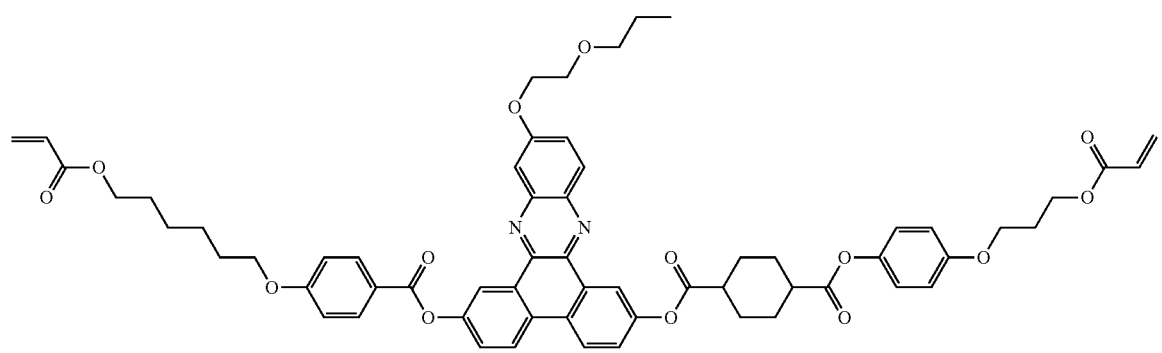
[Chemical Formula 1-38]
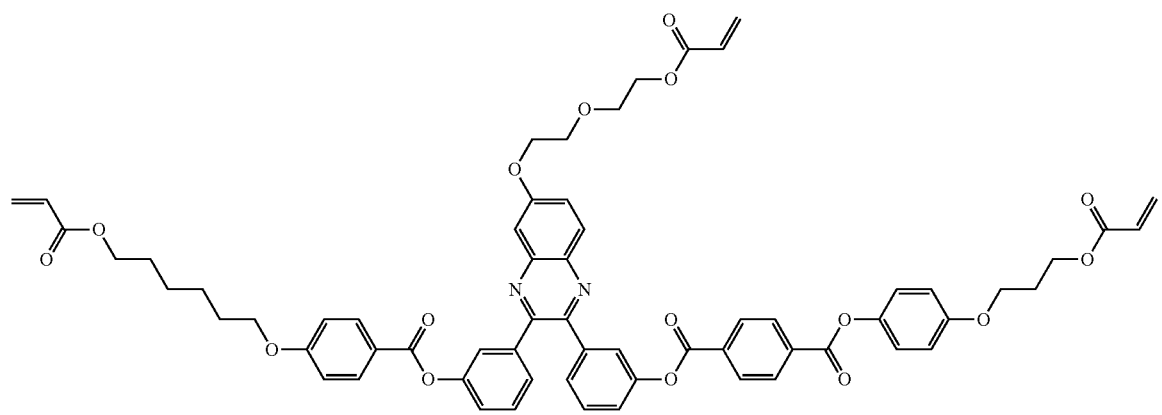
[Chemical Formula 1-39]
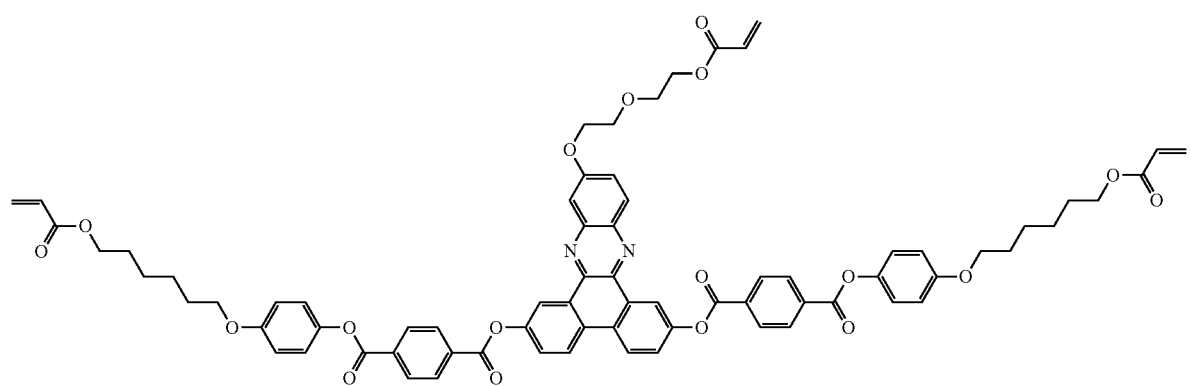

[Chemical Formula 1-40]
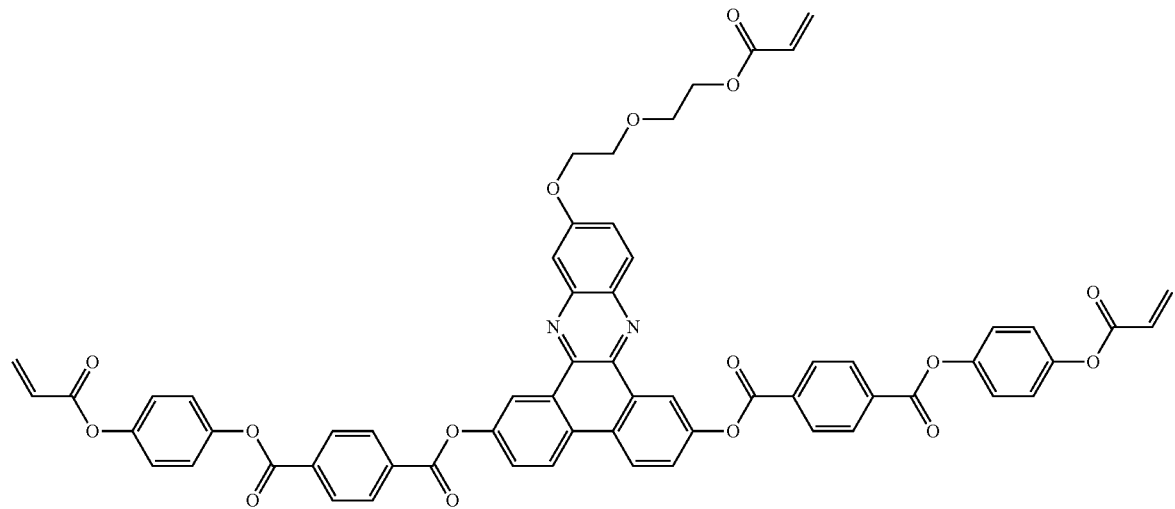
[Chemical Formula 1-41]
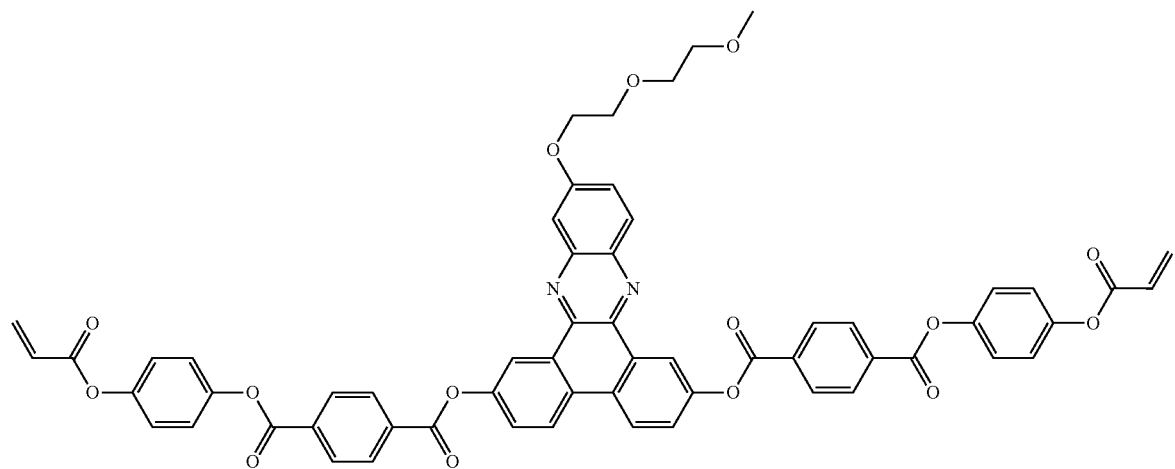
[Chemical Formula 1-42]
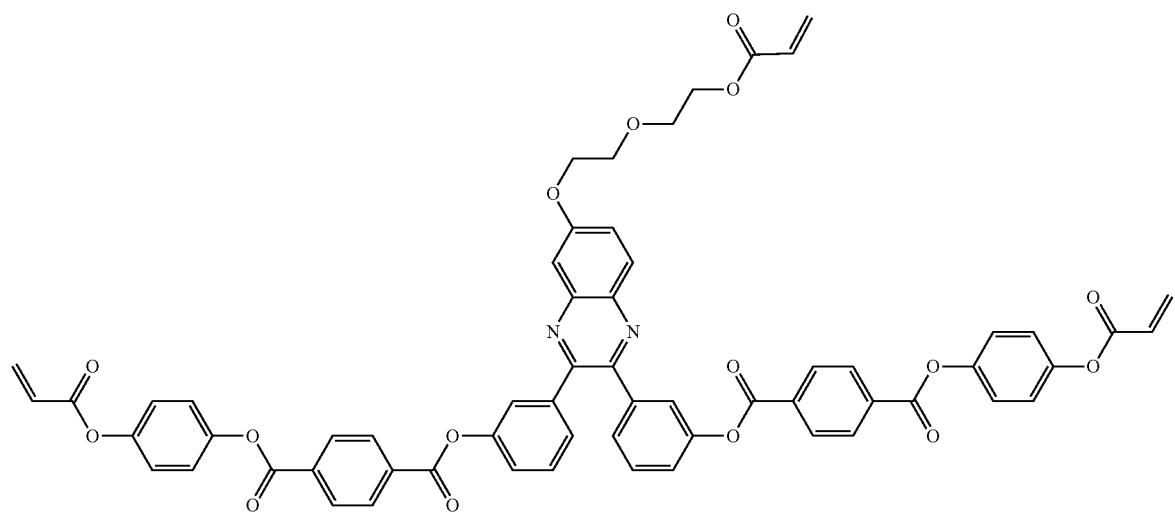

-continued
[Chemical Formula 1-43]
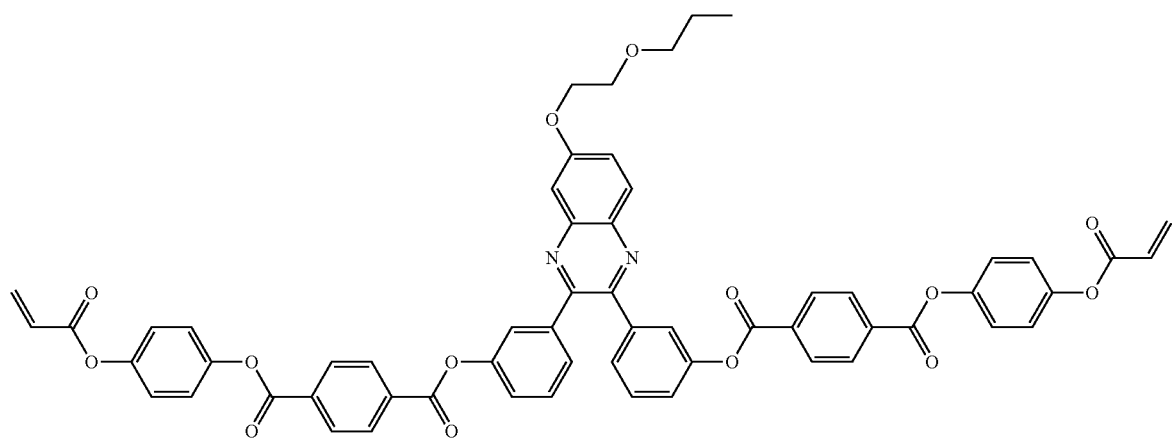
[Chemical Formula 1-44]
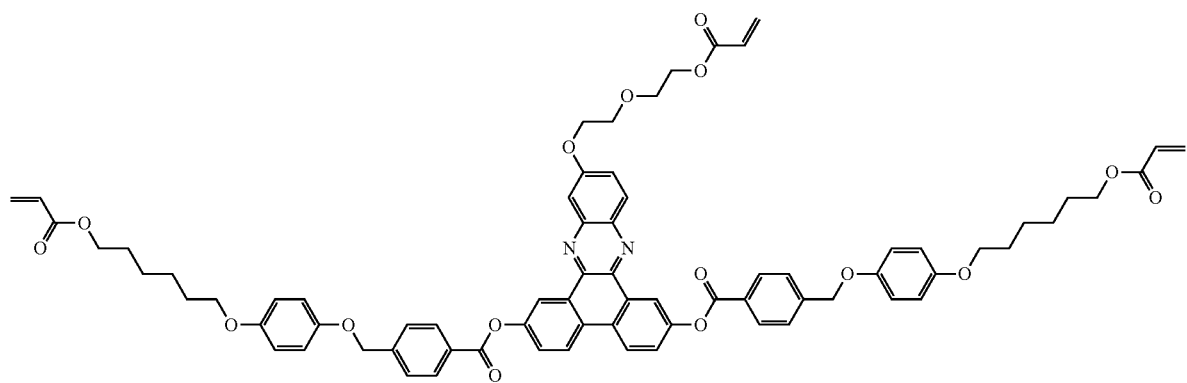
[Chemical Formula 1-45]
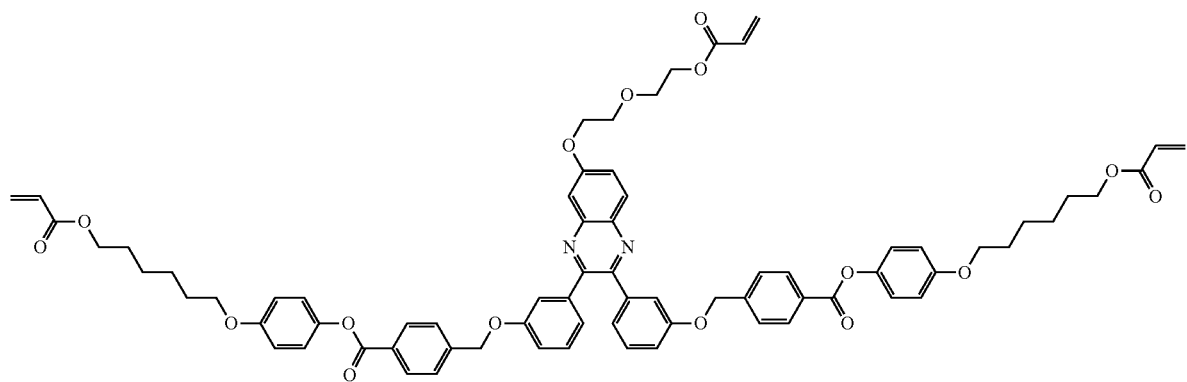
[Chemical Formula 1-46]
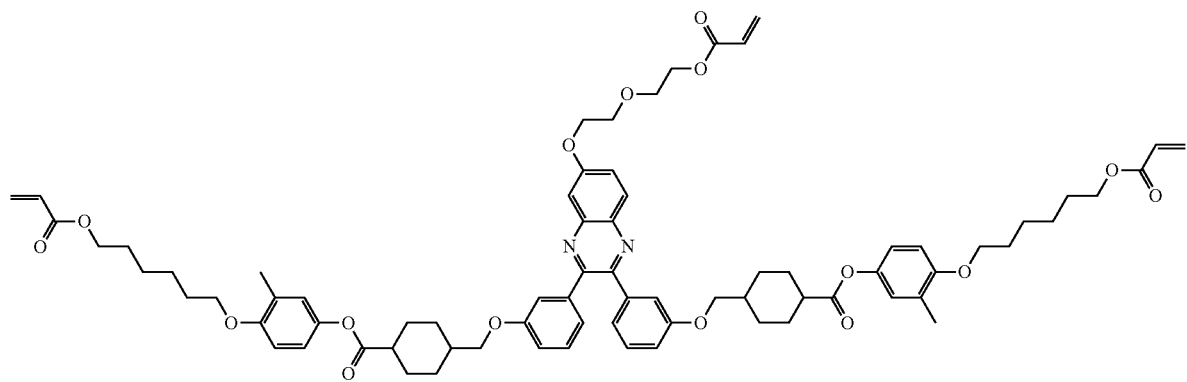

[Chemical Formula 1-47]
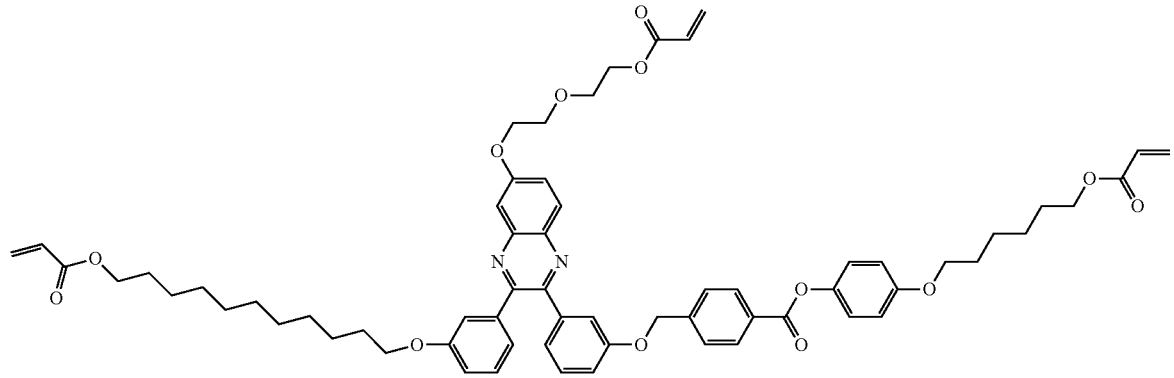
[Chemical Formula 1-48]
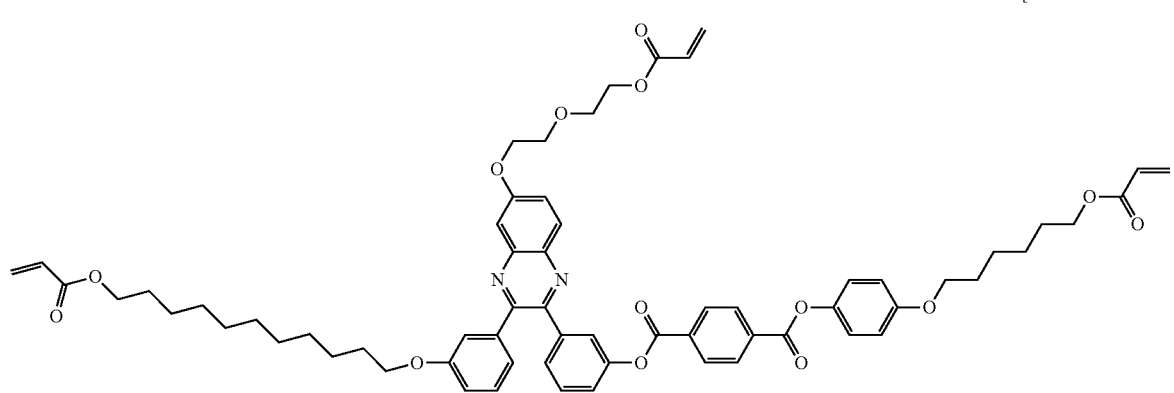
[Chemical Formula 1-49]
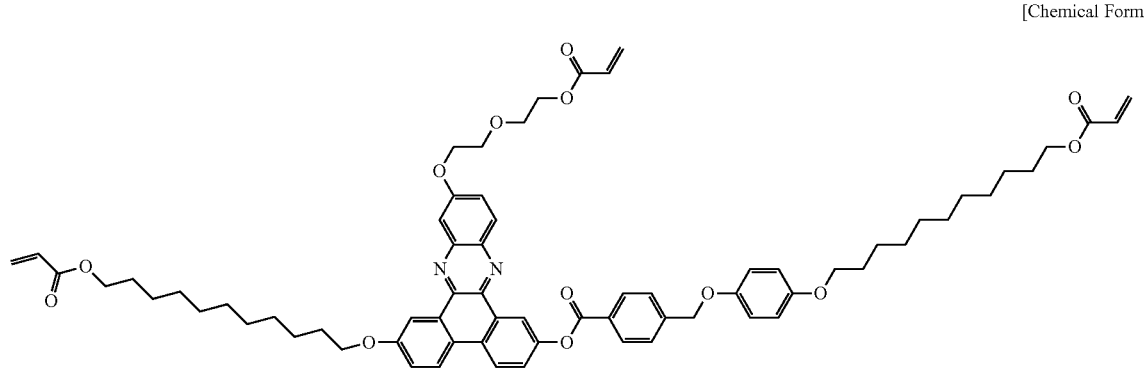
[Chemical Formula 1-50]
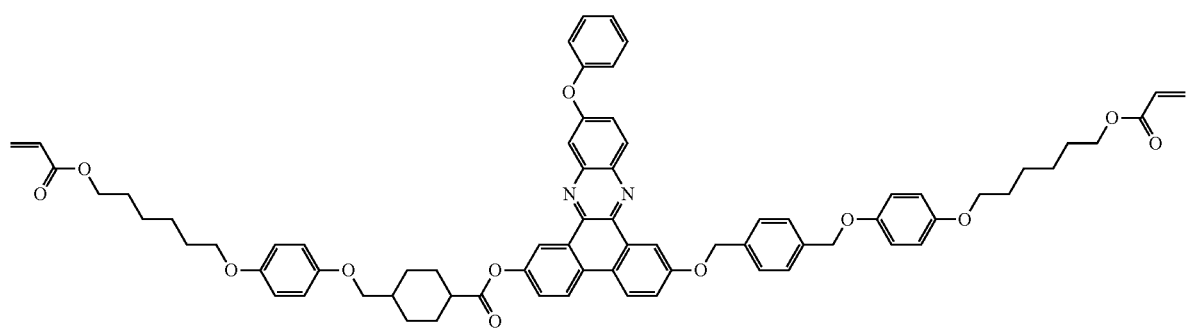

-continued
[Chemical Formula 1-51]
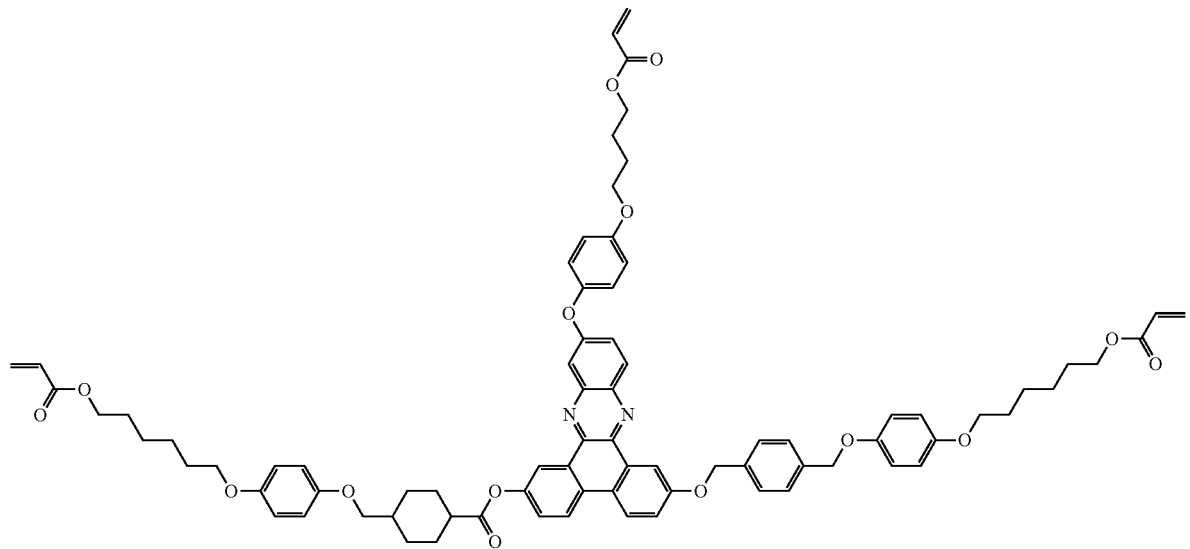
[Chemical Formula 1-52]
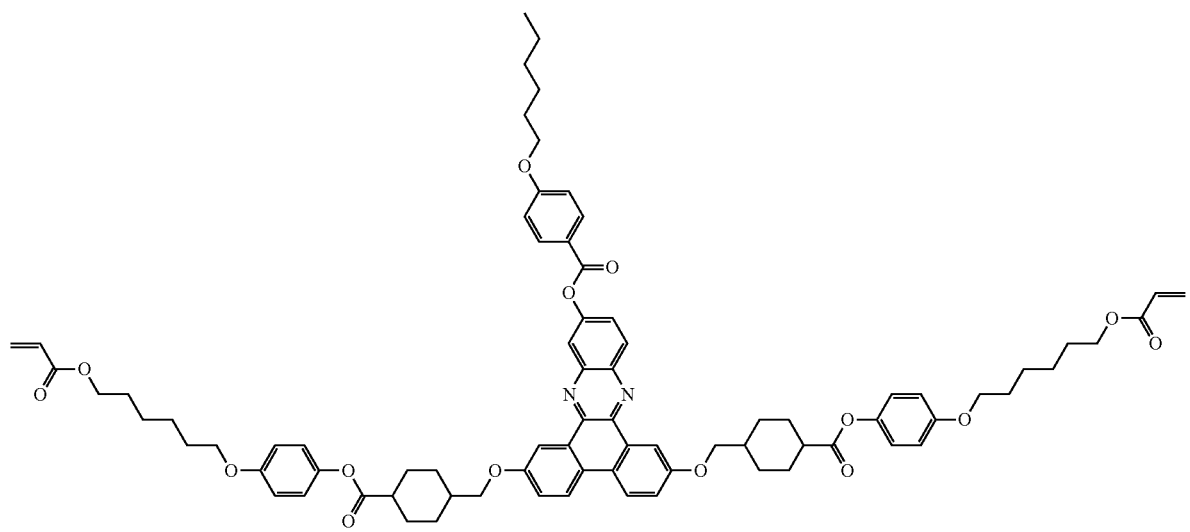
[Chemical Formula 1-53]
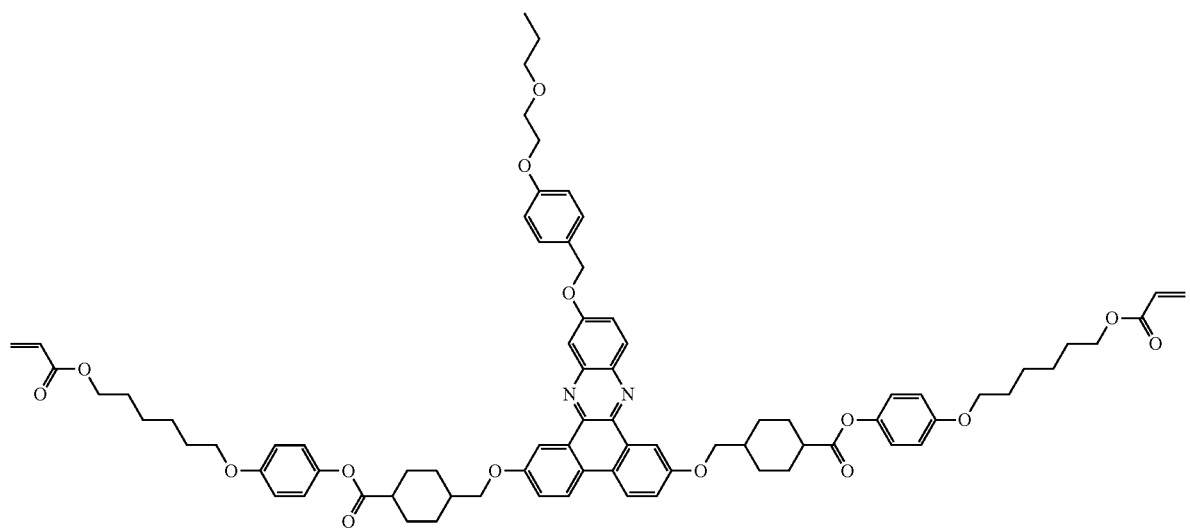

[Chemical Formula 1-54]
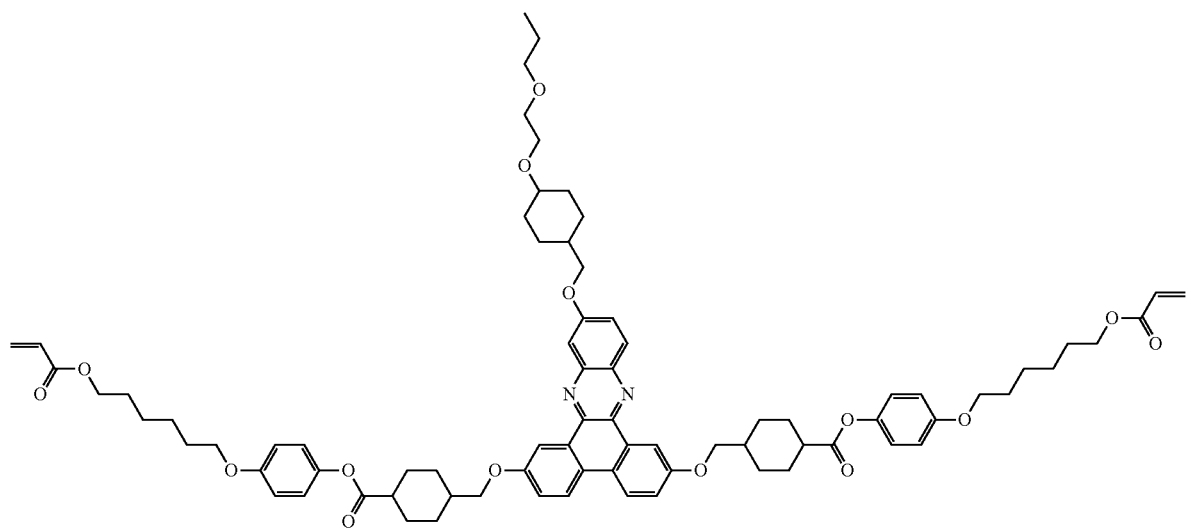
[Chemical Formula 1-55]
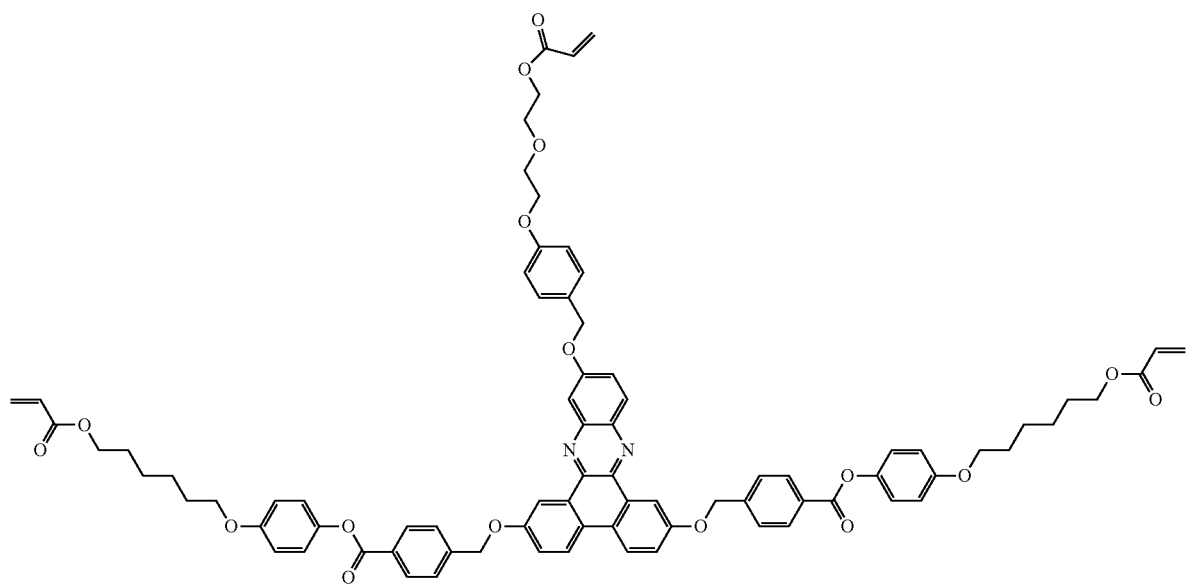

[Chemical Formula 1-56]
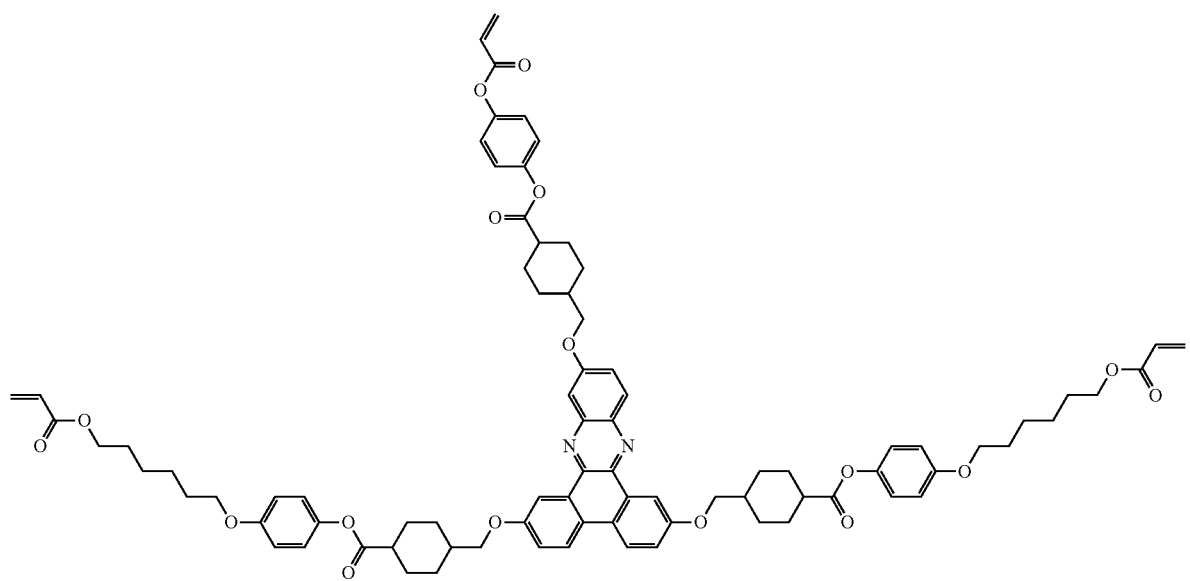
[Chemical Formula 1-57]
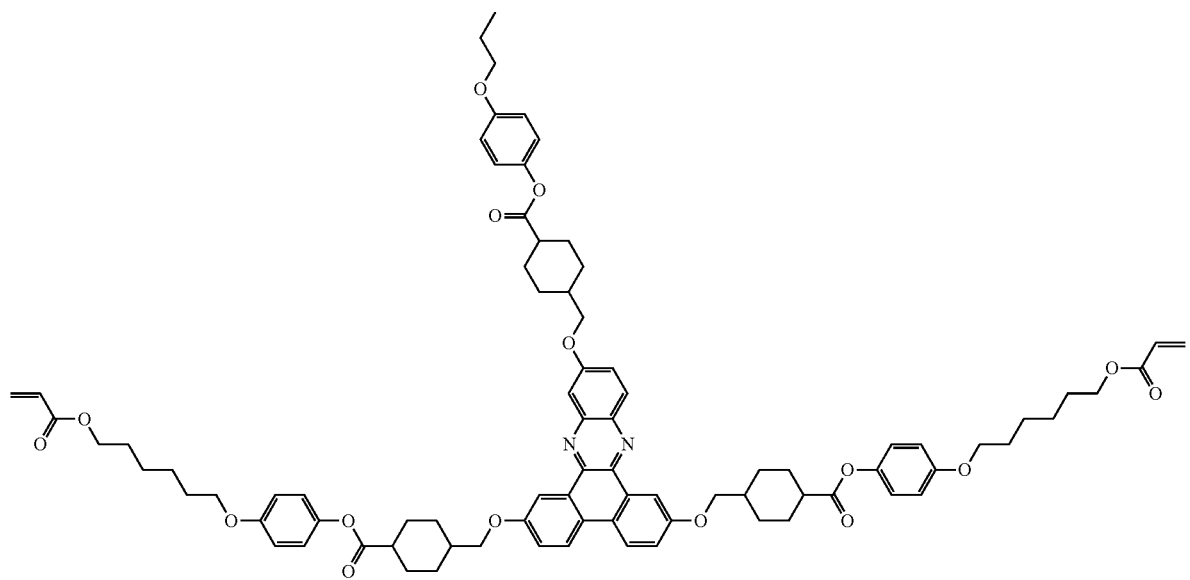

[Chemical Formula 1-58]
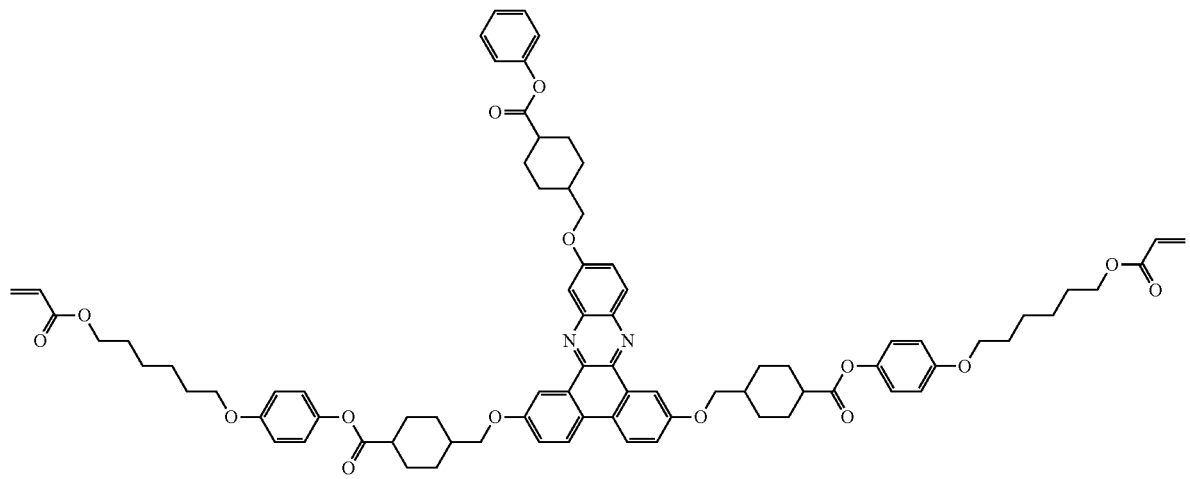
[Chemical Formula 1-59]
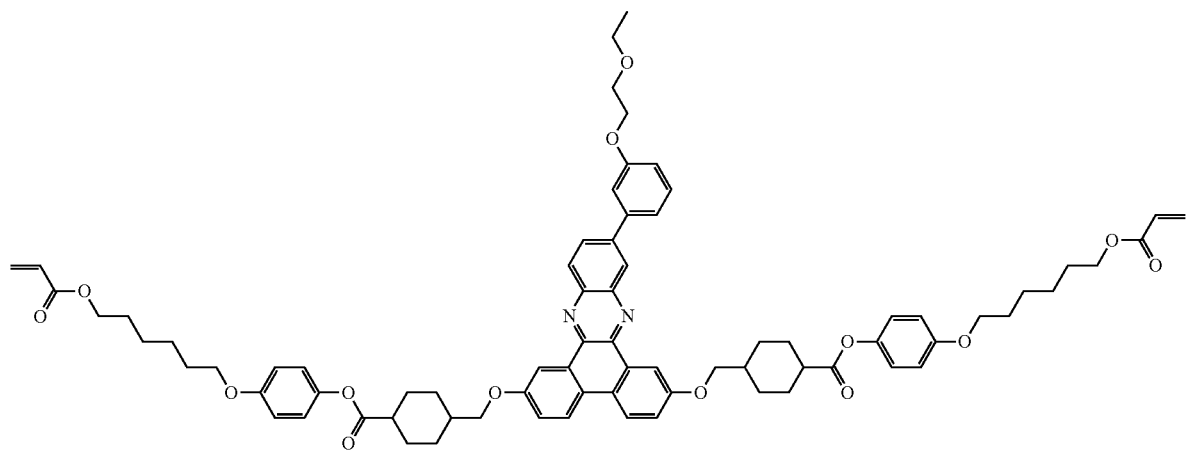
[Chemical Formula 1-60]
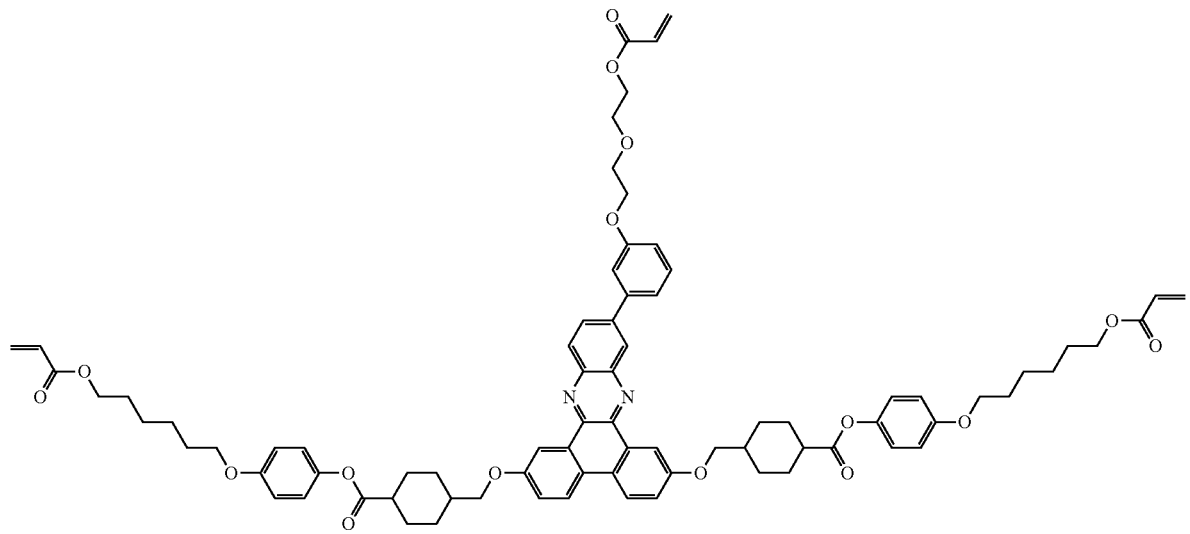

[Chemical Formula 1-61]
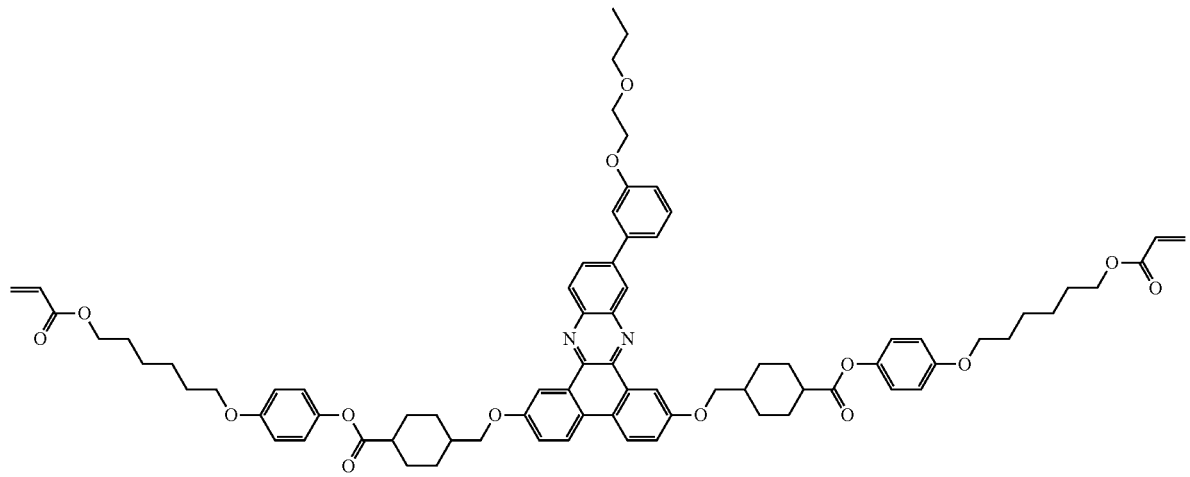
[Chemical Formula 1-62]
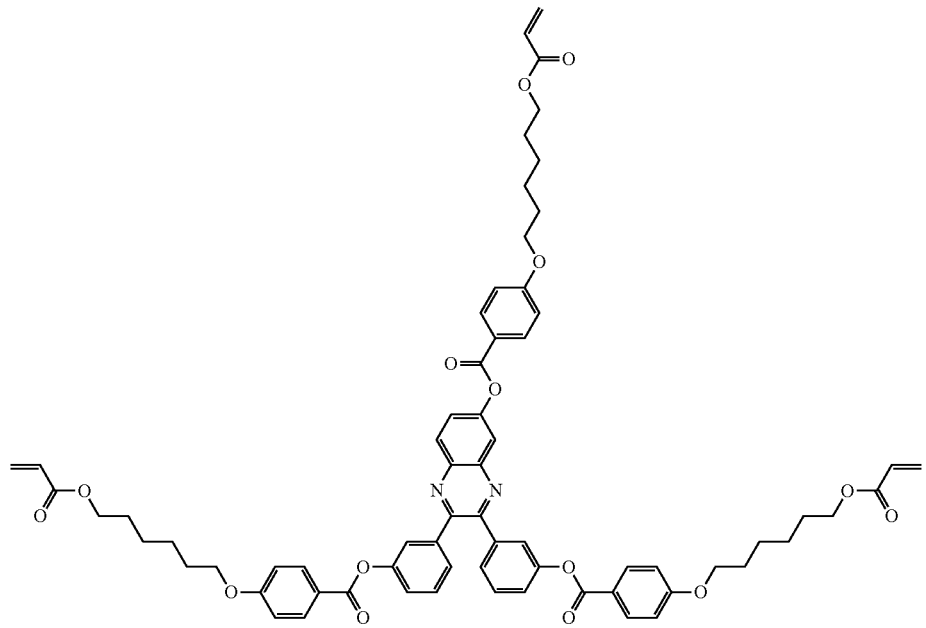
[Chemical Formula 1-63]
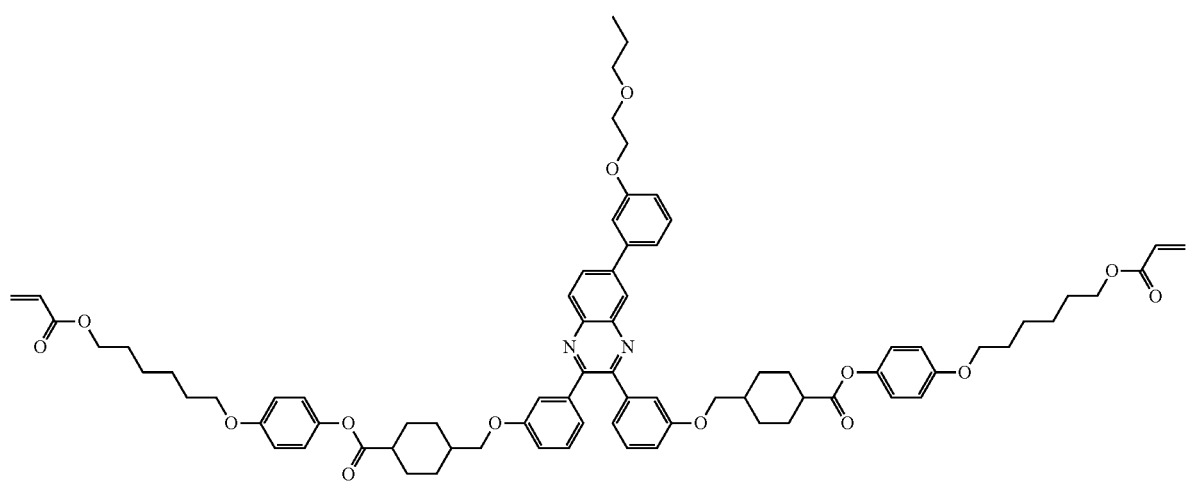

[Chemical Formula 1-64]
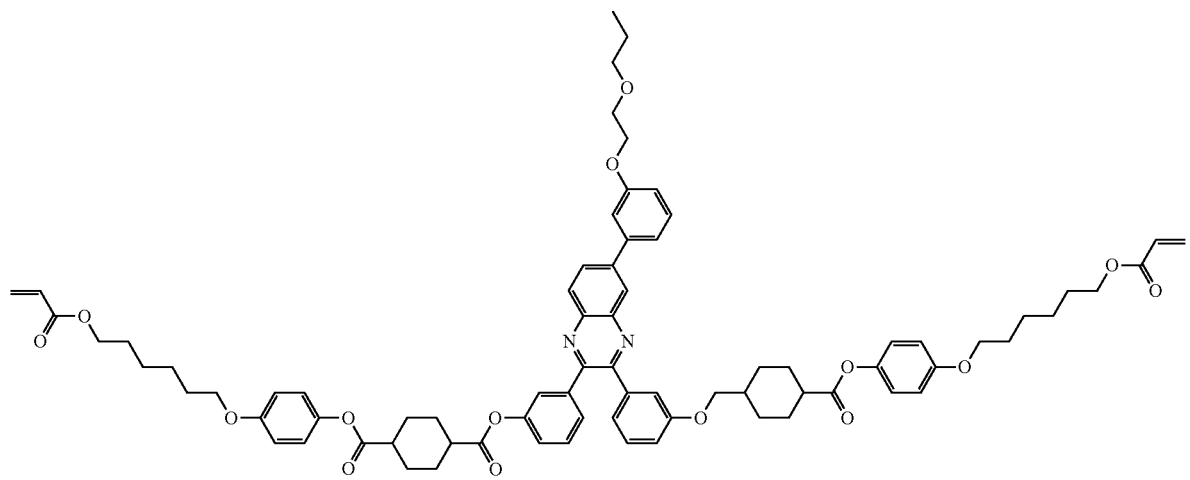
[Chemical Formula 1-65]
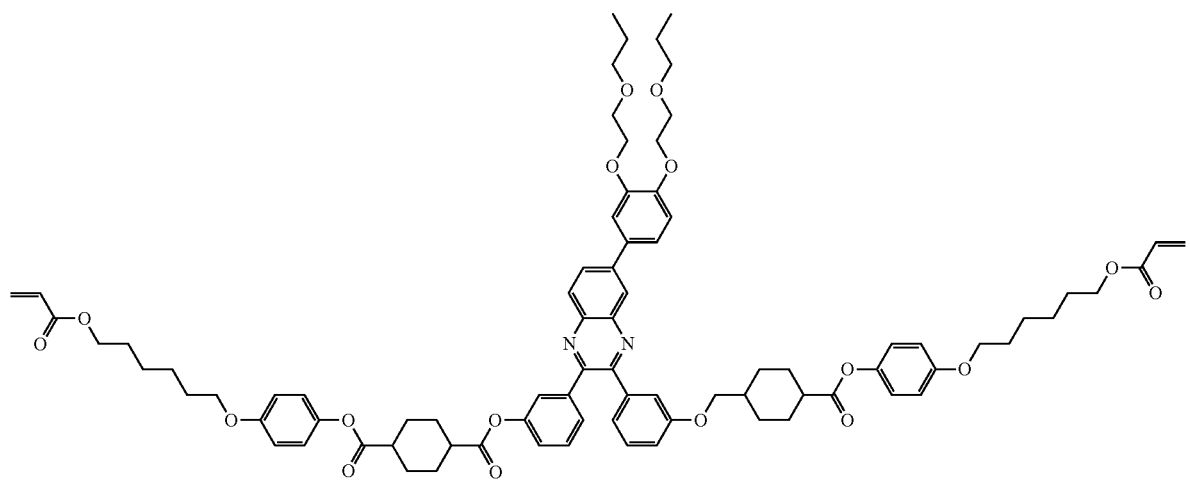
[Chemical Formula 1-66]
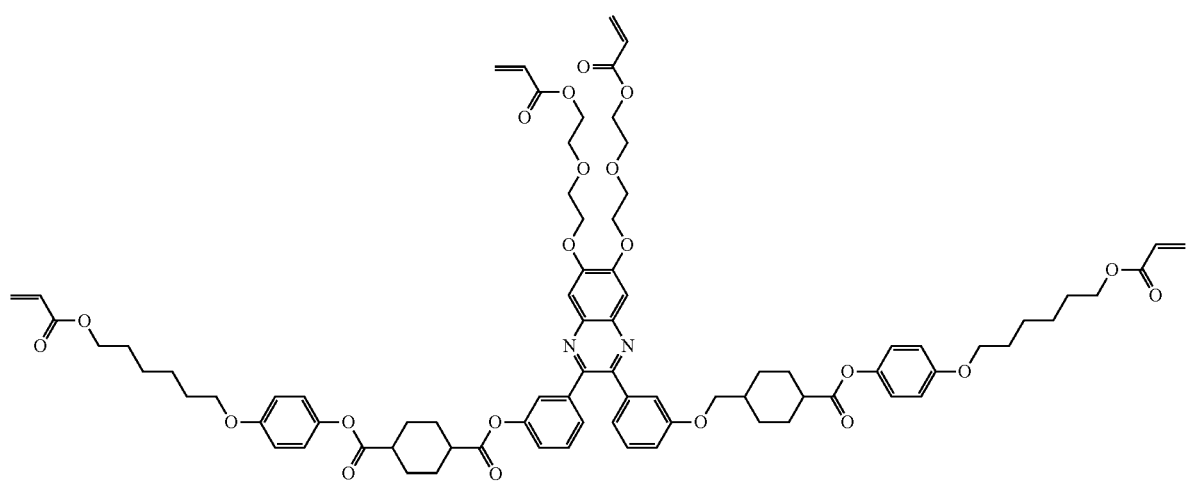

[Chemical Formula 1-67]
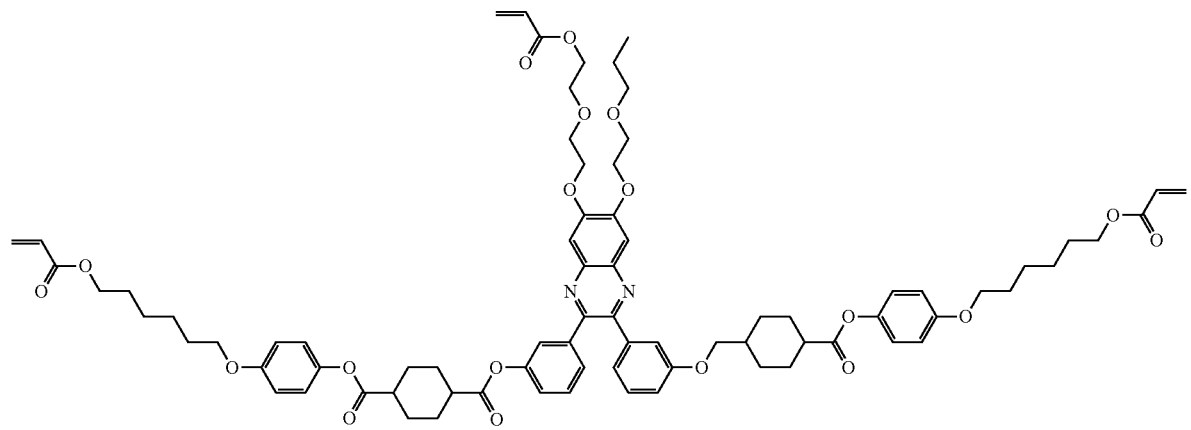
[Chemical Formula 1-68]
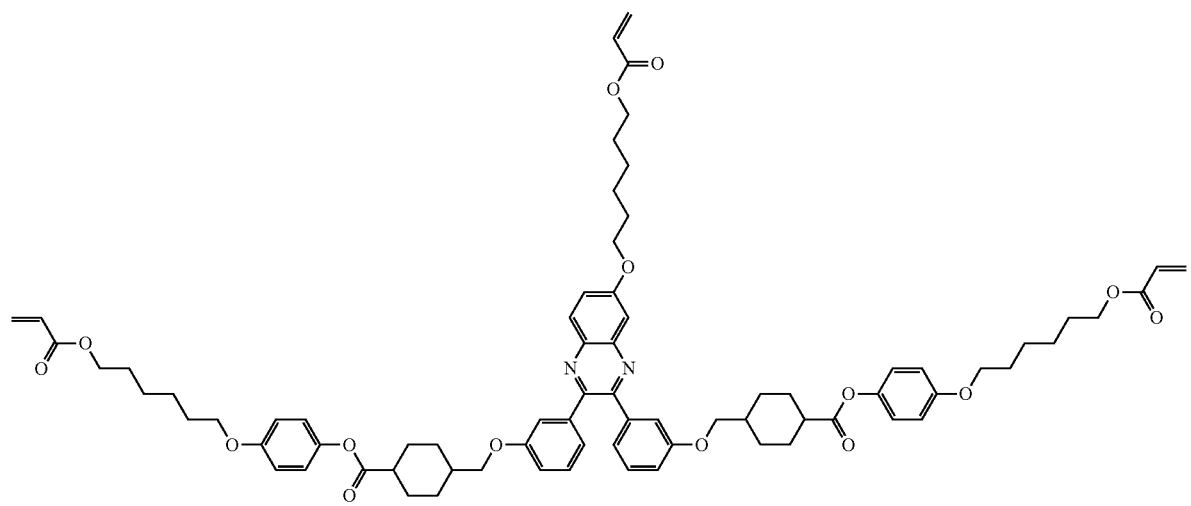
[Chemical Formula 1-69]
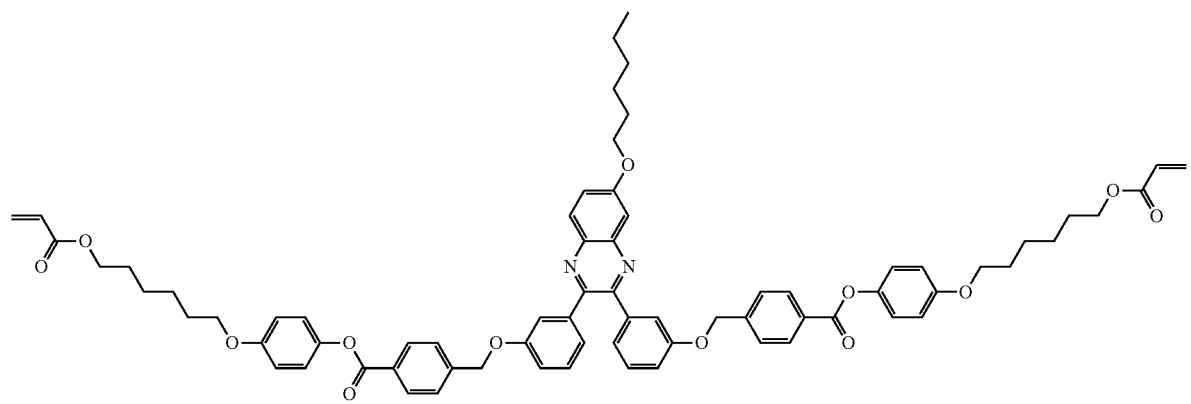

-continued
[Chemical Formula 1-70]
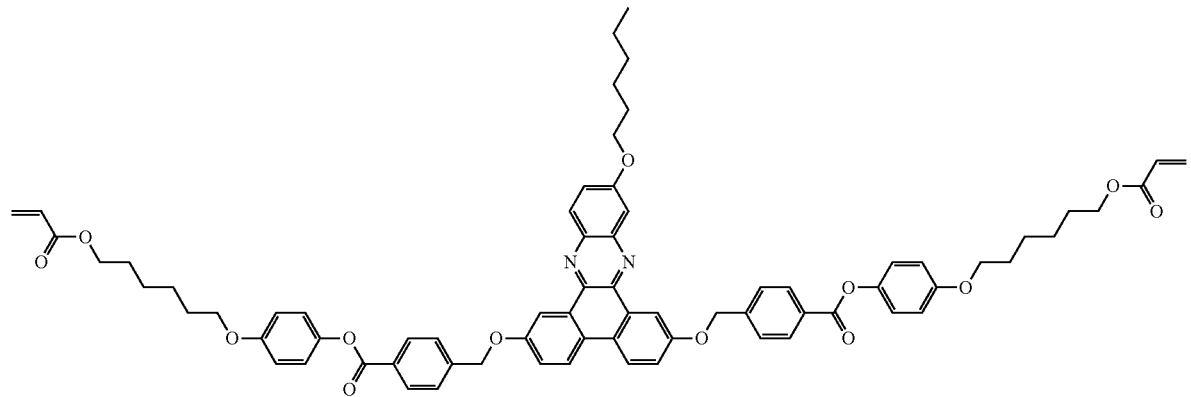
[Chemical Formula 1-71]
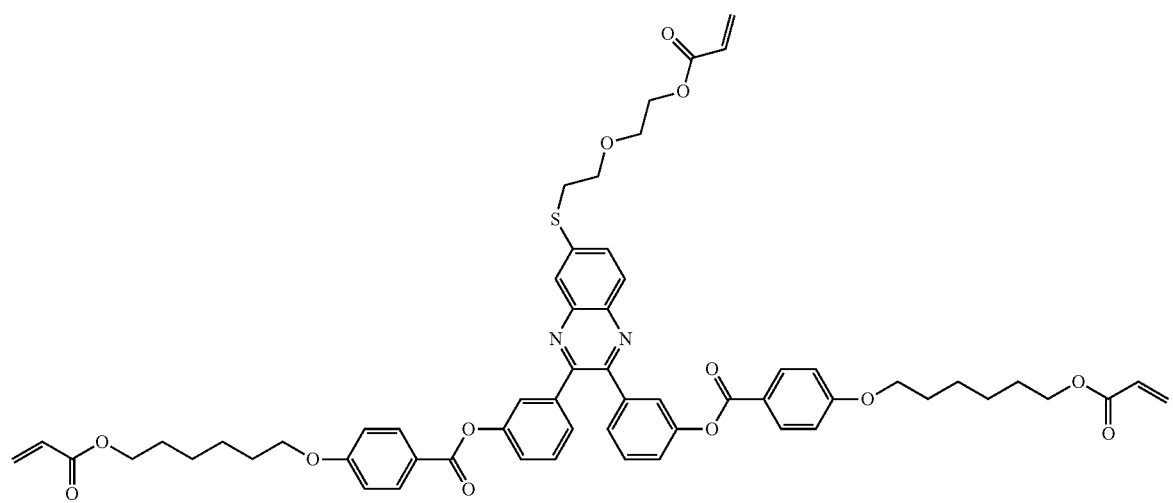
[Chemical Formula 1-72]
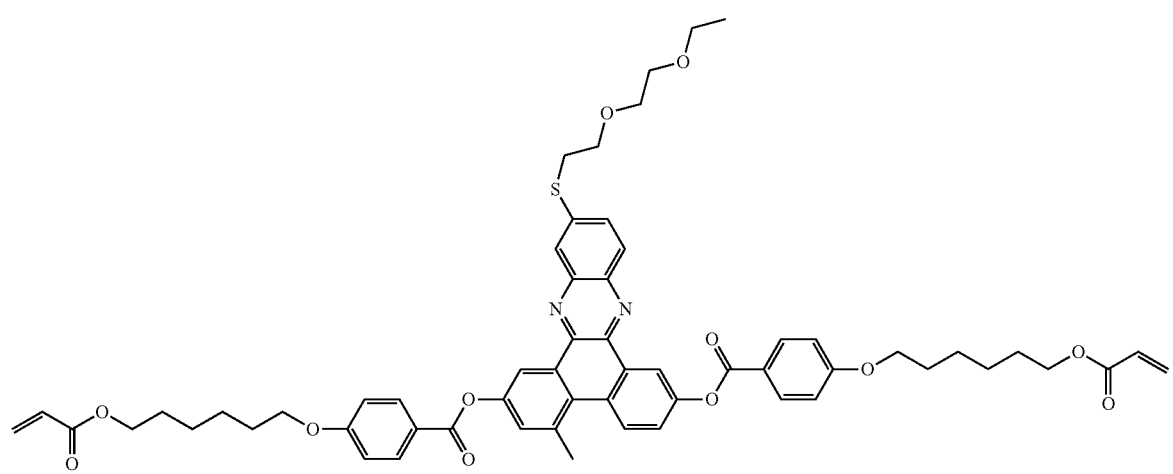

[Chemical Formula 1-73]
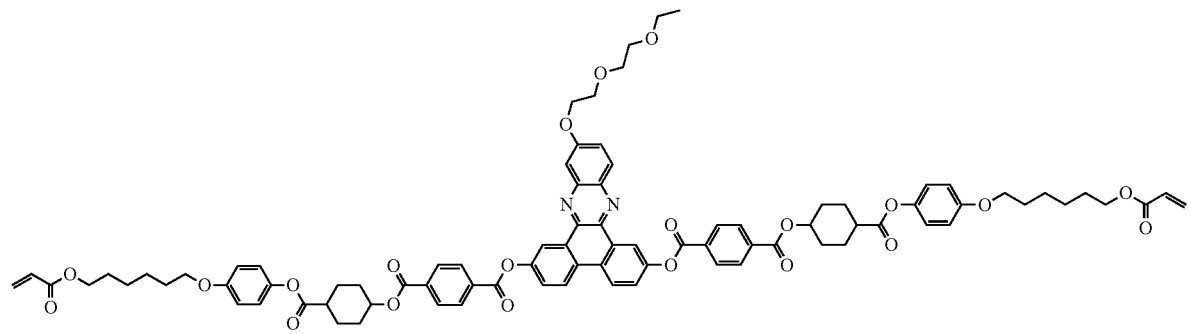
[Chemical Formula 1-74]
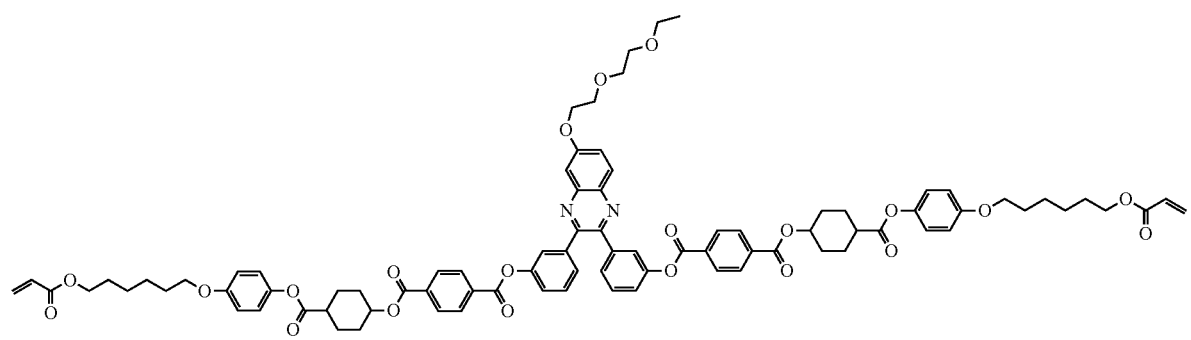
[Chemical Formula 1-75]
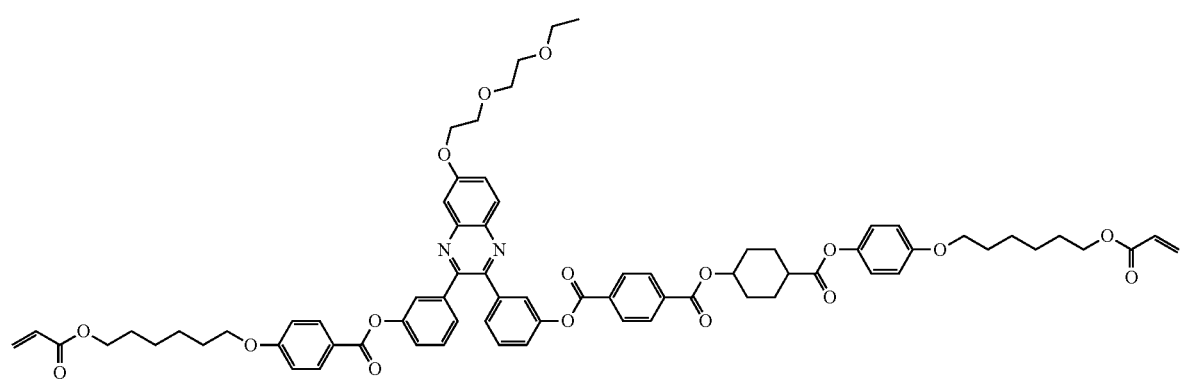
[Chemical Formula 1-76]
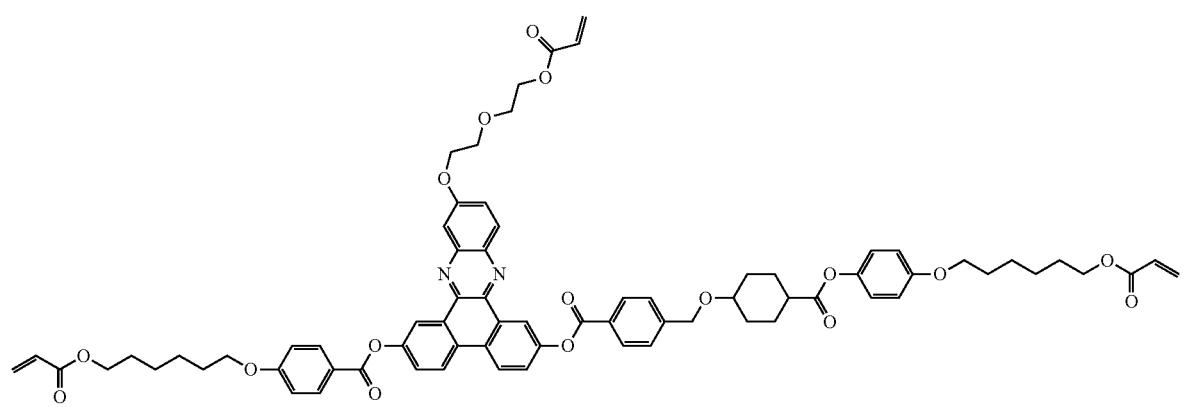

-continued
[Chemical Formula 1-77]
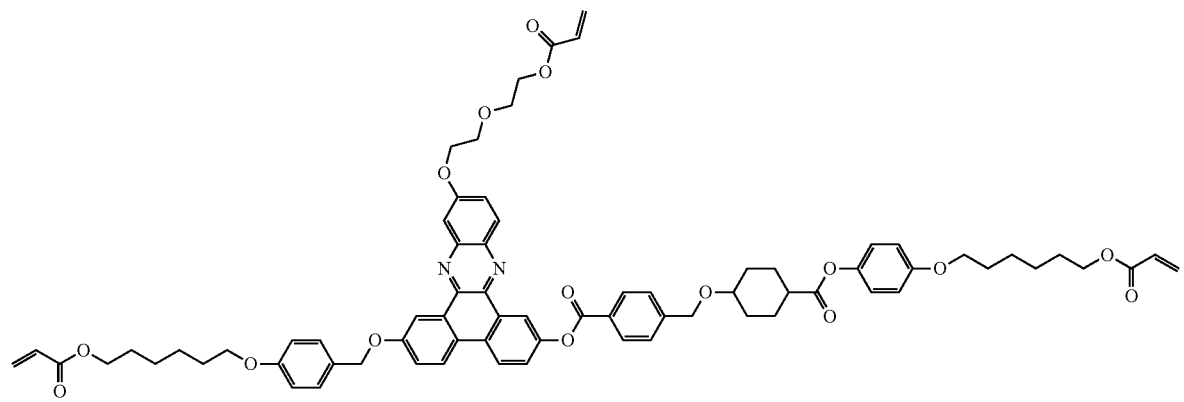
[Chemical Formula 1-78]
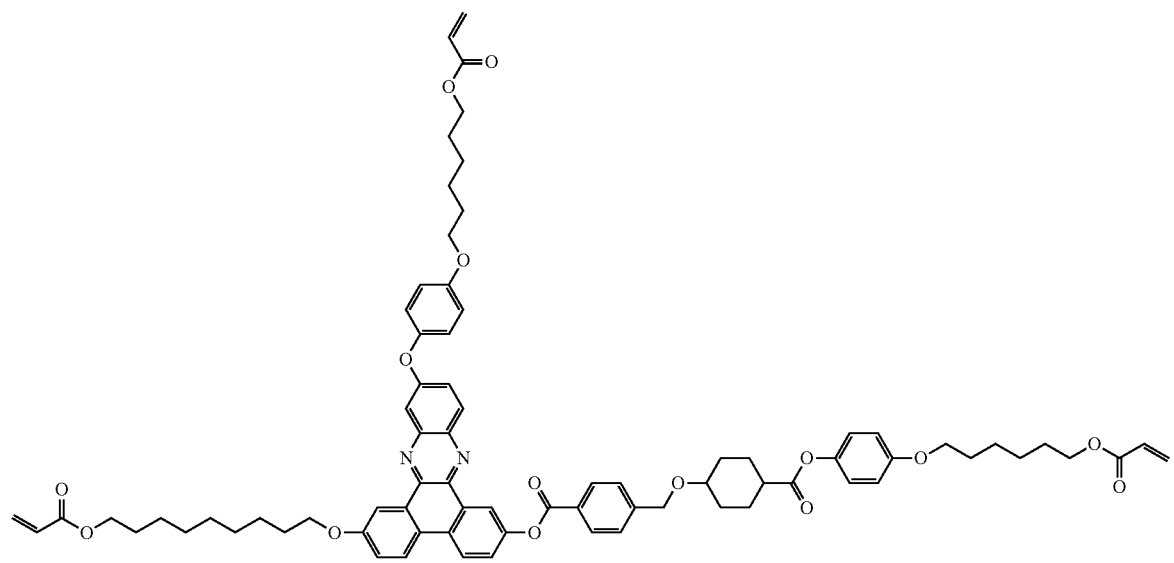
[Chemical Formula 1-79]
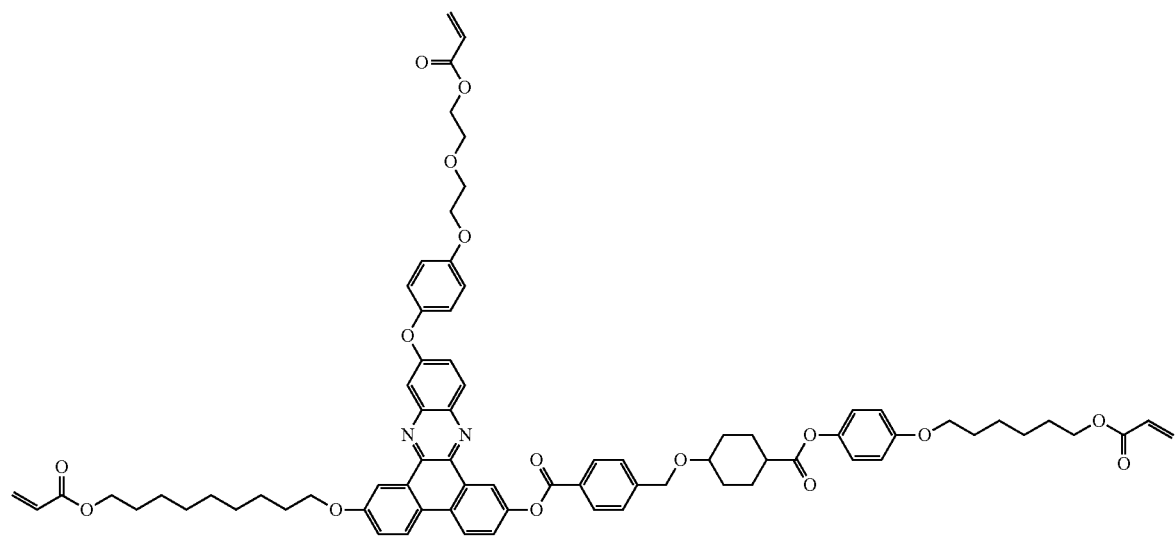

[Chemical Formula 1-80]
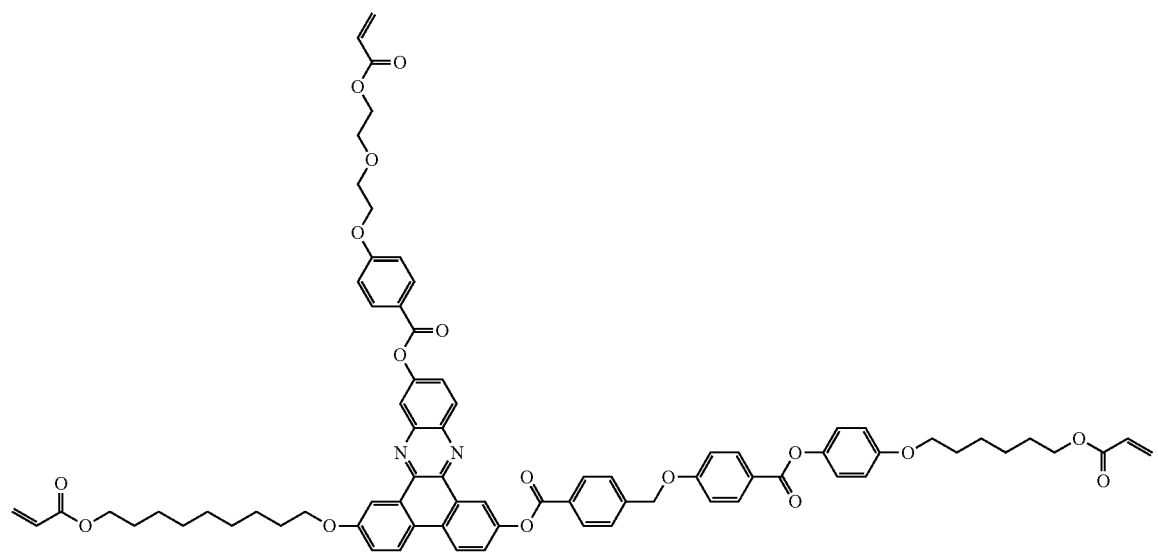
[Chemical Formula 1-81]
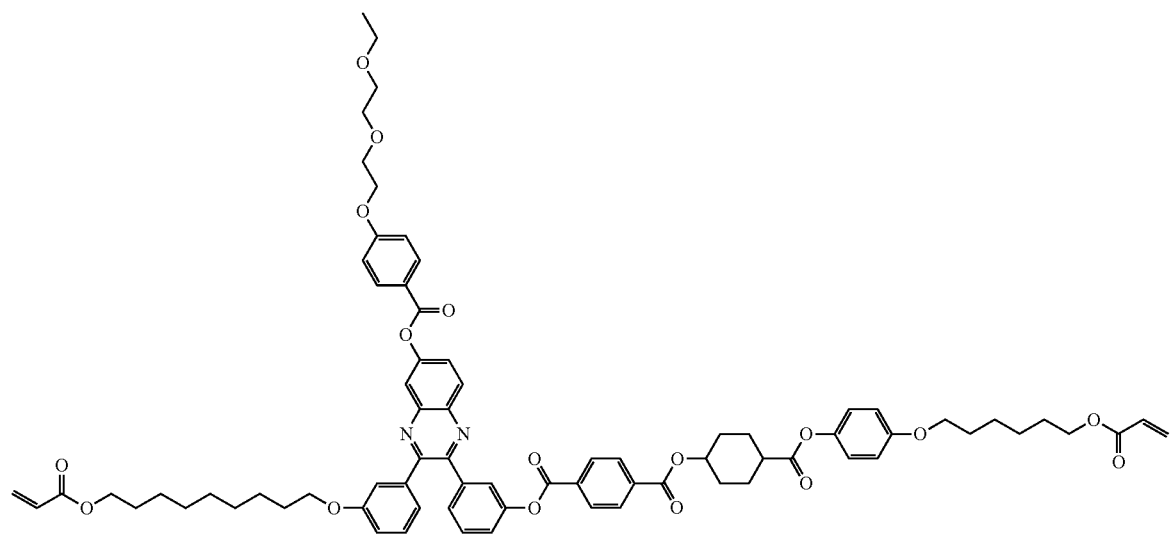

[Chemistry Formula 1-82]
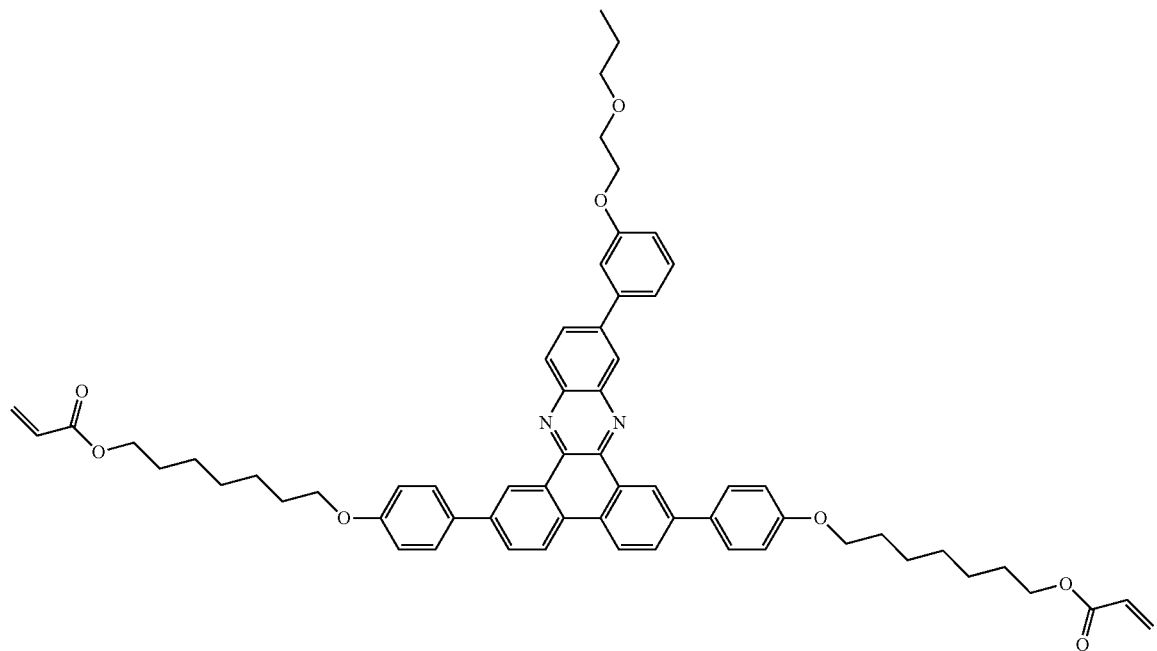
[Chemistry Formula 1-83]
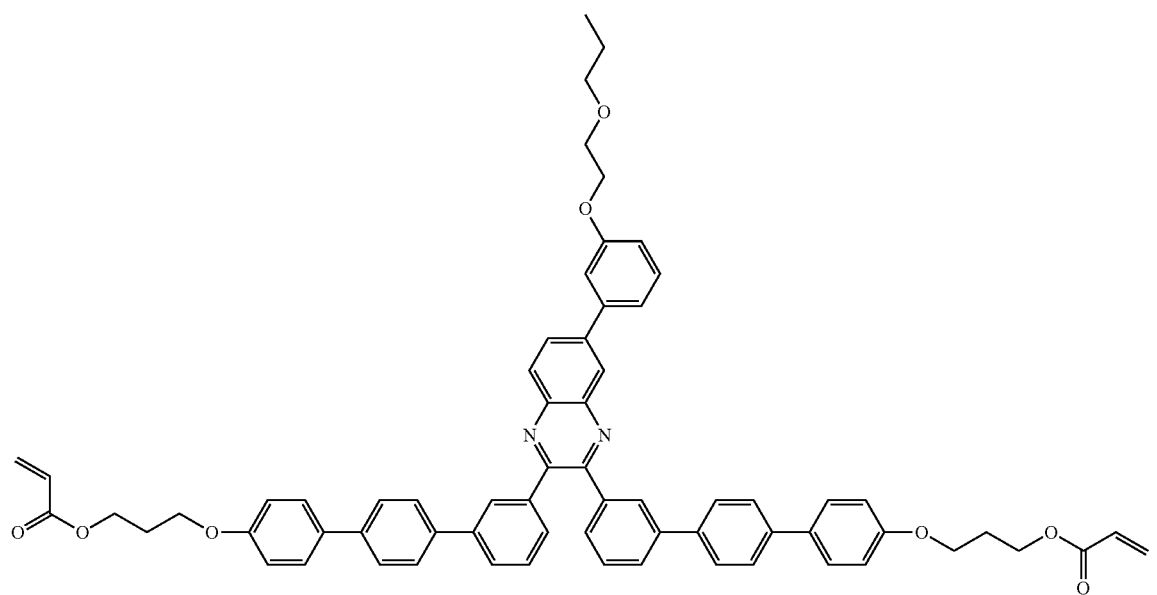

[Chemical Formula 1-84]
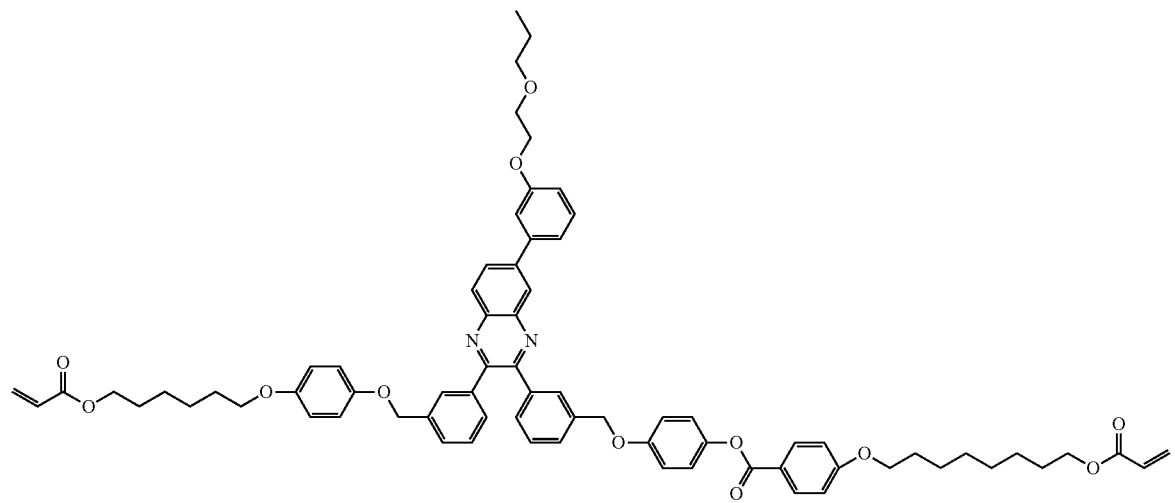
[Chemical Formula 1-85]
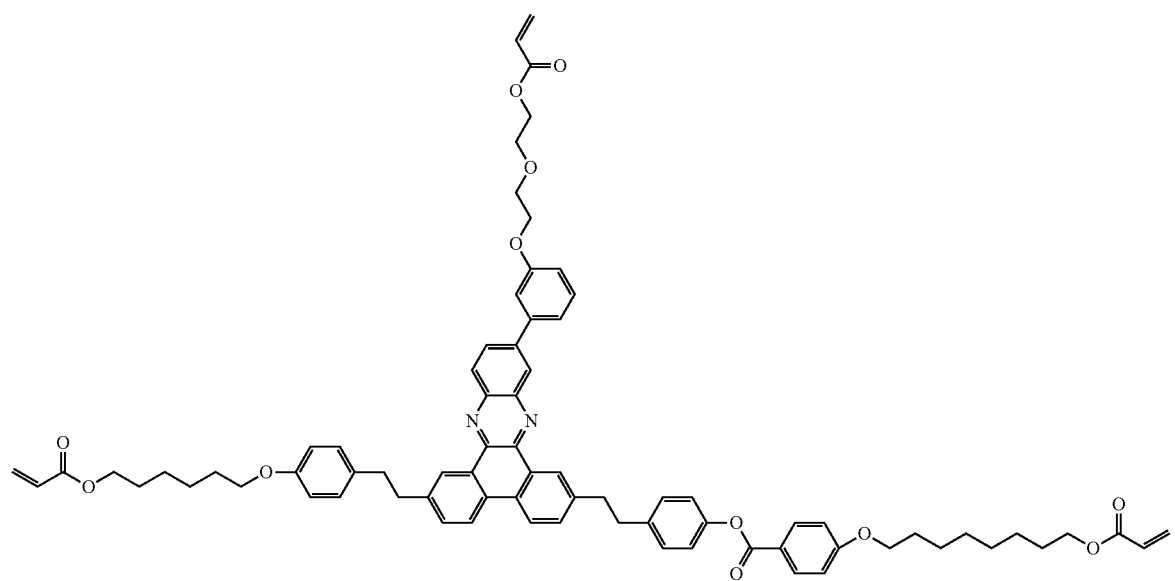

[Chemical Formula 1-86]
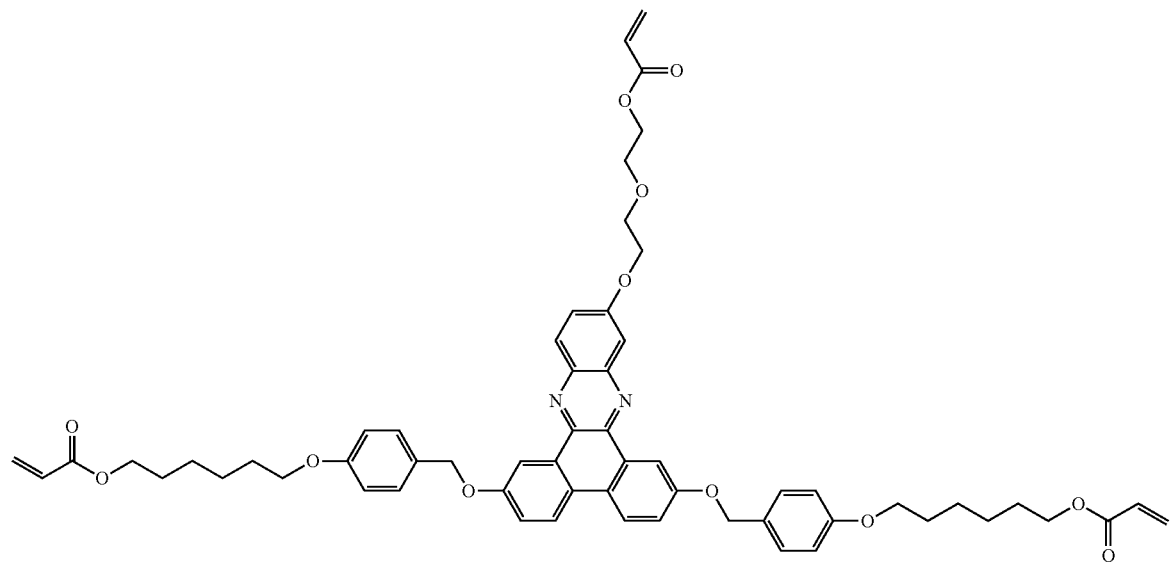
[Chemical Formula 1-87]
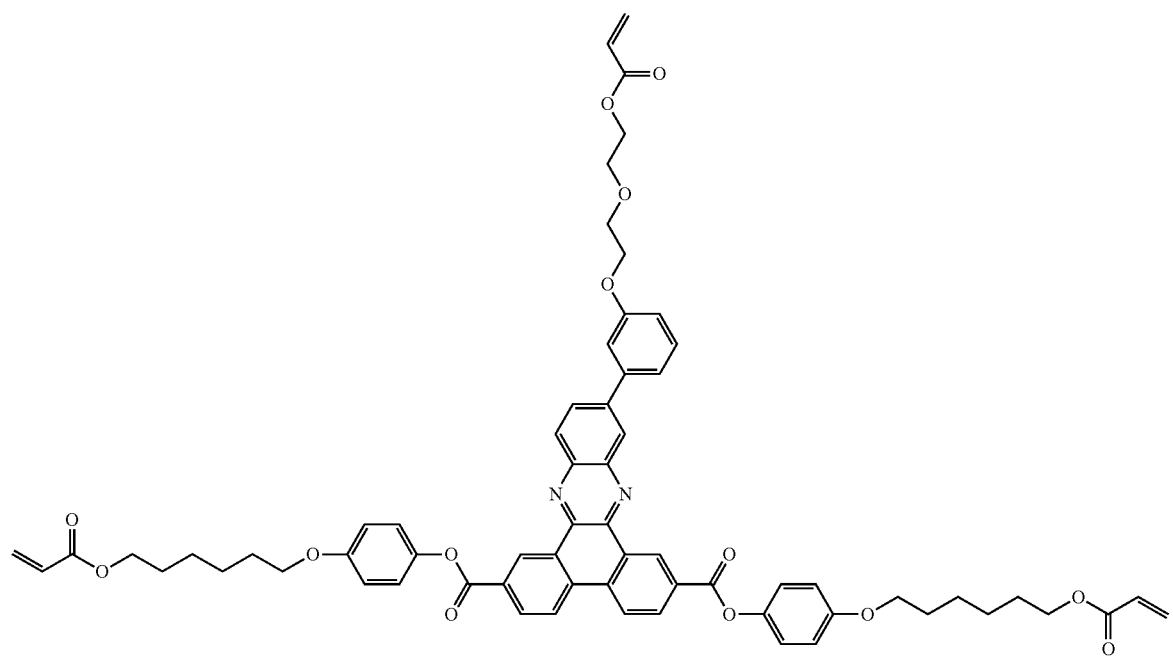

[Chemical Formula 1-88]
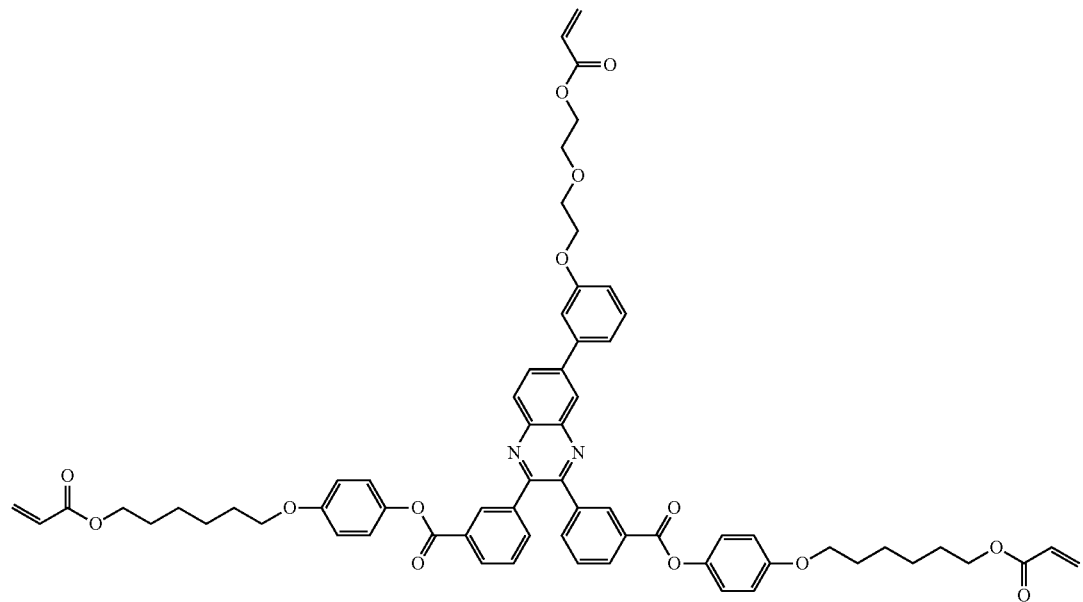
[Chemical Formula 1-89]
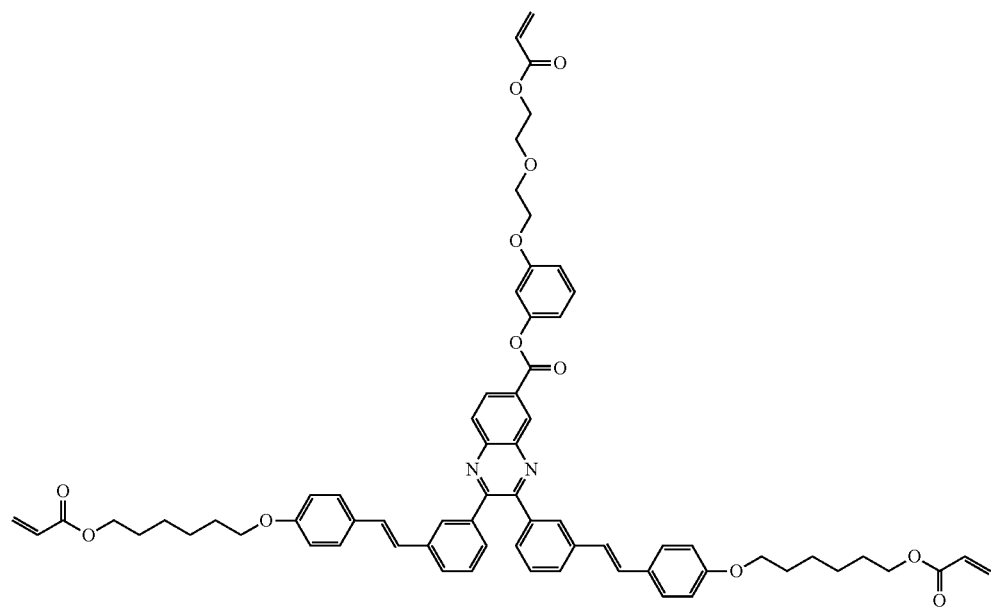

[Chemical Formula 1-90]
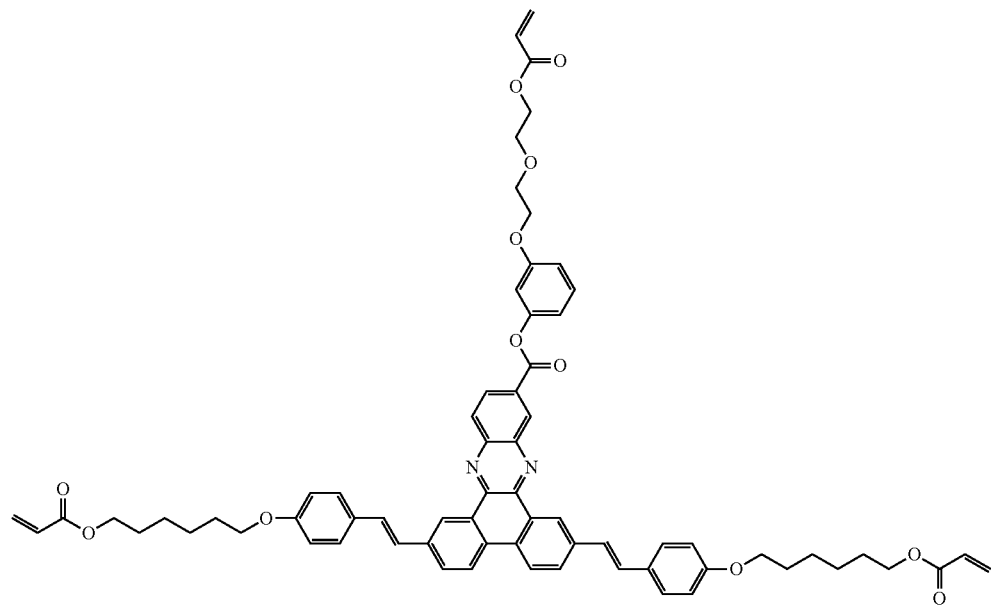
[Chemical Formula 1-91]
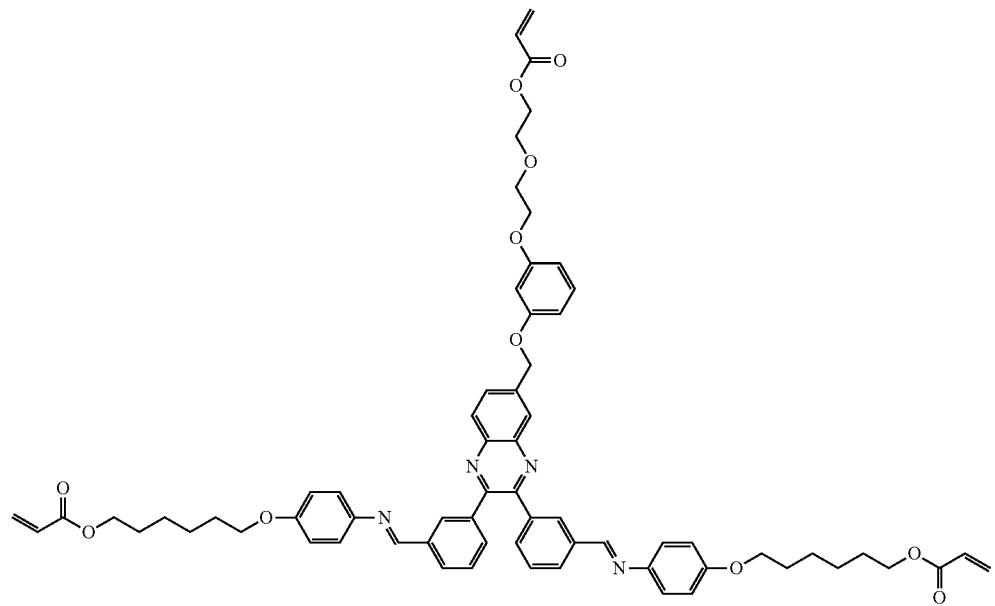

[Chemical Formula 1-92]
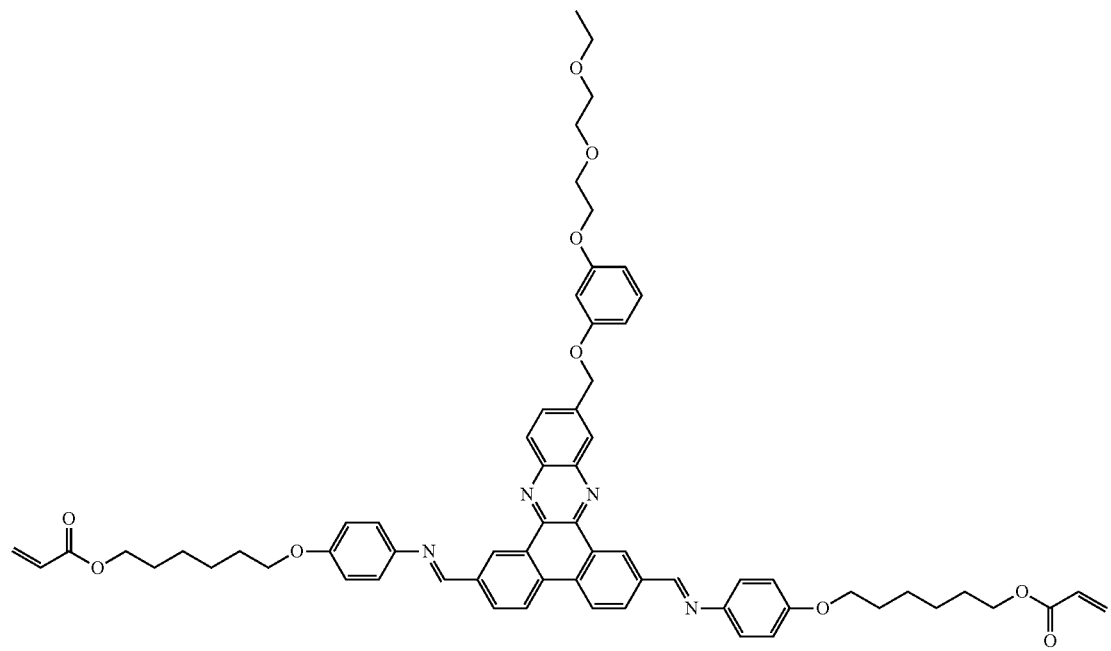
[Chemical Formula 1-93]
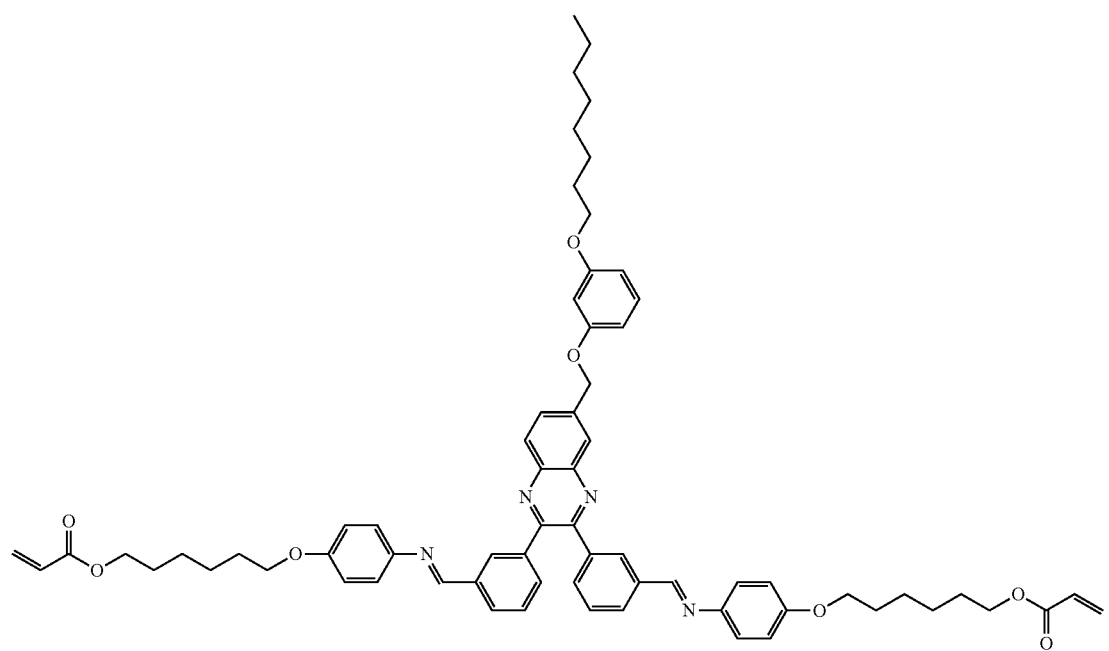

[Chemisty Formula 1-94]
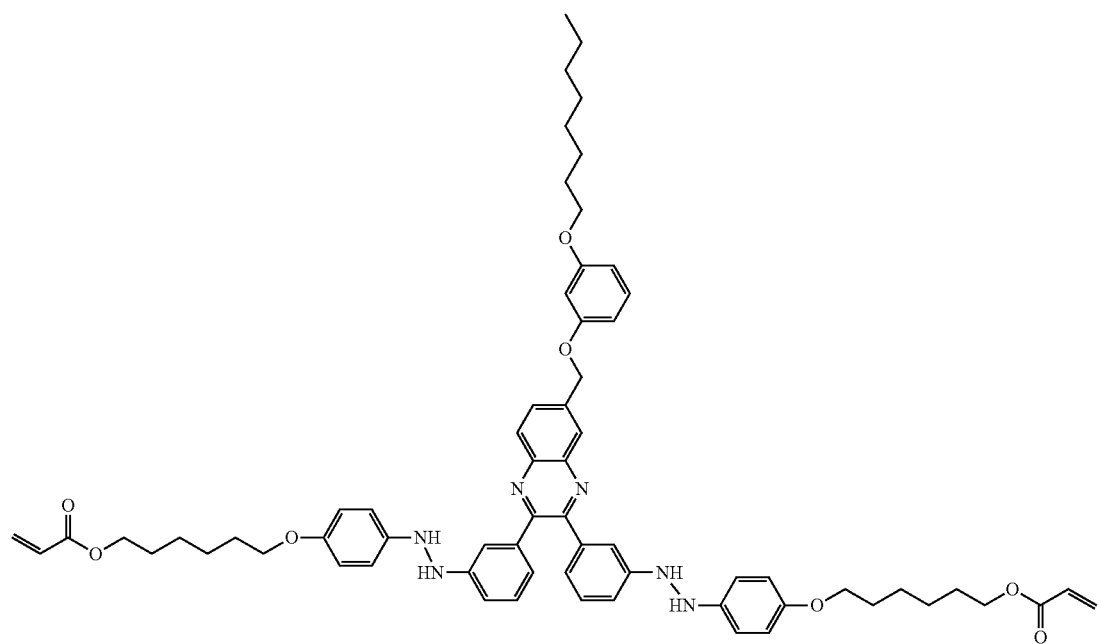
[Chemisty Formula 1-95]
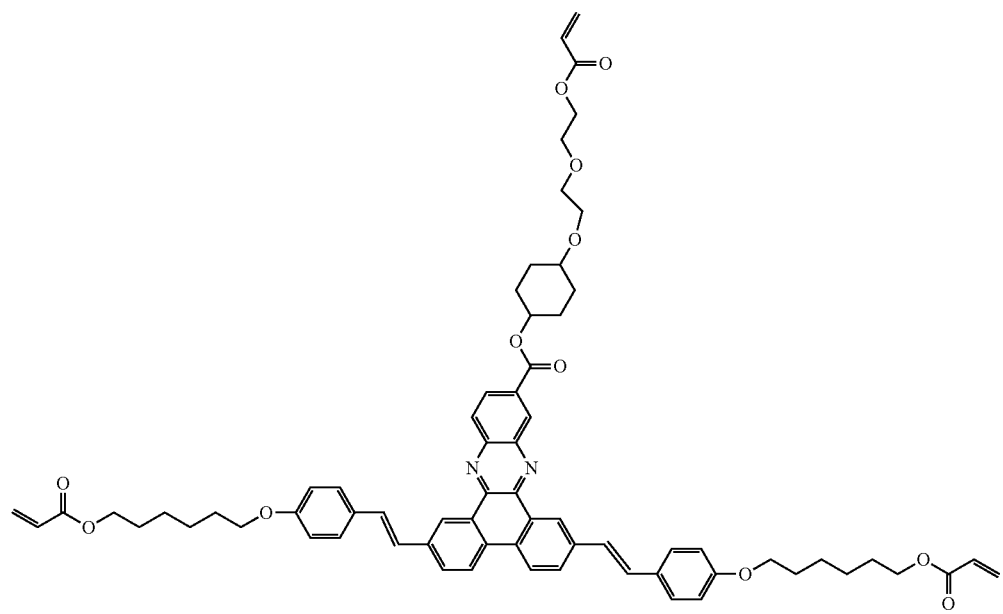

[Chemical Formula 1-96]
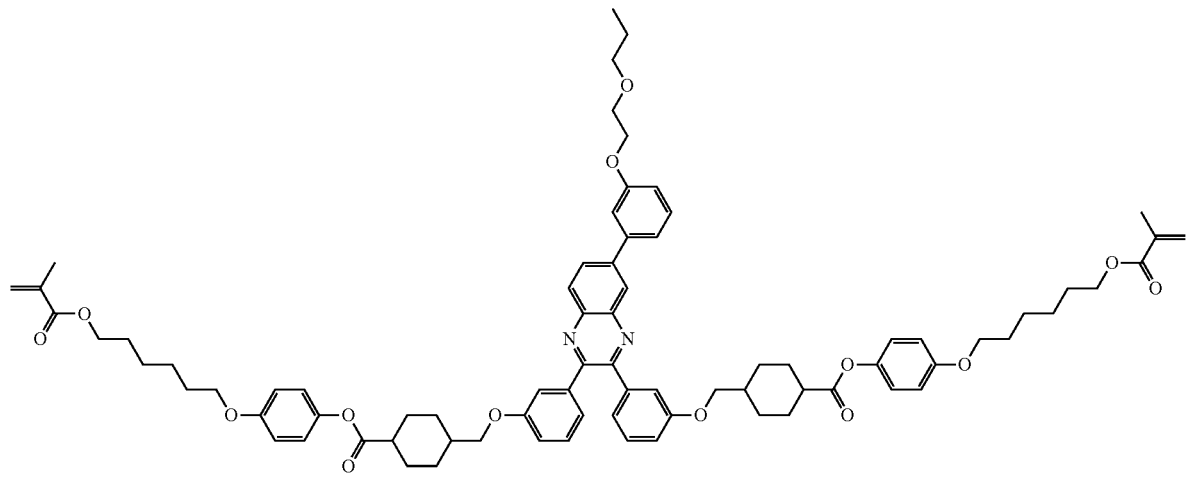
[Chemical Formula 1-97]
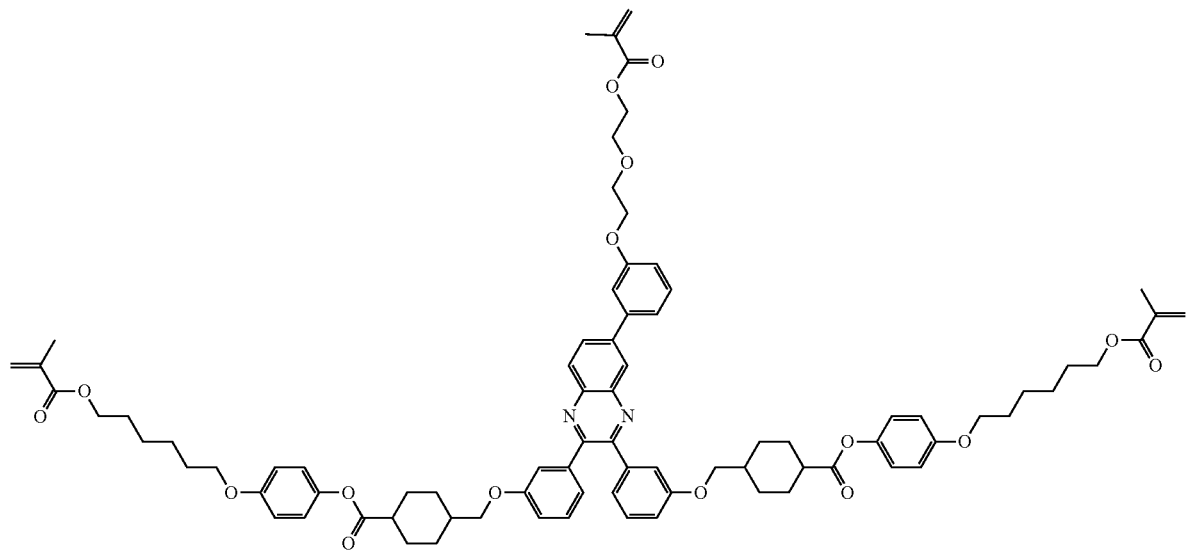
[Chemical Formula 1-98]
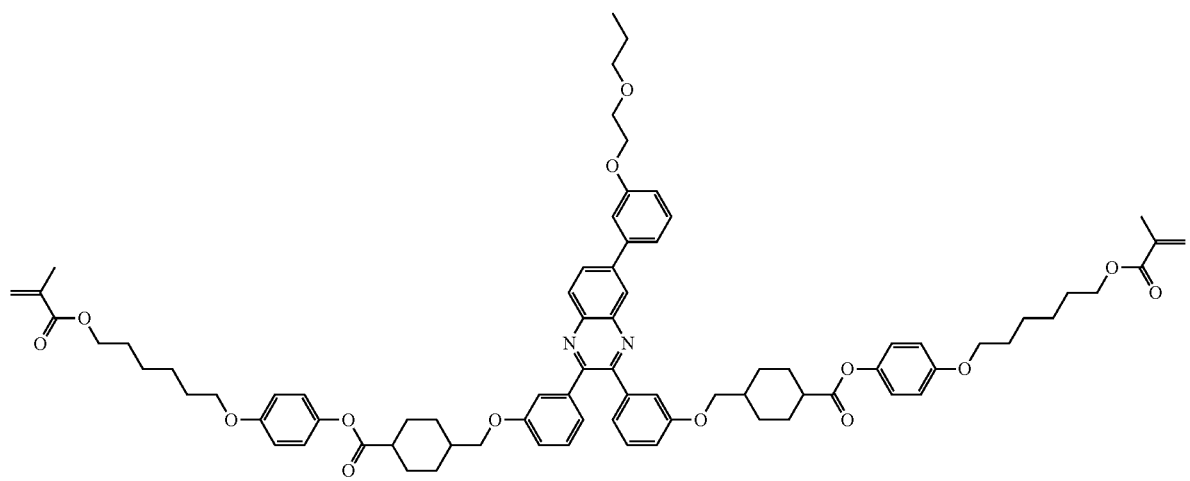

[Chemical Formula 1-99]
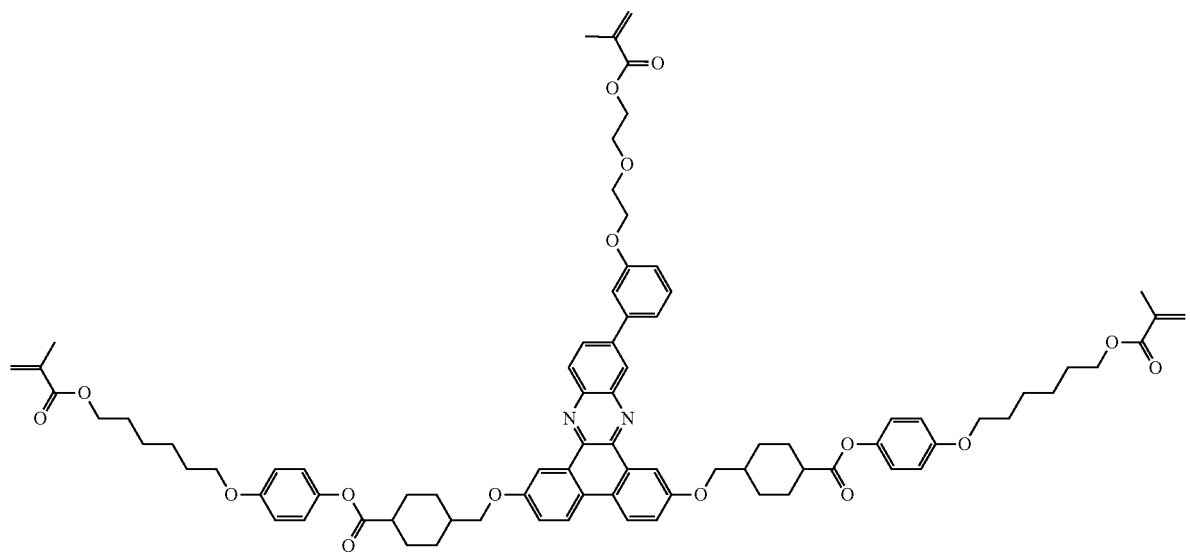
[Chemistry Formula 1-100]
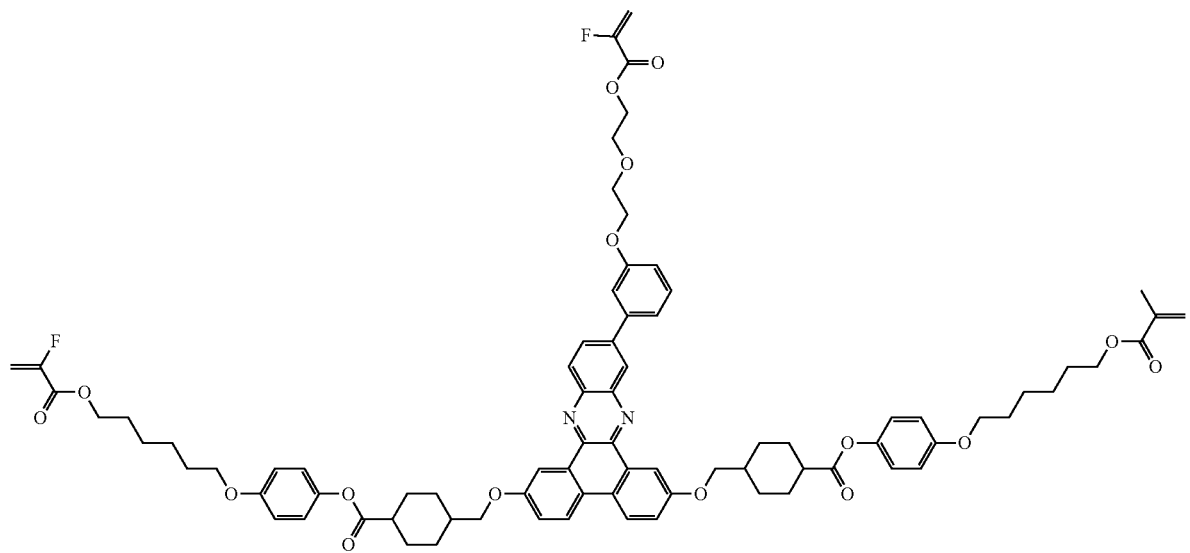

[Chemistry Formula 1-101]
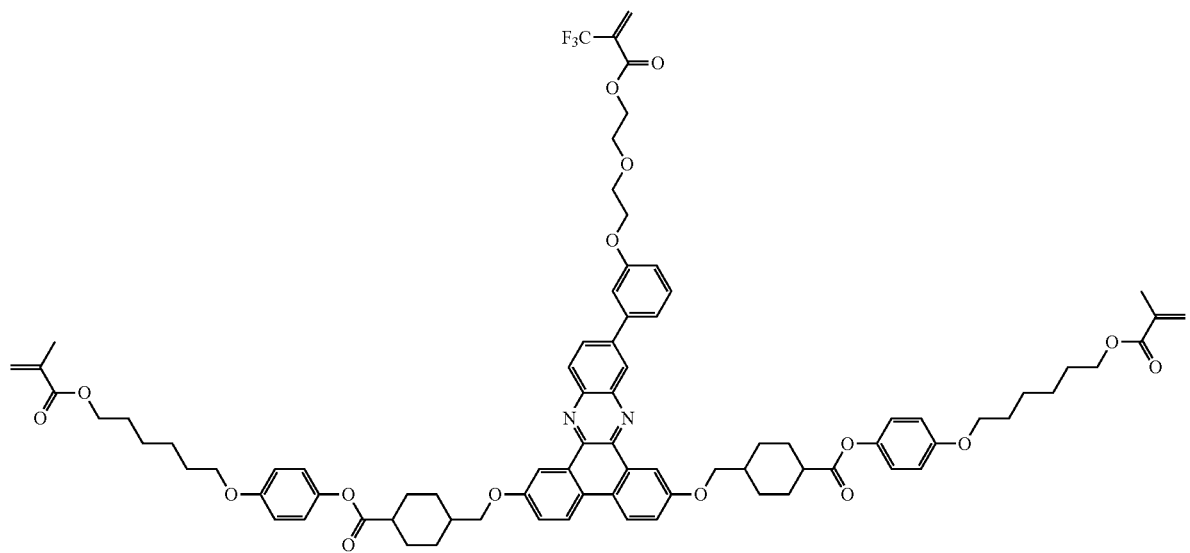
[Chemistry Formula 1-102]
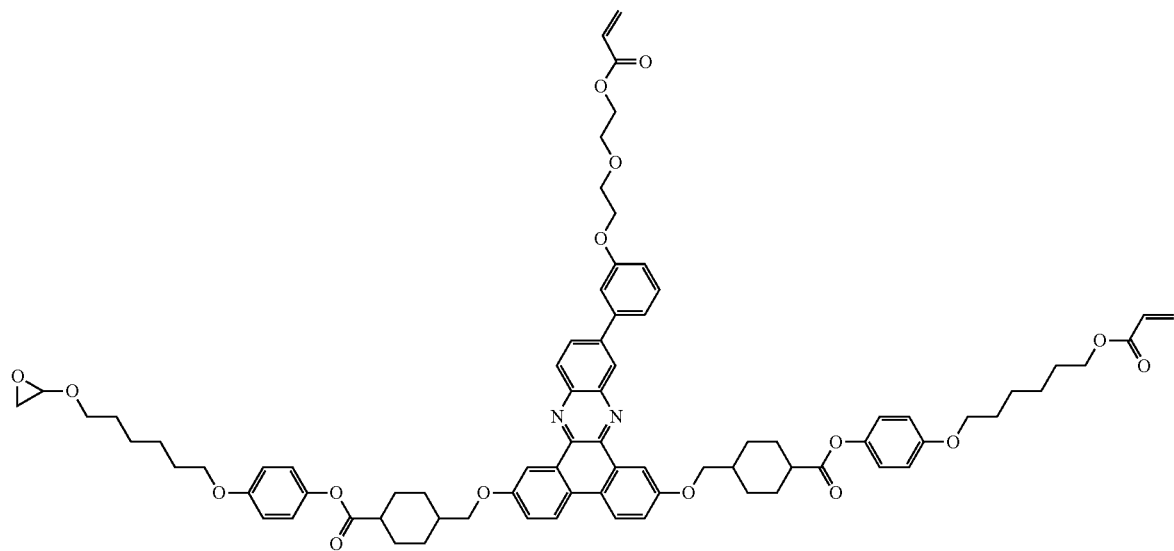

[Chemistry Formula 1-103]
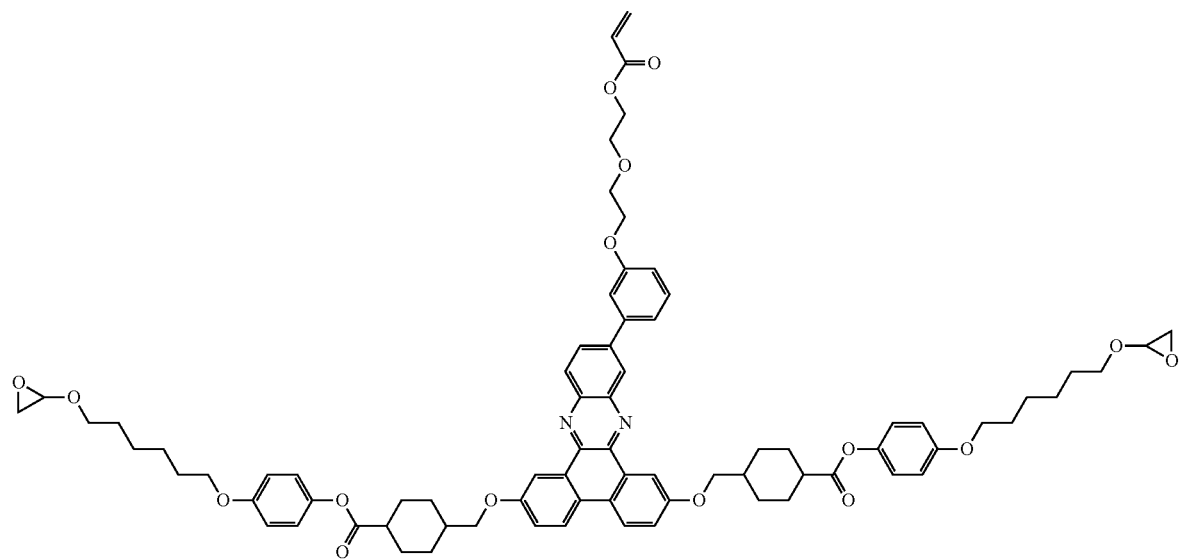
[Chemistry Formula 1-104]
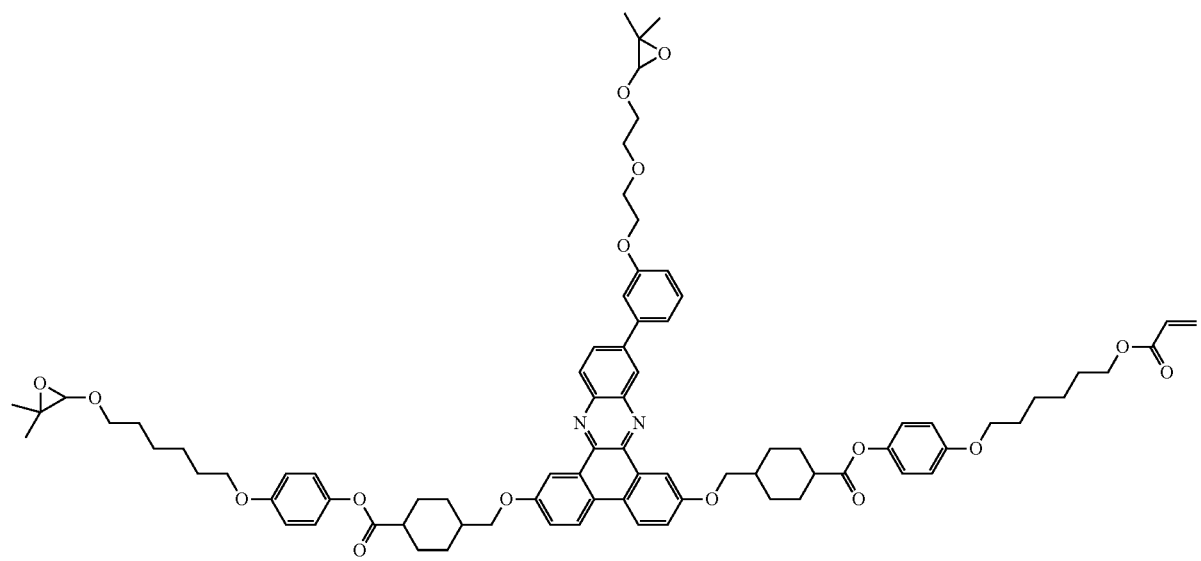

[Chemistry Formula 1-105]
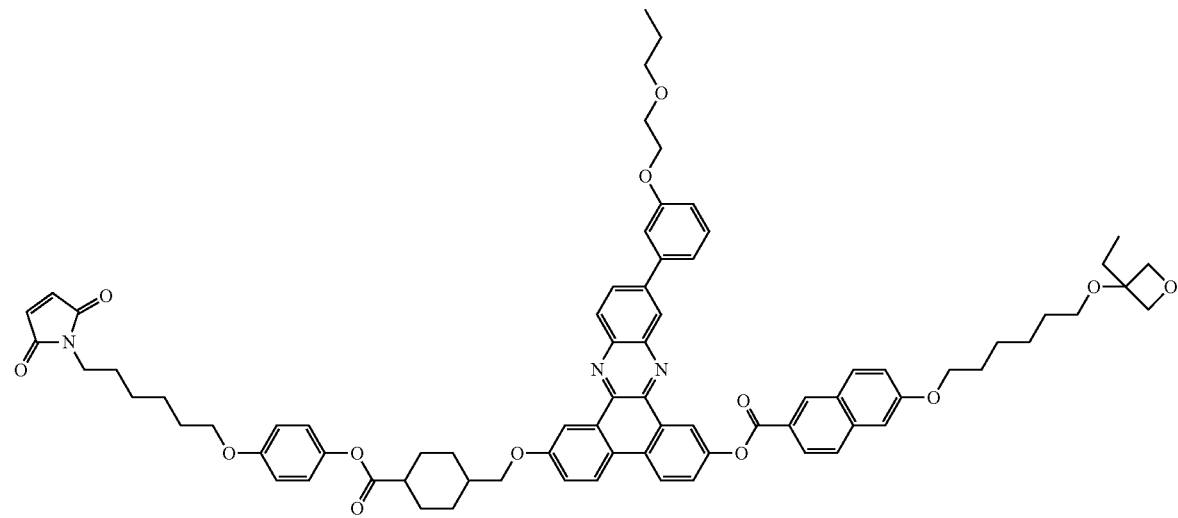
[Chemistry Formula 1-106]
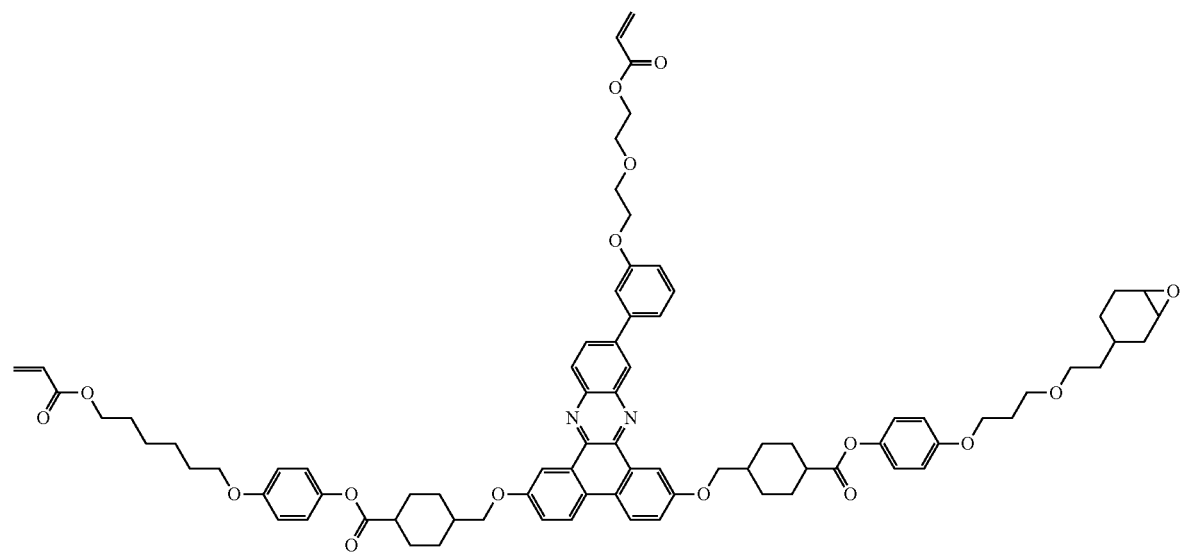

[Chemistry Formula 1-107]
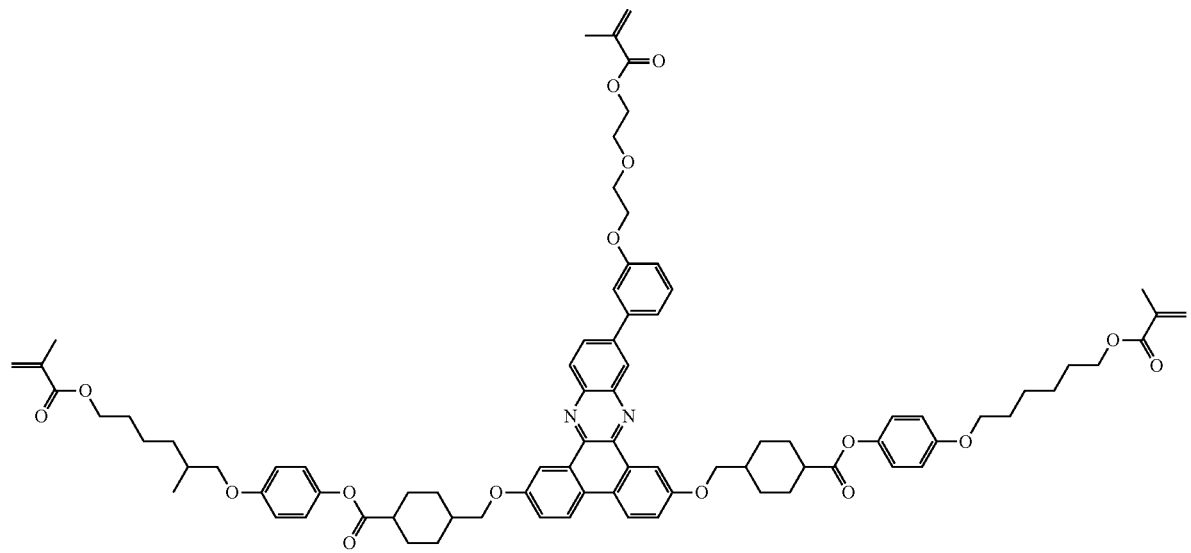
[Chemical Formula 1-108]
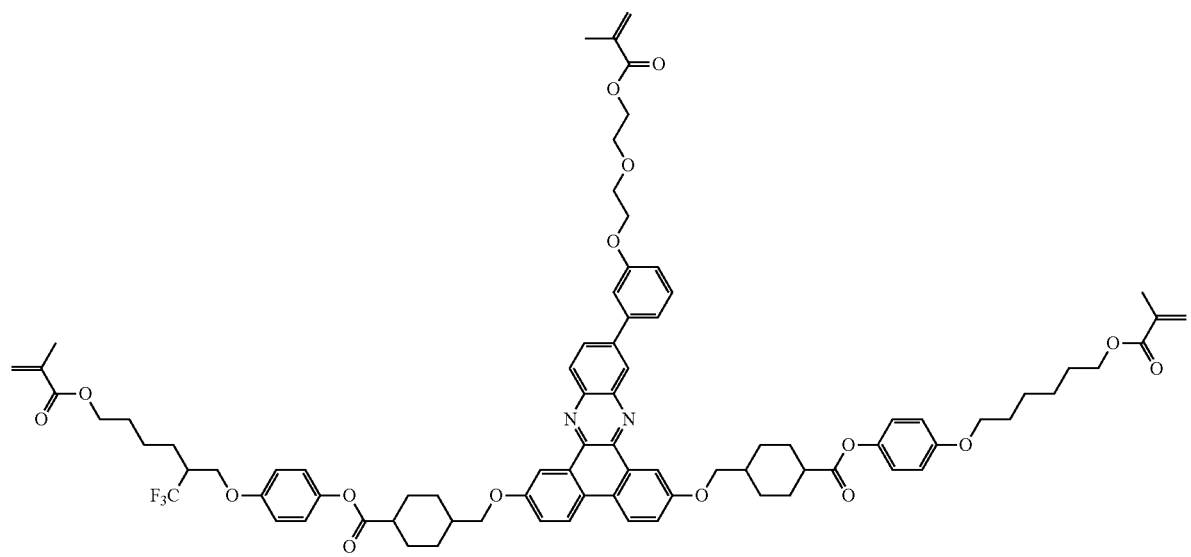
[Chemical Formula 1-109]
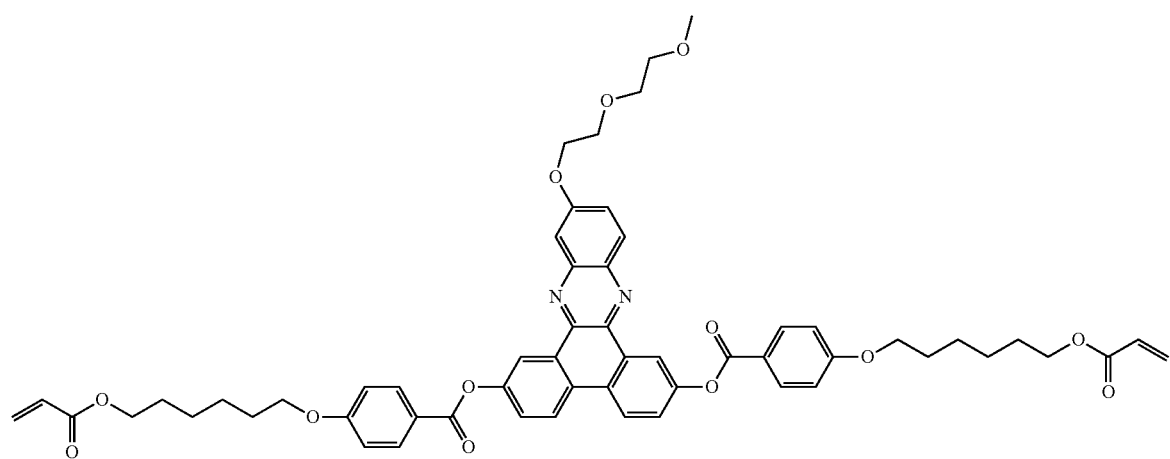

[Chemistry Formula 1-110]
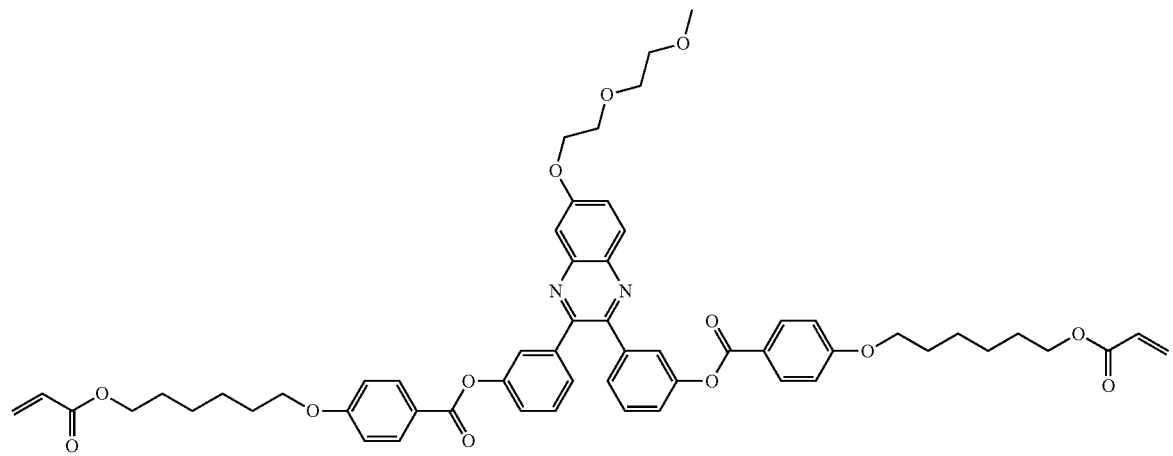
[Chemistry Formula 1-111]
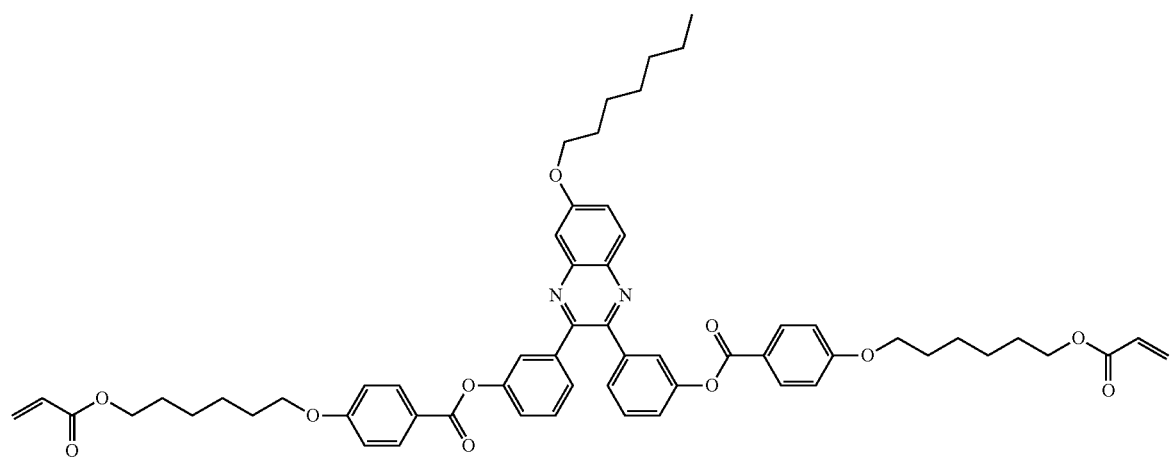
[Chemistry Formula 1-112]
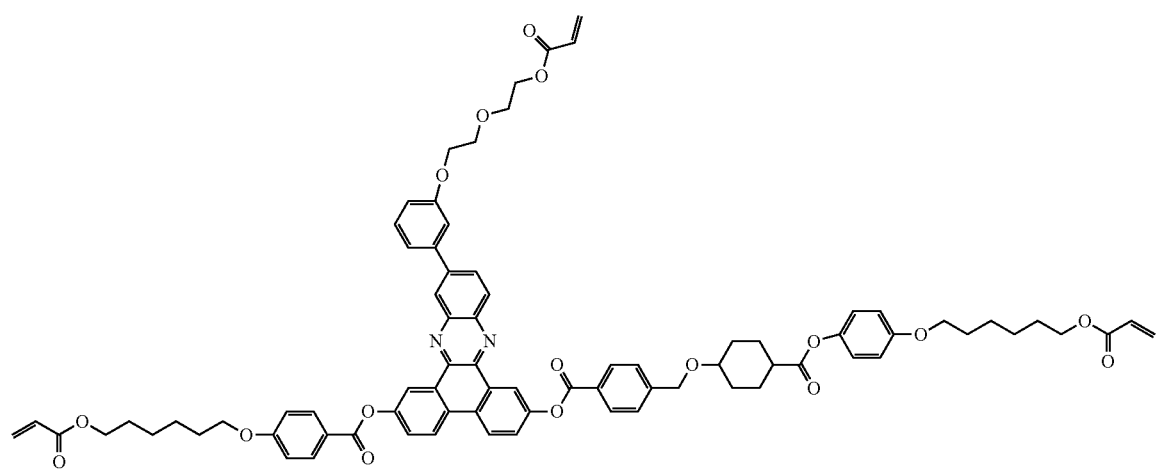

[Chemistry Formula 1-113]

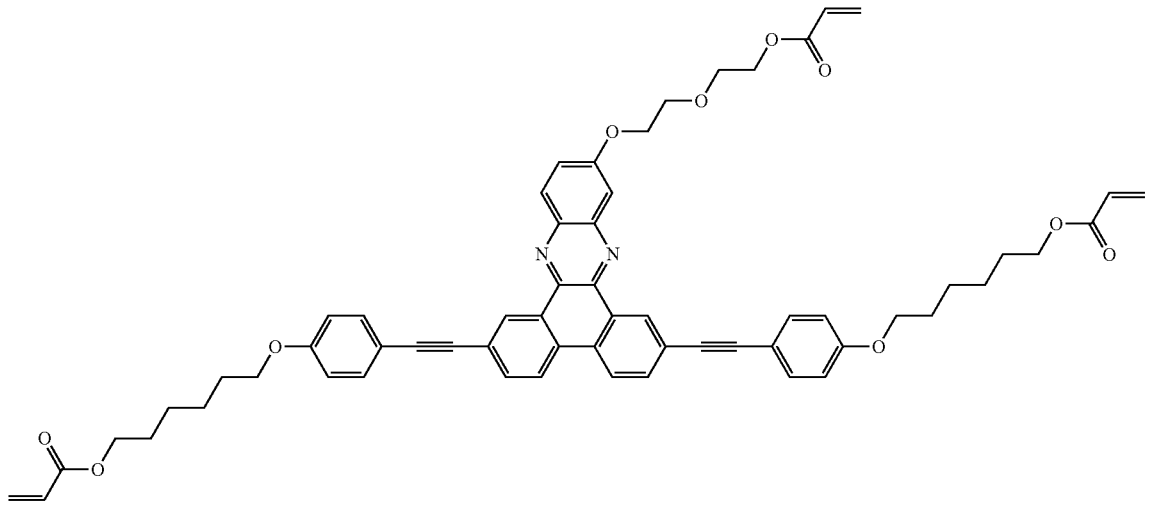

One embodiment of the present specification provides a liquid crystal composition for an optical element including the polymerizable liquid crystal compound described above.

In one embodiment of the present specification, the liquid crystal composition for an optical element may further include, in addition to the polymerizable liquid crystal compound, one or more types of second polymerizable liquid crystal compounds having a different structure from the polymerizable liquid crystal compound.

In the present specification, the second polymerizable liquid crystal compound means a compound having a different structure from the polymerizable liquid crystal compound represented by Chemical Formula 1, and the term 'second' is not to be construed as meaning any order or importance. In addition, the team 'second' is not to be construed as referring to only one type of compound, and as described above, is used to have meanings including all one or more types of polymerizable liquid crystal compounds having a different structure from the polymerizable liquid crystal compound of Chemical Formula 1.

In one embodiment of the present specification, the second polymerizable liquid crystal compound includes columatic mesogen including a substituted or unsubstituted aryl group; or a substituted or unsubstituted cycloalkyl group. However, general linear reactive mesogen (RM) compounds may all be used.

In one embodiment of the present specification, the second polymerizable liquid crystal compound may be preferably represented by the following Chemical Formula 3.

[Chemical Formula 3]

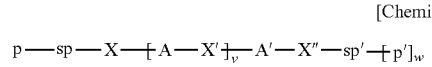

In Chemical Formula 3, p and p' are each a polymerizable functional group, the polymerizable functional group is an epoxy group, an oxetane group, an aziridinyl group, a maleimide group, a (meth)acryloyl group or a (meth)acryloyloxy group, sp and sp' are each a direct bond; or a substituted or unsubstituted alkylene group, X, X' and X'' are a direct bond, —O—, —OCH$_2$O—, —OOC—, —COO—, —OCOO—, —CR=N—, —N=N—, —S—, —SCO—, —SOC— or —CSO—, R is hydrogen; or an alkyl group, A and A' are each a substituted or unsubstituted arylene group; or a substituted or unsubstituted cycloalkylene group, v is an integer of 1 to 3, and when v is 2 or greater, structures in the parentheses are the same as or different from each other, and w is 0 or 1.

In one embodiment of the present specification, A and A' may each be substituted with fluorine, an alkyl group having 1 to 6 carbon atoms, NO$_2$, CN or SCN.

In one embodiment of the present specification, A and A' are each a phenylene group, a naphthylene group or a cyclohexylene group.

In one embodiment of the present specification, the second polymerizable liquid crystal compound may be a compound represented by any one of the following structures.

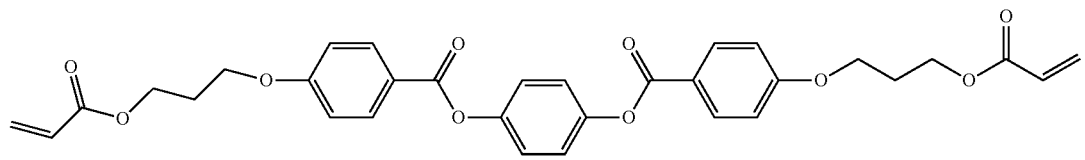

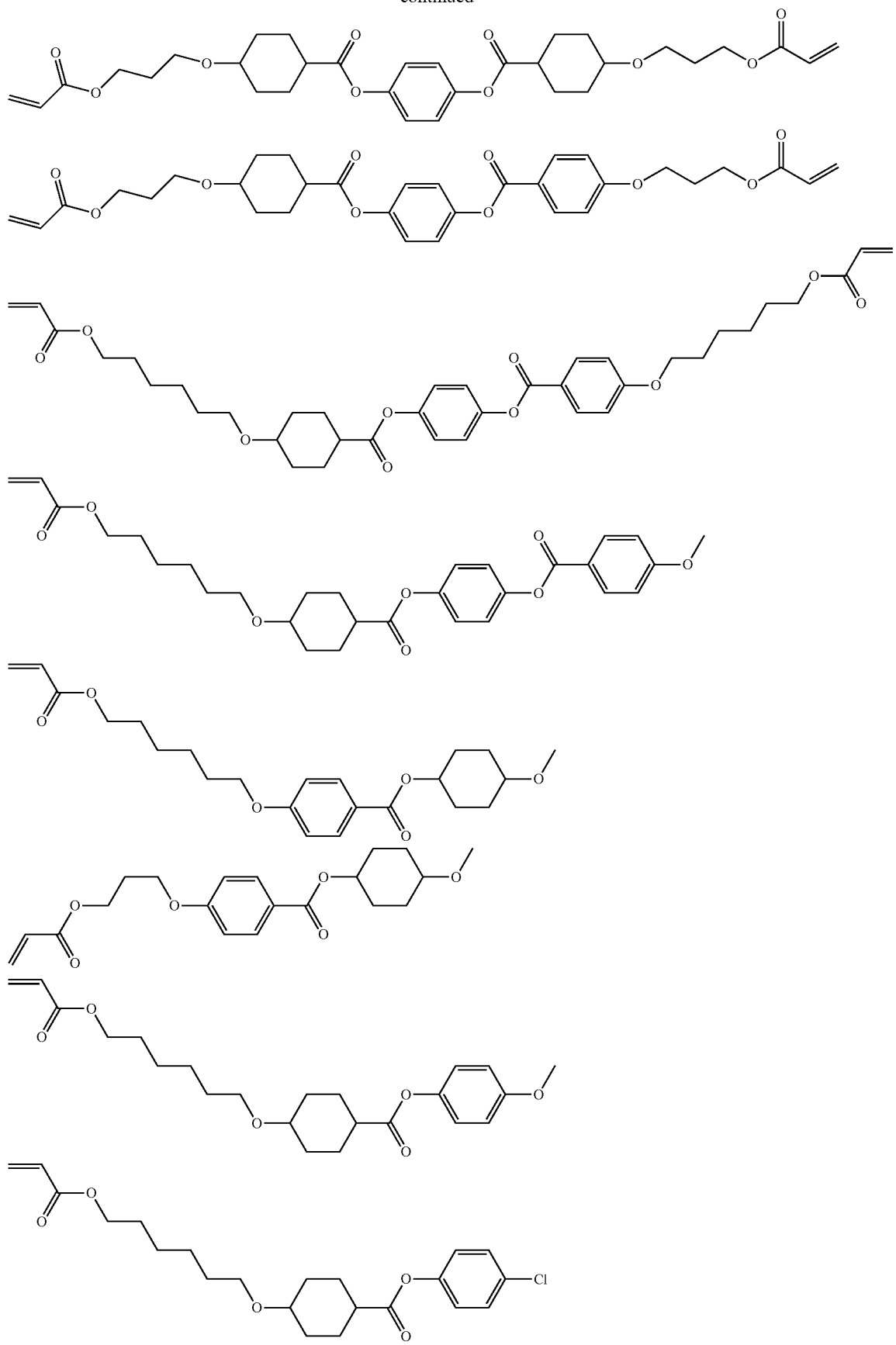

-continued

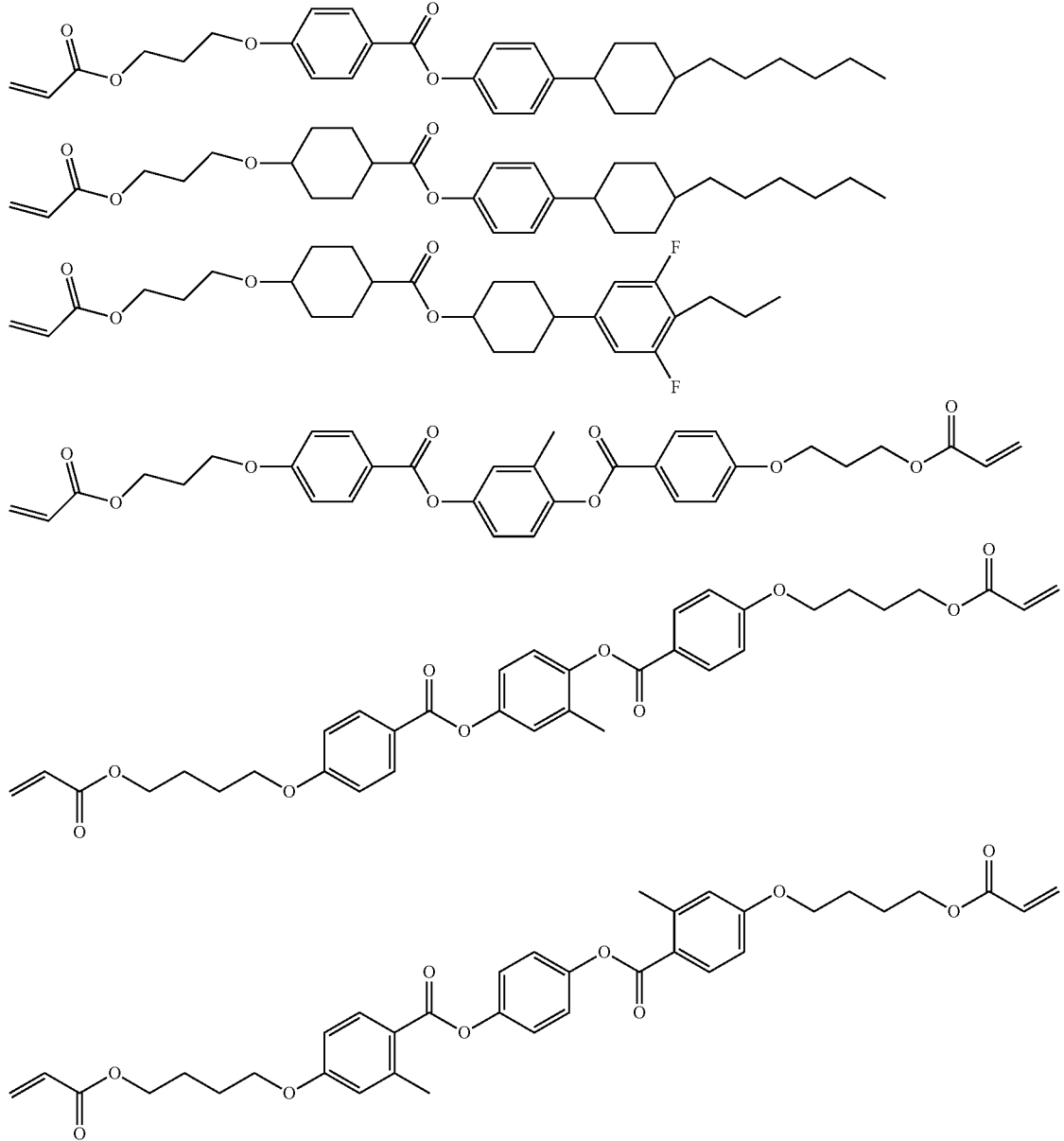

In one embodiment of the present specification, the liquid crystal composition for an optical element may further include a polymerization initiator and a solvent.

In one embodiment of the present specification, the polymerization initiator may be a photoreaction initiator or a thermal reaction initiator.

As the photoreaction initiator, one or more types selected from among benzoyl ether, benzoyl isobutyl ether, benzoyl isopropyl ether, benzophenone, acetophenone, 4-benzoyl-4'-methyldiphenyl sulfide, benzyl methyl ketal, dimethylaminomethyl benzoate, 3,3'-dimethyl-4-methoxybenzophenone, methylbenzoyl formate, 2-methyl-1-(4-(methylthio)phenyl)-2-morpholinylpropan-1-one, 2-benzyl-2-dimethylamino-1-(4-morpholinophenyl)-butan-1-one, 1-hydroxycyclohexyl phenyl ketone and Irgacure-based compounds, however, the photoreaction initiator is not limited thereto.

As the thermal reaction initiator, one or more types selected from among tert-amylperoxybenzoate, 4,4-azobis (4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione, peracetic acid and potassium persulfate, however, the thermal reaction initiator is not limited thereto.

In one embodiment of the present specification, an organic solvent may be used as the solvent, and one or more types selected from among hydrocarbons such as cyclohexane, cyclopentane, benzene, toluene, xylene or butylbenzene; ketones such as acetone, methyl ethyl ketone, methyl isobutyl ketone or cyclohexanone; esters such as ethyl acetate, ethylene glycol monomethyl ether acetate, propylene glycol monomethyl ether acetate or gamma-butyrolactone; amides such as 2-pyrrolidone, N-methyl-2-pyrrolidone, dimethylformamide or dimethylacetamide; halogens such as chloroform, dichloromethane, carbon tetrachloride, dichloroethane, tetrachloroethane, tetrachloroethylene or chlorobenzene; alcohols such as t-butyl alcohol, diacetone alcohol, glycerin, monoacetine, ethylene glycol, triethylene glycol, hexylene glycol or ethylene glycol monomethyl ether; phenols such as phenol or parachlorophenol; and ethers such as methoxybenzene, 1,2-dimethoxybenzene, diethylene glycol dimethyl ether, ethylene glycol dimethyl ether, ethylene glycol diethyl ether, propylene glycol dimethyl ether, propylene glycol diethyl ether, diethylene glycol dimethyl ether, diethylene glycol diethyl ether, dipropylene glycol dimethyl ether or dipropylene glycol diethyl ether.

In one embodiment of the present specification, the polymerizable liquid crystal compound may be included in 0.1 wt % to 99.9 wt % based on 100 wt % of the liquid crystal composition for an optical element.

In one embodiment of the present specification, the second polymerizable liquid crystal compound may be included in 0.01 wt % to 50 wt % based on 100 wt % of the liquid crystal composition for an optical element.

In one embodiment of the present specification, the polymerization initiator may be included in 0.001 wt % to 5 wt % based on 100 wt % of the liquid crystal composition for an optical element.

In one embodiment of the present specification, the remainder after excluding the polymerizable liquid crystal compound, the second polymerizable liquid crystal compound and the polymerization initiator in the liquid crystal composition for an optical element may be a solvent.

One embodiment of the present specification provides a polymer obtained by polymerizing the polymerizable liquid crystal compound represented by Chemical Formula 1. Specific descriptions on Chemical Formula 1 include the descriptions provided above on the polymerizable liquid crystal compound according to one embodiment of the present specification, and may cite the descriptions.

In one embodiment of the present specification, the polymer may be obtained by copolymerizing the polymerizable liquid crystal compound and one or more types of second polymerizable liquid crystal compounds having a different structure. In other words, the polymerizable liquid crystal compound represented by Chemical Formula 1 and the second polymerizable liquid crystal compound may form a copolymer.

In one embodiment of the present specification, the polymer goes through polymerization on a film substrate through photocuring or thermal curing, and since the degree of curing may be readily controlled by controlling the amount of applied energy and the time, a separate end-capping may not be required.

In one embodiment of the present specification, the polymer has a number average molecular weight of 5,000 g/mol to 1,000,000 g/mol.

In one embodiment of the present specification, the polymer may be prepared using a method of coating a liquid crystal composition prepared by dissolving the polymerizable liquid crystal compound represented by Chemical Formula 1; or a mixture of the polymerizable liquid crystal compound represented by Chemical Formula 1 and the second polymerizable liquid crystal compound in a solvent on a substrate provided with an alignment layer, removing the solvent by applying a heat or leaving the result unattended at room temperature, aligning the result through a change in the temperature, and polymerizing the result through photocuring or thermal curing.

One embodiment of the present specification provides an optically anisotropic body including a cured material or a polymerized reactant of the liquid crystal composition for an optical element described above.

In addition, one embodiment of the present specification provides an optically anisotropic body including the polymer described above.

In the present specification, the optically anisotropic body means a material that, when light passes through the material, differs in optical properties such as light velocity, refractive index and/or absorption depending on the passing through direction. Examples of the optically anisotropic body may include a retardation plate, a retardation film, a polarizing plate, a polarizing prism, a luminance enhancement film, an optical fiber covering material, a storage device and the like.

The optically anisotropic body according to one embodiment of the present specification may have no or minimized light leakage while having a high retardation value by including a cured material or a polymerized reactant of the liquid crystal composition for an optical element described above, or the polymer described above. In addition, compared to previous laminate-type optically anisotropic bodies, the optically anisotropic body may be prepared using a more simplified process while having a smaller thickness.

In one embodiment of the present specification, the optically anisotropic body may be prepared by coating the liquid crystal composition for an optical element on a support, drying the result, aligning the liquid crystal composition for an optical element, and then polymerizing the result by irradiating ultraviolet rays or the like.

In one embodiment of the present specification, the support is not particularly limited, however, a glass plate, a polyethylene terephthalate film, a cellulose-based film and the like may be preferably used. As the method of coating the liquid crystal composition for an optical element on the support, known methods may be used without particular limit, and for example, a roll coating method, a spin coating method, a bar coating method, a spray coating method and the like may be used.

In addition, as the method of aligning the liquid crystal composition for an optical element, known methods such as rubbing the formed composition layer or applying a magnetic field, an electric field or the like to the formed composition layer may be used.

In one embodiment of the present specification, the optically anisotropic body may have its specific shape determined depending on the application, and for example, may be a film type or a laminate. In addition, the optically anisotropic body may have its thickness adjusted depending on the application, and the thickness may be preferably adjusted in a range of 0.01 μm to 100 μm.

In one embodiment of the present specification, R(450)/R(550) of the optically anisotropic body may have a smaller value than R(650)/R(550).

In one embodiment of the present specification, R(450)/R(550) of the optically anisotropic body may be less than 1, preferably 0.9 or less, and more preferably 0.8 or less.

In the present specification, R(N) means retardation in a plane or thickness direction for light having a wavelength of N nm, and N is an integer.

One embodiment of the present specification provides an optical element for a display device including the optically anisotropic body described above.

In one embodiment of the present specification, the optically anisotropic body may be used as an optical element such as a retardation film, an optical compensation plate, an alignment layer, a polarizing plate, a viewing angle magnifying plate, a reflective film, a color filter, a holographic element, an optical polarizing prism or an optical head of a display device, and the display device includes various liquid crystal display devices or light emitting devices.

Hereinafter, the present specification will be described in detail with reference to examples. However, the examples according to the present specification may be modified to various other forms, and the scope of the present specification is not to be construed as being limited to the examples described below. Examples of the present specification are provided in order to more fully describe the present specification to those having average knowledge in the art.

Preparation Example: Synthesis of Polymerizable Liquid Crystal Compound

[Preparation Example 1] Preparation of Compound 1-4

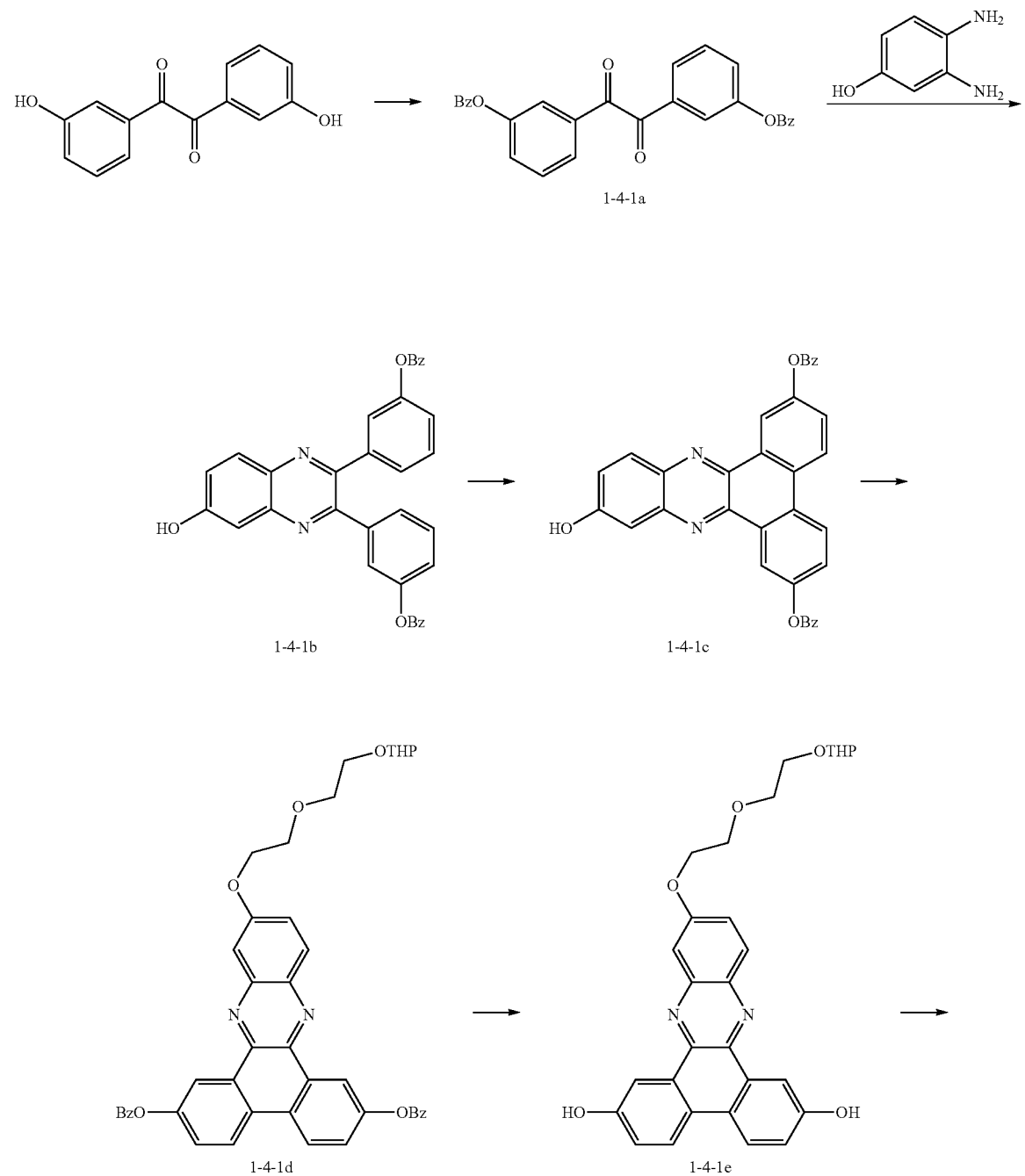

-continued

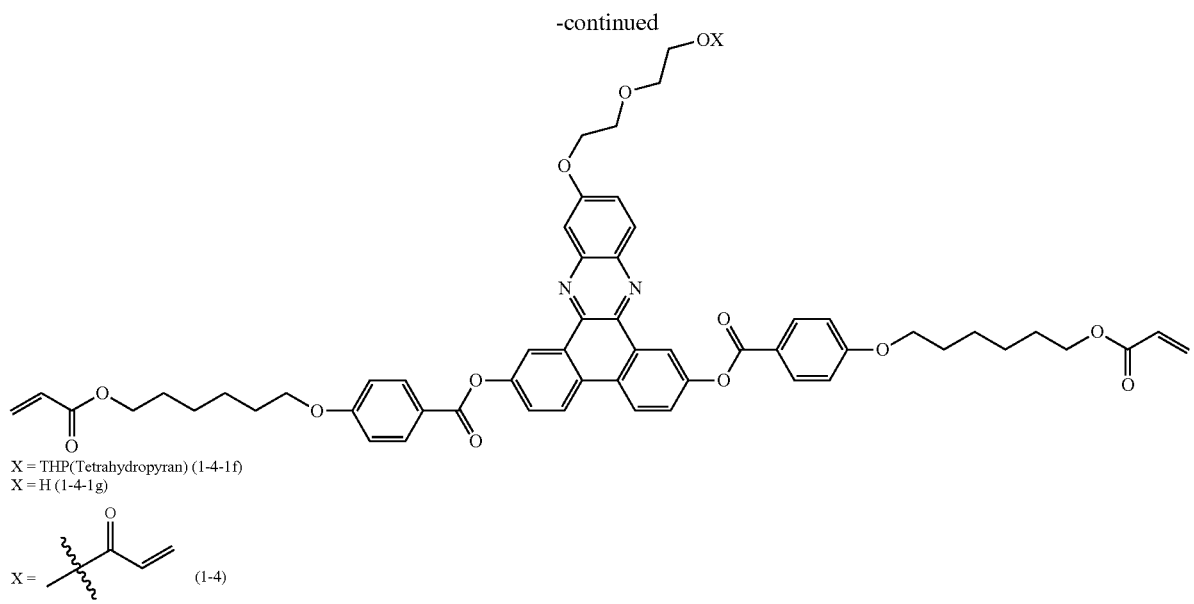

X = THP(Tetrahydropyran) (1-4-1f)
X = H (1-4-1g)

X = (1-4)

(1) Synthesis of 1-4-1a

After dispersing 1,2-bis(3-hydroxyphenyl)ethane-1,2-dione (20 g, 82.57 mmol) and $K_2CO_3$ (34.2 g, 247.70 mmol) into acetone (300 mL), benzyl bromide (21.6 ml, 181.65 mmol) was introduced thereto, and the result was refluxed for 6 hours. The reaction material was cooled to room temperature, water was poured thereinto, and produced solids were filtered and then dried to obtain 1-4-1a (35.1 g, yield 94.4%, MS: $[M+H]^+=451$).

(2) Synthesis of 1-4-1b 1-4-1a (15 g, 36.54 mmol) was dispersed into acetic acid (80 mL). To the dispersed solution, 3,4-diaminophenol (6.2 g, 49.95 mmol) dissolved in acetone (45 mL) was introduced, and the result was refluxed for 120 minutes. After the reaction was finished, the result was vacuum distilled to remove the acetic acid, and after dissolving the mixture in methylene chloride (MC), the result was washed once with a $NaHCO_3$ solution and once with water. The organic layer was collected, dried with $MgSO_4$ and filtered, and then the filtrate was vacuum distilled and purified using column chromatography (Hx:EA 2:1) to obtain 1-4-1b (14.2 g, yield 79.2%, MS: $[M+H]^+=539$).

(3) Synthesis of 1-4-1c

After dissolving 1-4-1b (13.5 g, 25.0 mmol) in MC (700 mL), anhydrous ferric(III) trichloride (40 g) was introduced thereto, and the mixture was stirred for 12 hours at room temperature. After the reaction was finished, solids obtained through vacuum distillation was introduced to EtOH (200 mL), and the result was refluxed, and then filtered to obtain black solids. These was separated using column chromatography (Hx:EA 3:1) and recrystallized with $CHCl_3$ and EA to obtain 1-4-1c (6.6 g, yield 49.0%, MS: $[M+H]^+=537$).

(4) Synthesis of 1-4-1d

After dispersing 1-4-1c (10 g, 17.74 mmol), $K_2CO_3$ (7.4 g, 53.23 mmol) and 2-(2-(2-chloroethoxy)ethoxy)tetrahydro-2H-pyran (4.44 g, 21.29 mmol) into dimethylformamide (DMF, 100 mL), the result was heated to 100° C. and stirred for 24 hours. After the reaction was finished, the result was extracted with $CHCl_3$ and water, and the organic layer was dried with $MgSO_4$, then filtered and vacuum distilled. The obtained mixture was recrystallized with $CHCl_3$ and EA to obtain 1-4-1d (10.1 g, yield 80.3%, MS: $[M+H]^+=709$).

(5) Synthesis of 1-4-1e 1-4-1d (10.1 g, 14.25 mmol) and 10 wt % Pd/C (0.2 g) were dispersed into EtOH (150 mL), and reacted for 8 hours in a hydrogenator filled with $H_2$ (g). After the reaction was finished, the result was filtered, and the filtrate was vacuum distilled to obtain 1-4-1e (7.0 g, yield 98%, MS: $[M+H]^+=501$).

(6) Synthesis of 1-4-1f After dissolving 1-4-1e (7.0 g, 13.98 mmol) and 4-((6-(acryloyloxy)hexyl)oxy)benzoic acid (9.0 g, 30.77 mmol) in MC (50 mL), the temperature of the reaction material was lowered to 0° C., and then a solution dissolving N,N'-dicyclohexylcarbodiimide (6.5 g, 31.47 mmol) and 4-(dimethylamino)pyridine (0.2 g, 1.4 mmol) in MC (15 mL) was added dropwise thereto. The temperature of the reaction material was raised to room temperature, and the reaction material was stirred for 12 hours. After the reaction was finished, produced solids were filtered, and a mixture obtained by vacuum distilling the filtrate was recrystallized with $CHCl_3$ and EA to obtain 1-4-1f (11.8 g, yield 80.4%, MS: $[M+H]^+=1050$).

(7) Synthesis of 1-4-1g After dispersing 1-4-1f (10 g, 9.53 mmol) and pyridinium p-toluenesulfonate (0.2 g, 0.95 mmol) in EtOH (150 mL), the result was heated to 65° C. and stirred for 8 hours. After the reaction was finished, the result was vacuum distilled to remove the EtOH, dissolved in $CHCl_3$, washed once with an aqueous $NaHCO_3$ solution and then washed once more with water. The organic layer was collected, dried with $MgSO_4$, then filtered and vacuum distilled to obtain 1-4-1g (7.6 g, yield 82.7%, MS: $[M+H]^+=964$).

(8) Synthesis of Compound 1-4

After dissolving 1-4-1g (7 g, 7.26 mmol) in MC, triethylamine (1.5 mL, 10.89 mmol) was added thereto. The reaction material was cooled to 0° C., and acryloyl chloride (0.7 mL, 8.71 mmol) was slowly added dropwise thereto. Then, the temperature of the reaction material was raised to room temperature, and the reaction material was stirred for 1 hour at room temperature. After the reaction was finished, water was slowly introduced to the reaction material. Water was further introduced thereto, and the reaction material was washed once or twice with water. The organic layer was collected, dried with $MgSO_4$, then filtered and vacuum distilled. Obtained solids were recrystallized with $CHCl_3$ and EtOH to obtain the following Compound 1-4 (6.3 g, yield 85%, MS: $[M+H]^+=1019$).

[Compound 1-4]
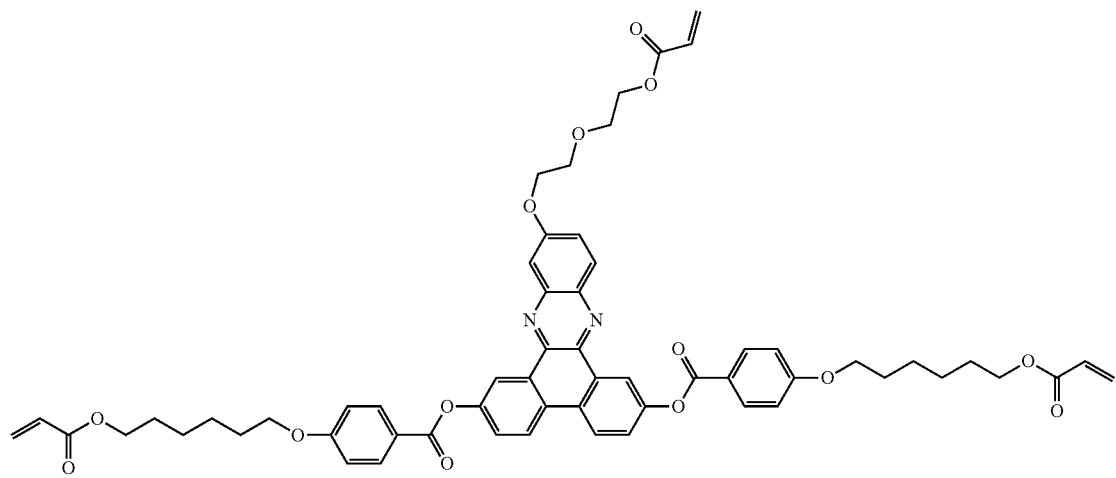
[Preparation Example 2] Preparation of Compound 1-8
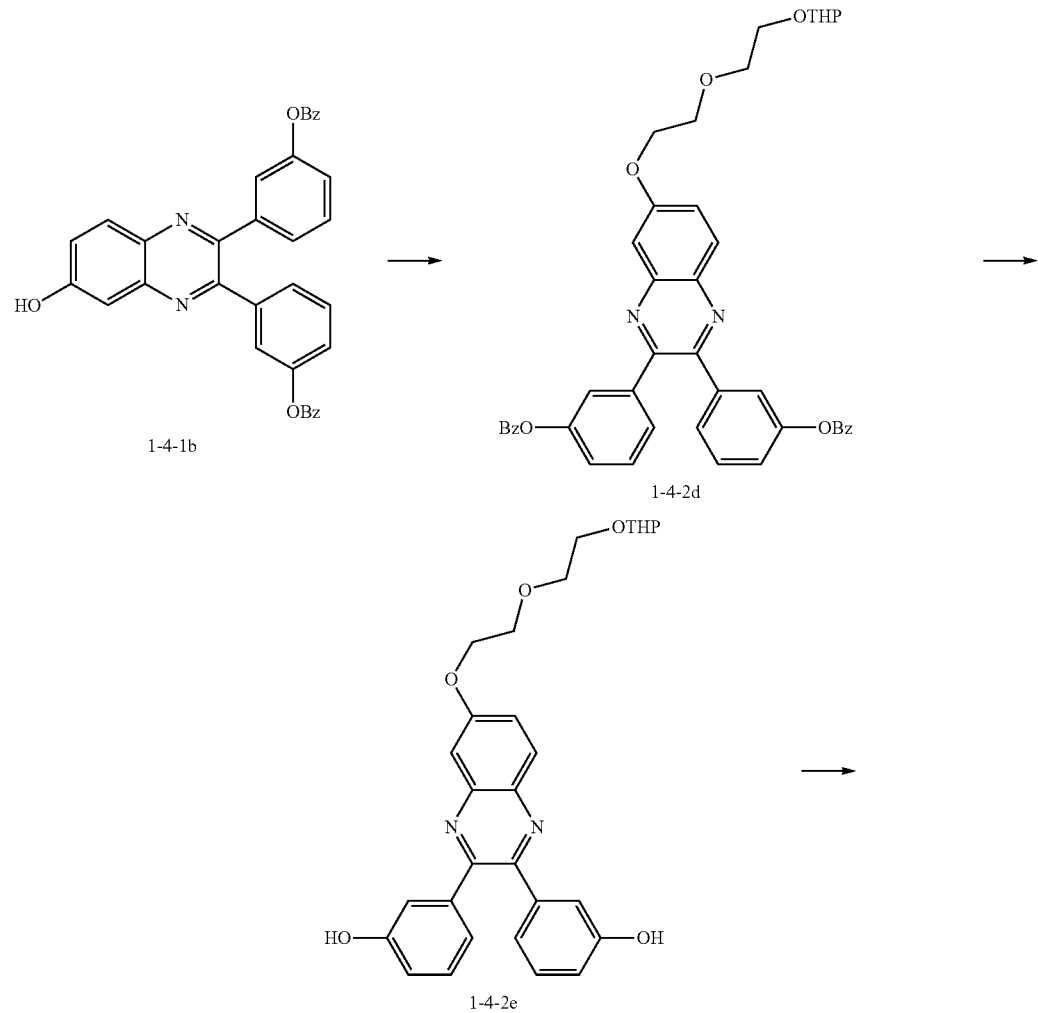

-continued

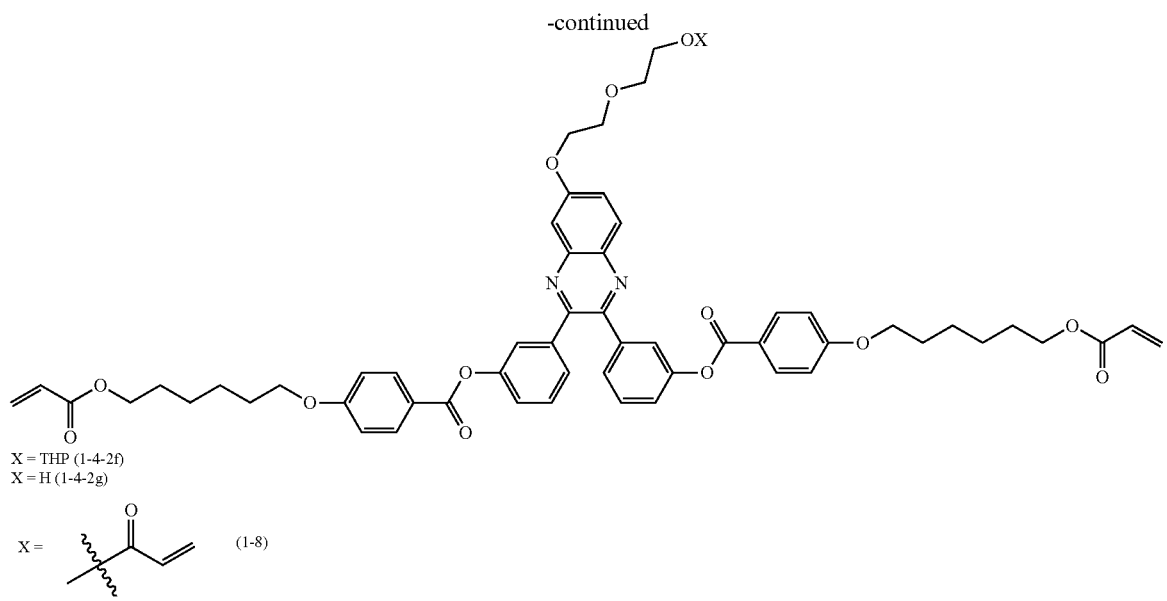

X = THP (1-4-2f)
X = H (1-4-2g)

X = (1-8)

(1) Synthesis of 1-4-2d 1-4-2d (10.6 g, yield 84%, MS: [M+H]+=711) was obtained in the same manner as in (4) of Preparation Example 1 except that 1-4-1b (9.55 g, 17.74 mmol) was used instead of 1-4-1c.

(2) Synthesis of 1-4-2e 1-4-2e (7.1 g, yield 99%, MS: [M+H]$^+$=503) was obtained in the same manner as in (5) of Preparation Example 1 except that 1-4-2d (10.1 g, 14.25 mmol) was used instead of 1-4-1d.

(3) Synthesis of 1-4-2f 1-4-2f (13.1 g, yield 89%, MS: [M+H]$^+$=1051) was obtained in the same manner as in (6) of Preparation Example 1 except that 1-4-2e (7.0 g, 13.98 mmol) was used instead of 1-4-1e.

(4) Synthesis of 1-4-2g 1-4-2g (7.4 g, yield 80%, MS: [M+H]$^+$=967) was obtained in the same manner as in (7) of Preparation Example 1 except that 1-4-2f (10.0 g, 9.53 mmol) was used instead of 1-4-1f.

(5) Synthesis of Compound 1-8

The following Compound 1-8 (5.7 g, yield 77%, MS: [M+H]$^+$=1021) was obtained in the same manner as in (8) of Preparation Example 1 except that 1-4-2g (7.0 g, 7.26 mmol) was used instead of 1-4-1g.

[Compound 1-8]

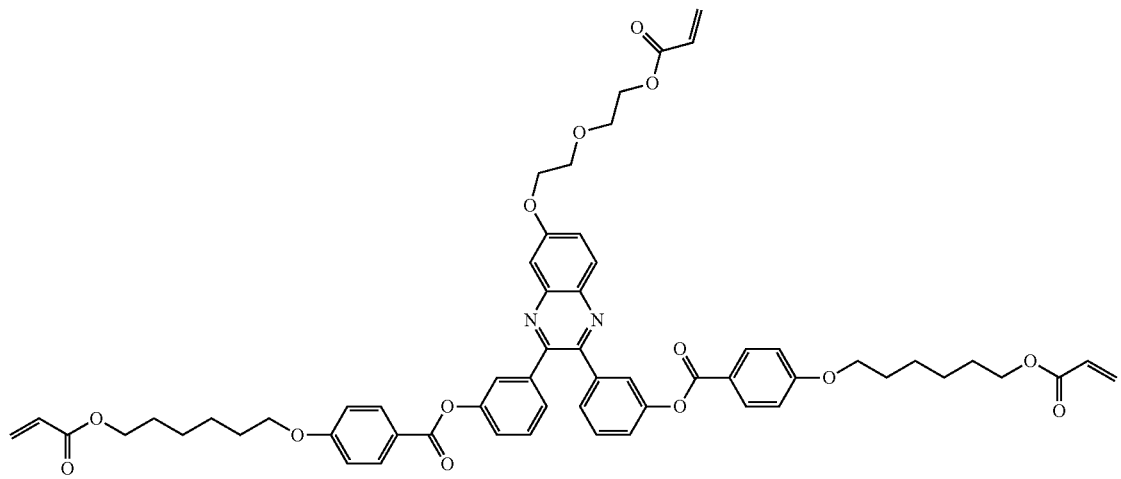

[Preparation Example 3] Preparation of Compound 1-110
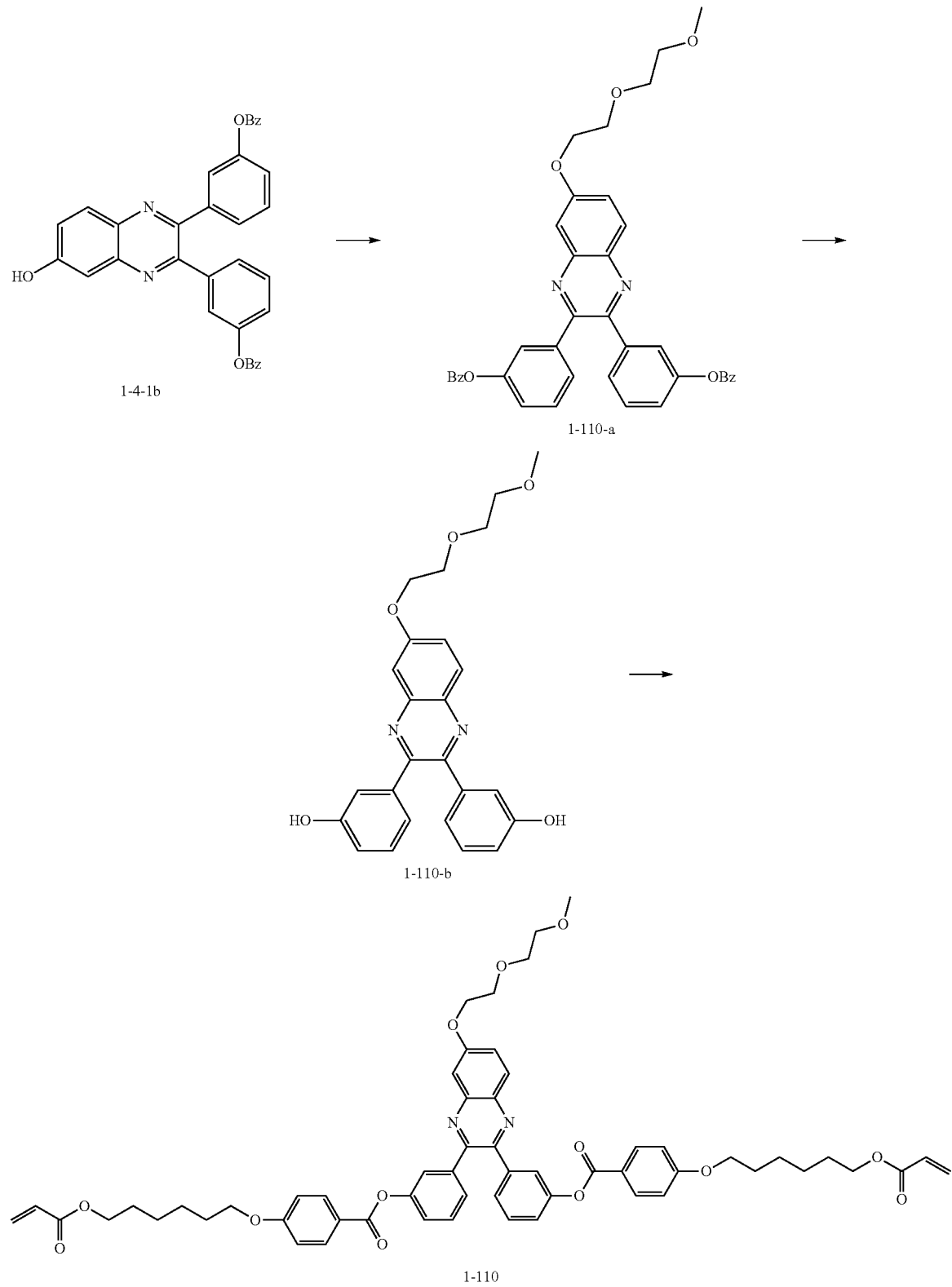

(1) Synthesis of 1-110-a 1-110-a (9.9 g, yield 87%, MS: [M+H]$^+$=641) was obtained in the same manner as in (4) of Preparation Example 1 except that 1-4-1b was used instead of 1-4-1c, and 1-chloro-2-(2-methoxyethoxy)ethane (2.95 g, 21.29 mmol) was used instead of 2-(2-(2-chloroethoxy)ethoxy) tetrahydro-2H-pyran.

(2) Synthesis of 1-110-b 1-110-b (6.0 g, yield 97%, MS: [M+H]$^+$=433) was obtained in the same manner as in (5) of Preparation Example 1 except that 1-110-a (9.1 g, 14.25 mmol) was used instead of 1-4-1d.

(3) Synthesis of Compound 1-110

The following Compound 1-110 (4.9 g, yield 69%, MS: [M+H]$^+$=981) was obtained in the same manner as in (8) of Preparation Example 1 except that 1-110-b (3.1 g, 7.26 mmol) was used instead of 1-4-1g.

[Compound 1-110]

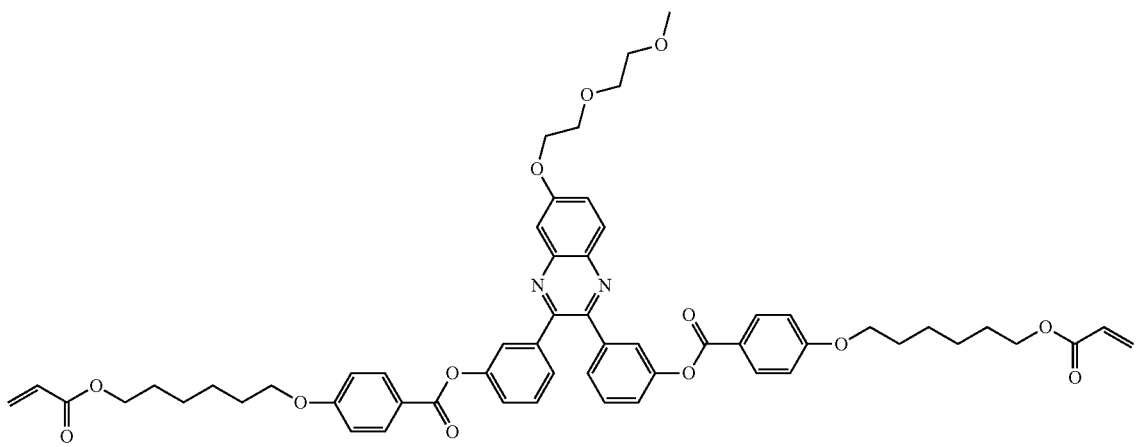

[Preparation Example 4] Preparation of Compound 1-16

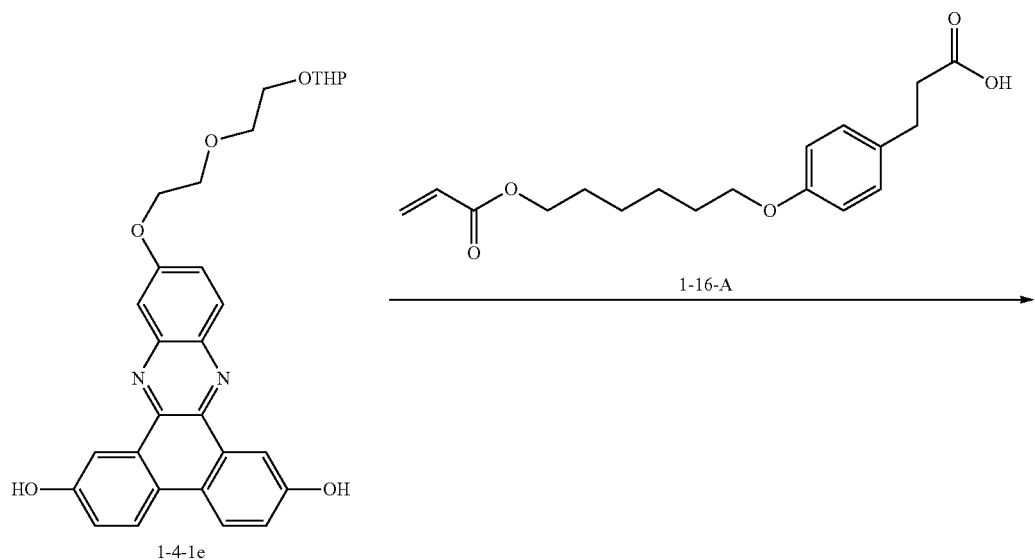

-continued
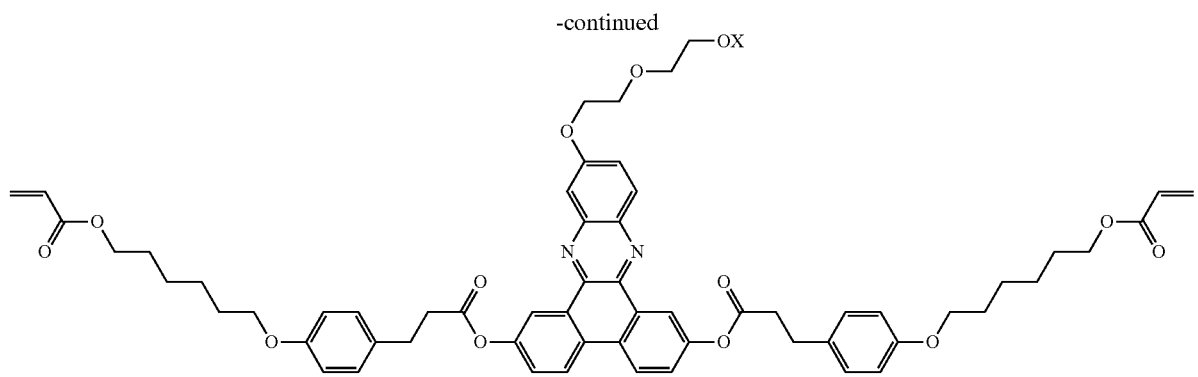
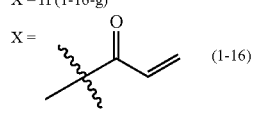
(1) Synthesis of 1-16-A
1-16-A was synthesized in the same manner as in Example 1 of Japanese Patent Application Laid-Open Publication No. 2008-239873.
(2) Synthesis of Compound 1-16
The following Compound 1-16 (12.3 g, yield 82%, MS: [M+H]$^+$=1075) was obtained in the same manner as in (6) to (8) of Preparation Example 1 except that 1-16-A (9.9 g, 30.77 mmol) was used instead of 4-((6-(acryloyloxy)hexyl)oxy)benzoic acid.
[Compound 1-16]
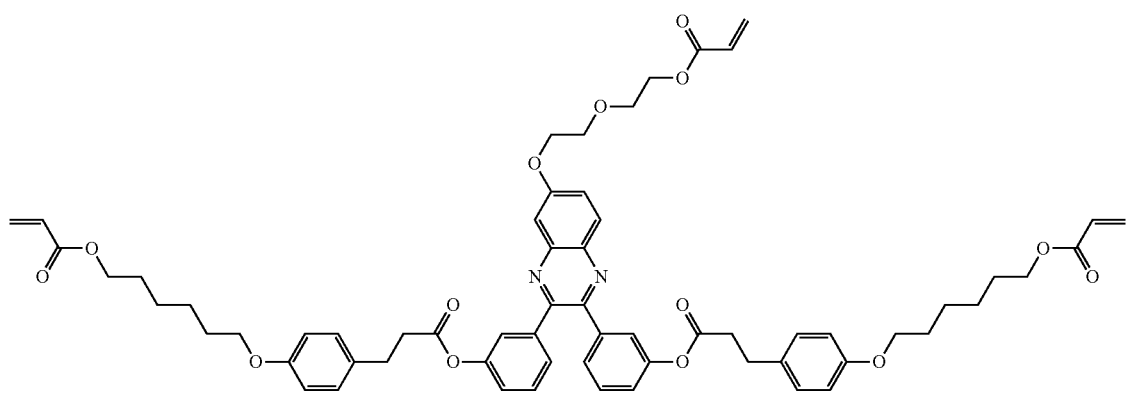

[Preparation Example 5] Preparation of Compound 1-24
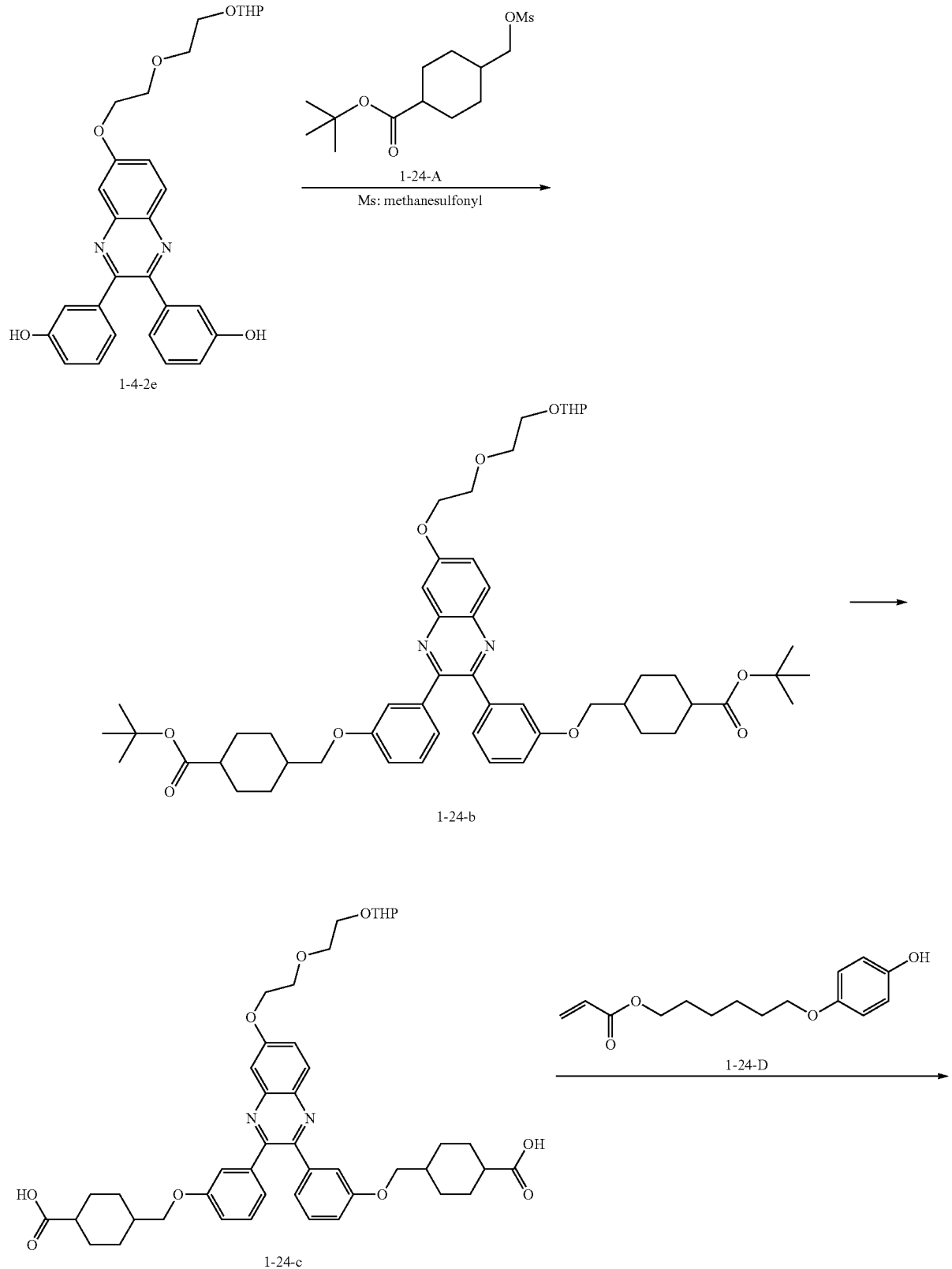

-continued

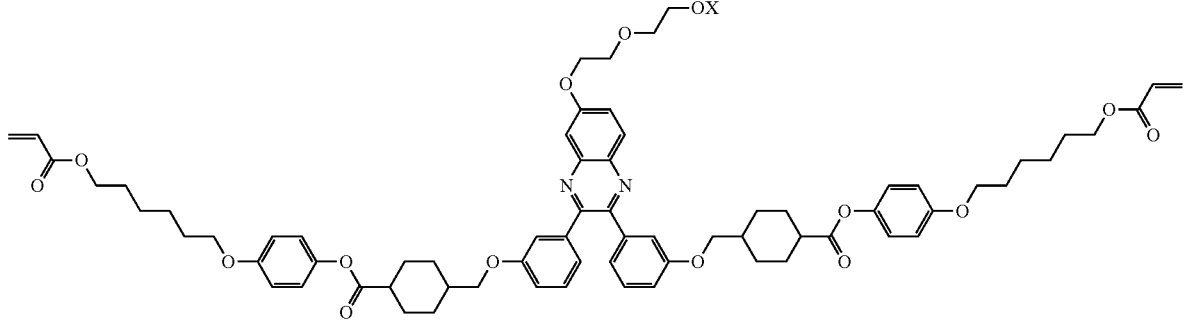

X = THP (1-24-f)
X = H (1-24-g)

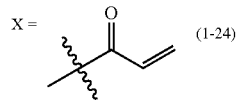

(1) Synthesis of 1-24-A 1-24-A was synthesized in the same manner as in Example 88 of International Patent Application Laid-Open Publication No. WO2016-088749 A1.

(2) Synthesis of 1-24-b 1-4-2e (10 g, 19.97 mmol), 1-24-A (12.3 g, 41.94 mmol) and $K_2CO_3$ (13.8 g, 99.85 mmol) were mixed with DMF (150 mL), and stirred for 24 hours at 90° C. After the reaction was finished, excess water was poured into the mixture, and the result was extracted with $CHCl_3$. The organic layer was further washed twice with water, and then the organic layer was collected and dried with $MgSO_4$. After filtering, solids obtained by vacuum distilling the filtrate were recrystallized with $CHCl_3$ and EA to obtain 1-24-b (12.7 g, yield 71%, MS: $[M+H]^+$=895).

(3) Synthesis of 1-24-c

After dissolving 1-24-b (12.7 g, 14.18 mmol) in MC (70 mL), trifluoroacetic acid (100 mL) was introduced thereto, and the result was stirred for 1 hour. After the reaction was finished, the result was vacuum distilled to remove the solvent, and obtained solids were washed with water and then dried to obtain 1-24-c (9.1 g, yield 82%, MS: $[M+H]^+$=783).

(4) Synthesis of 1-24-D 1-24-D was synthesized in the same manner as in US Patent Application Laid-Open Publication No. US 2017/0260150.

(5) Synthesis of Compound 1-24

The following Compound 1-24 (9.7 g, yield 67%, MS: $[M+H]^+$=1245) was obtained in the same manner as in (6) to (8) of Preparation Example 1 except that 1-24-c (9.1 g, 11.63 mmol) was used instead of 1-4-1e, and 1-24-D (6.2 g, 23.26 mmol) was used instead of 4-((6-(acryloyloxy)hexyl)oxy) benzoic acid.

[Compound 1-24]

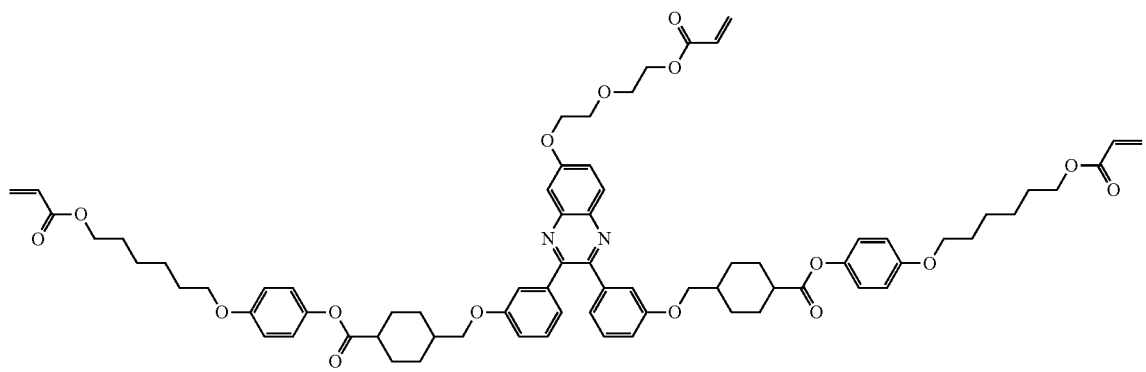

[Preparation Example 6] Preparation of Compound 1-25
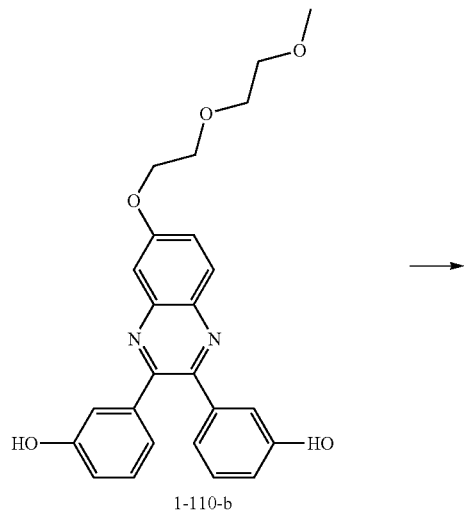
1-110-b
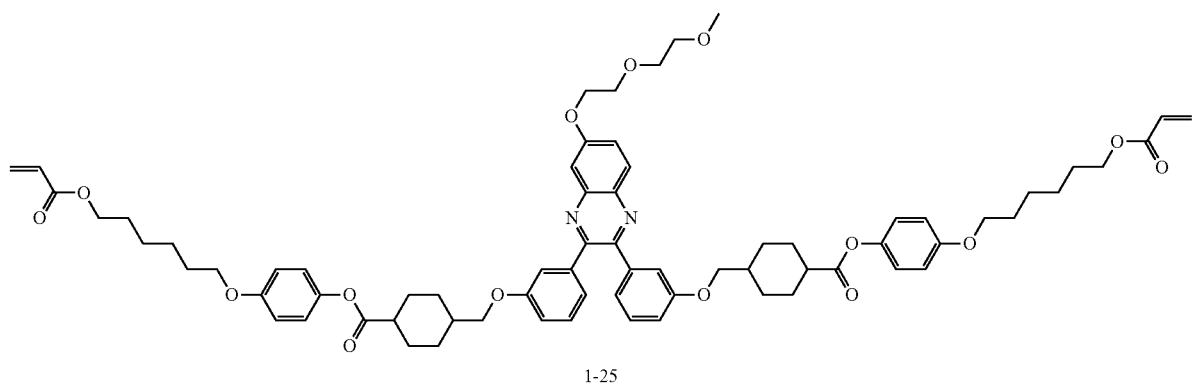
1-25
Compound 1-25 (13.1 g, yield 78%, MS: [M+H]$^+$=1205) was obtained in the same manner as in (2) to (5) of Preparation Example 5 except that 1-110-b (6.0 g, 13.98 mmol) was used instead of 1-4-2e.

[Preparation Example 7] Preparation of Compound 1-33

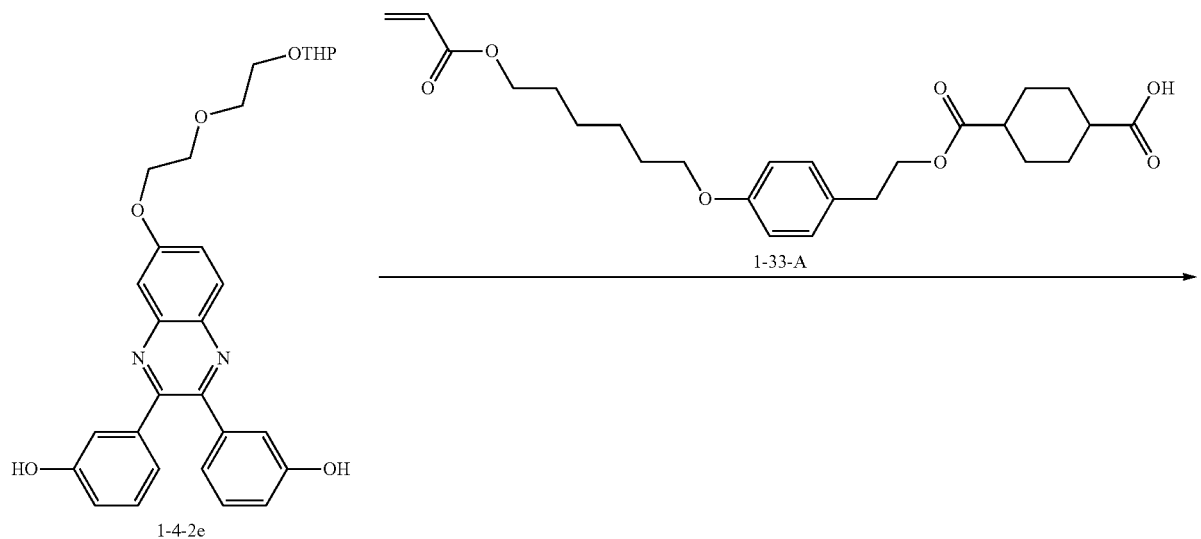

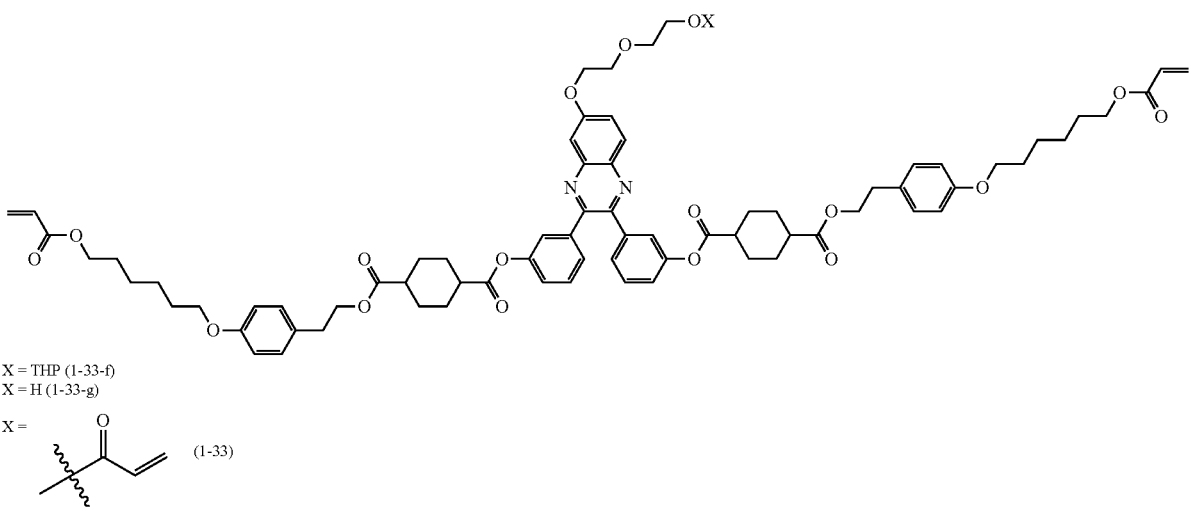

(1) Synthesis of 1-33-A 1-33-A was synthesized in the same manner as in US Patent Application Laid-Open Publication No. US 2017/0008833.

(2) Synthesis of Compound 1-33

The following Compound 1-33 (12.1 g, yield 65%, MS: [M+H]$^+$=1329) was obtained in the same manner as in (6) to (8) of Preparation Example 1 except that 1-4-2e (7.0 g, 13.98 mmol) was used instead of 1-4-1e, and 1-33-A (13.7 g, 30.77 mmol) was used instead of 4-((6-(acryloyloxy)hexyl)oxy) benzoic acid.

[Compound 1-33]
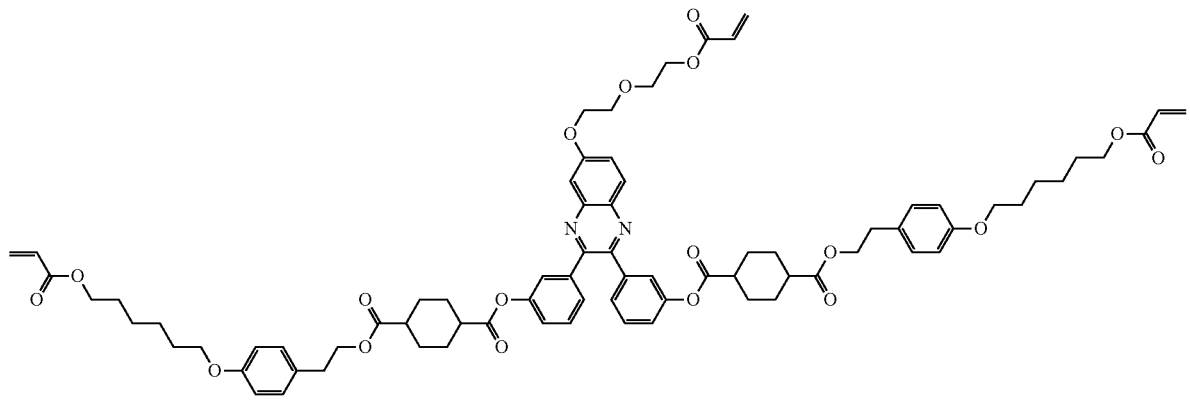
[Preparation Example 8] Preparation of Compound 1-45
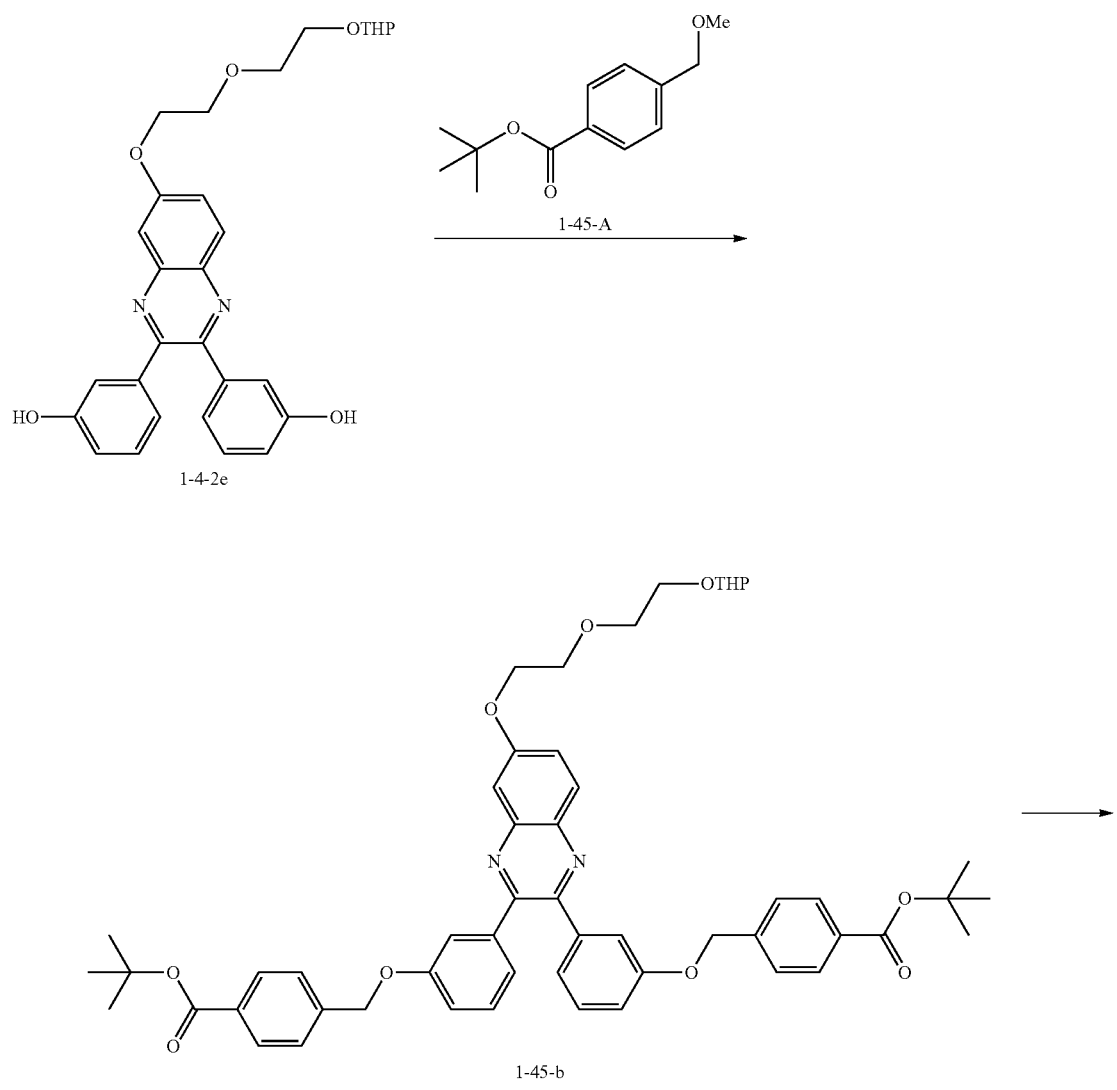

-continued
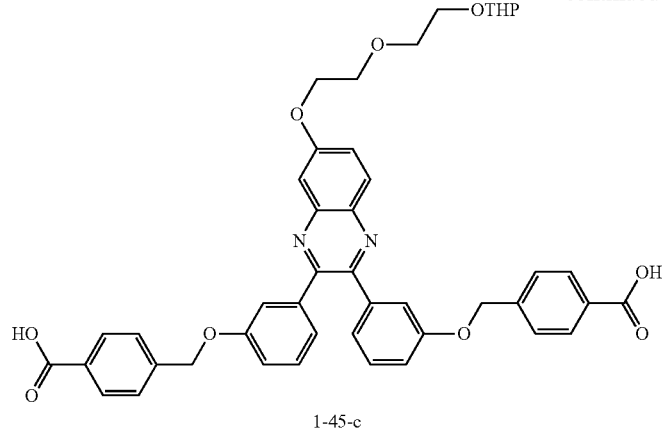
1-45-c
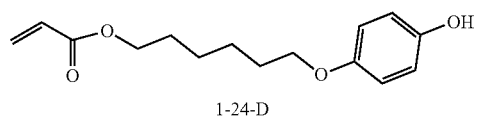
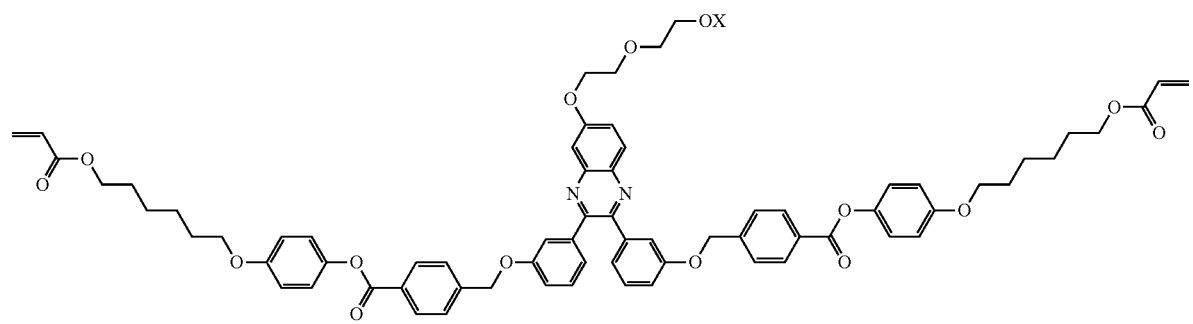
X = THP (1-45-f)
X = H (1-45-g)
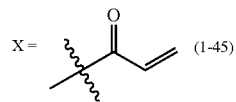 (1-45)
The following Compound 1-45 (12.8 g, yield 52%, MS: [M+H]⁺=1233) was synthesized in the same manner as in Preparation Example 4 except that 1-45-A (12.0 g, 41.94 mmol) was used instead of 1-24-A.
[Compound 1-45]
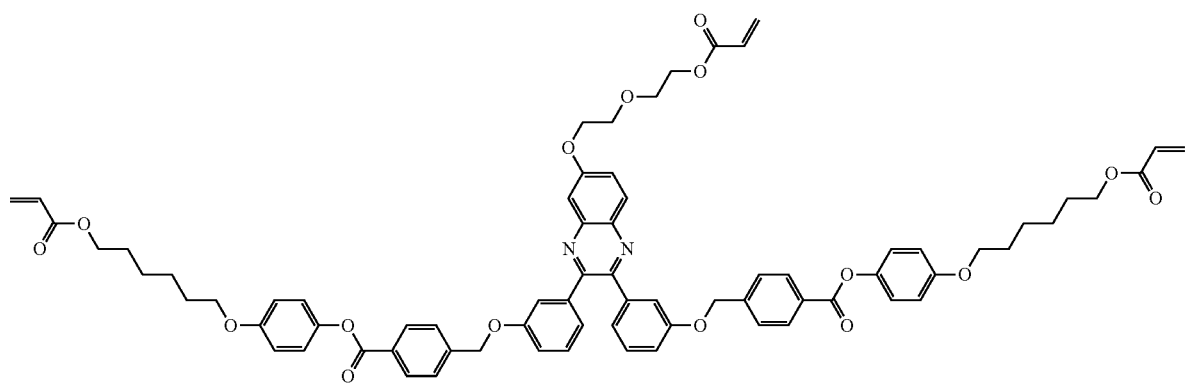

[Preparation Example 9] Preparation of Compound 1-62
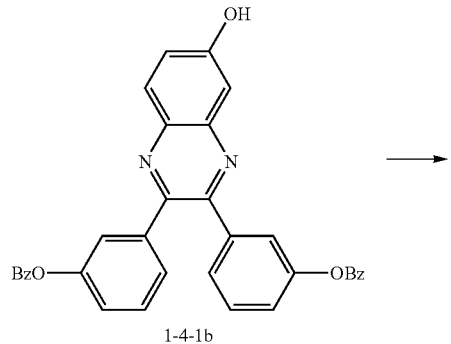
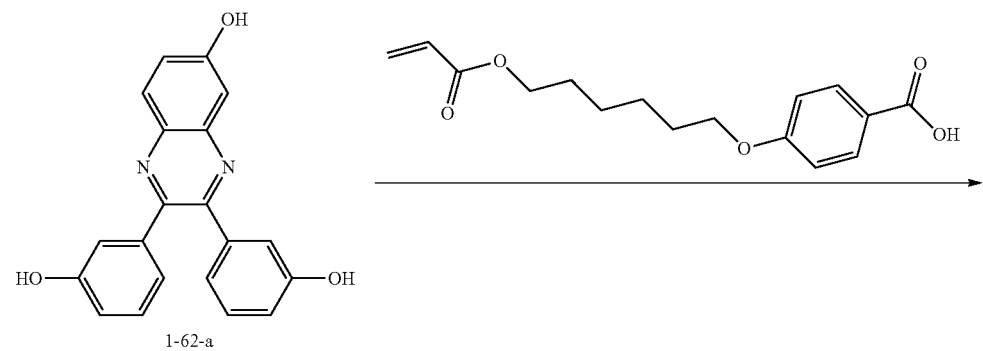
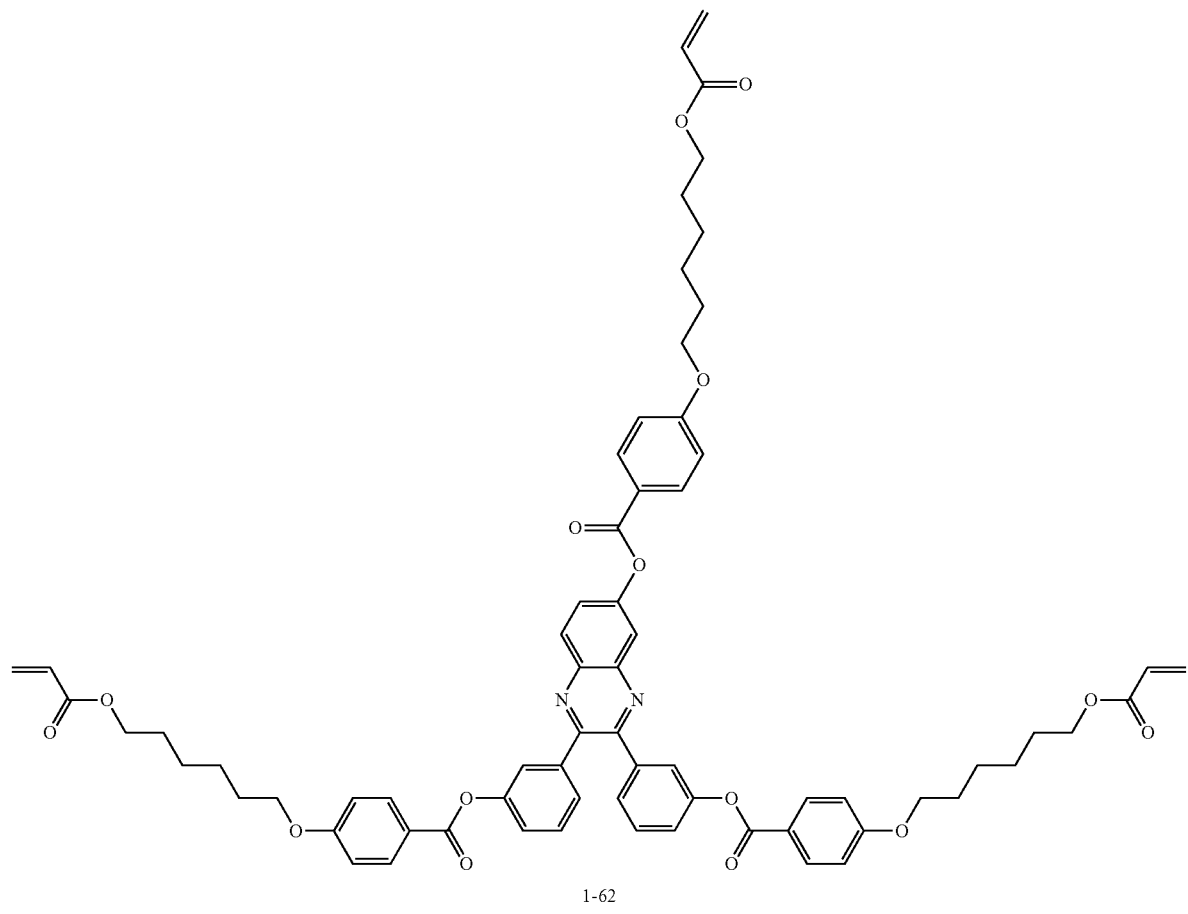

(1) Synthesis of 1-62-a

Compound 1-62-a (4.66 g, yield 99%, MS: [M+H]$^+$=331) was synthesized in the same manner as in (5) of Preparation Example 1 except that 1-4-1b (7.7 g, 14.25 mmol) was used instead of 1-4-1d.

(2) Synthesis of 1-62

The following Compound 1-62 (13.2 g, yield 82%, MS: [M+H]$^+$=1153) was obtained in the same manner as in (6) of Preparation Example 1 except that 1-62-a (4.62 g, 13.98 mmol) was used instead of 1-4-1e, and the content of 4-((6-(acryloyloxy)hexyl)oxy)benzoic acid was changed to 13.5 g (46.16 mmol), the content of N,N'-dicyclohexylcarbodiimide was changed to 9.75 g, and the content of 4-(dimethylamino)pyridine was changed to 0.3 g.

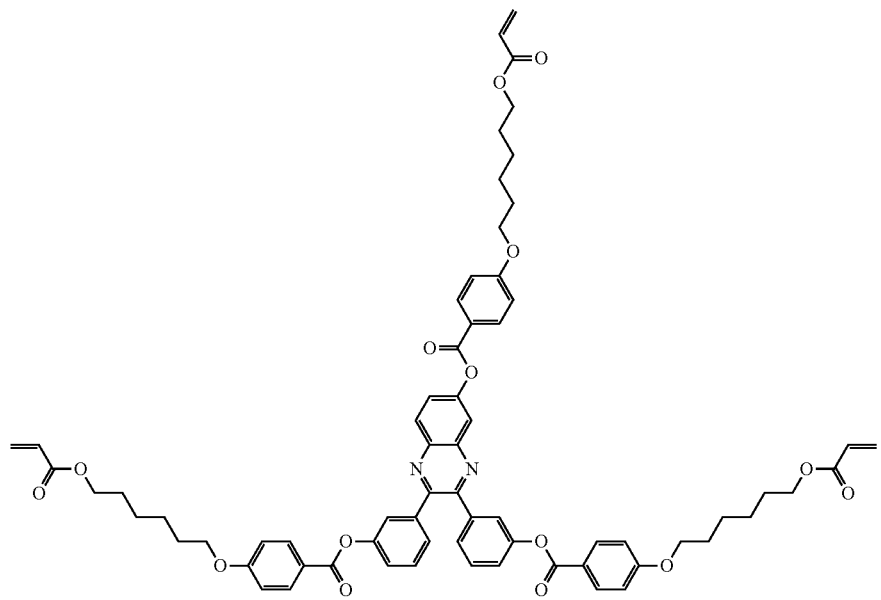

[Compound 1-62]

[Preparation Example 10] Synthesis of Comparative Compound A

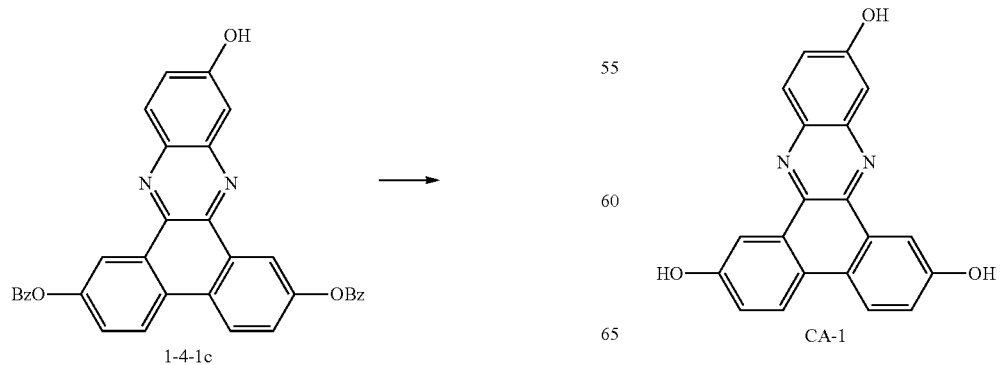

-continued

-continued

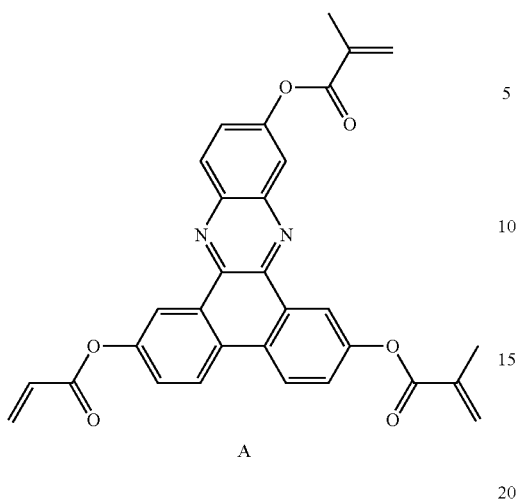

A (1) Synthesis of CA-1

Compound CA-1 (4.6 g, yield 98%, MS: [M+H]$^+$=329) was obtained in the same manner as in (5) of Preparation Example 1 except that 1-4-1c (7.6 g, 14.25 mmol) was used instead of 1-4-1d.

(2) Synthesis of Compound A

Comparative Compound A (3.2 g, yield 86%, MS: [M+H]$^+$=519) was obtained in the same manner as in (8) of Preparation Example 1 except that CA-1 (2.4 g, 7.26 mmol) was used instead of 1-4-1g.

[Preparation Example 11] Synthesis of Comparative Compound

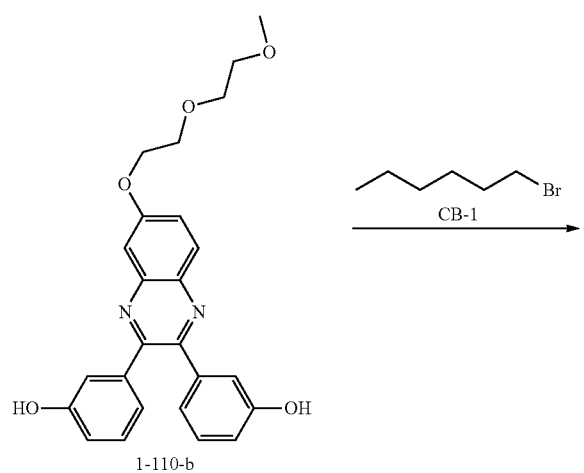

-continued

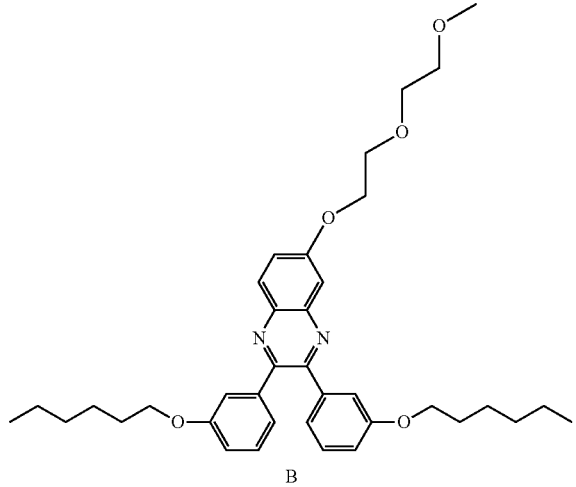

B

After dispersing 1-110-b (5 g, 11.56 mmol), K$_2$CO$_3$ (4.8 g, 34.68 mmol) and CB-1 (5.4 g, 23.12 mmol) into acetonitrile (100 mL), the result was refluxed for 24 hours. After the reaction was finished, the result was extracted with CHCl$_3$ and water. The organic layer was dried with MgSO$_4$, then filtered, and vacuum distilled. An obtained mixture was recrystallized with CHCl$_3$ and EtOH to obtain Comparative Compound B (6.0 g, yield 86%, MS: [M+H]$^+$=601).

Example: Preparation of Retardation Layer

Example 1

(1) Preparation of Liquid Crystal Composition

A liquid crystal composition was prepared by mixing 0.738 g of polymerizable Compound 1-4 synthesized using the method of Preparation Example 1, 0.00716 g of OXE-1 (manufactured by Ciba Specialty Chemicals Inc.), a polymerization initiator, 0.00113 g of p-methoxyphenol (MEHQ), a polymerization inhibitor, 0.0150 g of BYK-3550 (manufactured by BYK Chemie Japan KK), a surfactant, and 2.25 g of cyclohexanone, a solvent.

(2) Preparation of Retardation Layer

The liquid crystal composition was coated on a triacetylcellulose (TAC) substrate so that the thickness after drying is approximately from 1 μm to 2 μm, and after removing the solvent, ultraviolet rays having a wavelength in a UVB region (approximately 300 nm) were irradiated at a total dose of approximately 200 mJ/cm$^2$ for curing while being aligned on the xy plane, and a retardation layer was prepared. The dose was measured using a UV power puck II.

Example 2 to Example 7

Liquid crystal compositions and retardation layers were prepared in the same manner as in Example 1 except that the liquid crystal compositions were each prepared using a polymerizable compound, a polymerization initiator, a polymerization inhibitor, a surfactant and a solvent with the material and in the content described in the following Table 1.

TABLE 1

|  | Name and Content of Polymerizable Compound | Name and Content of Polymerization Initiator | Name and Content of Polymerization Inhibitor | Name and Content of Surfactant | Name and Content of Solvent |
|---|---|---|---|---|---|
| Example 2 | Compound 1-14 0.738 g | OXE-1 0.00716 g | MEHQ 0.00113 g | BYK-3550 0.0150 g | Cyclohexanone 2.25 g |
| Example 3 | Compound 1-33 0.590 g | OXE-1 0.00573 g | MEHQ 0.000905 g | BYK-3550 0.0150 g | Cyclohexanone 2.40 g |
| Example 4 | Compound 1-45 0.738 g | OXE-1 0.00716 g | MEHQ 0.00113 g | BYK-3550 0.0150 g | Cyclohexanone 2.25 g |
| Example 5 | Compound 1-62 0.590 g | OXE-1 0.00573 g | MEHQ 0.000905 g | BYK-3550 0.0150 g | Cyclohexanone 2.40 g |
| Example 6 | Compound 1-8 0.517 g Compound 1-110 0.221 g | OXE-1 0.00716 g | MEHQ 0.00113 g | BYK-3550 0.0150 g | Cyclohexanone 2.25 g |
| Example 7 | Compound 1-24 0.553 g Compound 1-25 0.184 g | OXE-1 0.00716 g | MEHQ 0.00113 g | BYK-3550 0.0150 g | Cyclohexanone 2.25 g |

Comparative Example 1

An attempt was made to prepare a retardation layer in the same manner as in Example 1 except that polymerizable Comparative Compound A prepared in Preparation Example 10 was used instead of polymerizable Compound 1-4 of Example 1, however, the corresponding material was not liquid crystalline, and crystals precipitated when drying. Accordingly, a retardation layer (liquid crystal polymer film) without alignment defects was not able to be prepared.

Comparative Example 2

An attempt was made to prepare a retardation layer in the same manner as in Example 1 except that polymerizable Comparative Compound B prepared in Preparation Example 11 was used instead of polymerizable Compound 1-4 of Example 1, however, the corresponding material was not liquid crystalline, and crystals precipitated when drying. Accordingly, a retardation layer (liquid crystal polymer film) without alignment defects was not able to be prepared.

Comparative Example 3

A retardation layer was prepared in the same manner as in Example 1 except that the following polymerizable Compound C was used instead of polymerizable Compound 1-4. Compound C was synthesized in the same manner as in Korean Patent Application Laid-Open Publication No. 10-2017-0074178.

C

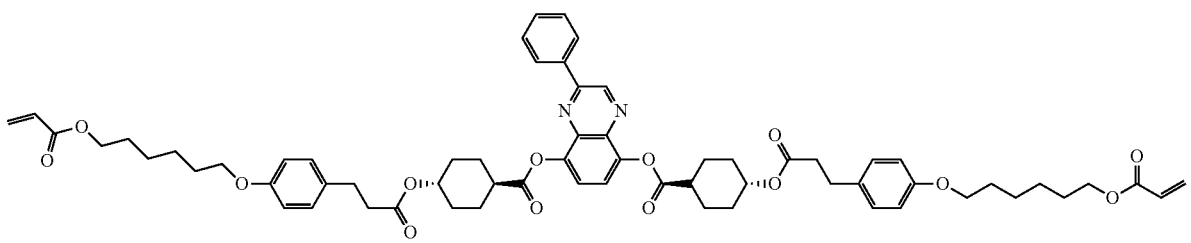

Comparative Example 4

A retardation layer was prepared in the same manner as in Example 1 except that the following polymerizable Compound D was used instead of polymerizable Compound 1-4.

Compound D was synthesized in the same manner as in Korean Patent Application Laid-Open Publication No. 10-2017-0086047.

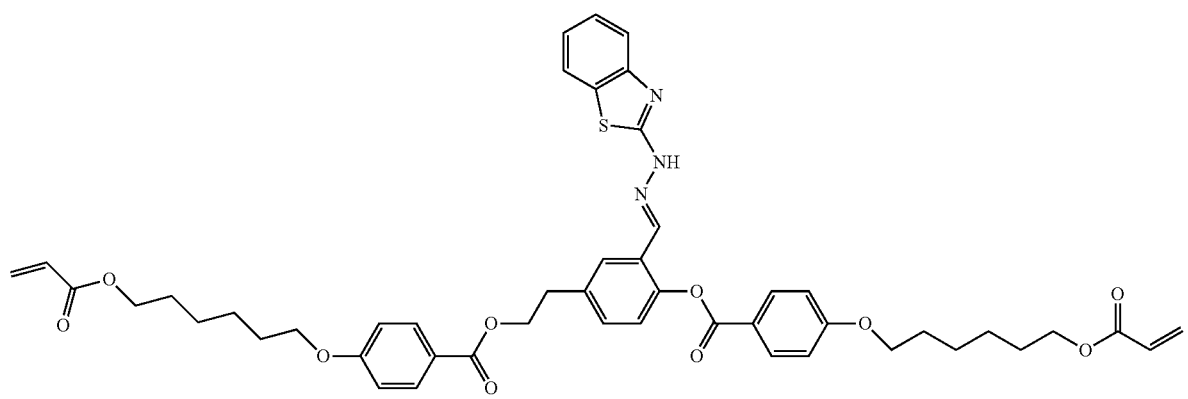

D

Experimental Example: Evaluation on Retardation Layer Properties

Properties of the retardation layers prepared in Examples 1 to 7, and Comparative Examples 1 to 4 were measured using methods as follows, and the results are shown in the following [Table 2].

(1) Evaluation on Retardation Value

Retardation in a plane or thickness direction was measured using an Axoscan (Axomatrics, Inc.) capable of extracting a Mueller matrix. Measurements were made for each of light having a wavelength of 450 nm, 550 nm and 650 nm, retardation was extracted by obtaining 16 Mueller matrix values according to the manufacturer's manual, and these values were evaluated as follows.

A: R(450)/R(550)<0.80
B: 0.80<R(450)/R(550)<0.90
C: 0.90<R(450)/R(550)<0.95
D: 0.95<R(450)/R(550)<1.05
E: 1.05<R(450)/R(550)

(2) Measurement of Retardation Layer Thickness

Thicknesses of the thin films were measured using a Bruker DektakXT (Bruker Corporation) capable of measuring a thin film level difference.

(3) Evaluation on High Temperature Durability

An initial retardation value ($Re_{in}$) of the prepared retardation layer was measured at 25° C., and after measuring a retardation value (Ref) after heating for 96 hours at 80° C., a retardation change rate (ΔRe) was calculated according to the following [Equation 1].

$$\Delta Re = (1 - Re_f/Re_{in}) \times 100 \quad \text{[Equation 1]}$$

After that, the results were evaluated in 4 steps as follows according to the magnitude of the ΔRe value.

A: ΔRe<0.5
B: 0.5<ΔRe<1.0
C: 1.0<ΔRe<5.0
D: 5.0<ΔRe

TABLE 2

| | Alignment Defects | Film Thickness (μm) | Retardation Value Evaluation | High Temperature Durability Evaluation |
|---|---|---|---|---|
| Example 1 | No | 1.9 | A | A |
| Example 2 | No | 1.7 | B | A |
| Example 3 | No | 1.4 | A | B |
| Example 4 | No | 1.8 | A | A |
| Example 5 | No | 1.3 | B | B |
| Example 6 | No | 1.5 | A | A |
| Example 7 | No | 1.7 | A | A |
| Comparative Example 1 | Yes | — | — | — |
| Comparative Example 2 | Yes | — | — | — |
| Comparative Example 3 | No | 1.6 | D | C |
| Comparative Example 4 | No | 1.3 | B | D |

As identified from the experimental results, a retardation film without defects may be prepared and high temperature durability may be enhanced when using the polymerizable compound of the present disclosure. Specifically, it was identified that Examples 1 to 7 all had excellent optical properties and high temperature durability compared to Comparative Example 3, and although Comparative Example 4 had similar optical properties to Examples 1 to 7, the performance was significantly low in terms of high temperature durability compared to Examples 1 to 7. It was identified that, in the polymerizable compound of the present disclosure, the structural skeleton to exhibit reverse dispersibility has a thermally stable structure, and therefore, changes in the retardation value were small at a high temperature.

The invention claimed is:
1. A polymerizable liquid crystal compound represented by the following Chemical Formula 1:

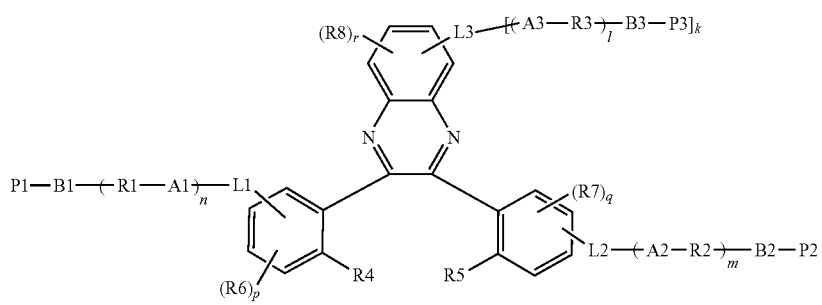

[Chemical Formula 1]

wherein, in Chemical Formula 1,
A1 to A3 are each O or S;
B1 to B3 are each a direct bond, or a substituted or unsubstituted alkylene group;
R1 to R3 are each a substituted or unsubstituted alkylene group, or a substituted or unsubstituted arylene group;
P1 to P3 are each an epoxy group, an oxetane group, an aziridinyl group, a maleimide group, a (meth)acryloyl group, or a (meth)acryloyloxy group, wherein the (meth)acryloyloxy group is represented by

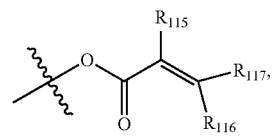

wherein $R_{115}$ to $R_{117}$ are each hydrogen, a halogen group, or a substituted or unsubstituted alkyl group, and adjacent substituents may bond to each other to form a ring;
R4 to R8 are each hydrogen, or a substituted or unsubstituted alkyl group, and R4 and R5 can bond to each other to form a ring;

l, m, n, p, q and r are each an integer of 0 to 3, and when l, m, n, p, q or r is 2 or greater, structures in the parentheses are the same as or different from each other;
k is 1 or 2, and when k is 2, structures in the parentheses are the same as or different from each other; and
L1 to L3 are each a direct bond or represented by the following Chemical Formula 2,

[Chemical Formula 2]

wherein, in Chemical Formula 2,
Ar is an arylene group having 6 to 30 carbon atoms, or a cycloalkylene group having 3 to 30 carbon atoms,
X is —O—, —COO—, —OCH$_2$O—, —CH$_2$CH$_2$—, —CH$_2$O— or —OCH$_2$—;
and
t is an integer of 1 to 3, and when t is 2 or greater, structures in the parentheses are the same as or different from each other.

2. The polymerizable liquid crystal compound of claim 1, wherein Chemical Formula 1 is represented by the following Chemical Formula 1-1 or 1-2:

[Chemical Formula 1-1]

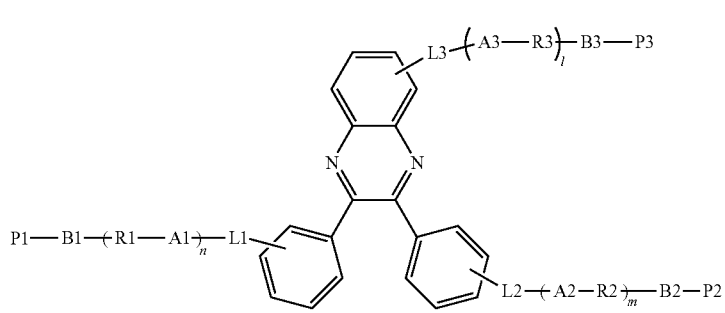

[Chemical Formula 1-2]

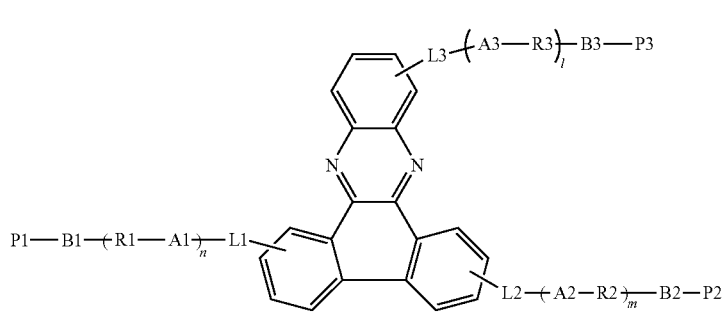

wherein, in Chemical Formulae 1-1 and 1-2,

A1 to A3, B1 to B3, R1 to R3, P1 to P3, L1 to L3, l, m and n have the same definitions as in Chemical Formula 1.

3. The polymerizable liquid crystal compound of claim 1, wherein L1 and L2 are each represented by the following Chemical Formula 2-1 or 2-2, L3 is a direct bond, and l, m and n are each 1 or 2:

[Chemical Formula 2-1]

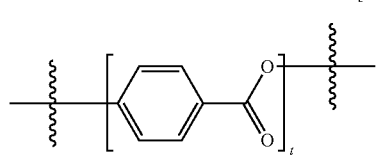

-continued

[Chemical Formula 2-2]

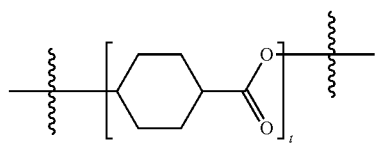

wherein, in Chemical Formulae 2-1 and 2-2, t is an integer of 1 to 3, and when t is 2 or greater, structures in the parentheses are the same as or different from each other.

4. The polymerizable liquid crystal compound of claim 1, which is represented by any one of the following compounds:

[Chemical Formula 1-3]
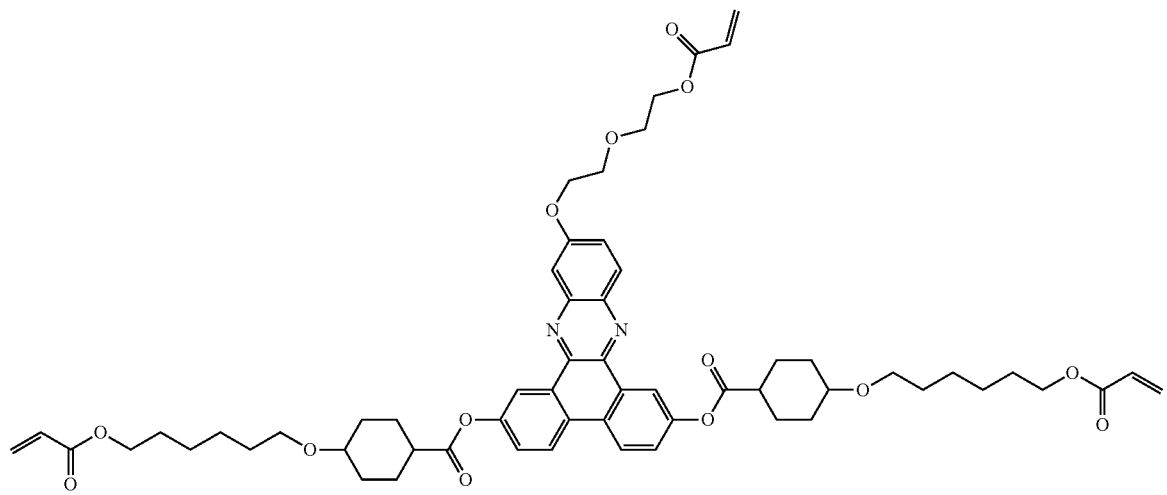
[Chemical Formula 1-4]
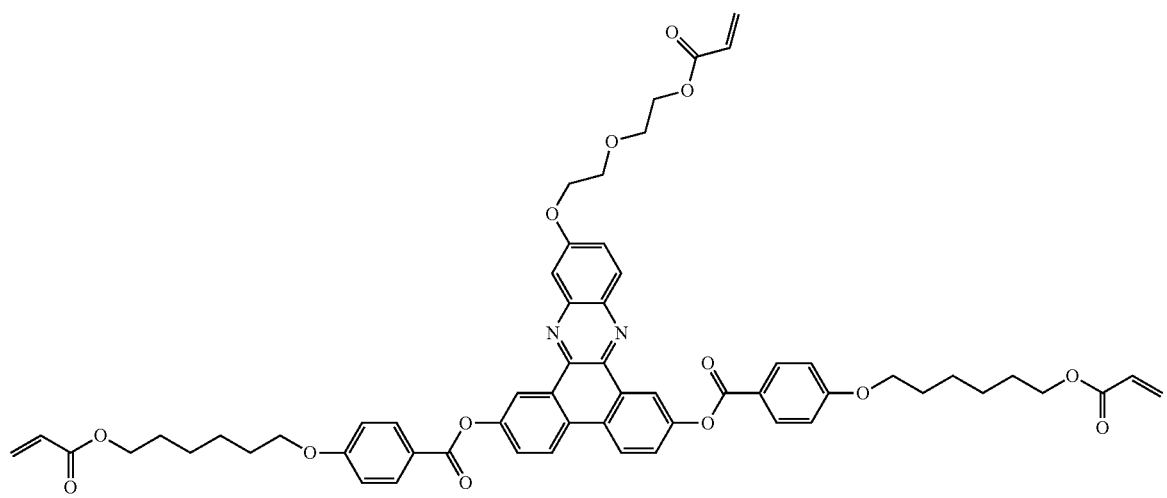
[Chemical Formula 1-5]
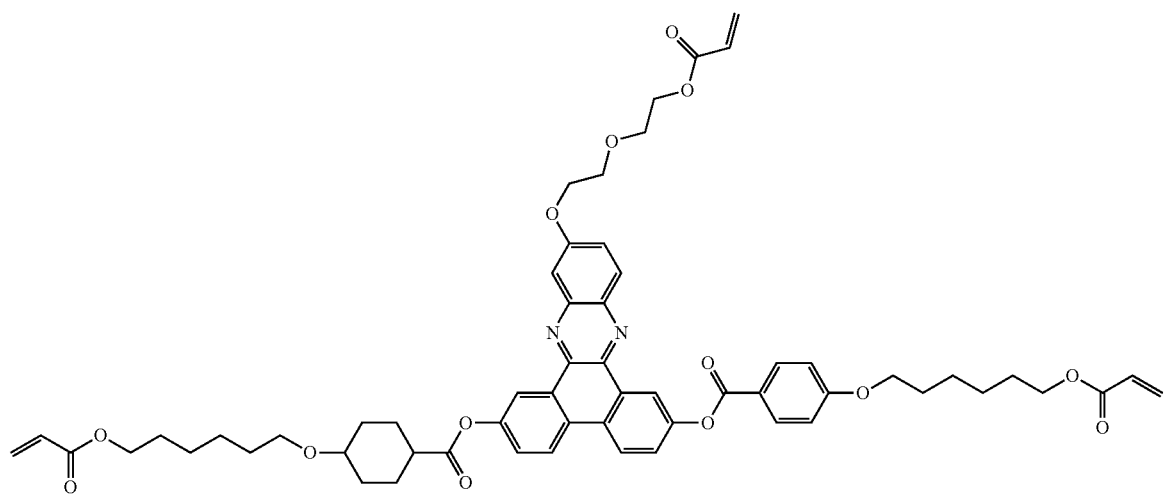

[Chemical Formula 1-7]
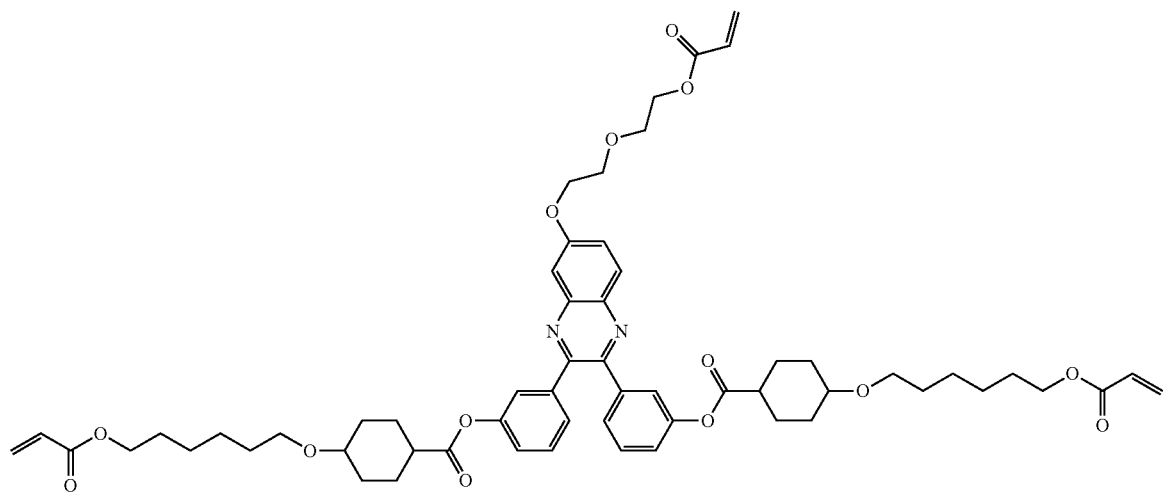
[Chemical Formula 1-8]
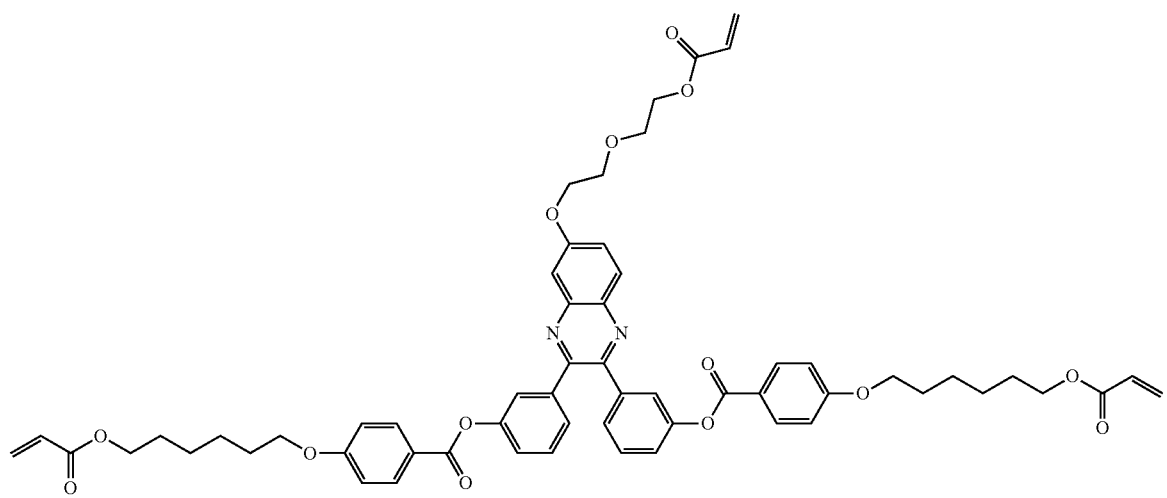
[Chemical Formula 1-9]
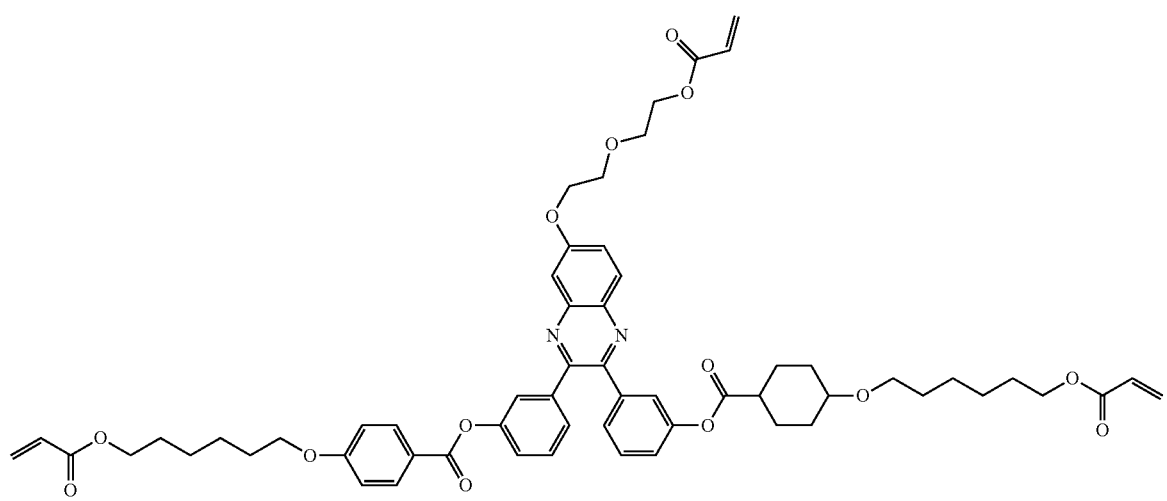

[Chemical Formula 1-18]
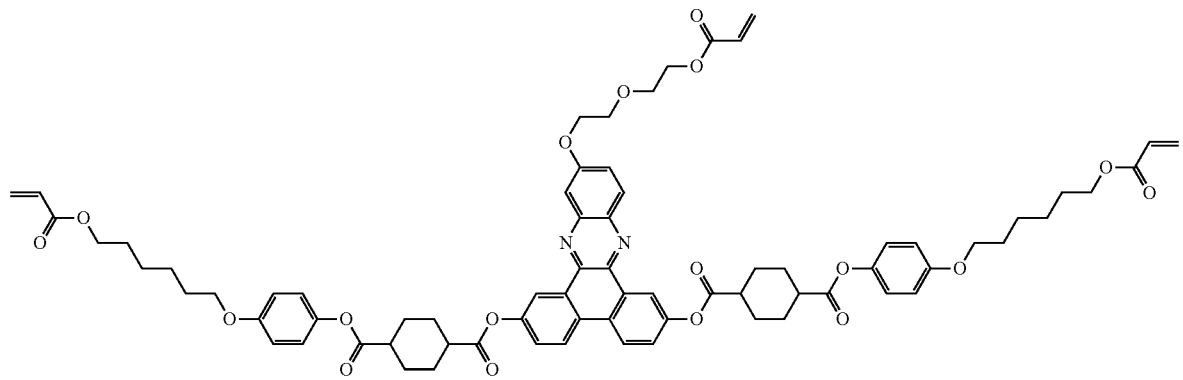
[Chemical Formula 1-20]
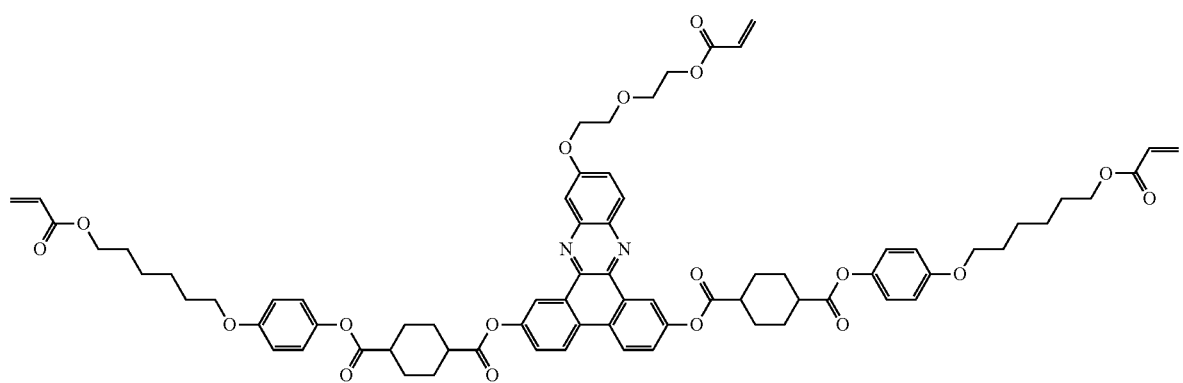
[Chemical Formula 1-22]
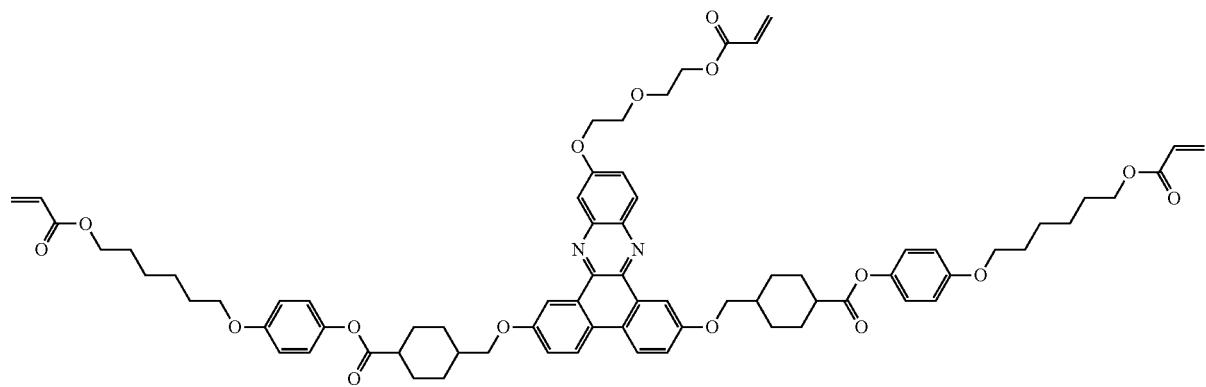
[Chemical Formula 1-24]
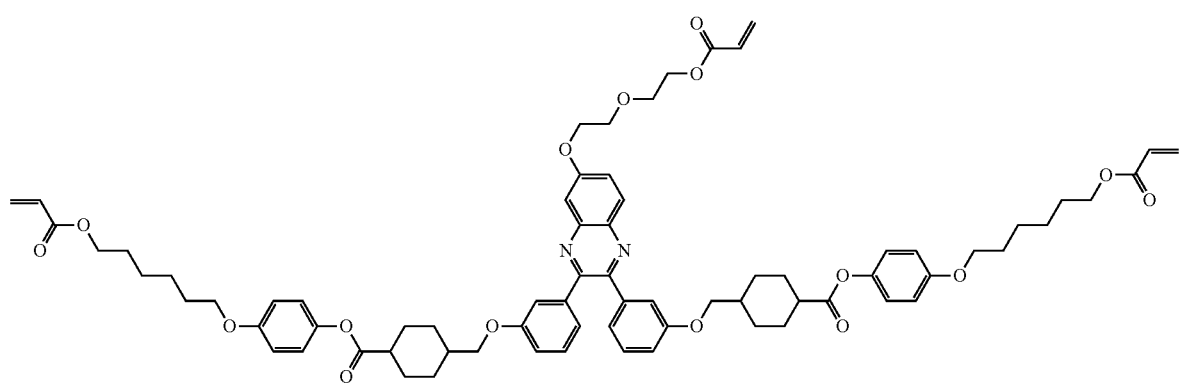

[Chemical Formula 1-26]
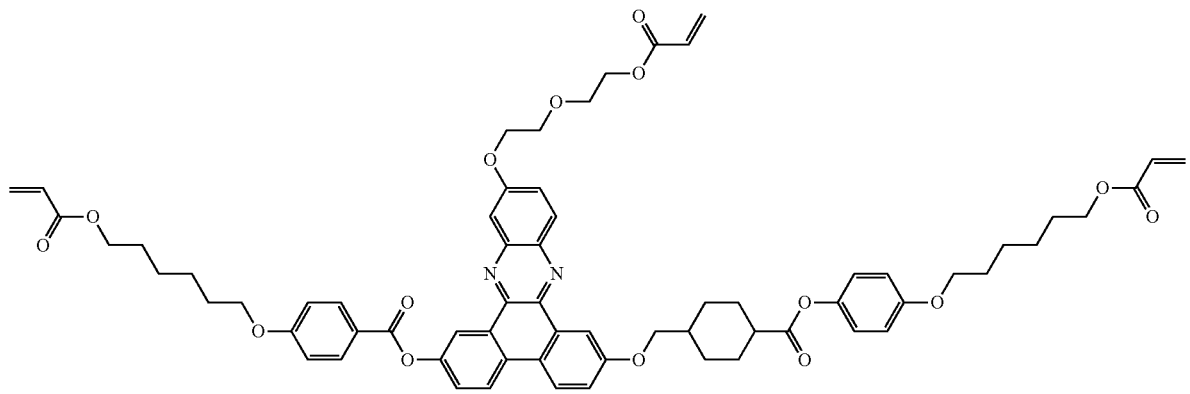
[Chemical Formula 1-28]
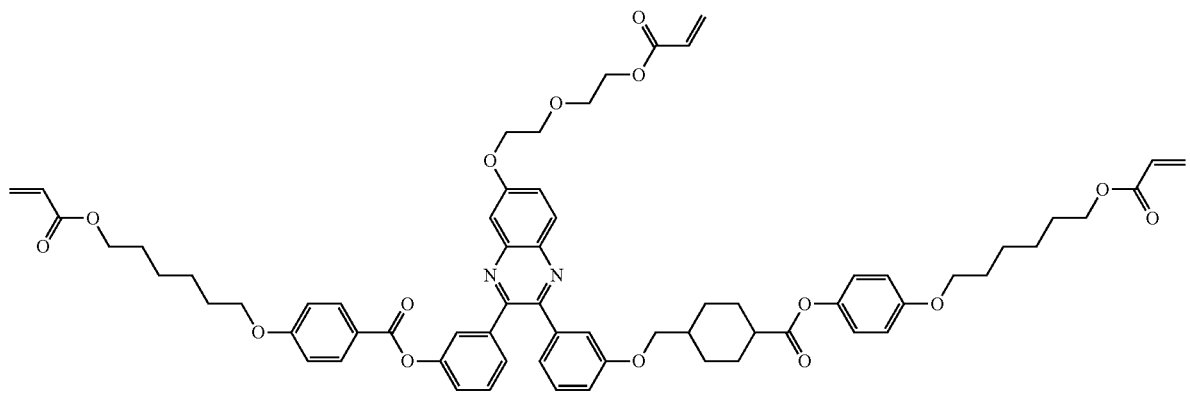
[Chemical Formula 1-30]
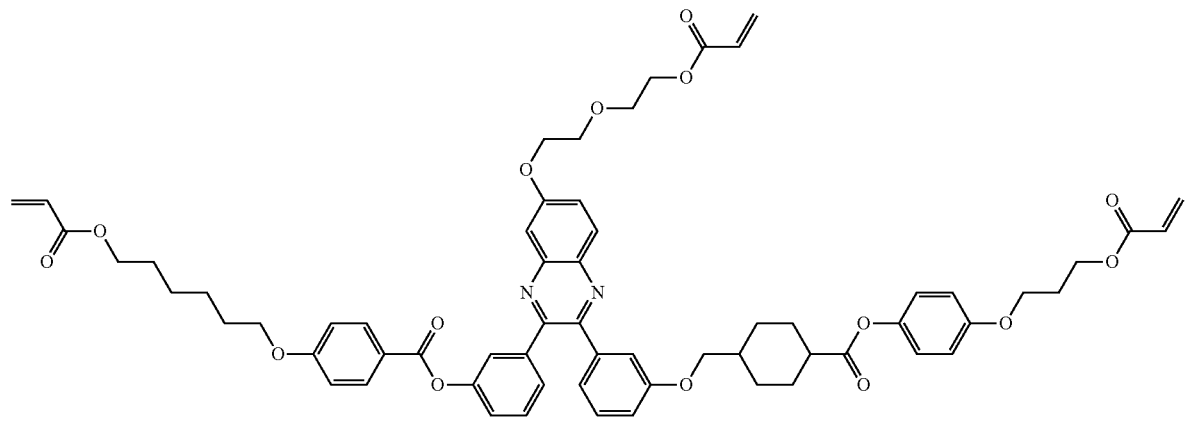

[Chemical Formula 1-32]
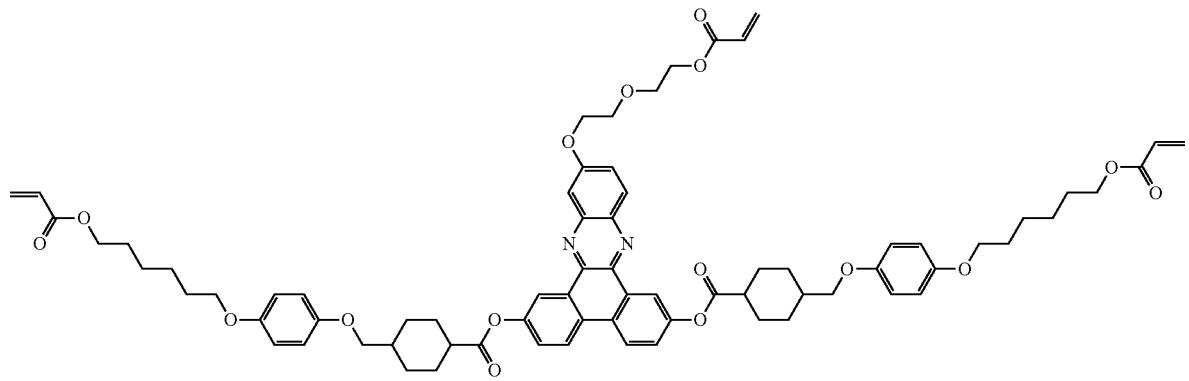
[Chemical Formula 1-33]
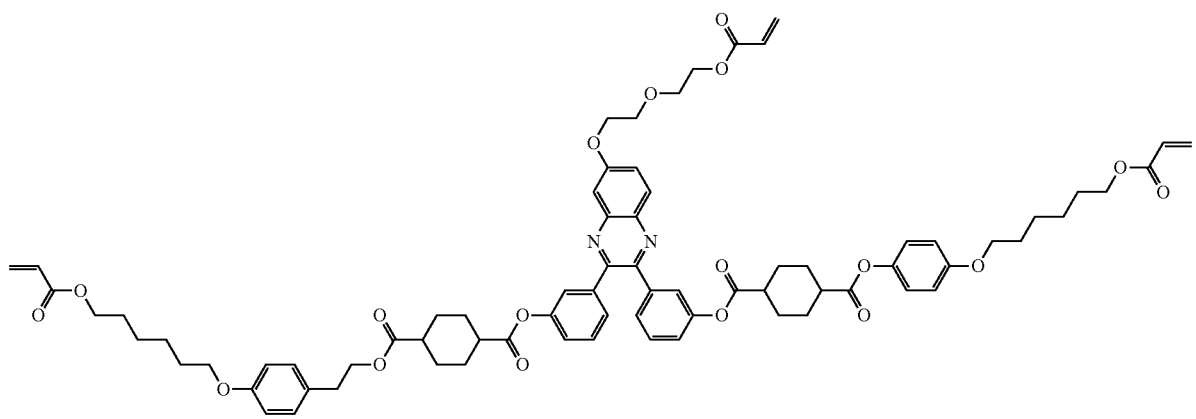
[Chemical Formula 1-34]
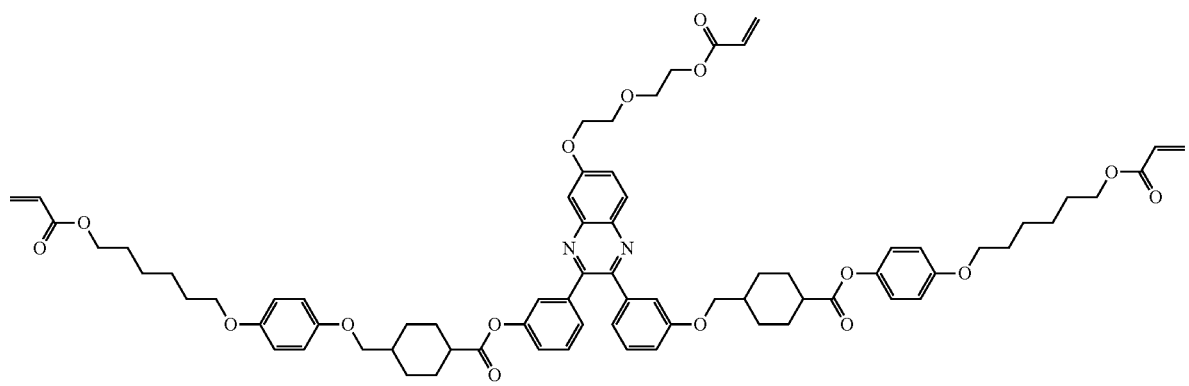
[Chemical Formula 1-35]
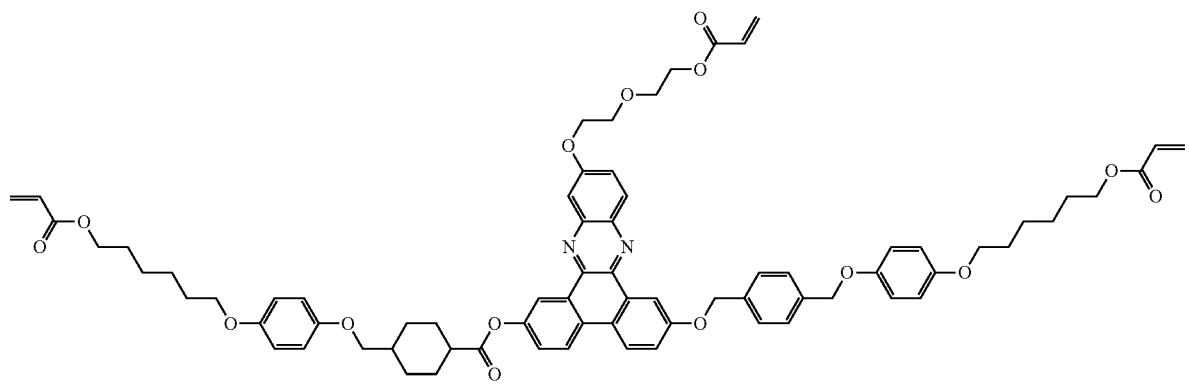

[Chemical Formula 1-36]
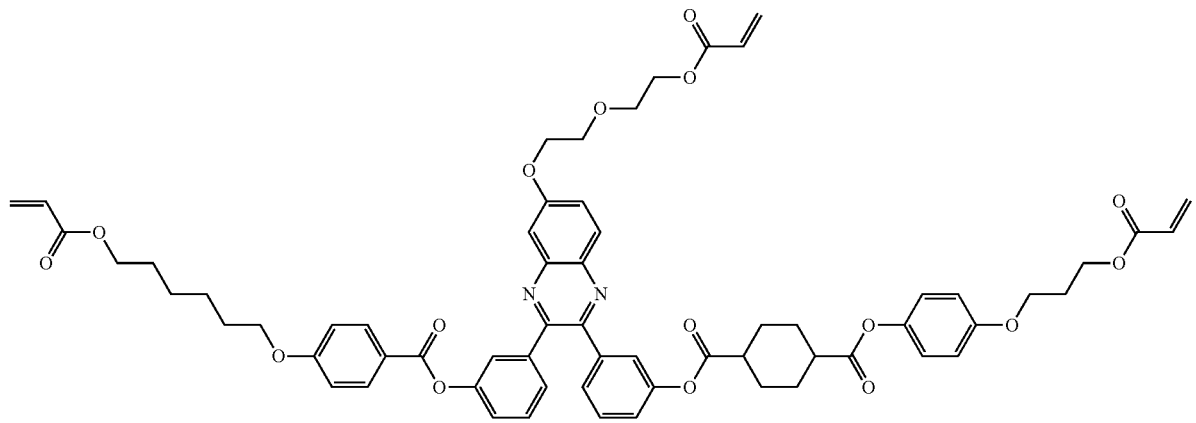
[Chemical Formula 1-38]
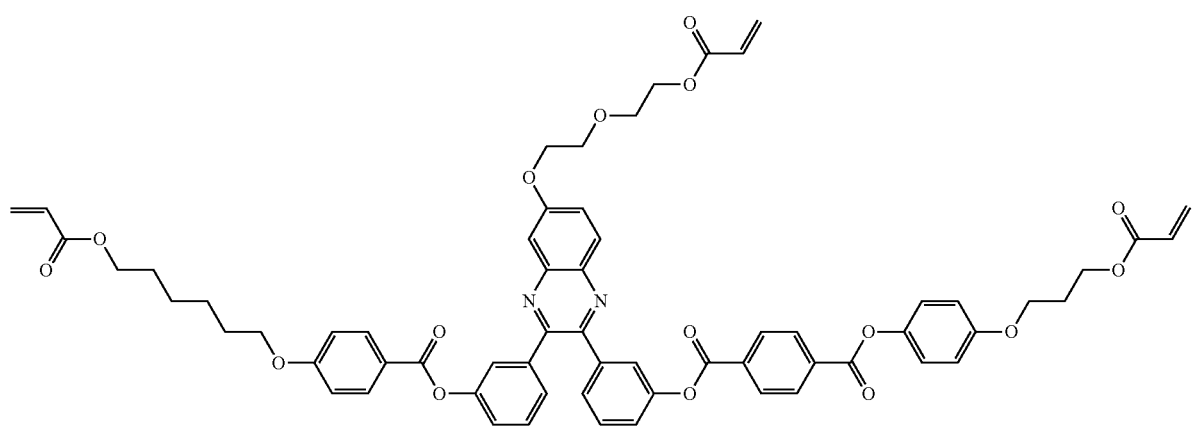
[Chemical Formula 1-39]
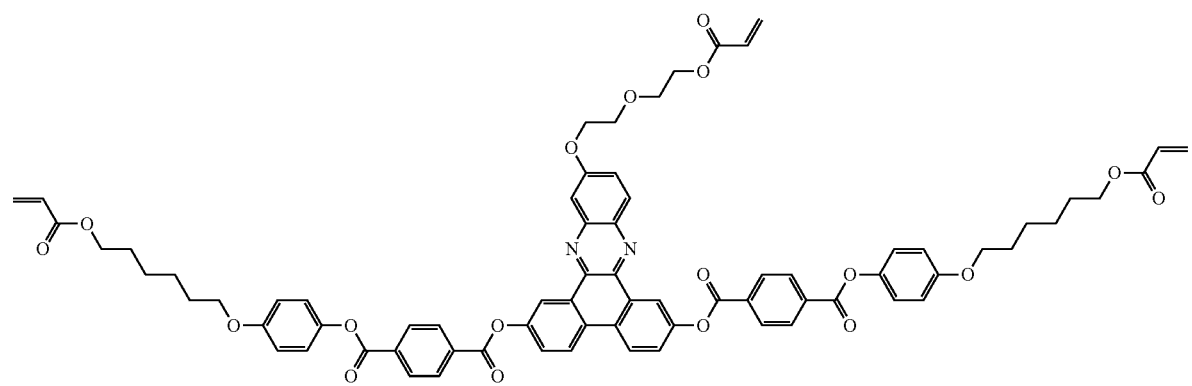

[Chemical Formula 1-40]
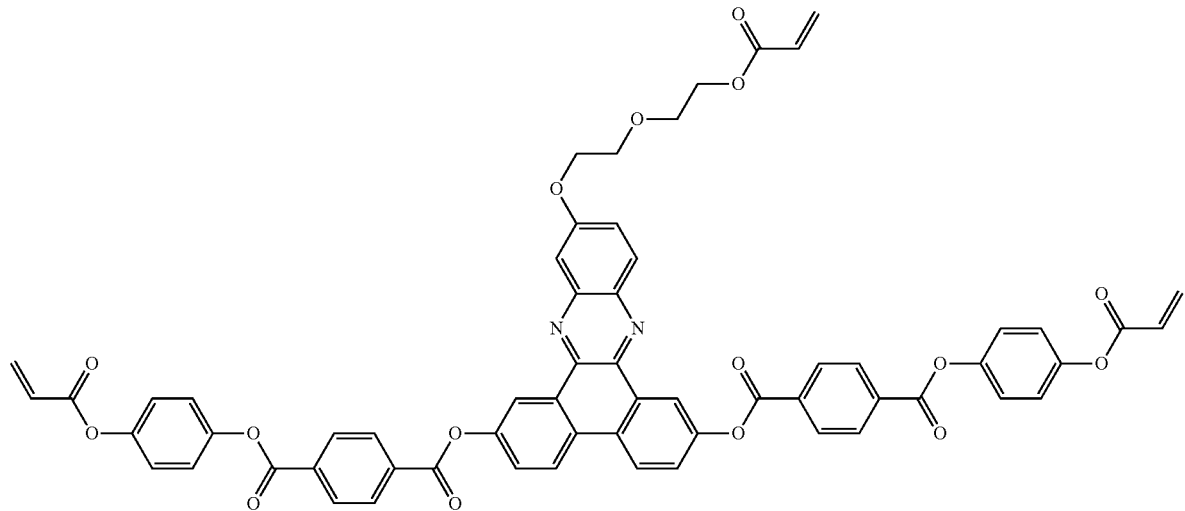
[Chemical Formula 1-42]
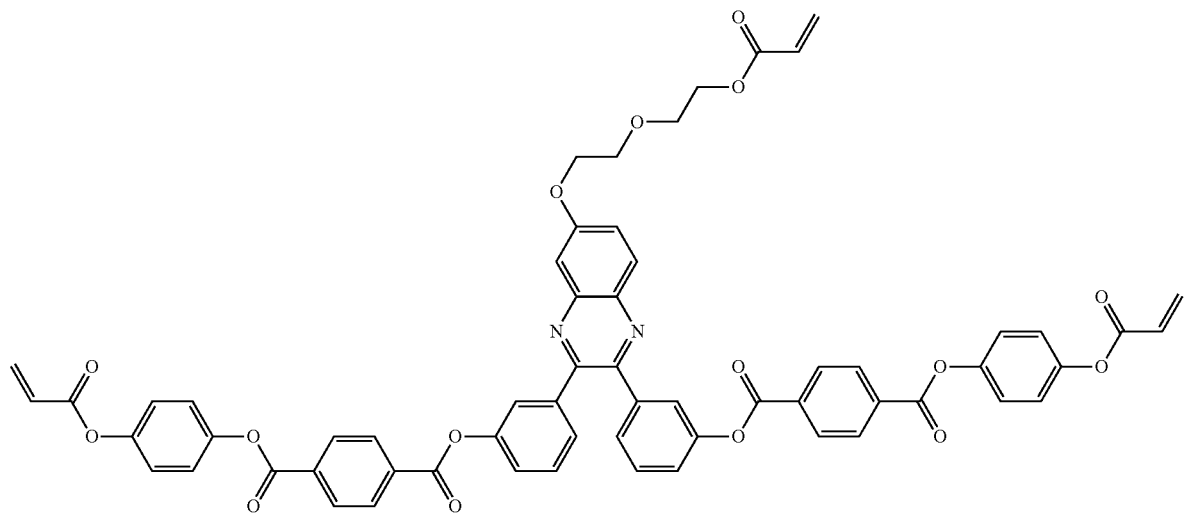
[Chemical Formula 1-44]
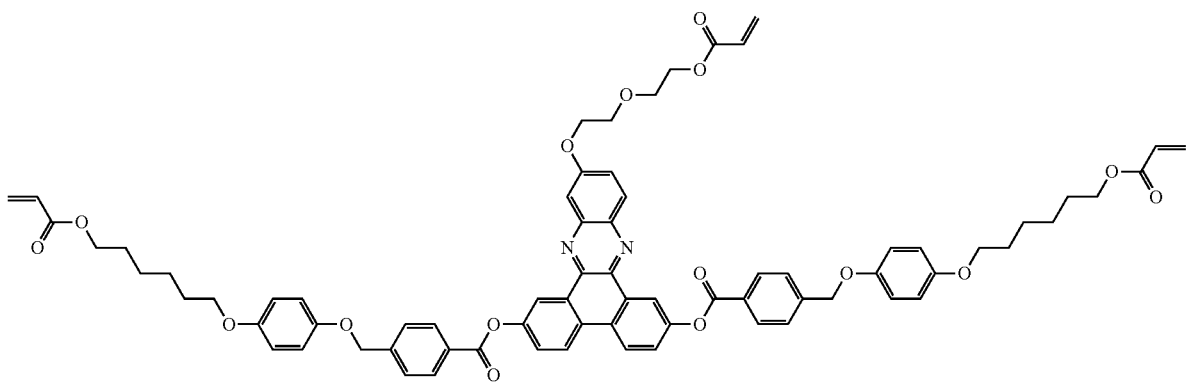

[Chemical Formula 1-45]
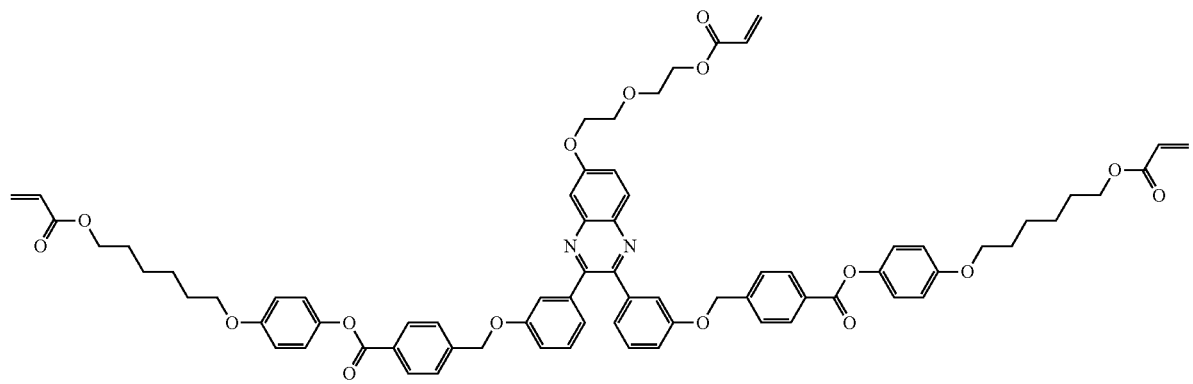
[Chemical Formula 1-46]
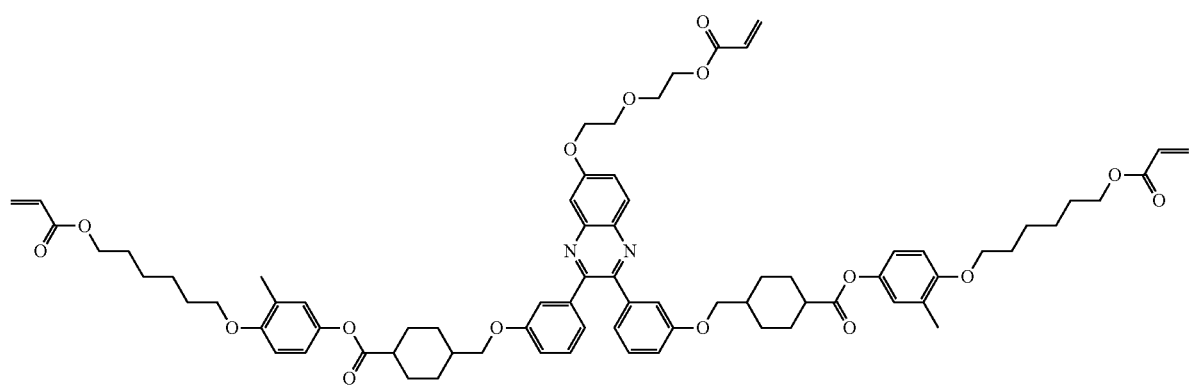
[Chemical Formula 1-47]
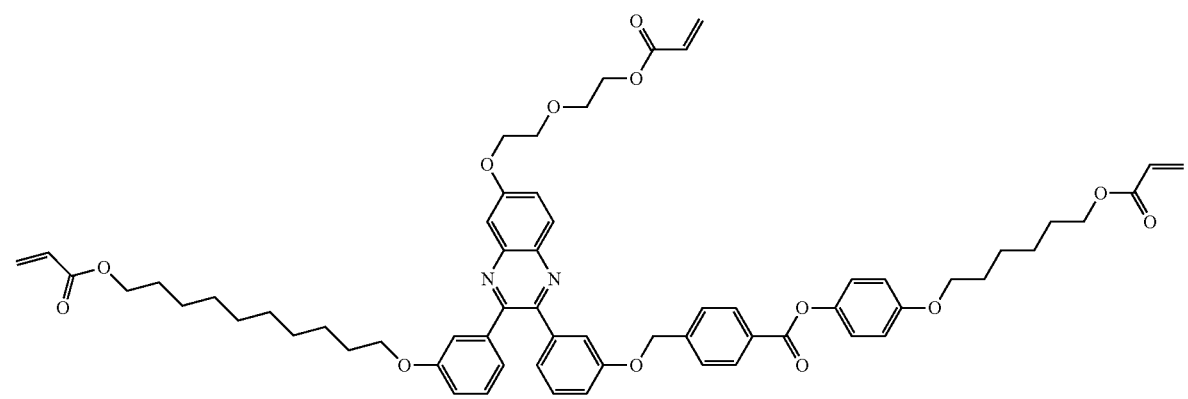
[Chemical Formula 1-48]
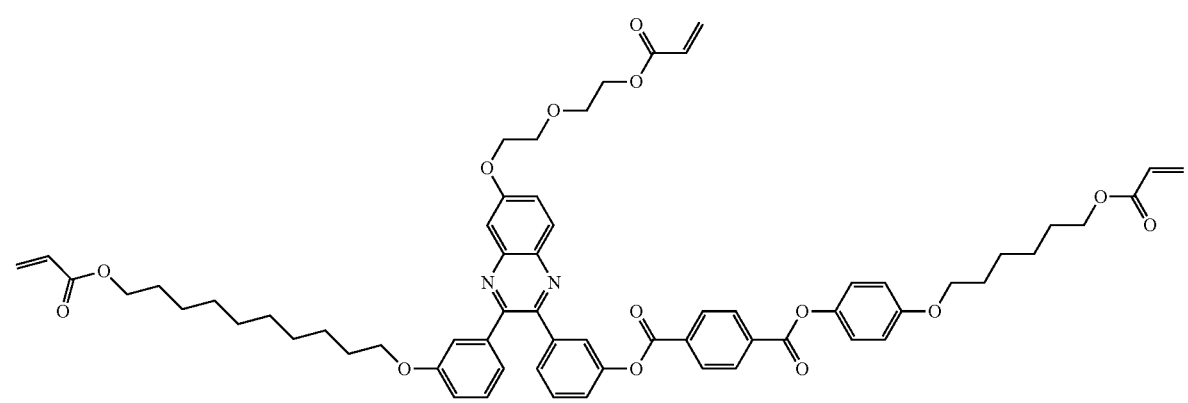

[Chemical Formula 1-49]
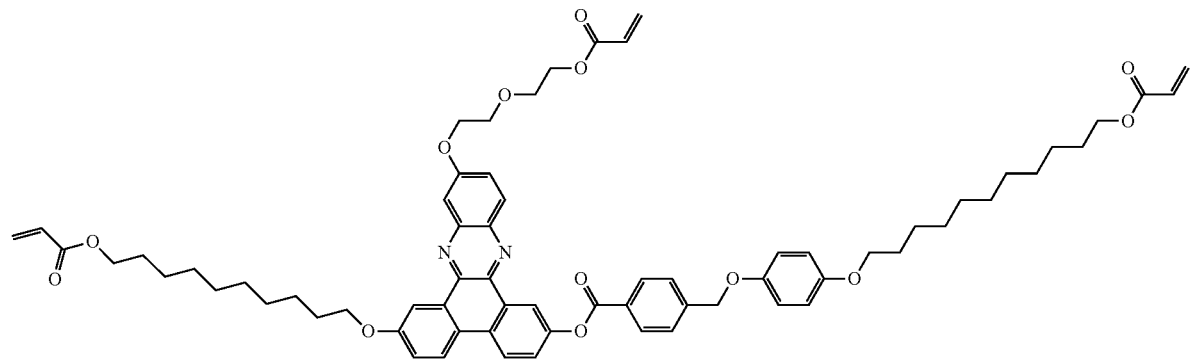
[Chemical Formula 1-51]
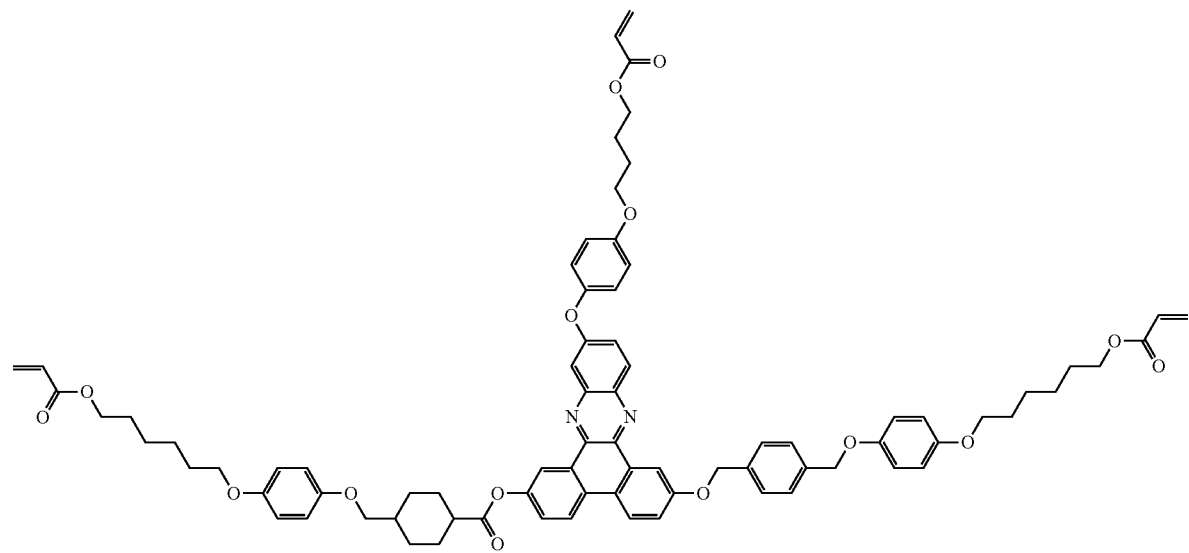
[Chemical Formula 1-55]
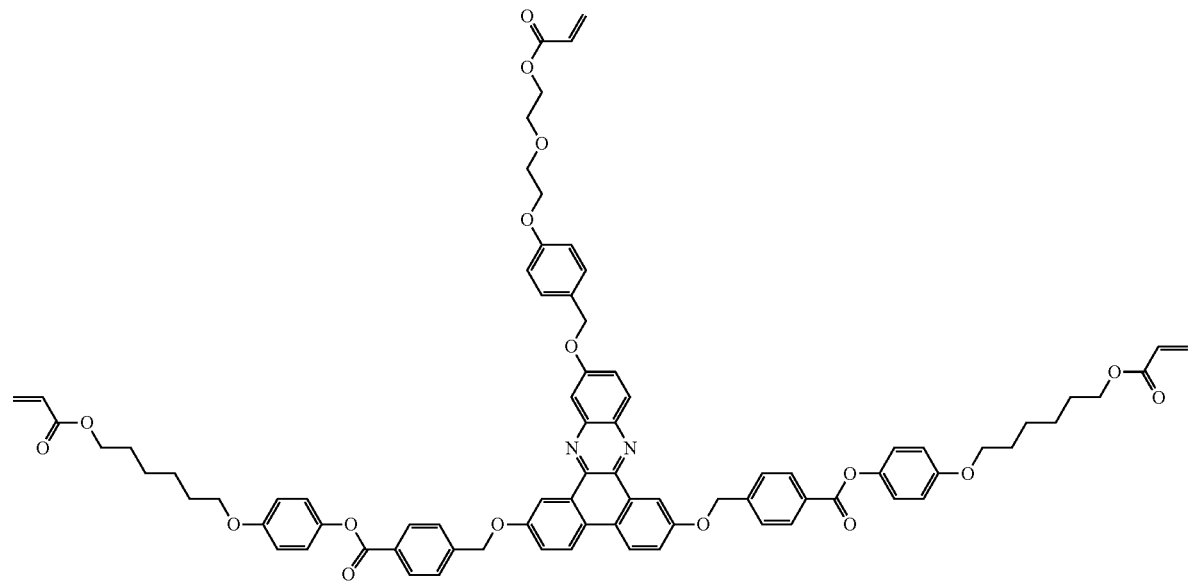

[Chemical Formula 1-56]
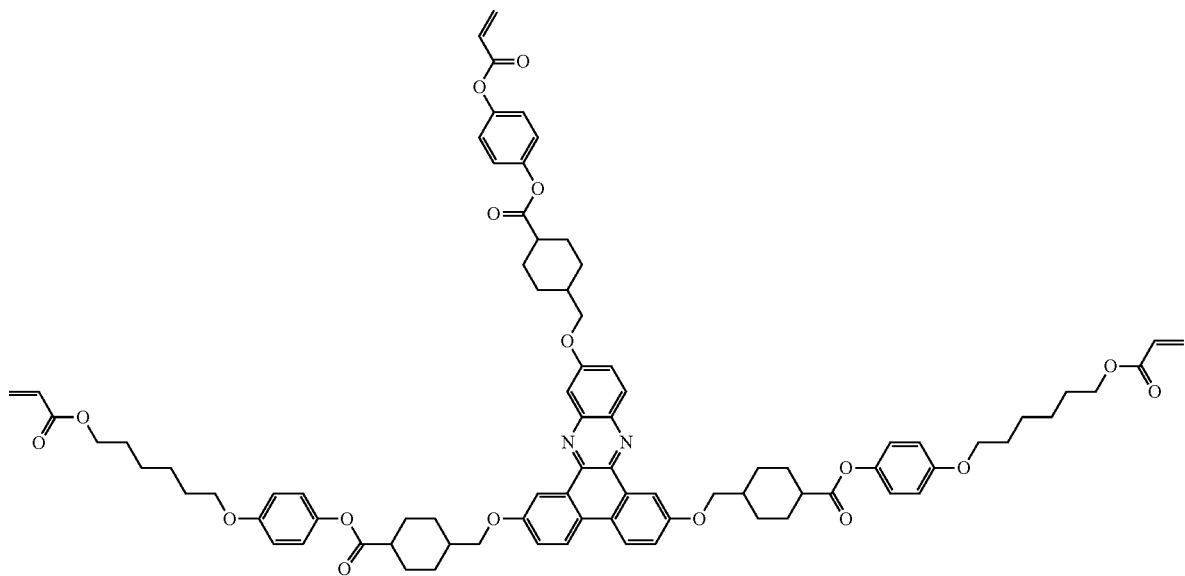
[Chemical Formula 1-62]
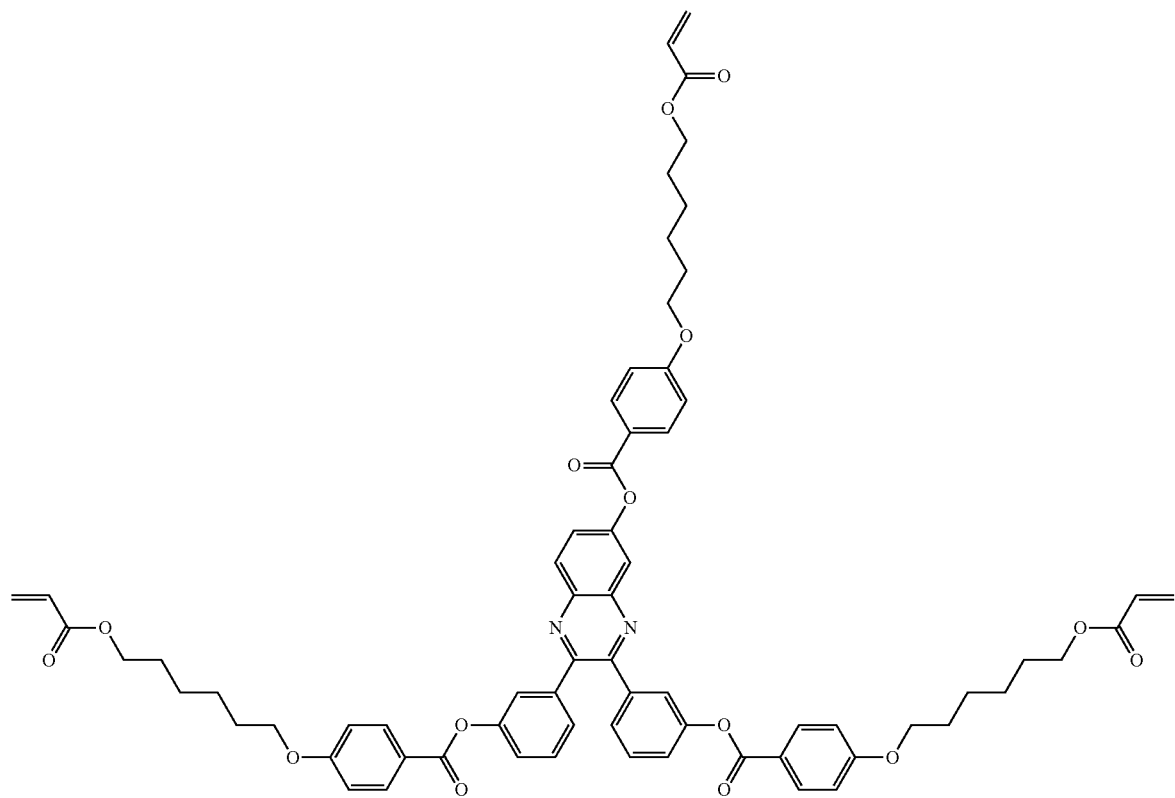

-continued
[Chemical Formula 1-66]
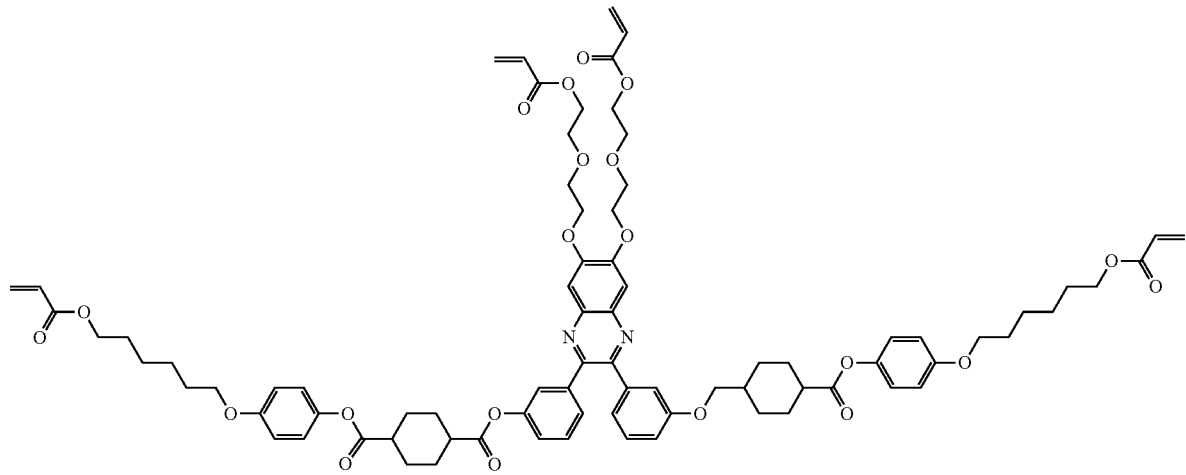
[Chemical Formula 1-68]
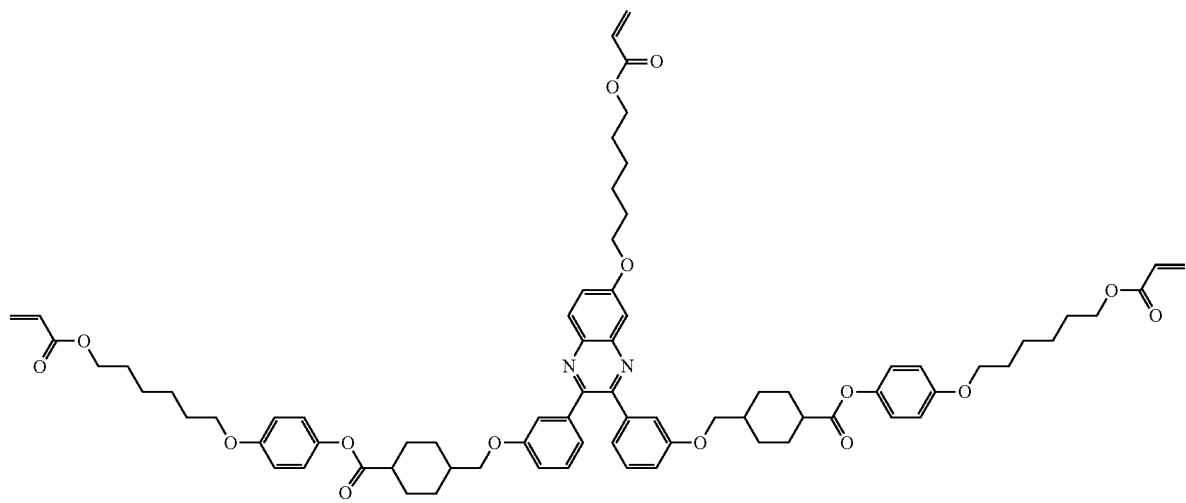
[Chemical Formula 1-71]
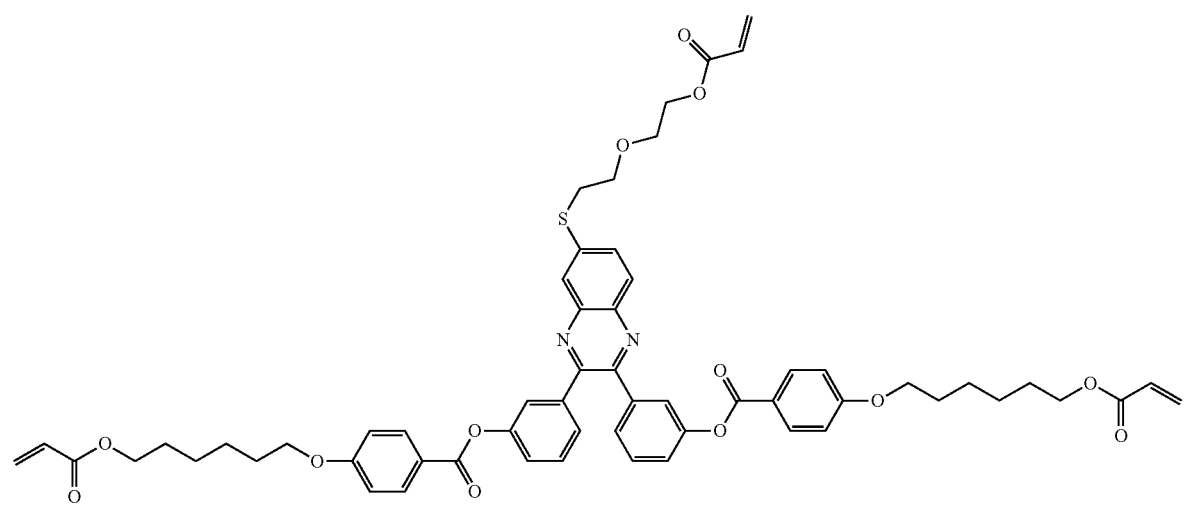

[Chemical Formula 1-76]
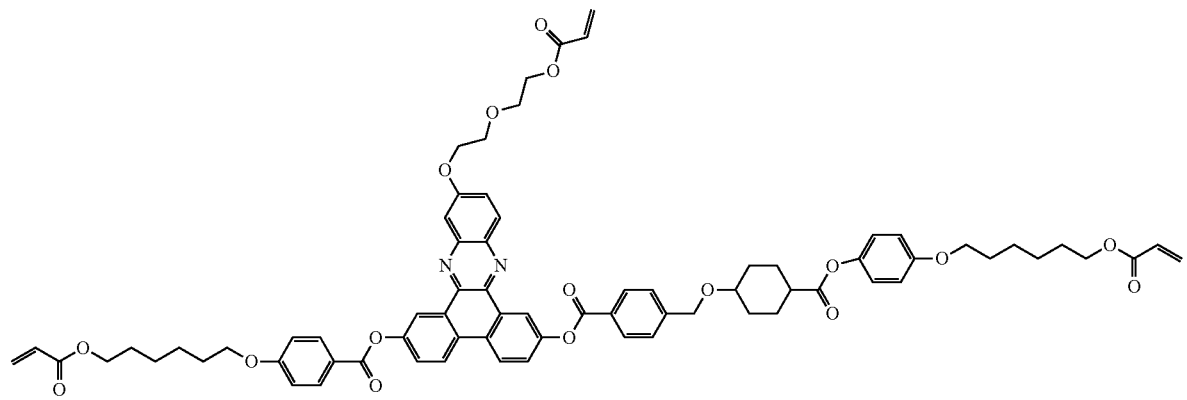
[Chemical Formula 1-77]
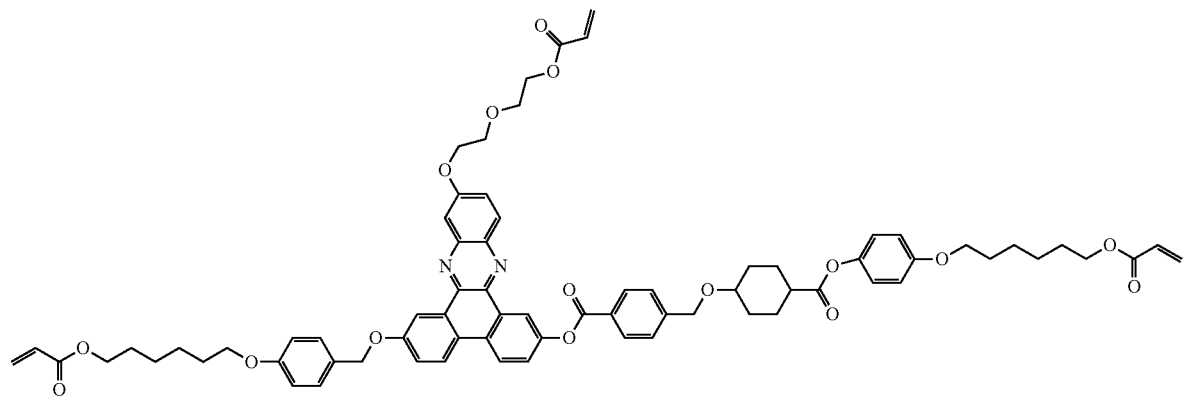
[Chemical Formula 1-78]
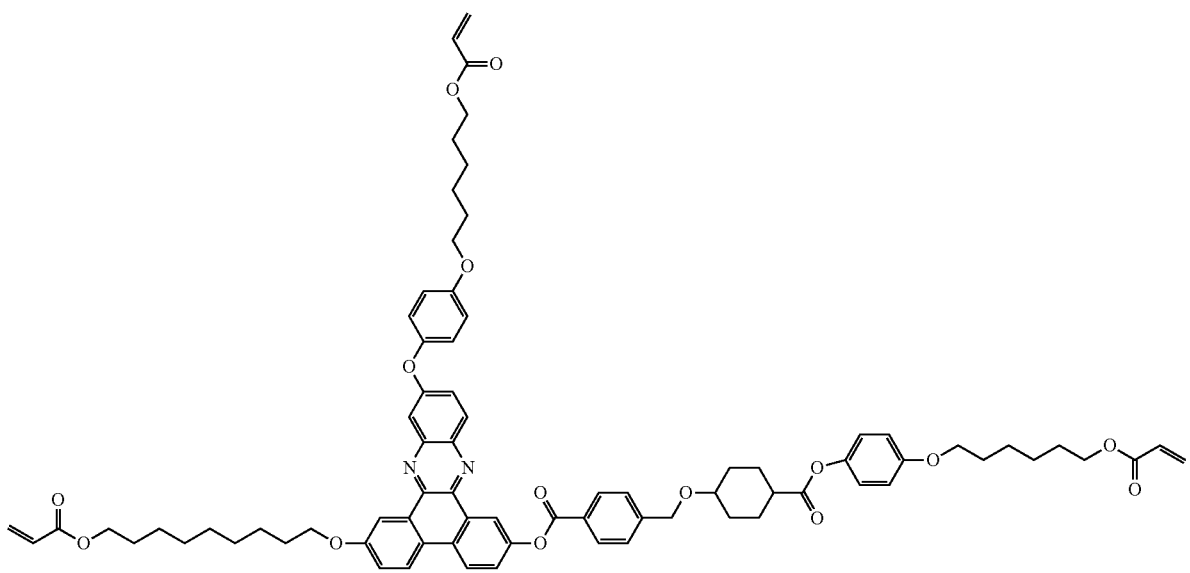

[Chemical Formula 1-79]
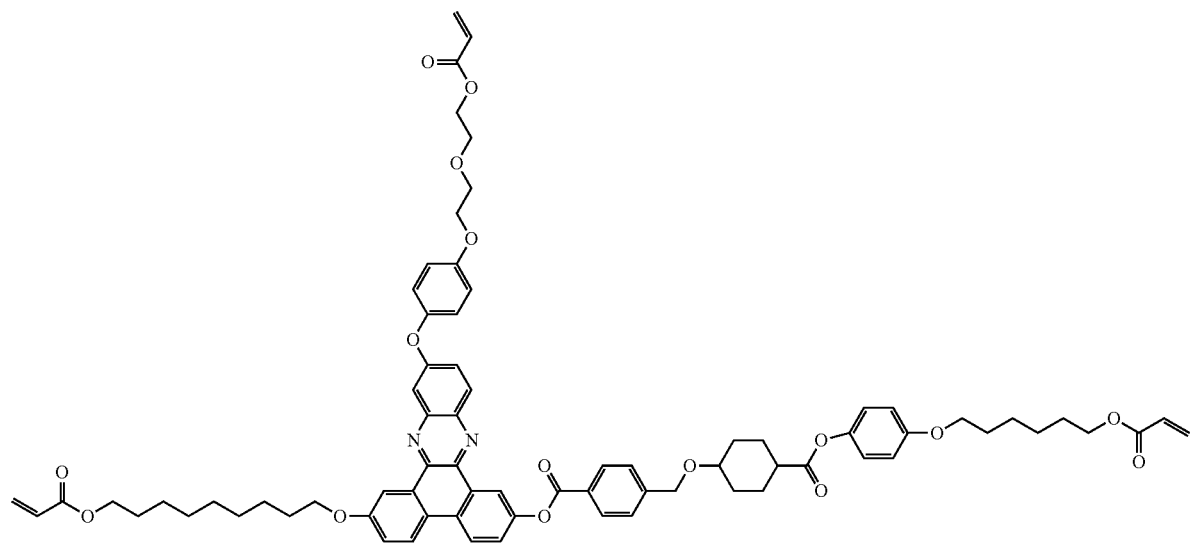
[Chemical Formula 1-80]
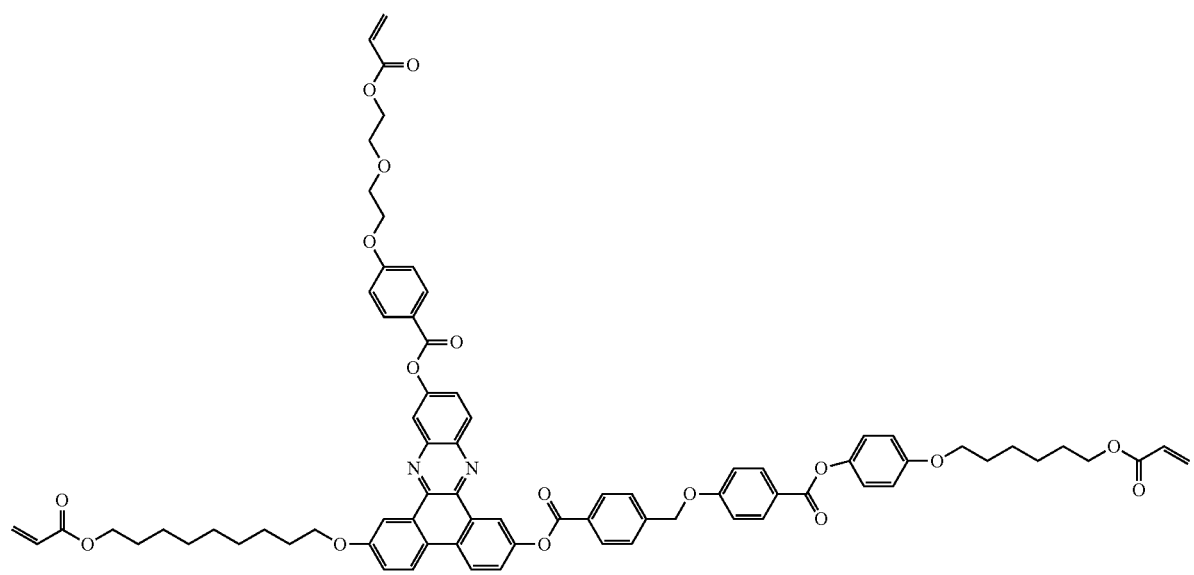

[Chemical Formula 1-86]

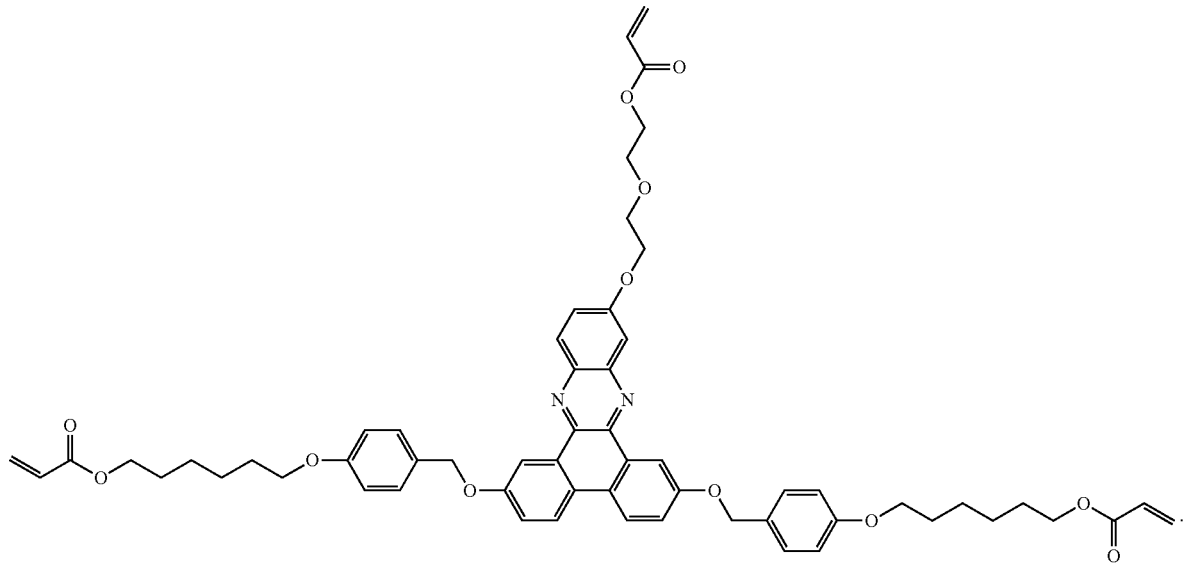

5. A liquid crystal composition comprising the polymerizable liquid crystal compound of claim 1.

6. The liquid crystal composition of claim 5, further comprising:
one or more second polymerizable liquid crystal compounds having a different structure from the polymerizable liquid crystal compound.

7. The liquid crystal composition of claim 5, further comprising:
a polymerization initiator; and
a solvent.

8. A polymer obtained by polymerizing the polymerizable liquid crystal compound of claim 1, wherein
l, m and n are each 1 or 2.

9. The polymer of claim 8, obtained by further copolymerizing with one or more second polymerizable liquid crystal compounds having a different structure than the polymerizable liquid crystal compound.

10. An optically anisotropic body comprising a cured material or a polymerized reactant of the liquid crystal composition of claim 6.

11. An optically anisotropic body comprising the polymer of claim 8.

12. An optical element comprising the optically anisotropic body of claim 10.

13. An optical element comprising the optically anisotropic body of claim 11.

14. A polymerizable liquid crystal compound represented by the following Chemical Formula 1:

[Chemical Formula 1]

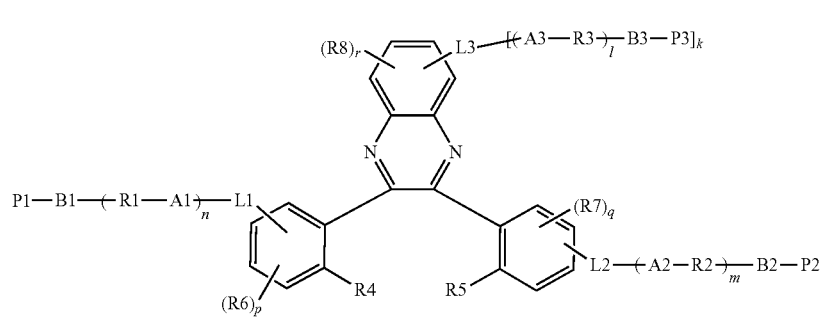

wherein, in Chemical Formula 1,

A1 to A3 are each O or S;

B1 to B3 are each a direct bond, or a substituted or unsubstituted alkylene group;

R1 to R3 are each a substituted or unsubstituted alkylene group, or a substituted or unsubstituted arylene group;

P1 and P2 are each an epoxy group, an oxetane group, an aziridinyl group, a maleimide group, a (meth)acryloyl group, or a (meth)acryloyloxy group;

P3 is hydrogen, a substituted or unsubstituted alkyl group, a substituted or unsubstituted alkoxy group, an epoxy group, an oxetane group, an aziridinyl group, a maleimide group, a (meth)acryloyl group, or a (meth)acryloyloxy group, wherein the (meth)acryloyloxy group of P1 to P3 is represented by

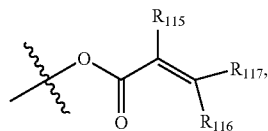

wherein $R_{115}$ to $R_{117}$ are each hydrogen, a halogen group, or a substituted or unsubstituted alkyl group, and adjacent substituents may bond to each other to form a ring;

R4 to R8 are each hydrogen, or a substituted or unsubstituted alkyl group, and R4 and R5 are bonded to each other to form a ring;

l, m, n, p, q and r are each an integer of 0 to 3, and when l, m, n, p, q or r is 2 or greater, structures in the parentheses are the same as or different from each other;

k is 1 or 2, and when k is 2, structures in the parentheses are the same as or different from each other; and L1 to L3 are each a direct bond or represented by the following Chemical Formula 2,

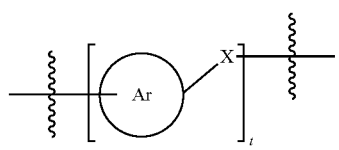

[Chemical Formula 2]

wherein, in Chemical Formula 2,

Ar is an arylene group having 6 to 30 carbon atoms, or a cycloalkylene group having 3 to 30 carbon atoms, and wherein X is —O—, —COO—, —OCH$_2$O—, —CH$_2$CH$_2$—, —CH$_2$O— or —OCH$_2$;

and t is an integer of 1 to 3, and when t is 2 or greater, structures in the parentheses are the same as or different from each other.

15. The polymerizable liquid crystal compound of claim 14, which is represented by any one of the following compounds:

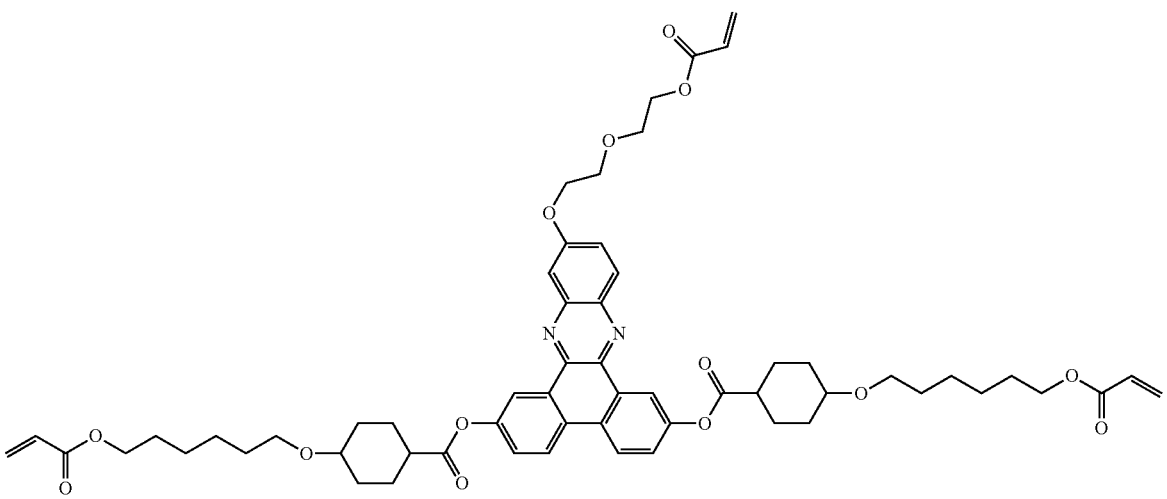

[Chemical Formula 1-3]

-continued
[Chemical Formula 1-4]
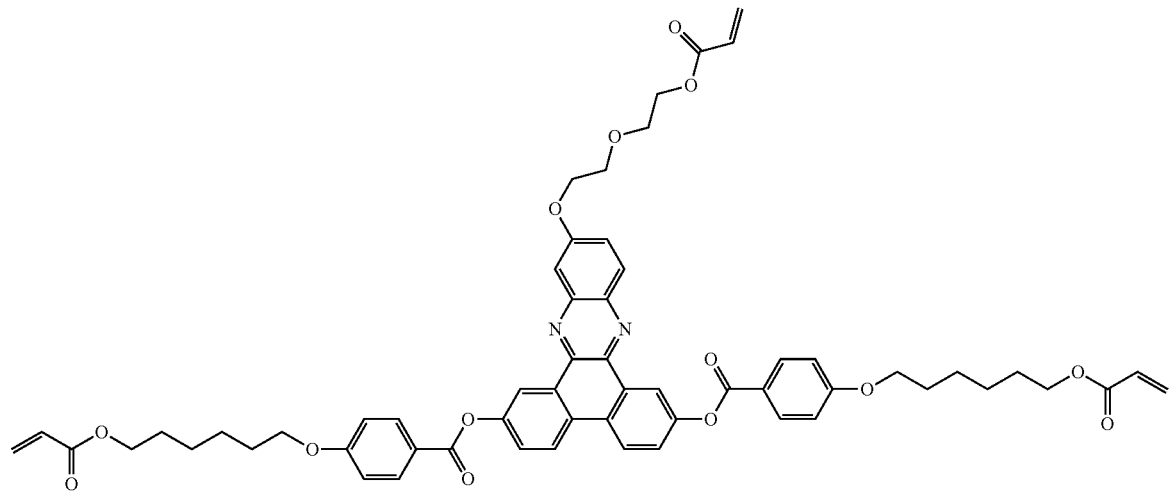
[Chemical Formula 1-5]
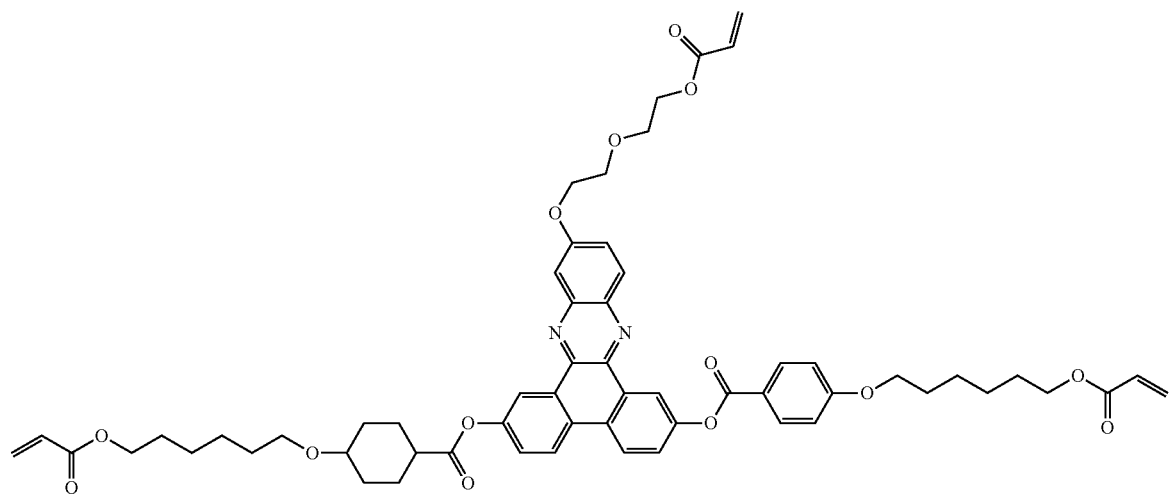
[Chemical Formula 1-18]
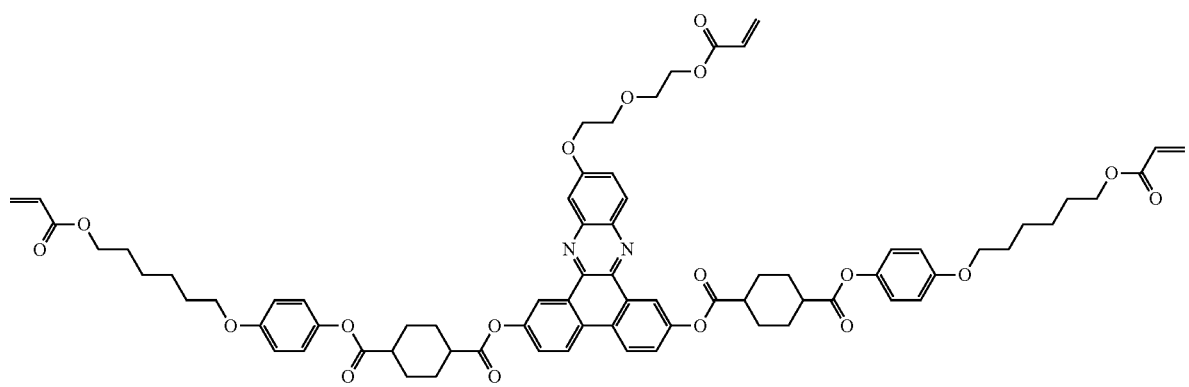

-continued
[Chemical Formula 1-19]
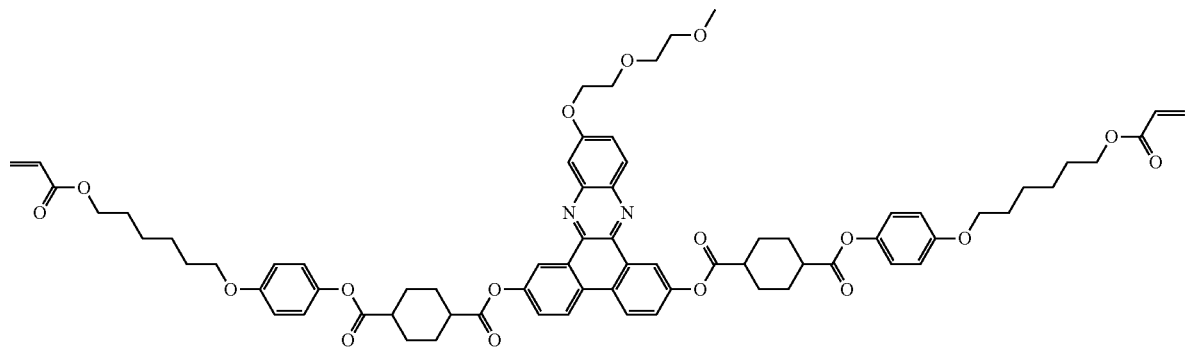
[Chemical Formula 1-22]
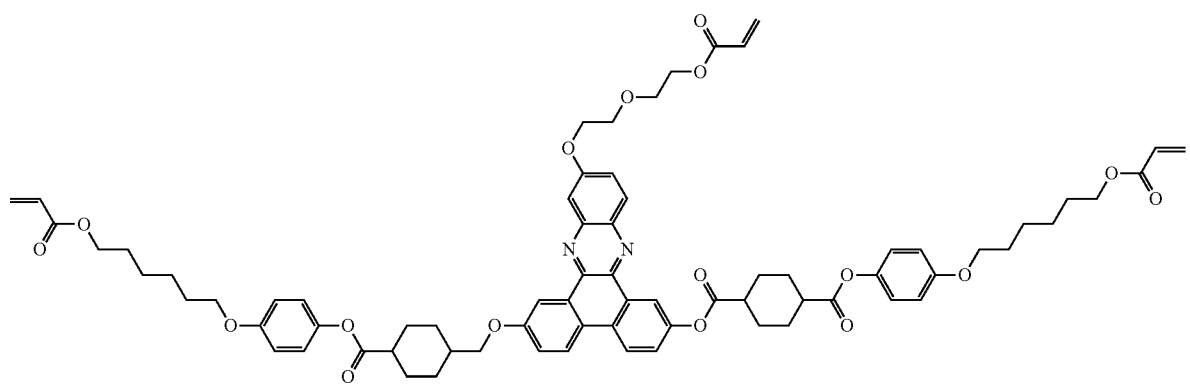
[Chemical Formula 1-23]
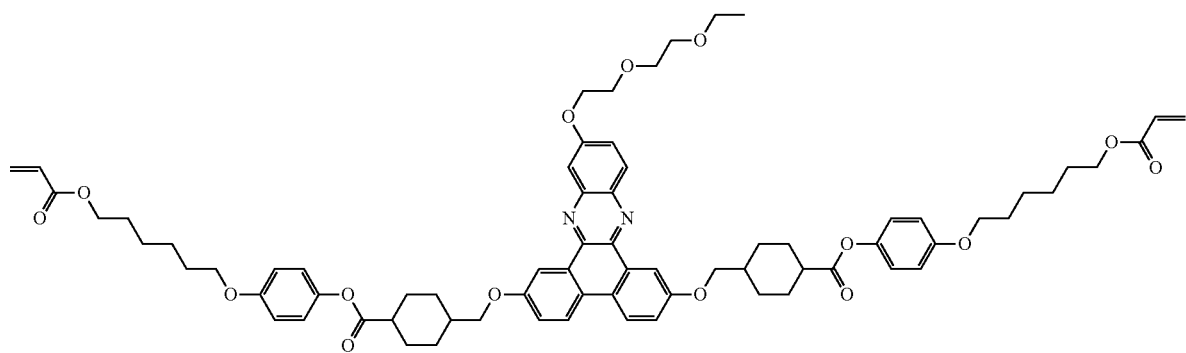
[Chemical Formula 1-26]
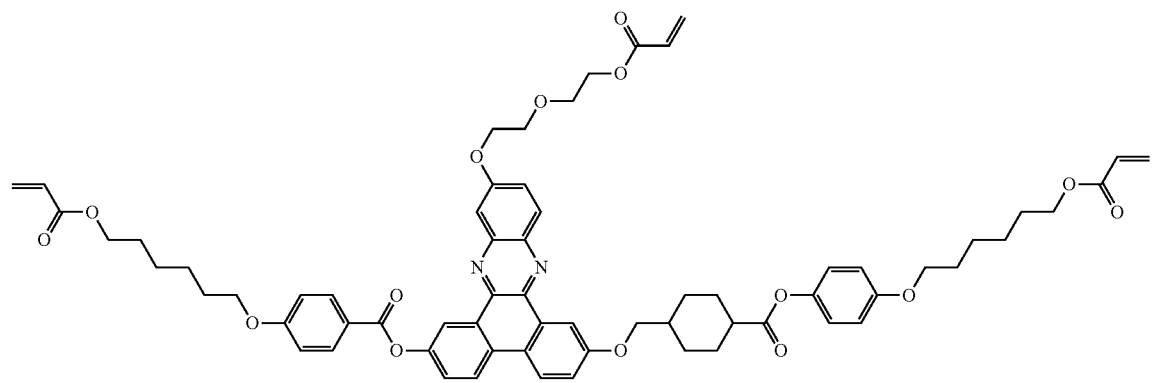

[Chemical Formula 1-27]
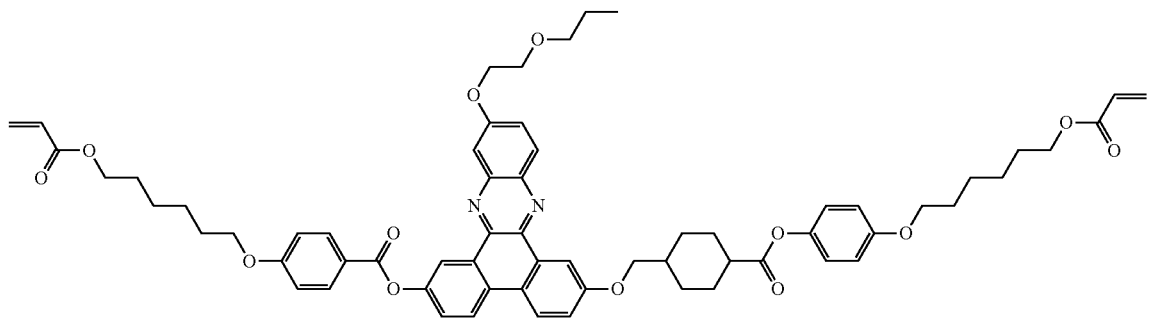
[Chemical Formula 1-32]
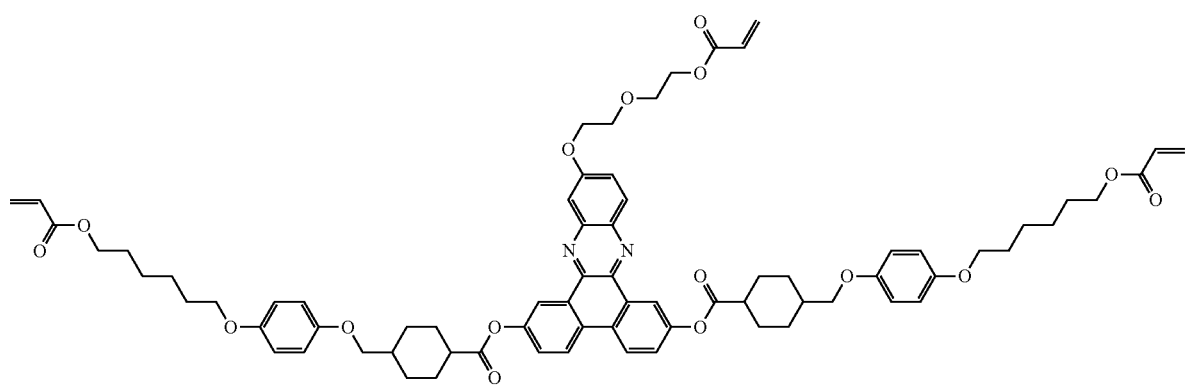
[Chemical Formula 1-35]
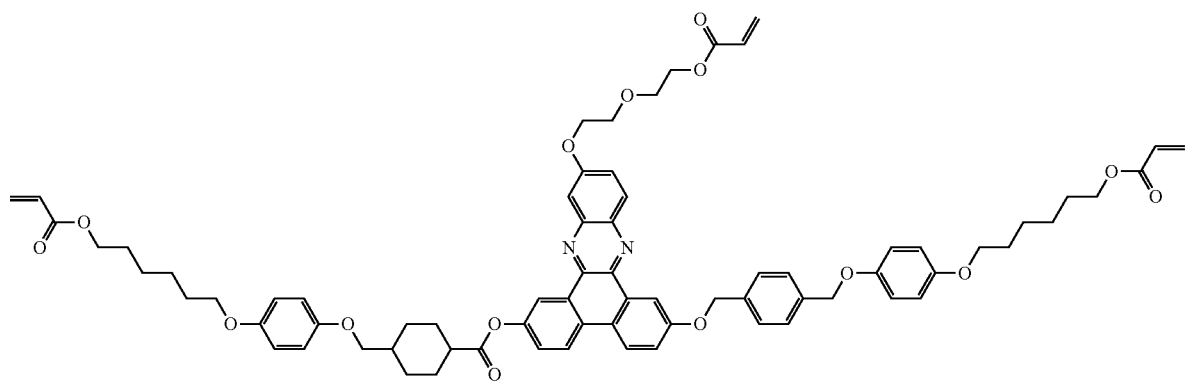
[Chemical Formula 1-37]
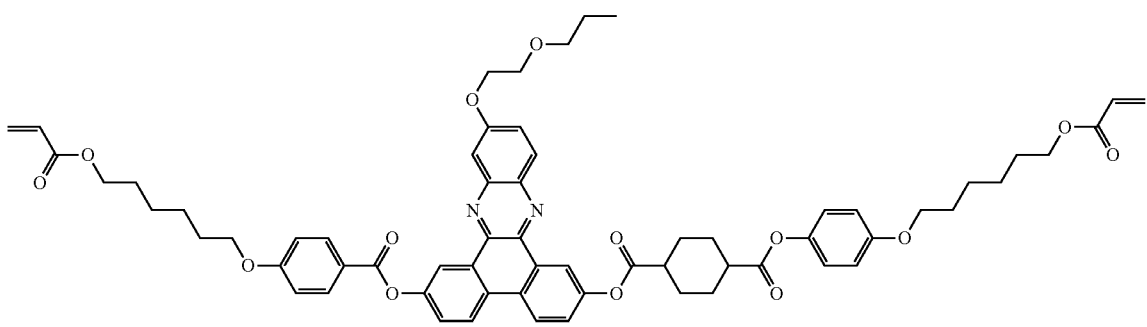

[Chemical Formula 1-39]
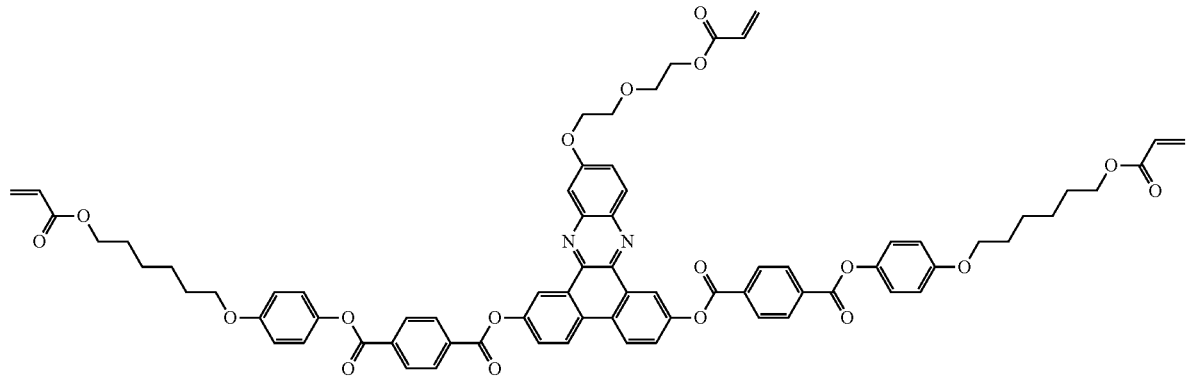
[Chemical Formula 1-40]
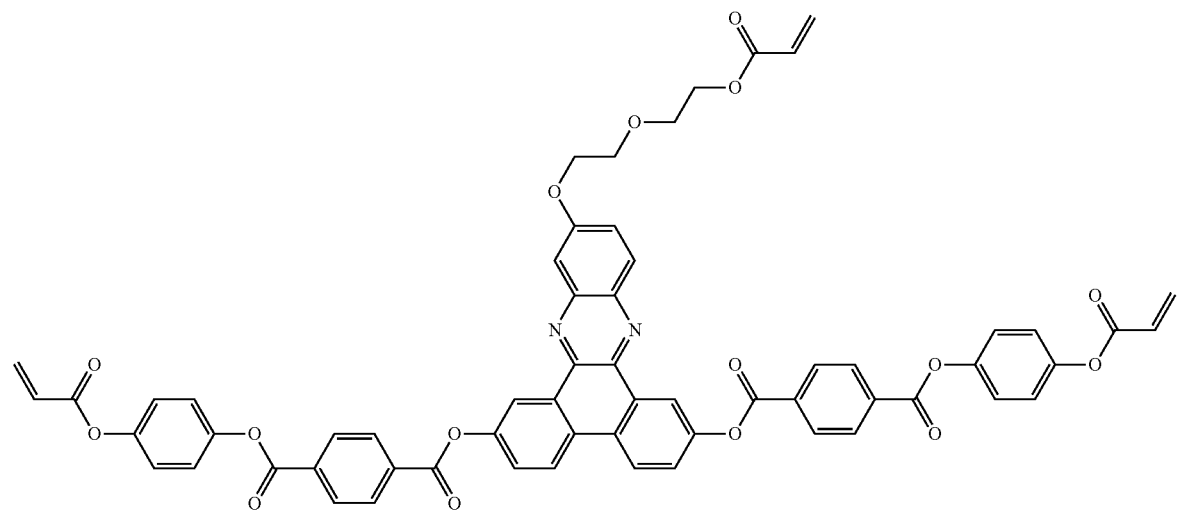
[Chemical Formula 1-41]
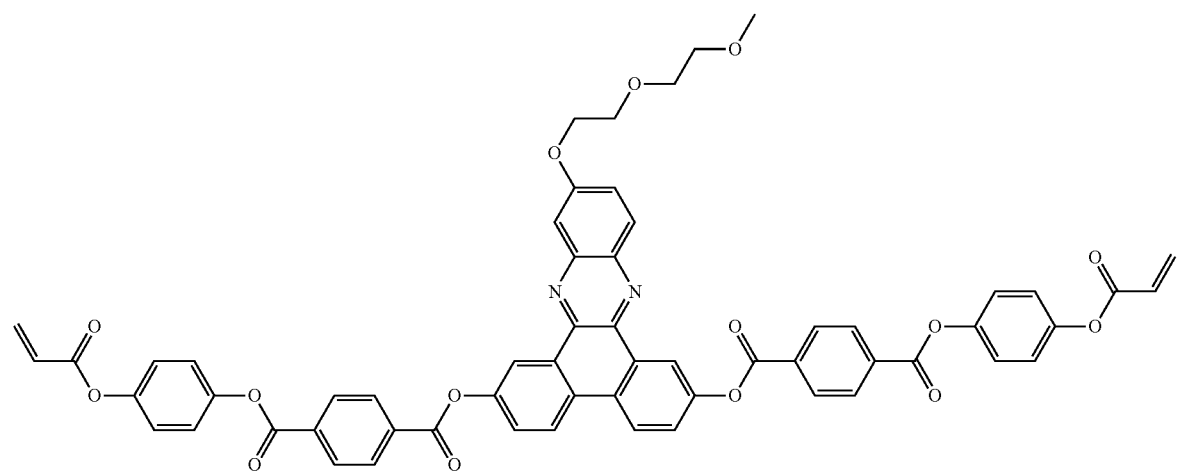

[Chemical Formula 1-44]
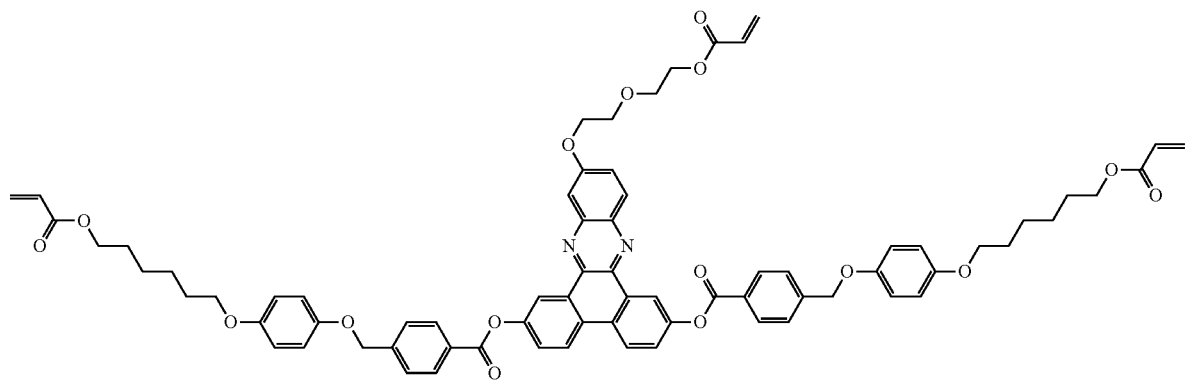
[Chemical Formula 1-49]
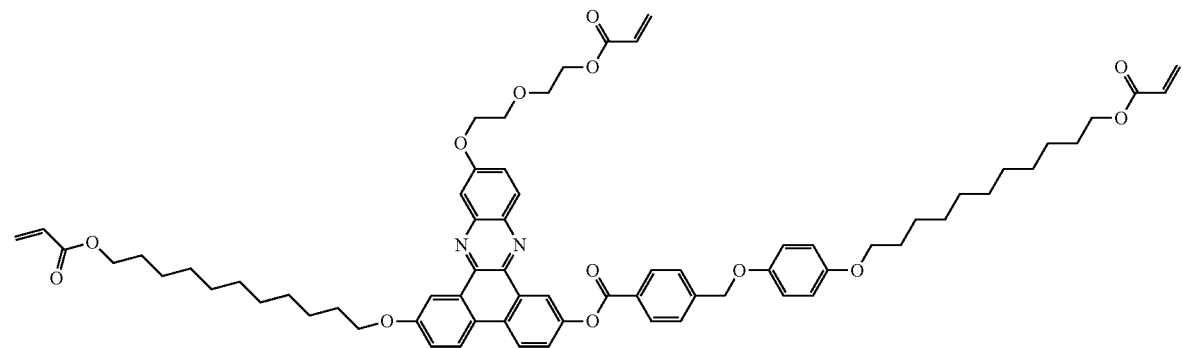
[Chemical Formula 1-50]
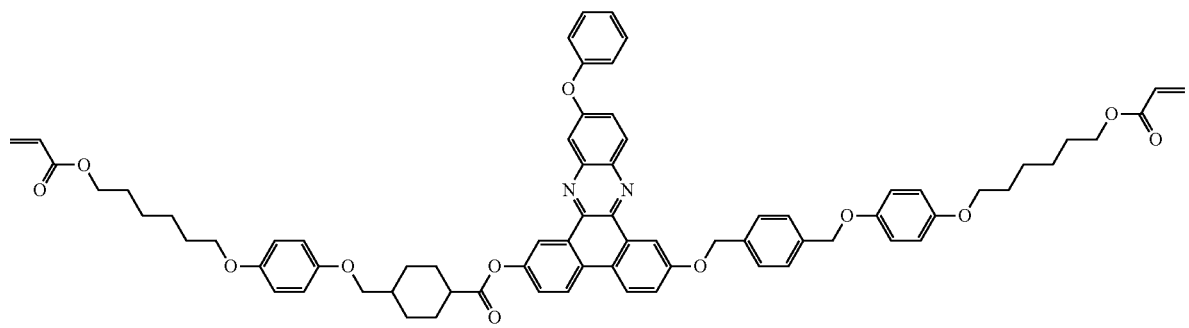

-continued
[Chemical Formula 1-51]
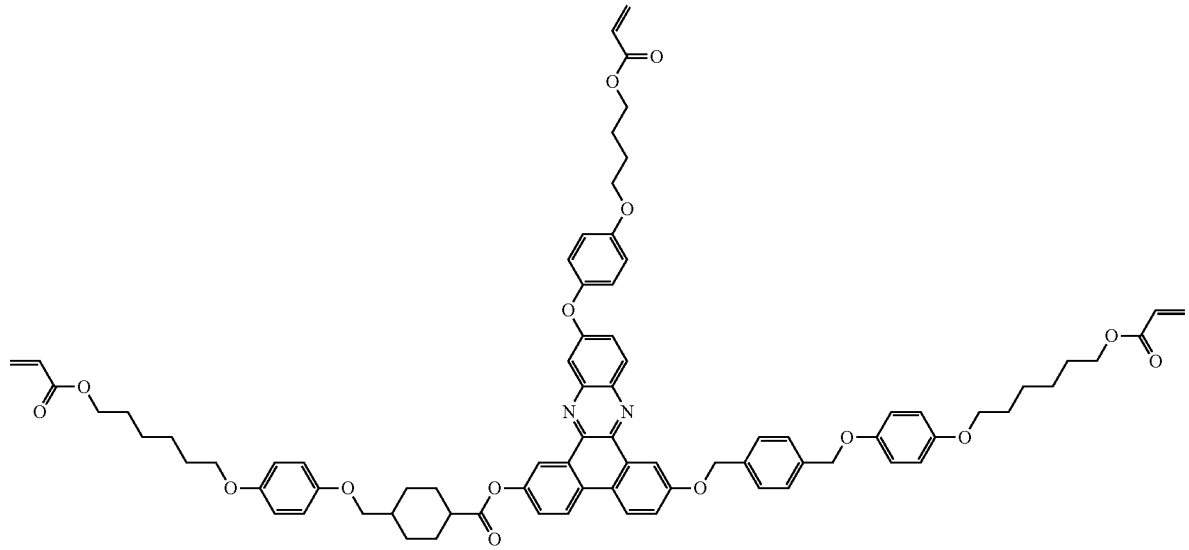
[Chemical Formula 1-52]
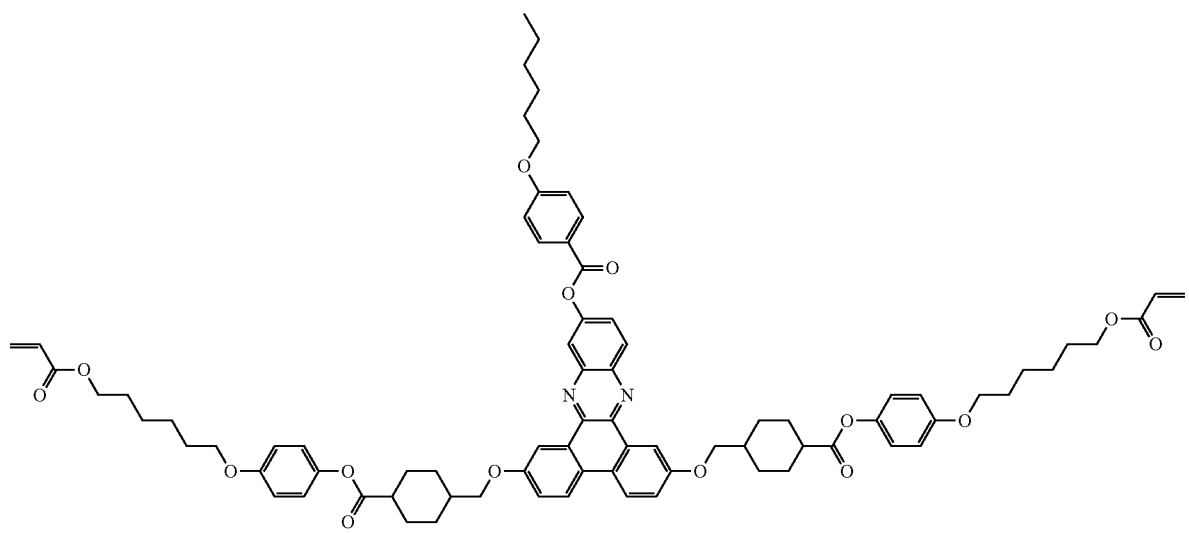
[Chemical Formula 1-53]
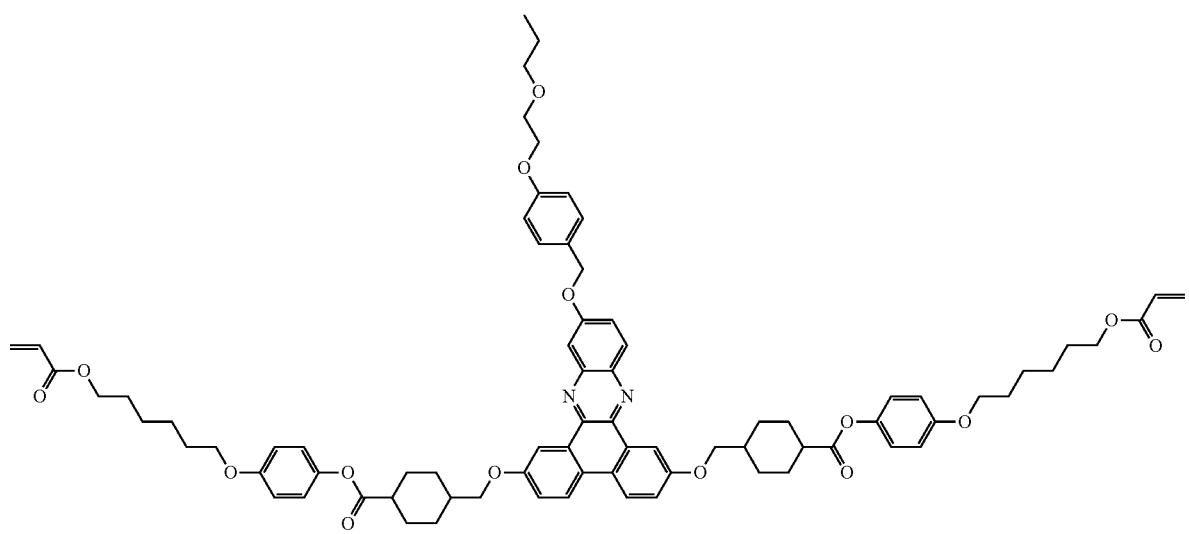

[Chemical Formula 1-54]
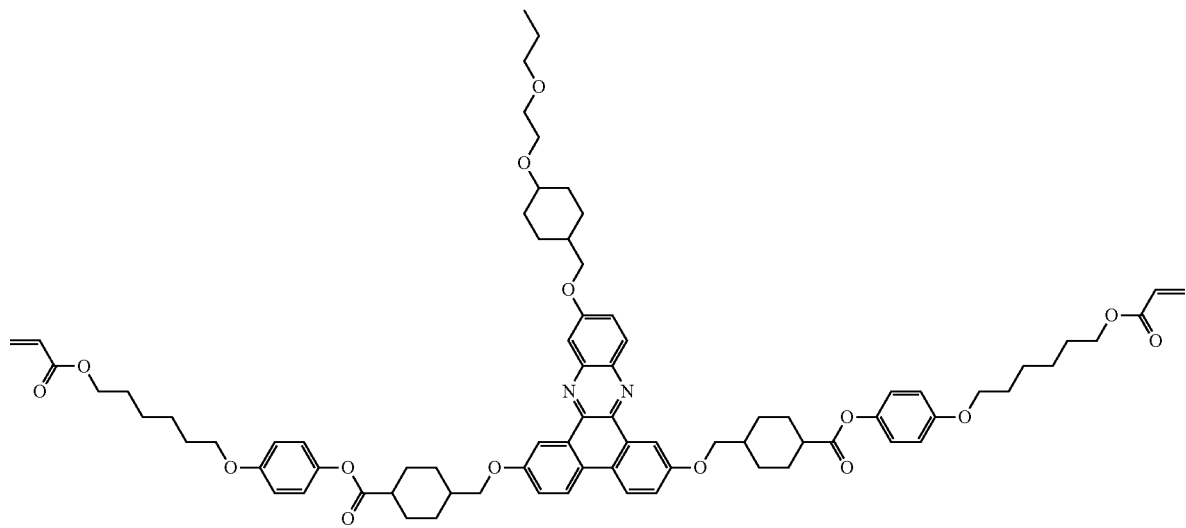
[Chemical Formula 1-55]
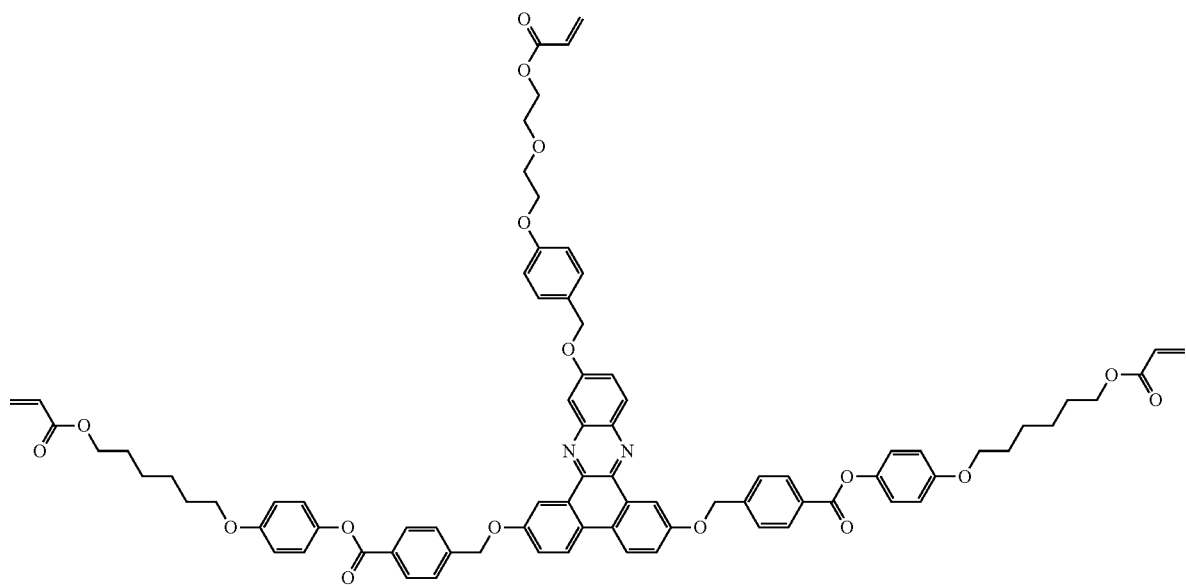

[Chemical Formula 1-56]
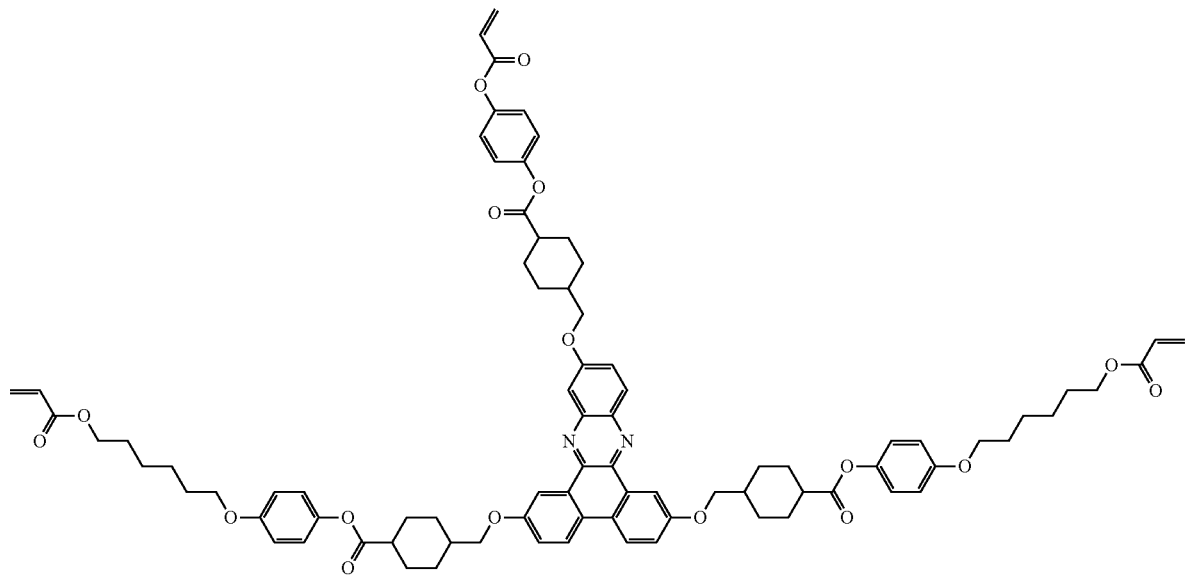
[Chemical Formula 1-57]
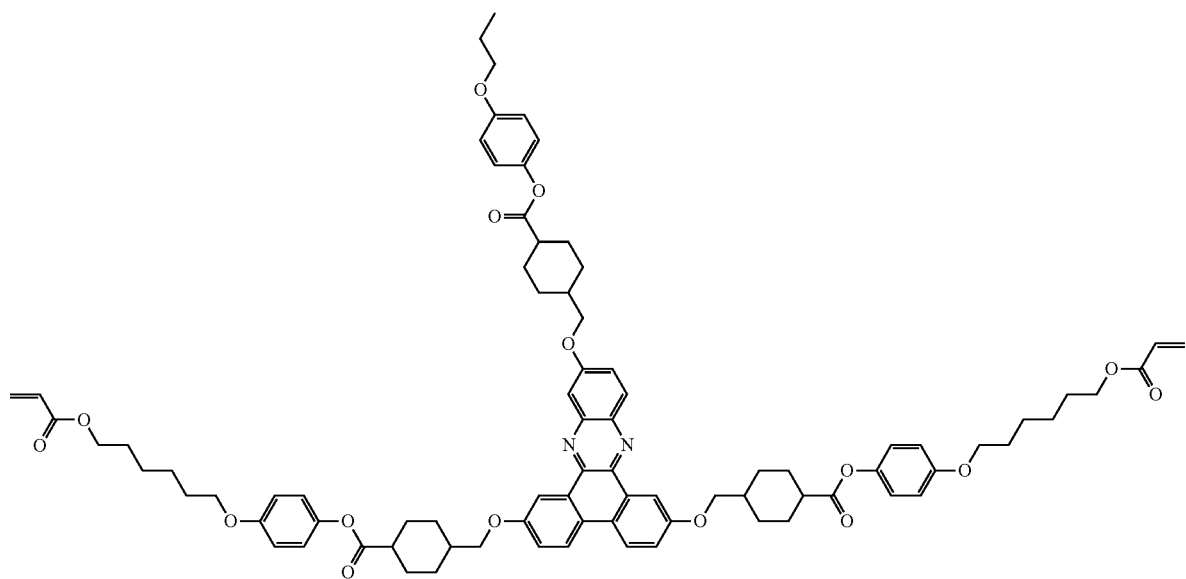

[Chemical Formula 1-58]
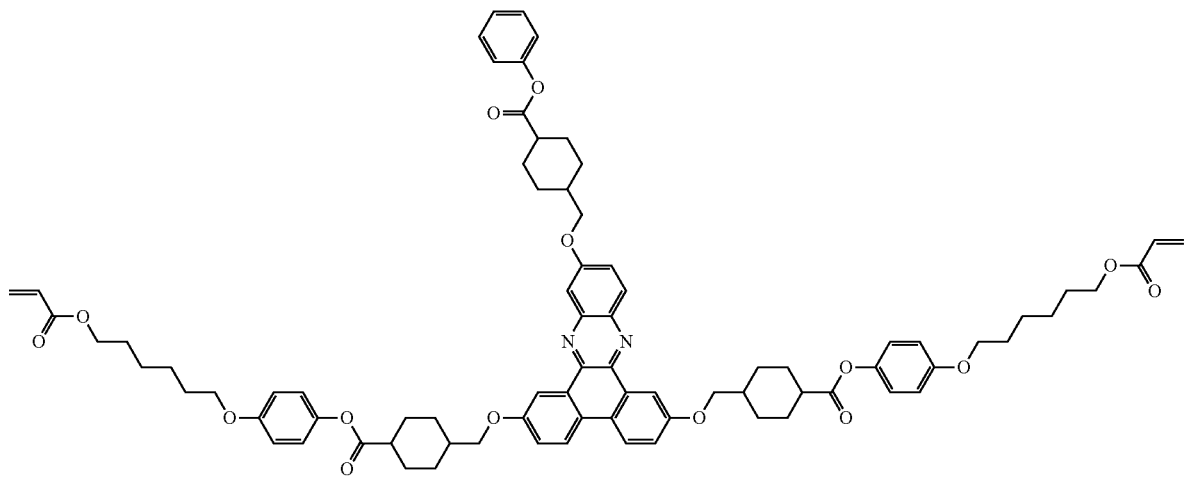
[Chemical Formula 1-70]
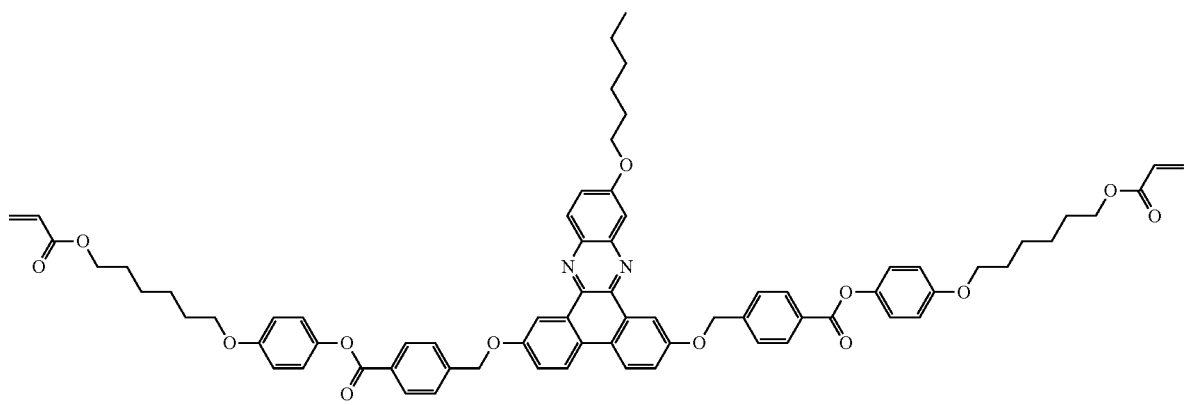
[Chemical Formula 1-72]
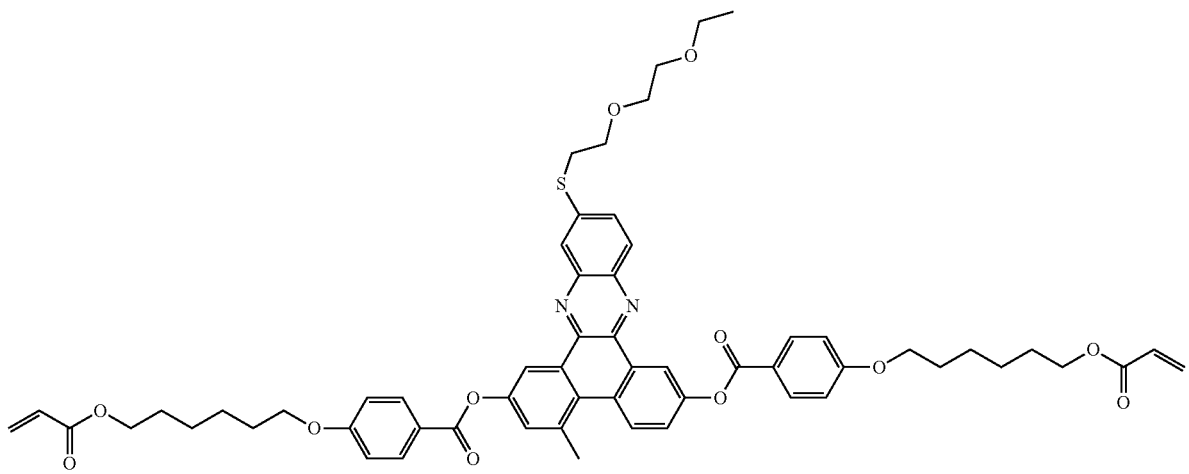
[Chemical Formula 1-73]
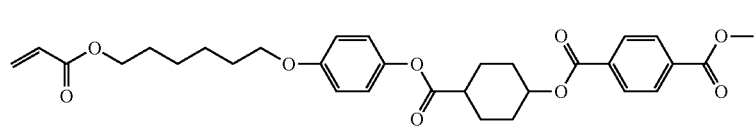

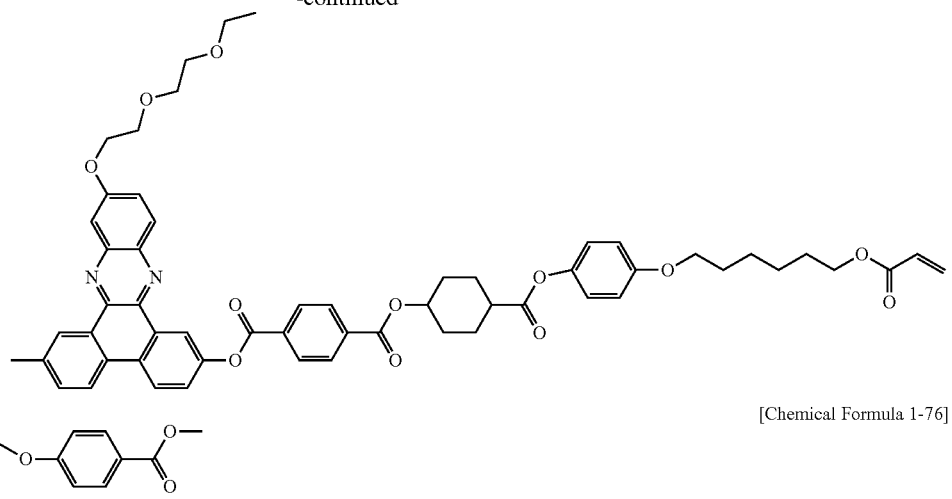
[Chemical Formula 1-76]
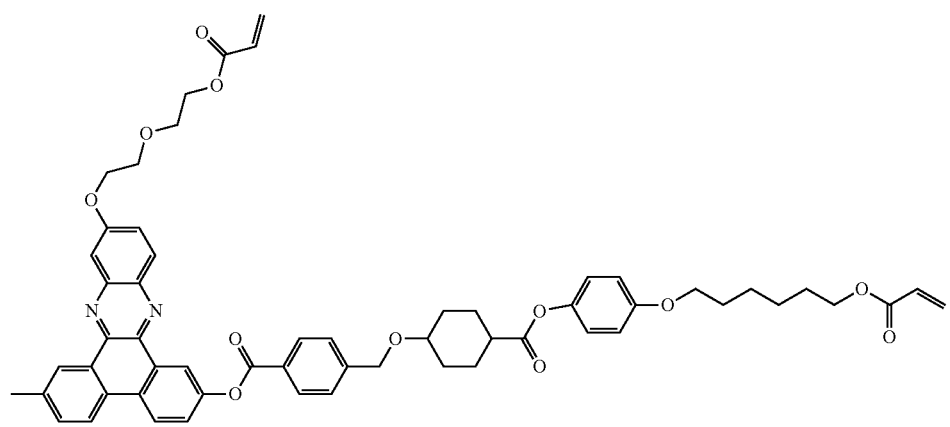
[Chemical Formula 1-77]
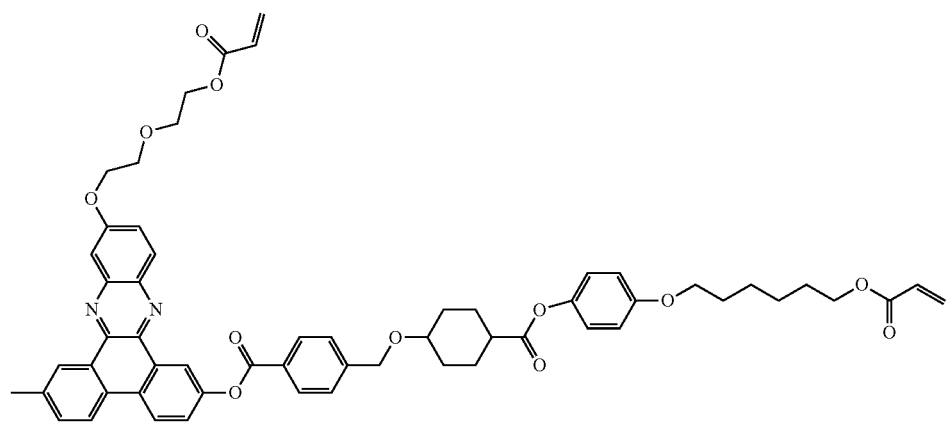

[Chemical Formula 1-78]
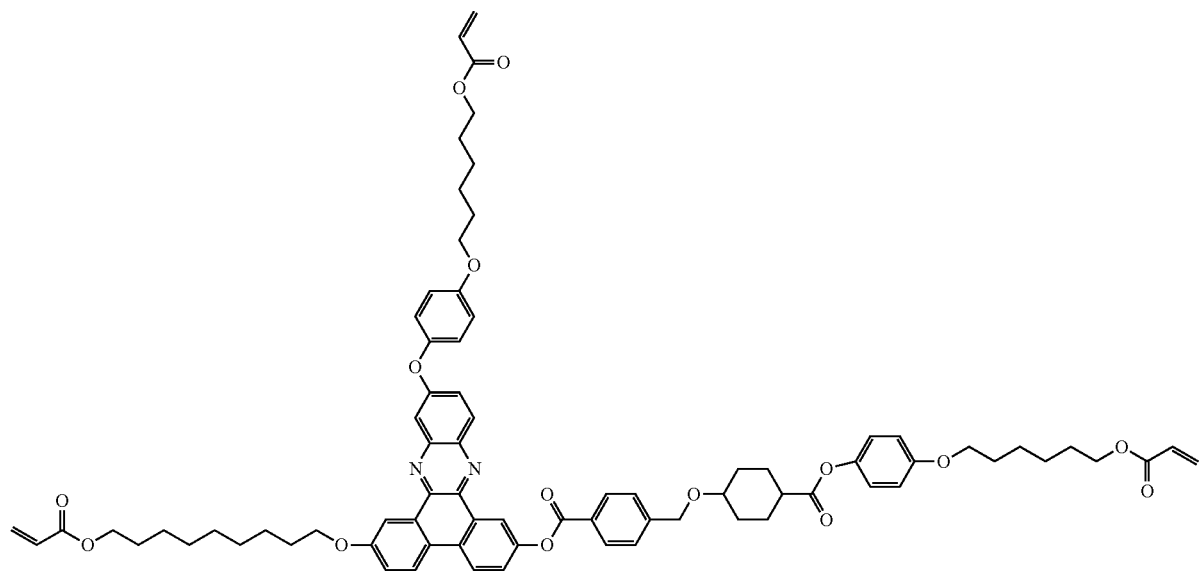
[Chemical Formula 1-79]
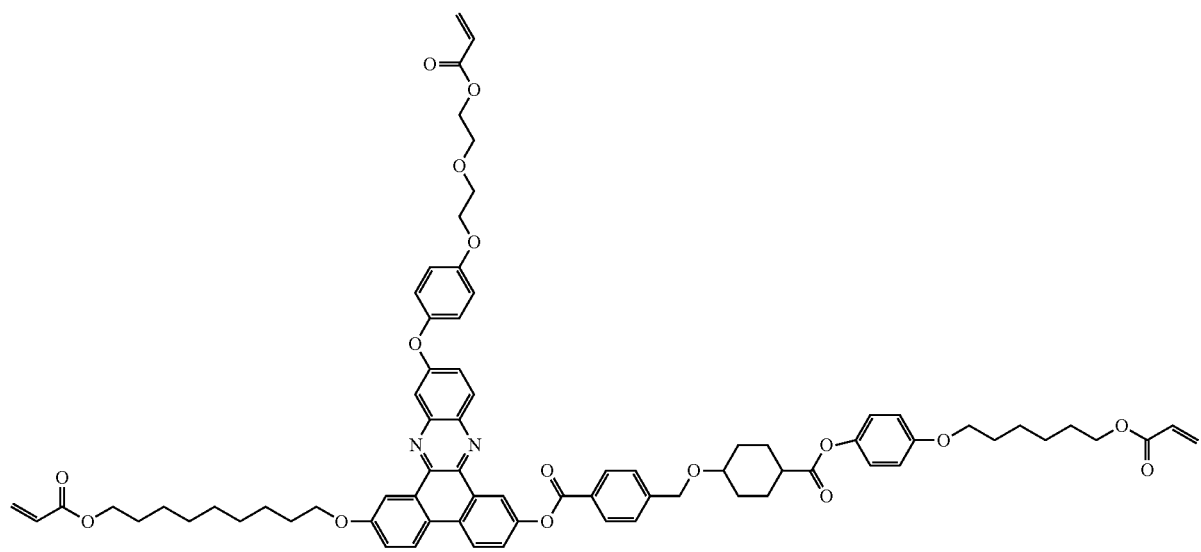

[Chemical Formula 1-80]
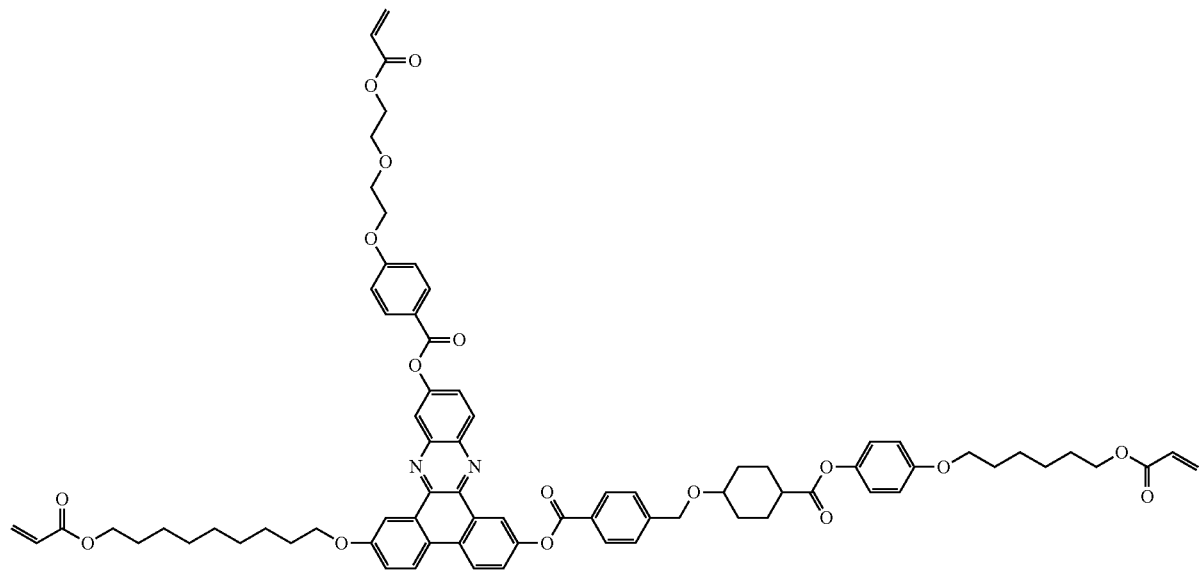
[Chemical Formula 1-86]
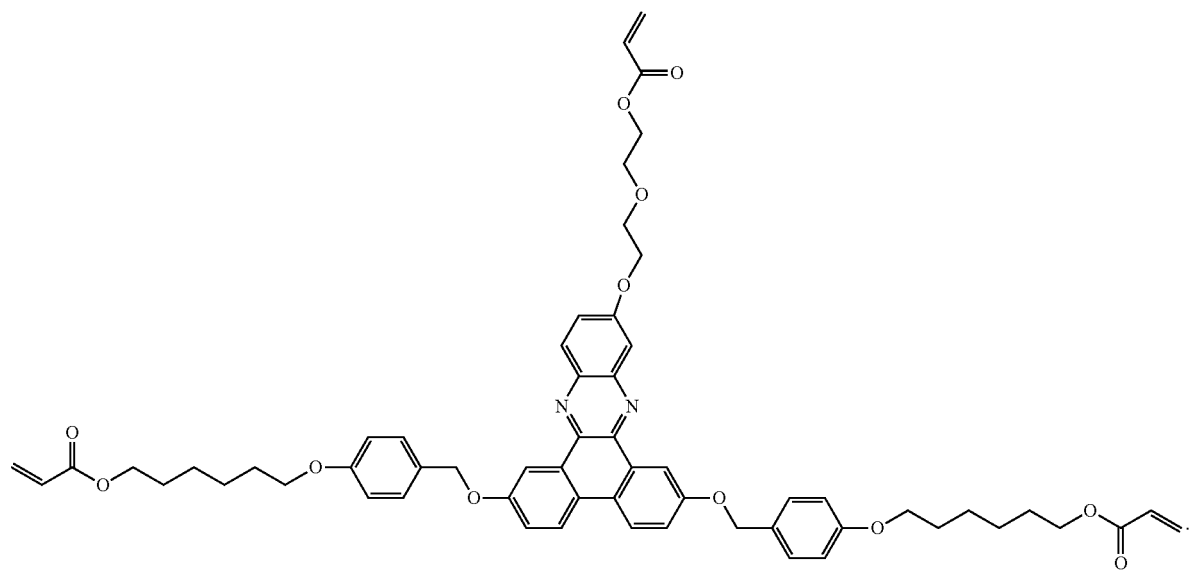

16. A polymerizable liquid crystal compound, which is represented by any one of the following compounds:
[Chemical Formula 1-10]
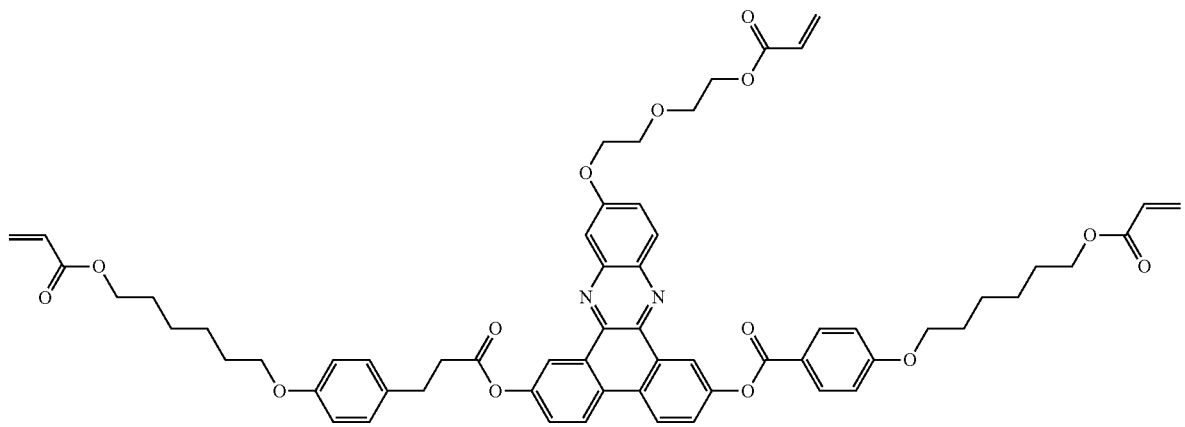
[Chemical Formula 1-11]
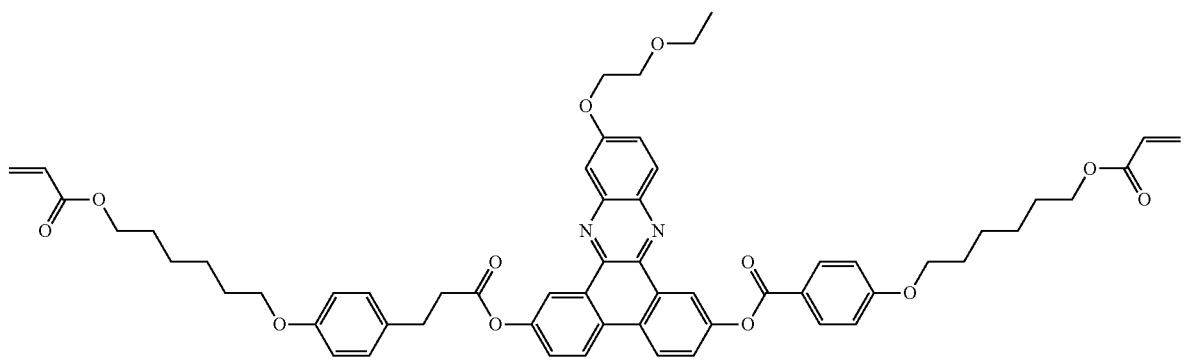
[Chemical Formula 1-12]
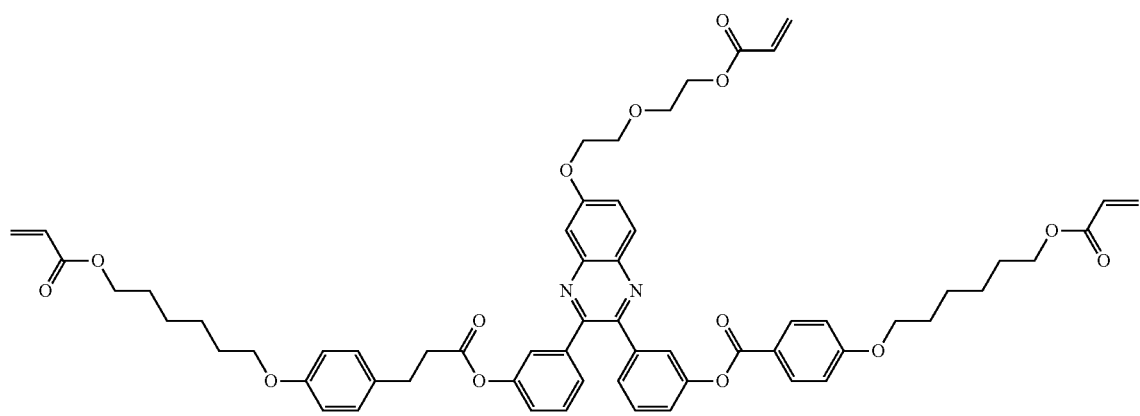

[Chemical Formula 1-14]
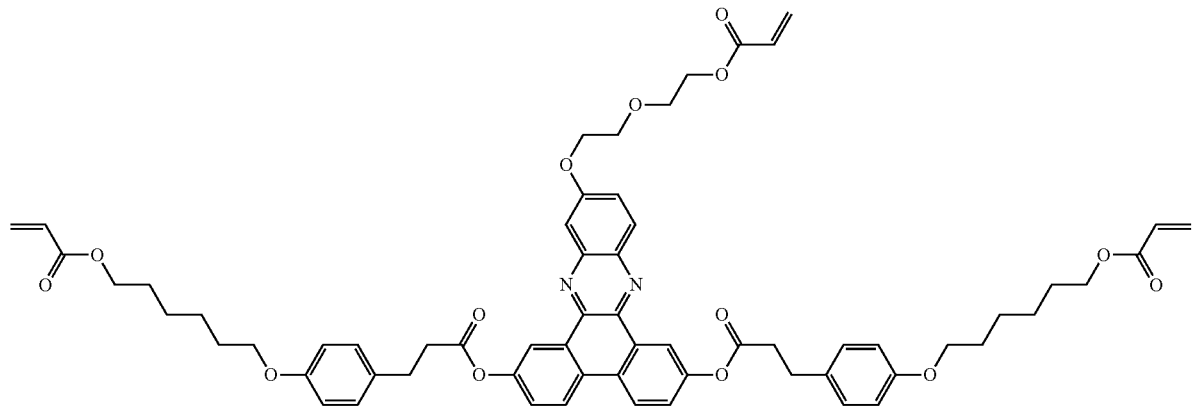
[Chemical Formula 1-15]
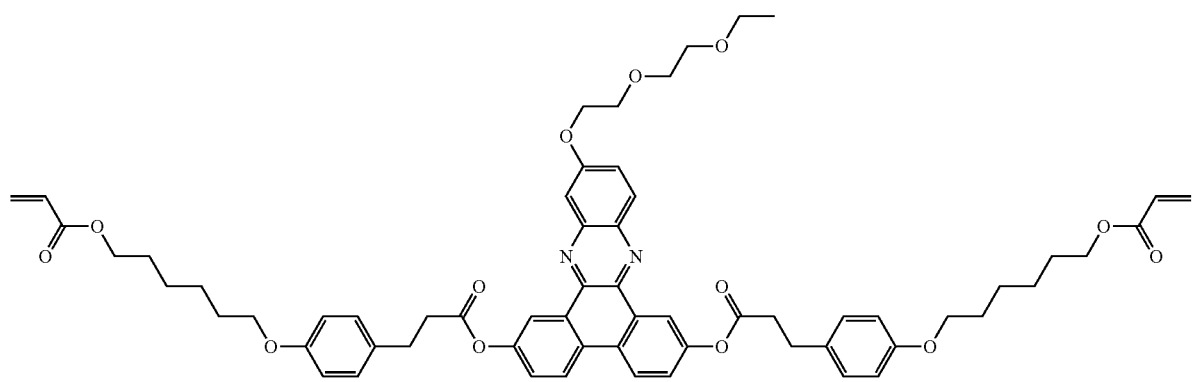
[Chemical Formula 1-16]
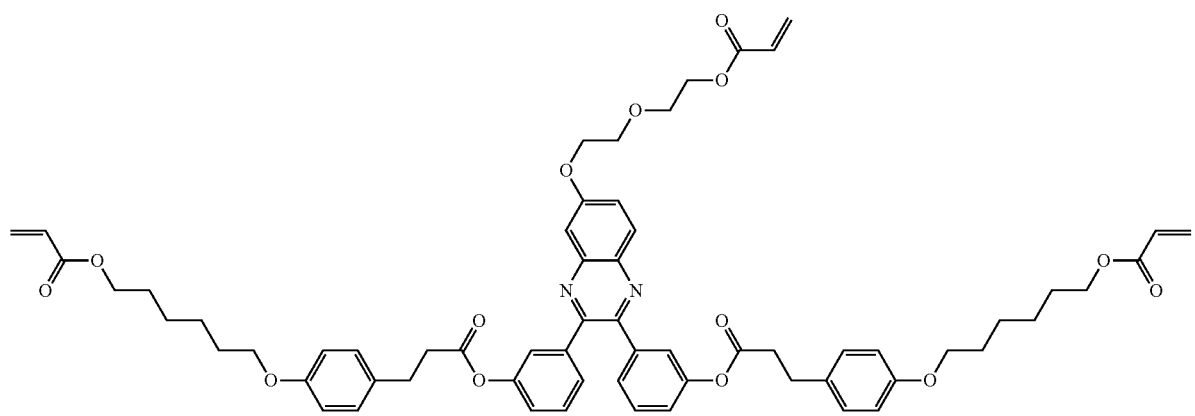

[Chemical Formula 1-59]
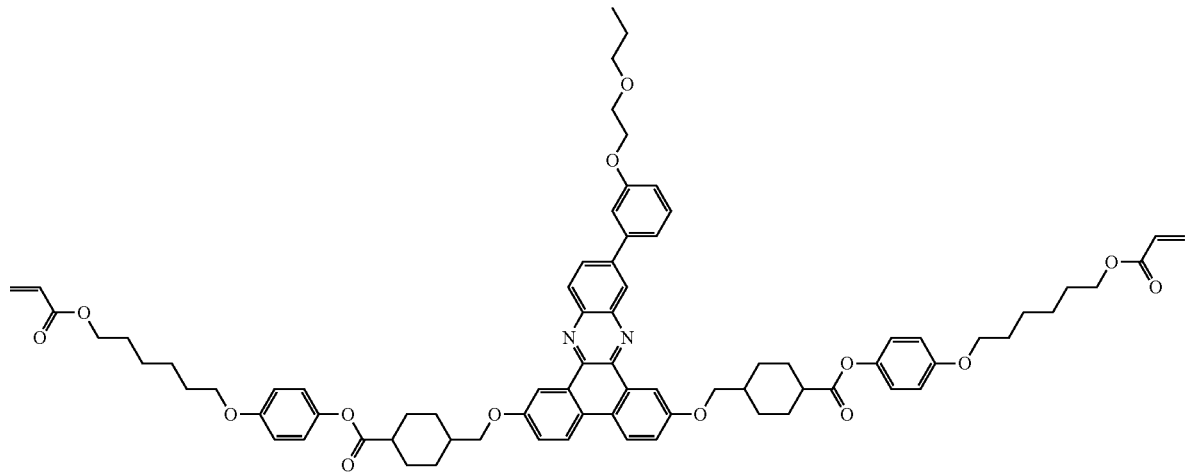
[Chemical Formula 1-60]
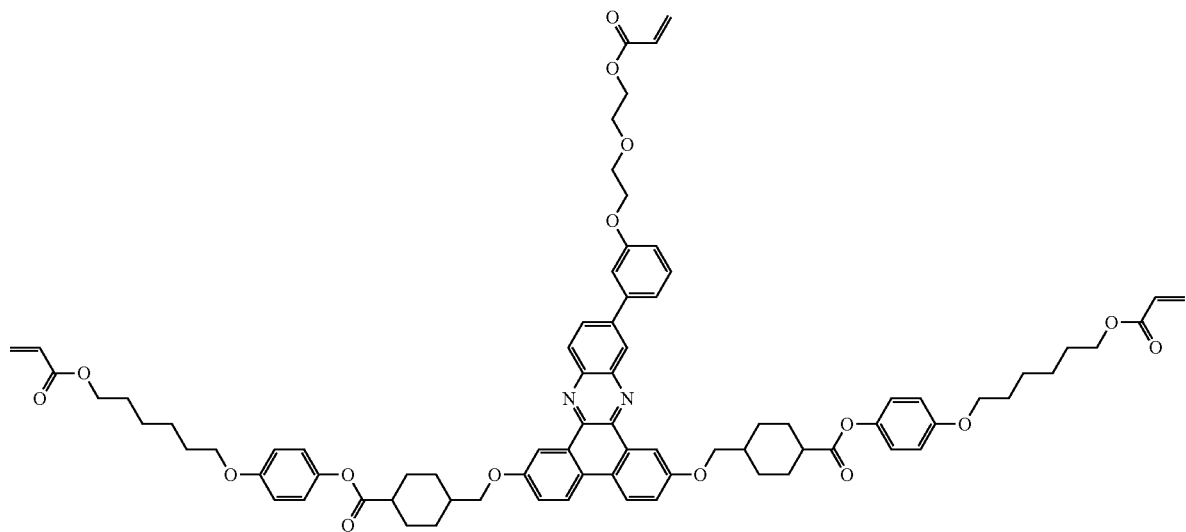
[Chemical Formula 1-61]
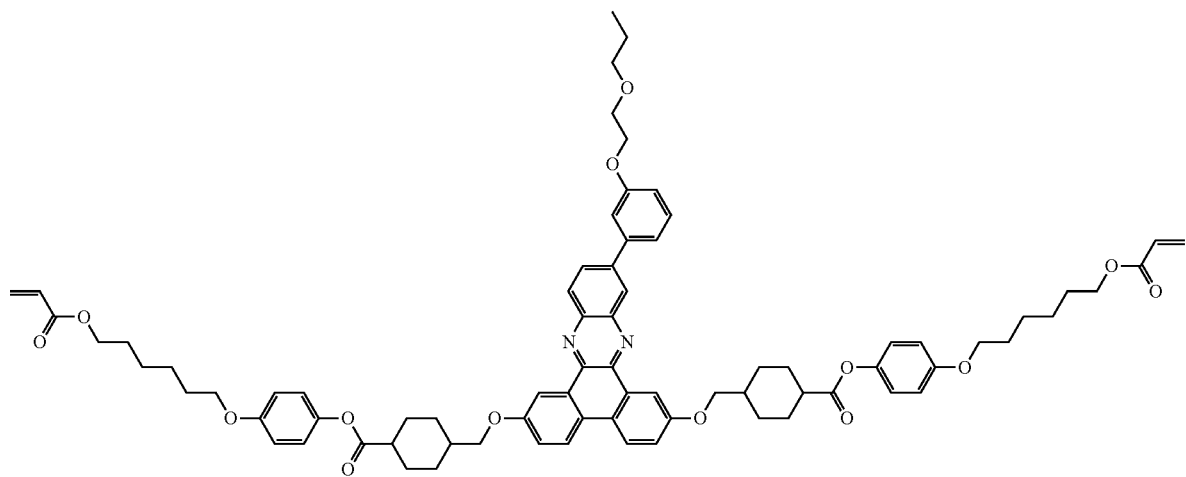

[Chemical Formula 1-82]
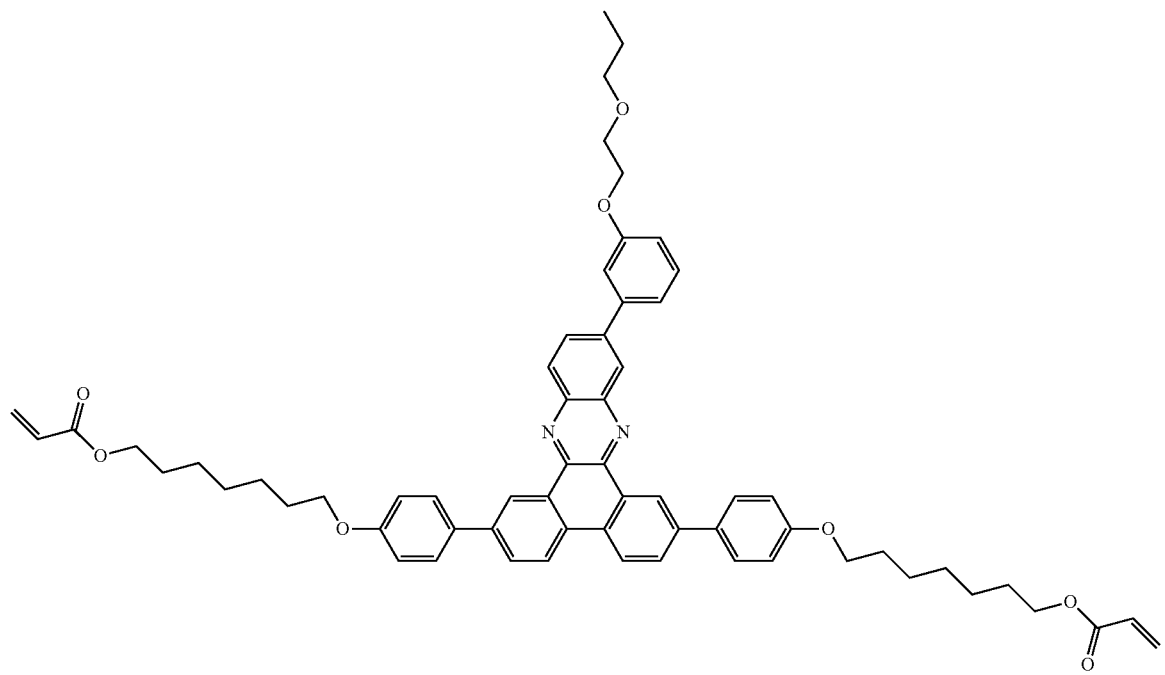
[Chemical Formula 1-85]
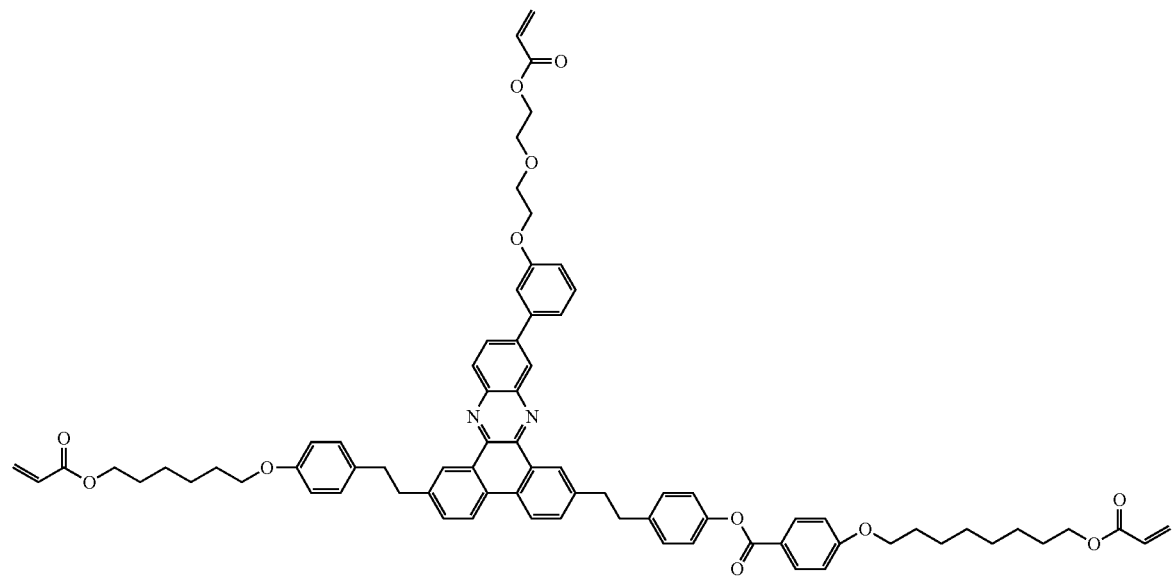

-continued
[Chemical Formula 1-87]
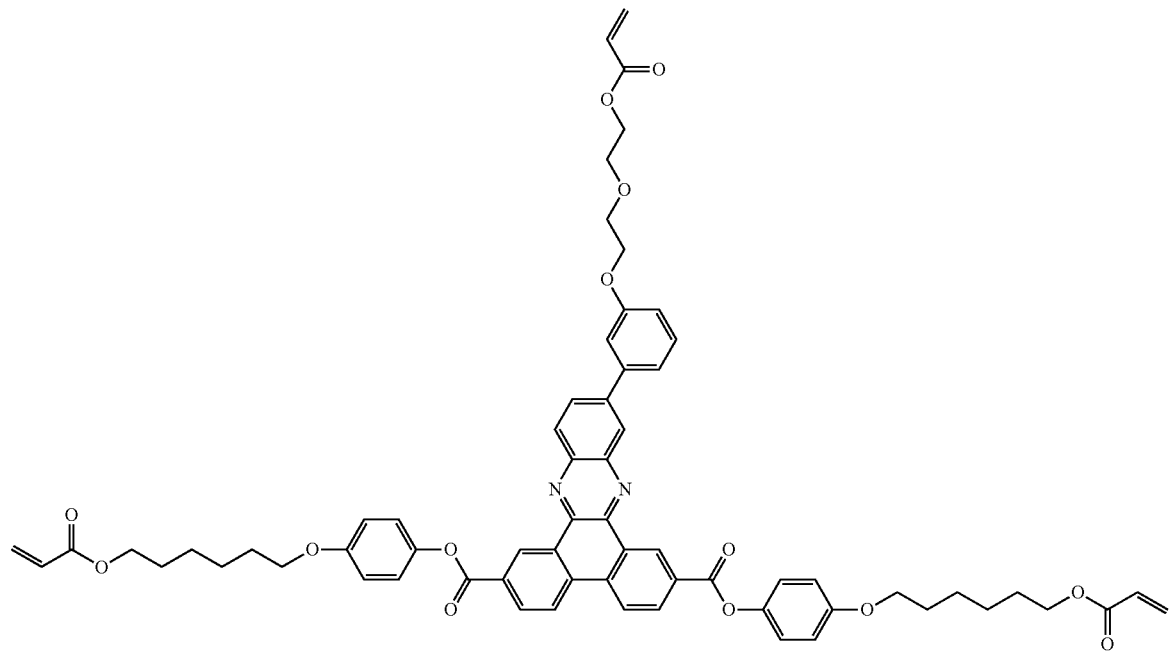
[Chemical Formula 1-88]
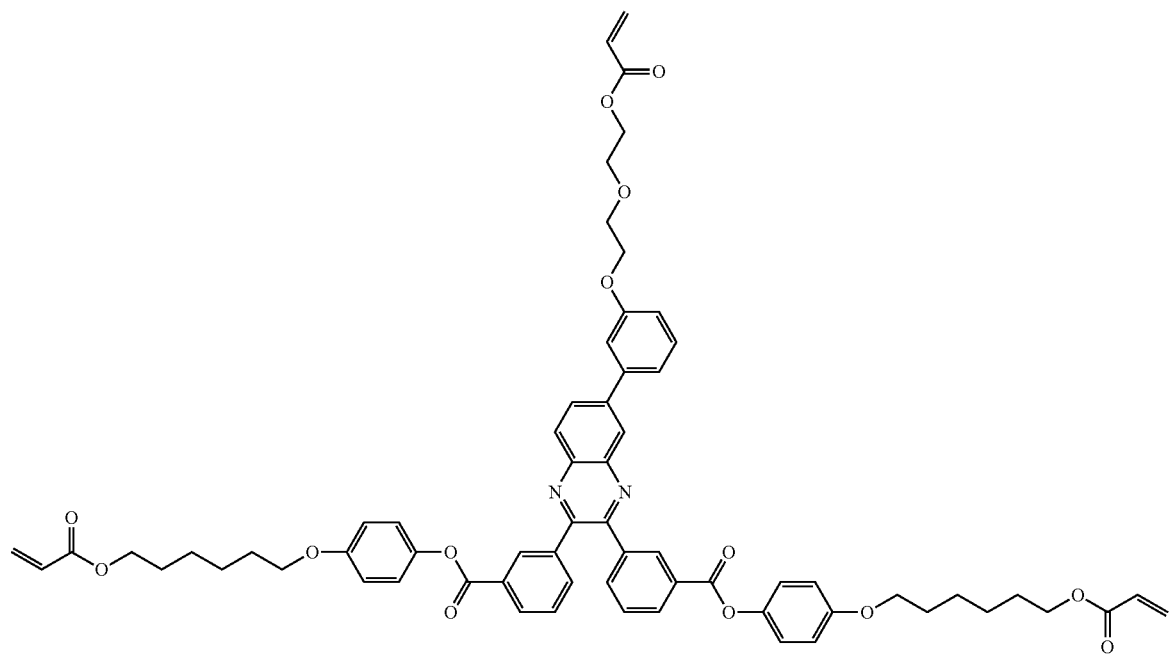

[Chemical Formula 1-89]
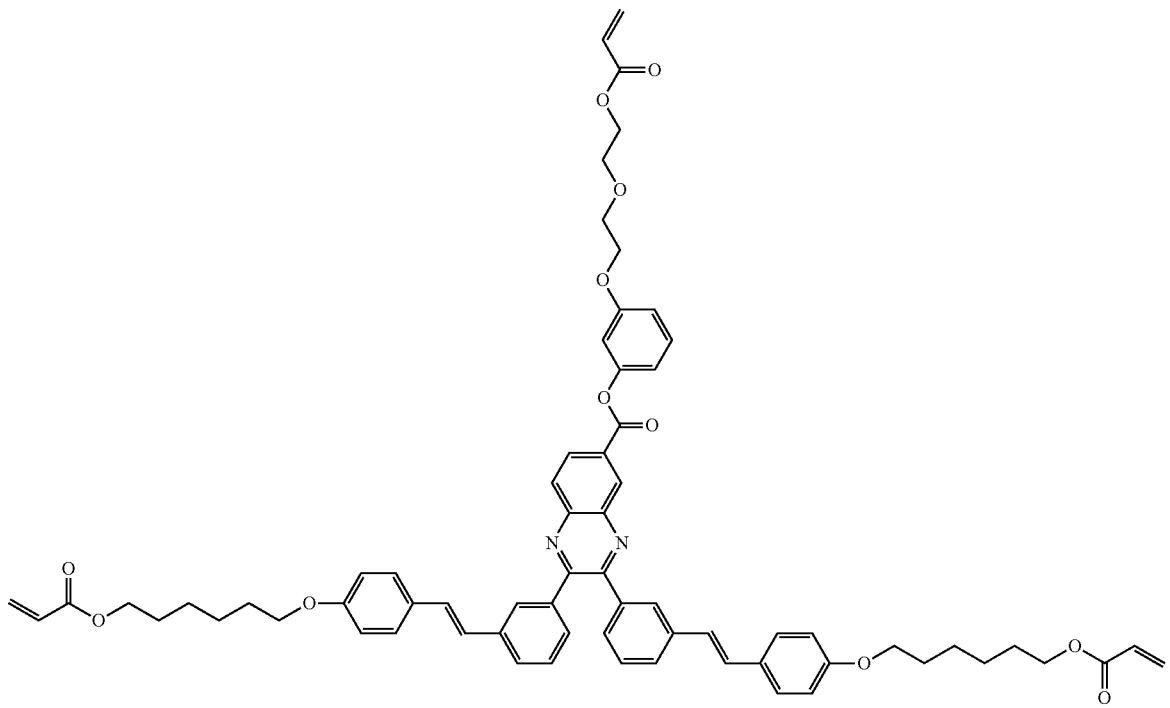
[Chemical Formula 1-90]
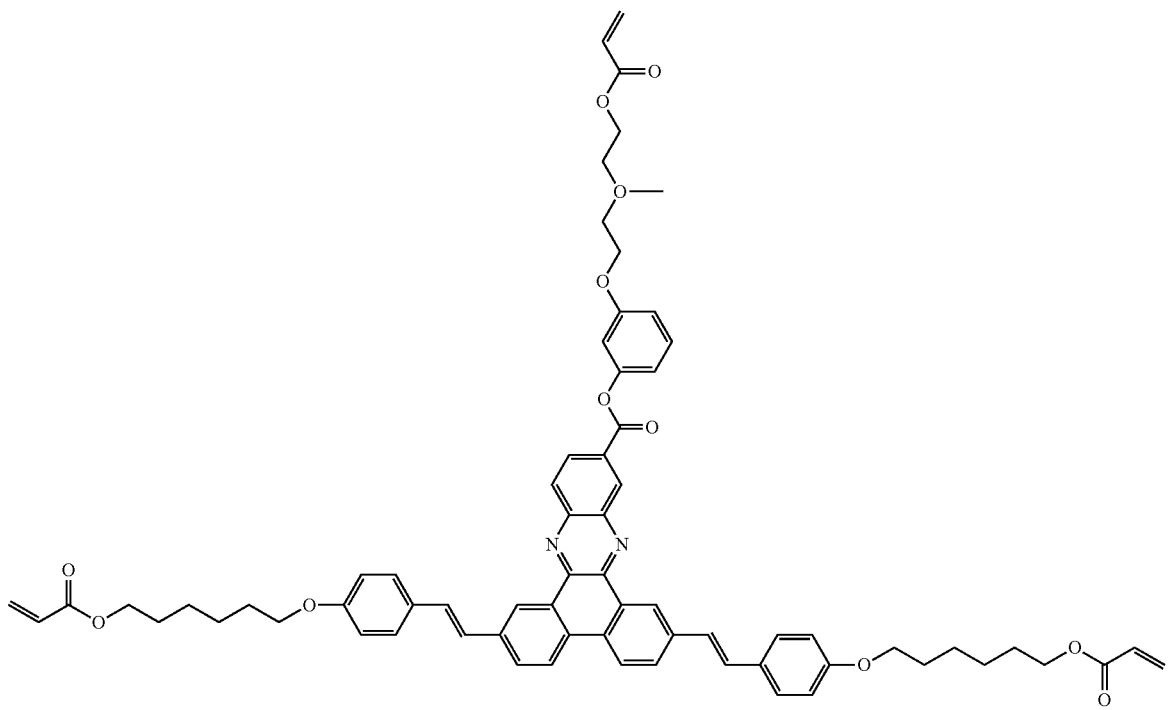

[Chemical Formula 1-91]
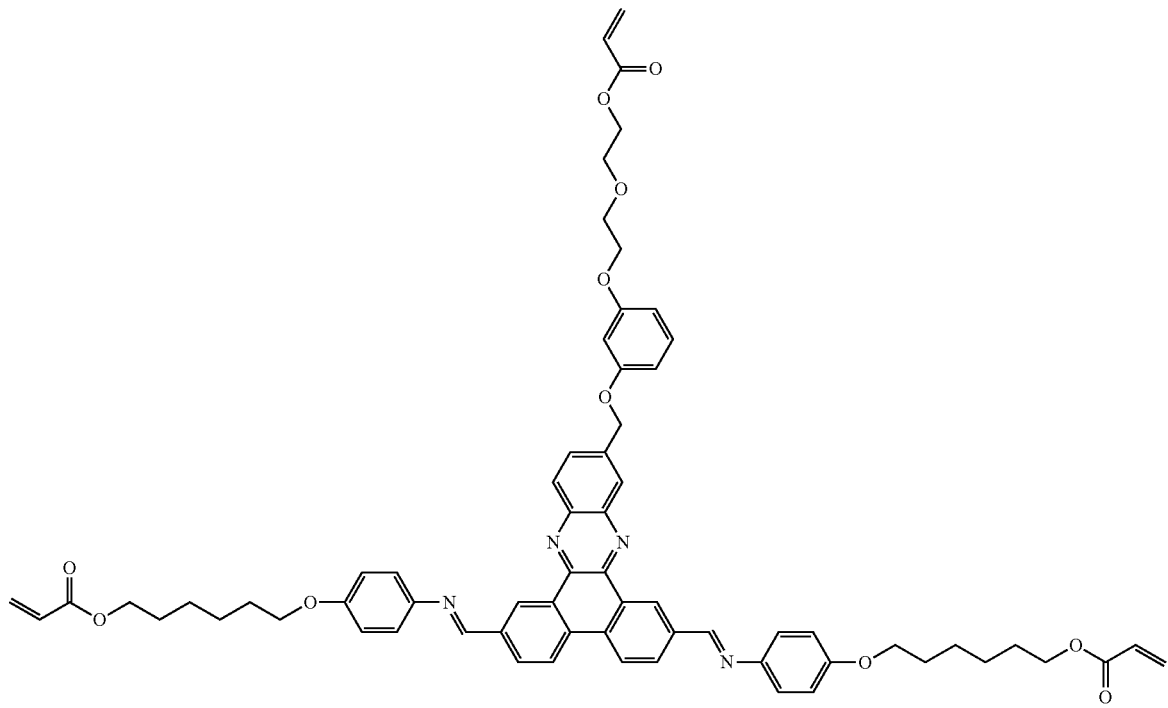
[Chemical Formula 1-92]
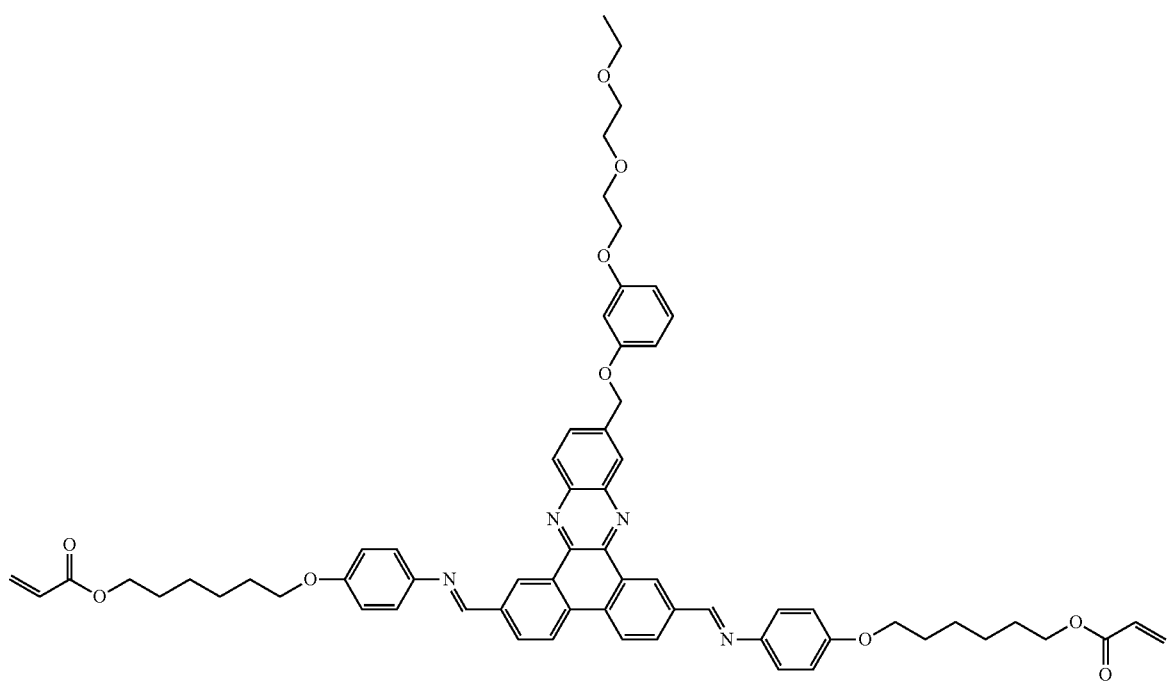

[Chemical Formula 1-95]
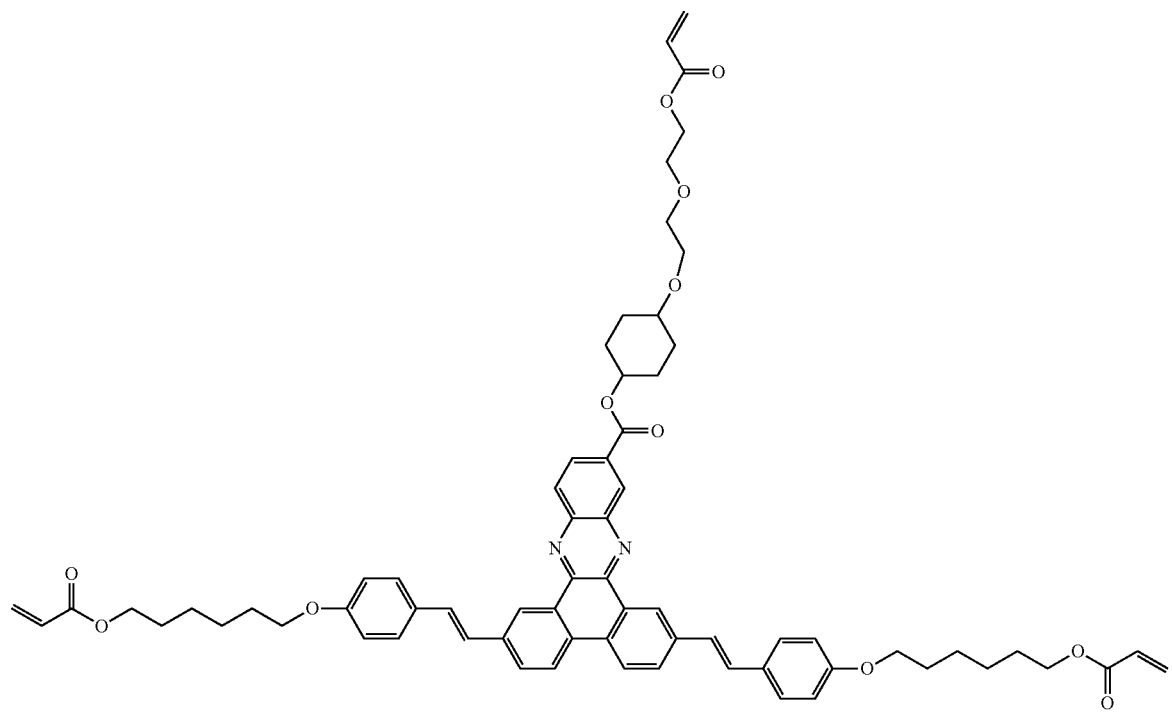
[Chemical Formula 1-97]
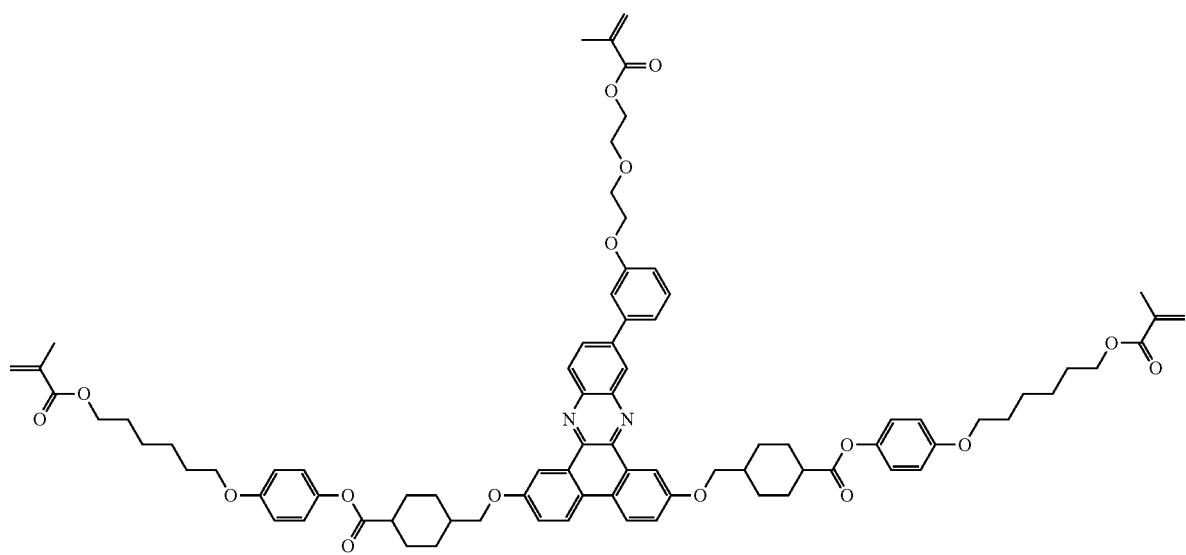

[Chemical Formula 1-98]
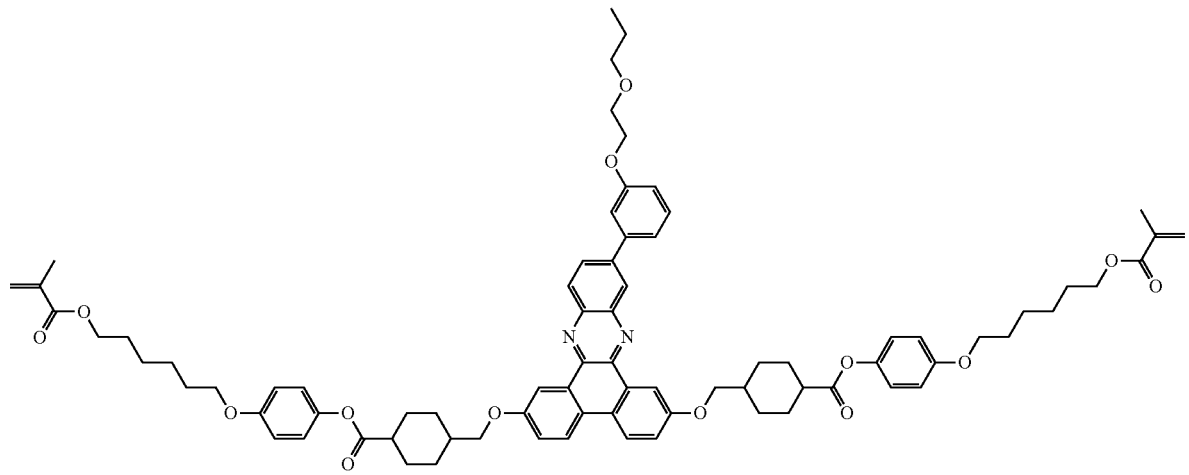
[Chemical Formula 1-99]
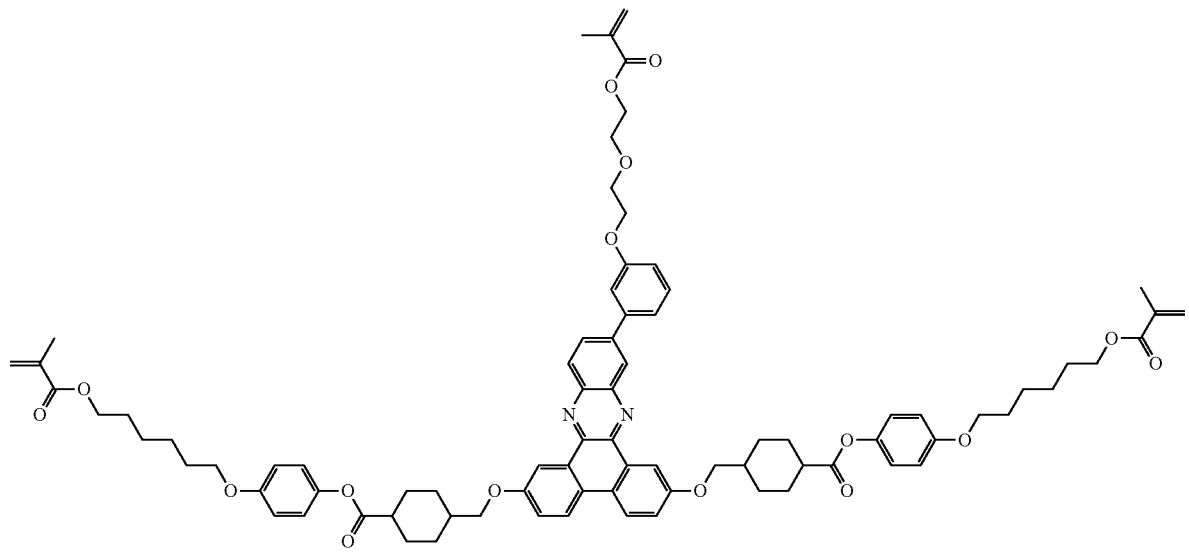
[Chemical Formula 1-100]
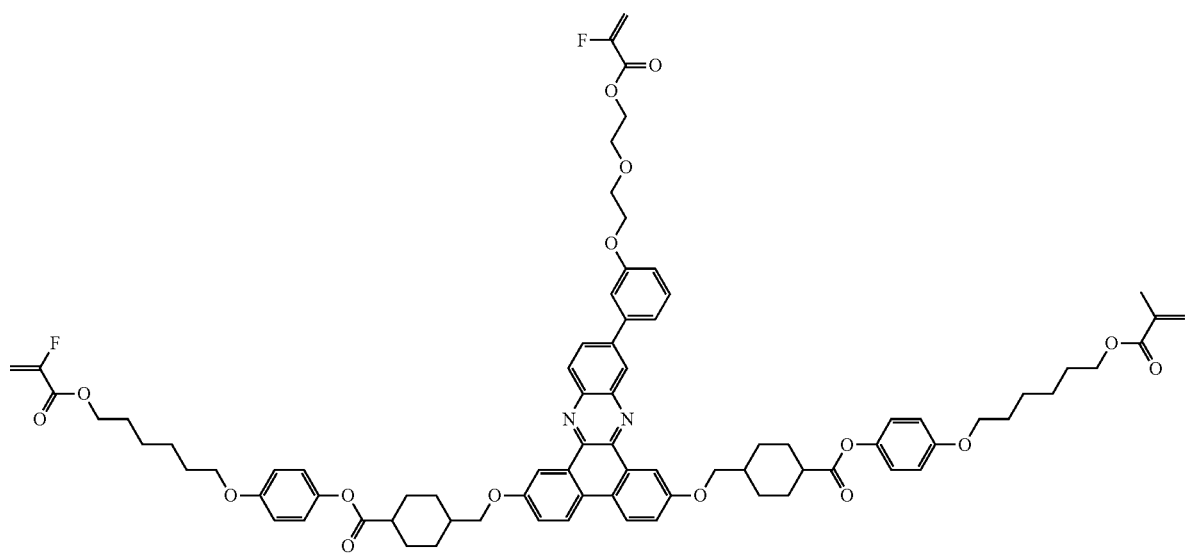

[Chemical Formula 1-101]
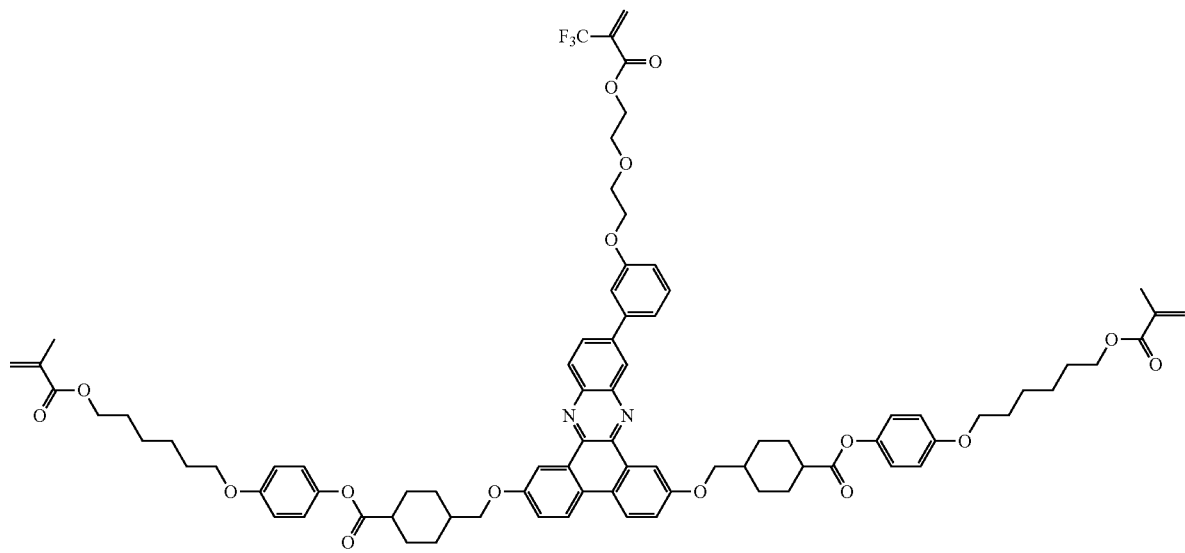
[Chemical Formula 1-102]
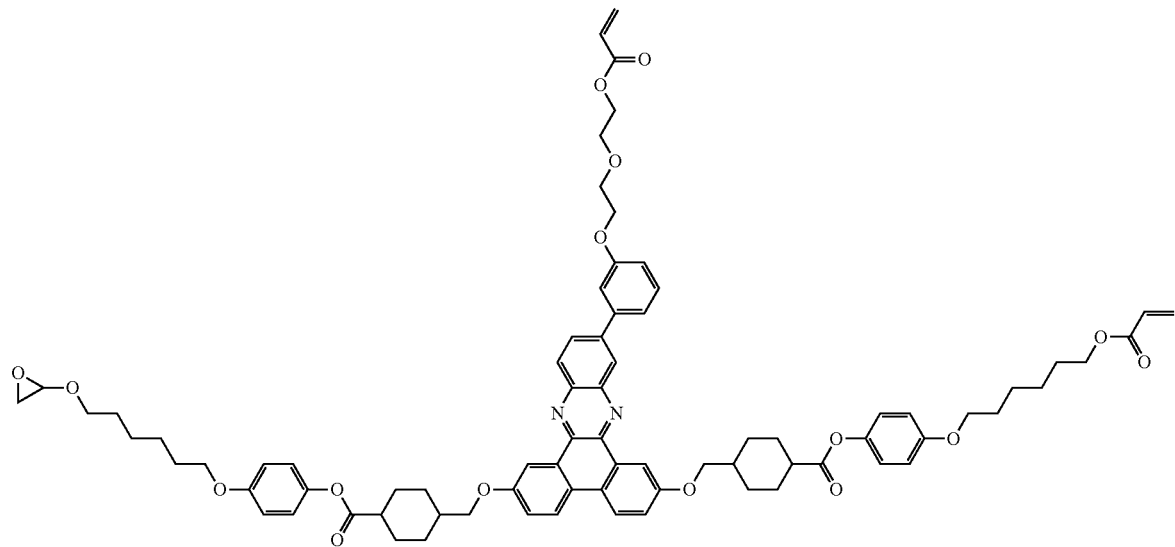

[Chemical Formula 1-103]
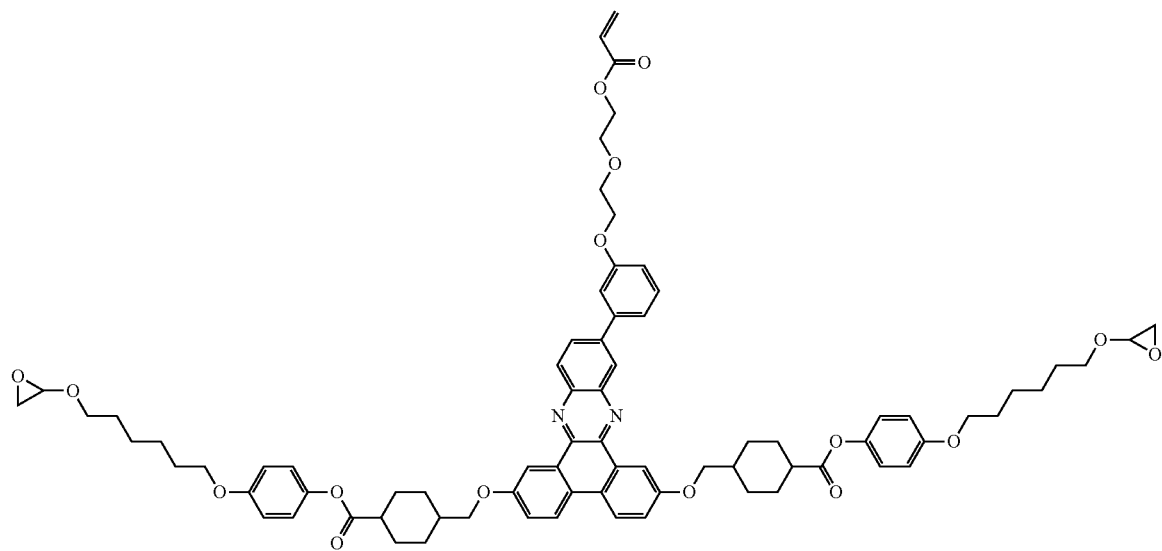
[Chemical Formula 1-104]
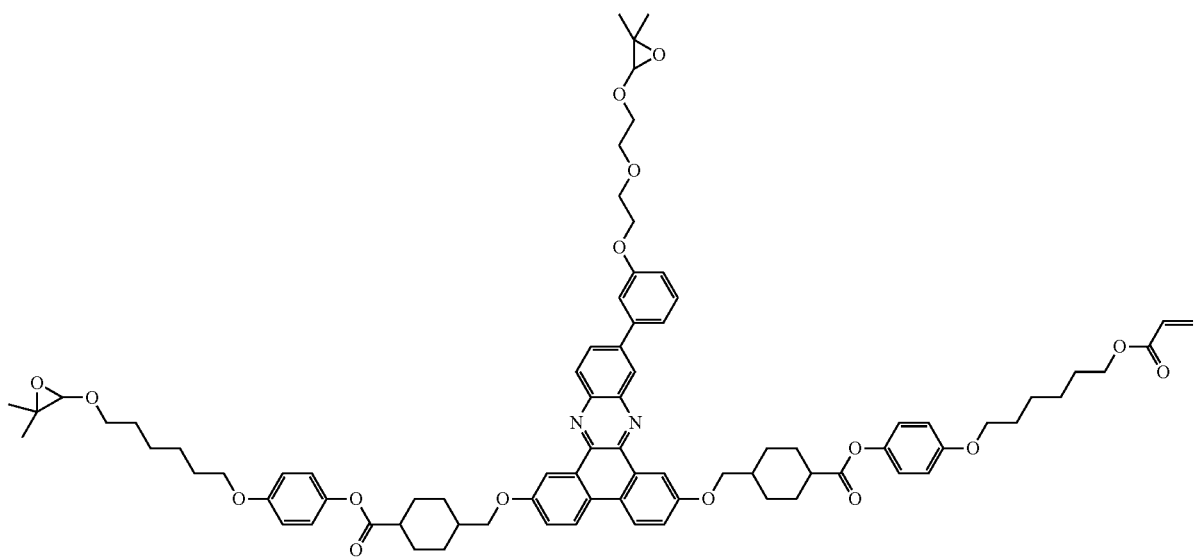

[Chemical Formula 1-105]
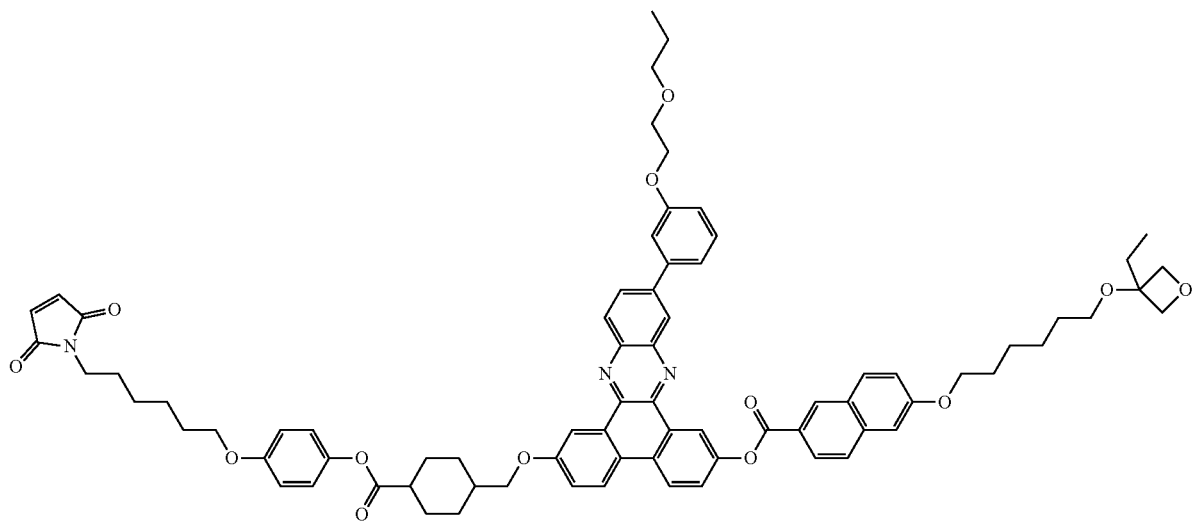
[Chemical Formula 1-106]
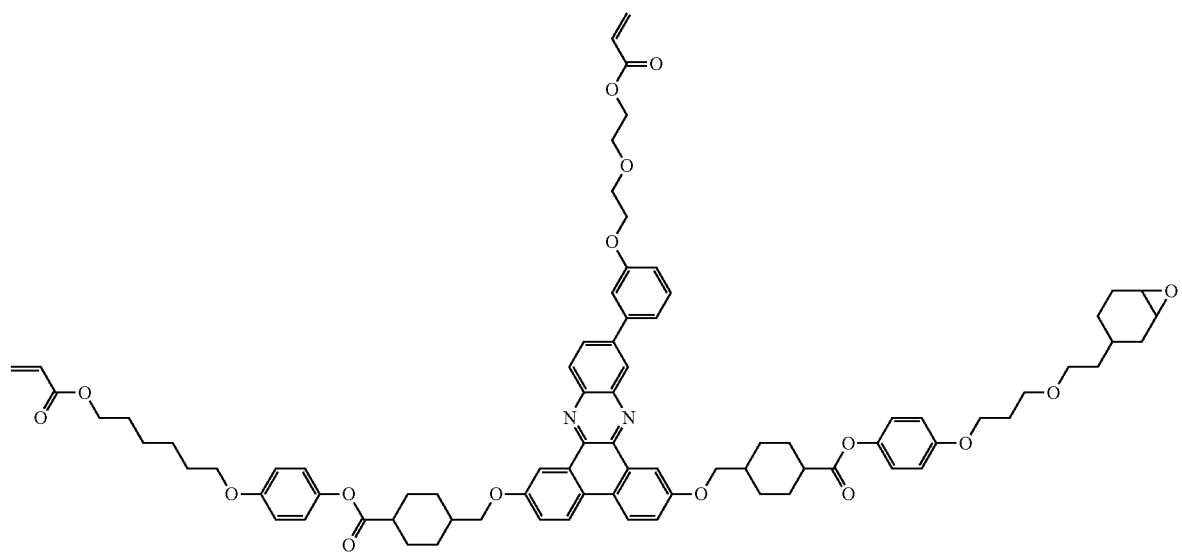

[Chemical Formula 1-107]
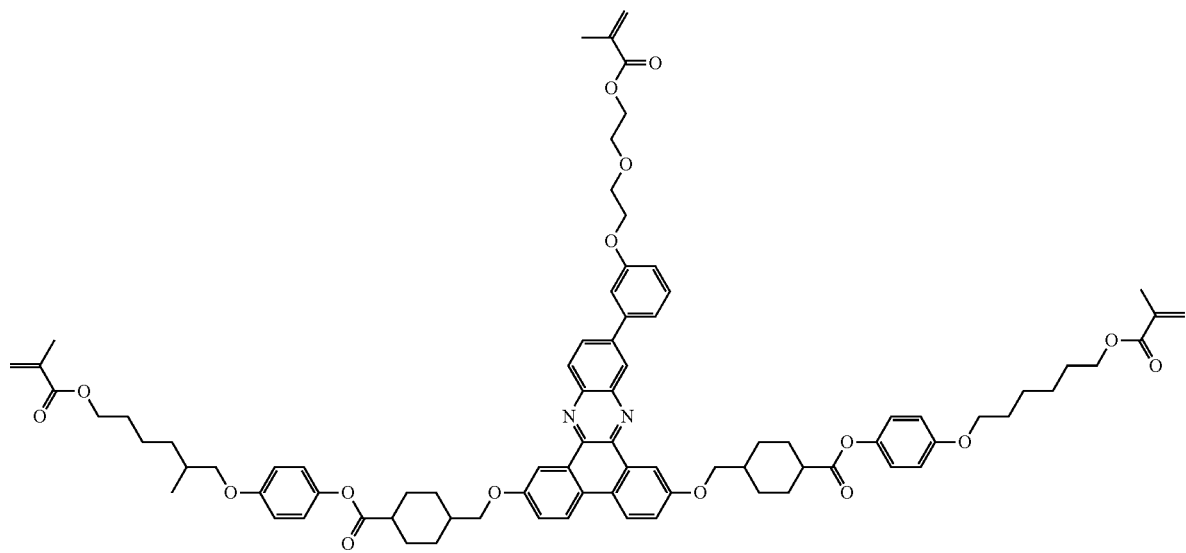
[Chemical Formula 1-108]
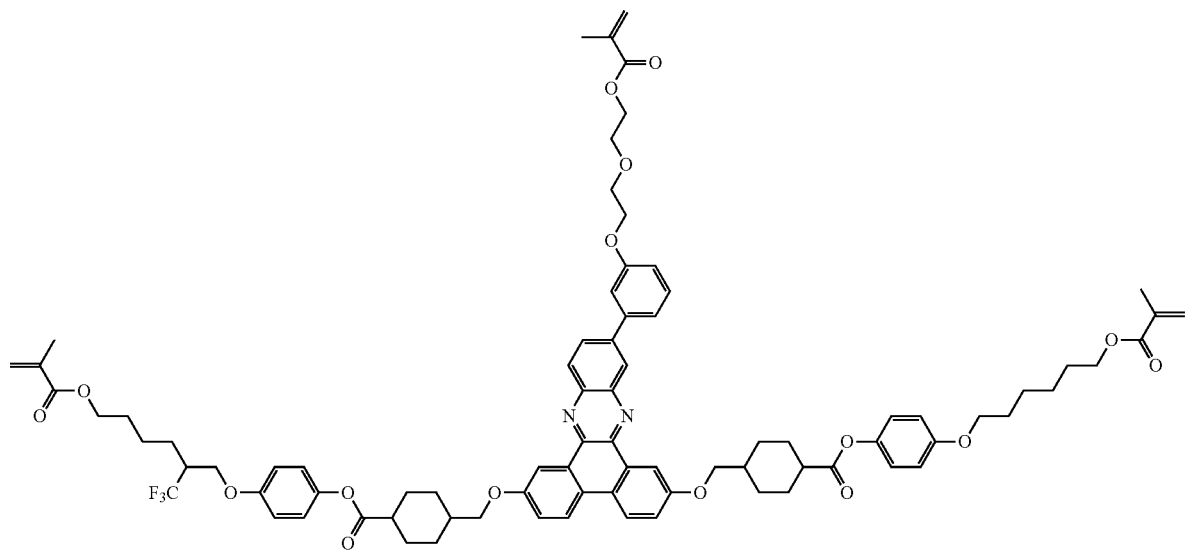
[Chemical Formula 1-109]
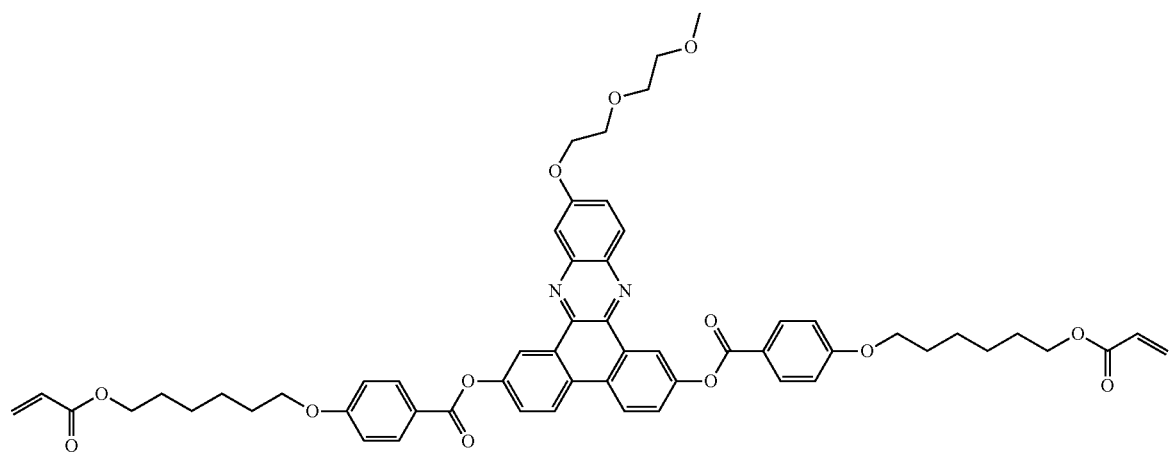

-continued
[Chemical Formula 1-112]
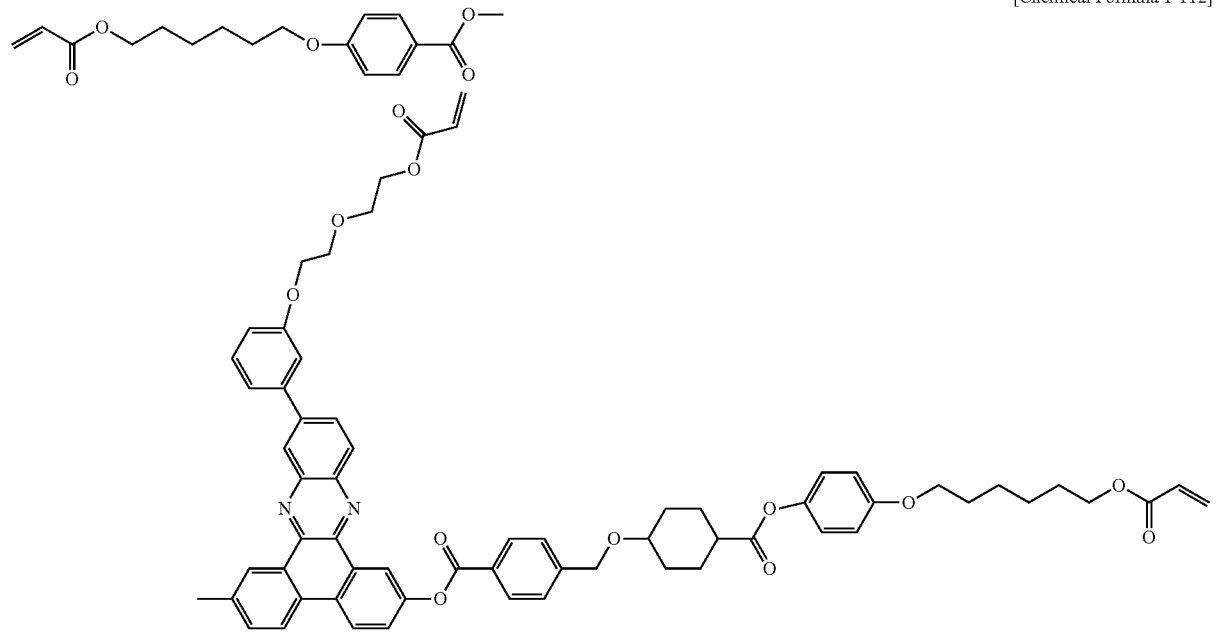
[Chemical Formula 1-113]
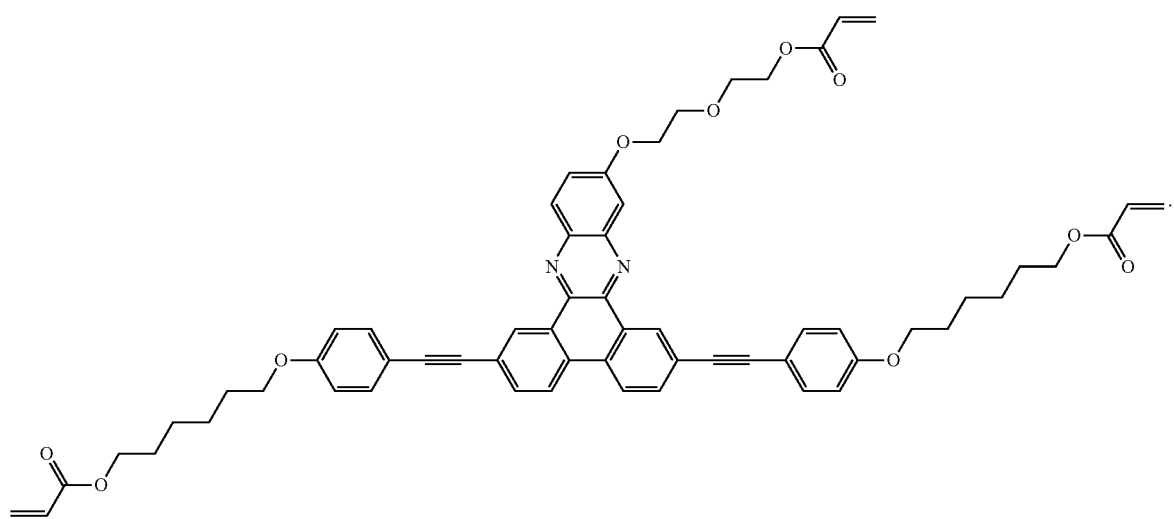
* * * * *